(12) United States Patent
Mochizuki et al.

(10) Patent No.: US 12,375,131 B2
(45) Date of Patent: Jul. 29, 2025

(54) MOBILE COMMUNICATION SYSTEM

(71) Applicant: Mitsubishi Electric Corporation, Tokyo (JP)

(72) Inventors: Mitsuru Mochizuki, Tokyo (JP); Miho Maeda, Tokyo (JP); Shinsuke Uga, Tokyo (JP); Noriyuki Fukui, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 18/330,840

(22) Filed: Jun. 7, 2023

(65) Prior Publication Data

US 2023/0353194 A1 Nov. 2, 2023

Related U.S. Application Data

(60) Continuation of application No. 15/624,126, filed on Jun. 15, 2017, which is a division of application No. (Continued)

(30) Foreign Application Priority Data

Jan. 27, 2012 (JP) ................................. 2012-015282

(51) Int. Cl.
*H04B 7/02* (2018.01)
*H04B 7/024* (2017.01)
(Continued)

(52) U.S. Cl.
CPC .......... *H04B 7/024* (2013.01); *H04J 11/0073* (2013.01); *H04L 5/0035* (2013.01);
(Continued)

(58) Field of Classification Search
None
See application file for complete search history.

(56) References Cited

U.S. PATENT DOCUMENTS

2007/0026865 A1 2/2007 Yano et al.
2009/0154580 A1 6/2009 Ahn et al.
(Continued)

FOREIGN PATENT DOCUMENTS

CN 101578837 11/2009
CN 101873666 A 10/2010
(Continued)

OTHER PUBLICATIONS

3GPP TSG-RAN WG1 #67 R1-113762, "CSI-RS configurations for CoMP", ZTE, Nov. 14-18, 2011, pp. 1-3 (Year: 2011).*
(Continued)

*Primary Examiner* — Scott M Sciacca
(74) *Attorney, Agent, or Firm* — PROCOPIO, CORY, HARGREAVES & SAVITCH LLP

(57) ABSTRACT

In a mobile communication system, an RRM measurement set is set as a collection of cells to become targets on which a UE performs a process of detecting whether or not radio communication is allowed. Among the cells in the RRM measurement set, a CoMP measurement set is set as a collection of cells to become candidates on which the UE performs a process of detecting whether or not coordinated communication (CoMP communication) is allowed. Among the cells of the CoMP measurement set, a CoMP active set is set as a collection of cells to become targets on which the UE performs the process of detecting whether or not CoMP communication is allowed.

8 Claims, 72 Drawing Sheets

Related U.S. Application Data

14/374,744, filed as application No. PCT/JP2013/051454 on Jan. 24, 2013, now Pat. No. 9,712,213.

(51) Int. Cl.

| | |
|---|---|
| *H04J 11/00* | (2006.01) |
| *H04L 5/00* | (2006.01) |
| *H04W 16/14* | (2009.01) |
| *H04W 24/10* | (2009.01) |
| *H04W 36/00* | (2009.01) |
| *H04W 36/08* | (2009.01) |
| *H04W 48/16* | (2009.01) |
| *H04L 1/1812* | (2023.01) |

(52) U.S. Cl.
CPC .......... *H04L 5/0048* (2013.01); *H04W 16/14* (2013.01); *H04W 24/10* (2013.01); *H04W 36/0005* (2013.01); *H04W 36/00692* (2023.05); *H04W 36/087* (2023.05); *H04W 48/16* (2013.01); *H04L 1/1812* (2013.01)

(56) References Cited

U.S. PATENT DOCUMENTS

| | | | |
|---|---|---|---|
| 2009/0247150 A1* | 10/2009 | Fischer | H04W 24/10 455/425 |
| 2009/0318181 A1 | 12/2009 | Tao et al. | |
| 2010/0039948 A1 | 2/2010 | Agrawal et al. | |
| 2010/0271968 A1 | 10/2010 | Liu et al. | |
| 2011/0028171 A1 | 2/2011 | Guo | |
| 2011/0281585 A1 | 11/2011 | Kwon et al. | |
| 2011/0306350 A1 | 12/2011 | Barbieri | |
| 2012/0028665 A1 | 2/2012 | Kwon et al. | |
| 2012/0113816 A1 | 5/2012 | Bhattad et al. | |
| 2012/0155312 A1 | 6/2012 | Kim et al. | |
| 2012/0176939 A1 | 7/2012 | Qu et al. | |
| 2012/0190375 A1 | 7/2012 | Gu | |
| 2012/0263122 A1 | 10/2012 | Shi et al. | |
| 2012/0264449 A1 | 10/2012 | Kazmi et al. | |
| 2012/0287875 A1 | 11/2012 | Kim et al. | |
| 2012/0307639 A1 | 12/2012 | Zirwas | |
| 2012/0315917 A1 | 12/2012 | Comeau | |
| 2013/0003788 A1 | 1/2013 | Marinier et al. | |
| 2013/0010763 A1* | 1/2013 | Chen | H04B 17/382 370/331 |
| 2013/0021925 A1 | 1/2013 | Yin | |
| 2013/0028109 A1 | 1/2013 | Jöngren et al. | |
| 2013/0044685 A1 | 2/2013 | Fong et al. | |
| 2013/0077513 A1 | 3/2013 | Ng et al. | |
| 2013/0077521 A1 | 3/2013 | Feng et al. | |
| 2013/0083681 A1 | 4/2013 | Ebrahimi Tazeh Mahalleh et al. | |
| 2013/0114427 A1 | 5/2013 | Maattanen | |
| 2013/0114430 A1 | 5/2013 | Koivisto | |
| 2013/0114431 A1 | 5/2013 | Koivisto | |
| 2013/0279344 A1 | 10/2013 | Wang | |
| 2013/0343317 A1 | 12/2013 | Etemad et al. | |
| 2014/0301345 A1 | 10/2014 | Kim et al. | |

FOREIGN PATENT DOCUMENTS

| | | |
|---|---|---|
| CN | 101932050 A | 12/2010 |
| EP | 2 182 663 A1 | 5/2010 |
| JP | 10-503356 A | 3/1998 |
| JP | 2008-311857 A | 12/2008 |
| JP | 2009-514360 A | 4/2009 |
| WO | 2010/081166 A2 | 7/2010 |
| WO | 2010/143911 A2 | 12/2010 |
| WO | 2011/017515 A2 | 2/2011 |
| WO | 2011/020062 A2 | 2/2011 |
| WO | 2011/029458 A1 | 3/2011 |
| WO | 2011/085608 A1 | 7/2011 |
| WO | 2011/100520 A1 | 8/2011 |
| WO | 2011/147462 A1 | 12/2011 |
| WO | 2011/152347 A1 | 12/2011 |
| WO | 2011/161538 A2 | 12/2011 |
| WO | WO-2011150695 A1 * | 12/2011 ........... H04B 17/382 |
| WO | 2012/005444 A1 | 1/2012 |

OTHER PUBLICATIONS

Japanese Patent Office, Office Action, Application No. 2023-008486, dated Mar. 26, 2024, in 6 pages.

3GPP TSG RAN WG1 Meeting #66bis R1-113295, "RRM measurement set management for Rel-11 CaMP", NTT DOCOMO, pp. 1-3, (Oct. 10-14, 2011).

3GPP TSG RAN WG1 meeting #57bis R1-092822, "Views on the relationship among CoMP sets", CMCC, Total 12 Pages, (Jun. 29-Jul. 3, 2009).

3GPP TSG-RAN WG2#76 meeting R2-116070, "CoMP architecture and CoMP RRM measurement", Samsung, pp. 1-5, (Nov. 14-18, 2011).

3GPP TSG RAN WG2 Meeting #66bis R2-093727, "Impact of CoMP on Control Plane", CATT, Total 5 Pages, (Jun. 29-Jul. 3, 2009).

3GPP TSG RAN WG1 meeting #57 R1-091830, "Views on the relationship among CoMP sets", CMCC, Total 14 Pages, (May 4-8, 2009).

3GPP TSG-RAN WG1 #67 R1-113937, "DL control signaling for DL CaMP", Intel Corporation, Total 4 Pages, (Nov. 14-18, 2011).

3GPP TS 36.300 V10.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", LTE Advanced, pp. 1-194, (Sep. 2011).

3GPP TS 36.331 V10.3.0, "3rd Generation Partnership Project; Technical Specification Group Radio Access Network; Evolved Universal Terrestrial Radio Access (E-UTRA); Radio Resource Control (RRC); Protocol specification (Release 10)", LTE Advanced, pp. 1-296, (Sep. 2011).

3GPP TS 36.304 V10.3.0, "3rd Generation Partnership Project; Technical Specification Group Radio Access Network; Evolved Universal Terrestrial Radio Access (E-UTRA); User Equipment (UE) procedures in idle mode (Release 10)", LTE Advanced, pp. 1-33, (Sep. 2011).

International Search Report Issued Feb. 26, 2013 in PCT/JP13/051454 Filed Jan. 24, 2013.

3GPP TSG-SA1 #42 S1-083461, "LS on HNB/HeNB Open Access Mode", 3GPP SA WG1, Total 2 Pages, (Oct. 13-17, 2008).

3GPP TSG-RAN WG 2 meeting #62 R2-082899, "LS on CSG cell identification", RAN2, pp. 1-2, (May 5-9, 2008).

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", LTE Advanced, pp. 1-104, (Mar. 2010).

3GPP TR 36.912 V10.0.0, "3rd Generation Partnership Project; Technical Specification Group Radio Access Network; Feasibility study for Further Advancements for E-UTRA (LTE-Advanced) (Release 10)", LTE Advanced, Total 261 Pages, (Mar. 2011).

3GPP TS 36.101 V10.3.0, "3rd Generation Partnership Project; Technical Specification Group Radio Access Network; Evolved Universal Terrestrial Radio Access (E-UTRA); User Equipment (UE) radio transmission and reception (Release 10)", LTE Advanced, pp. 1-83, (Jun. 2011).

3GPP TR 23.830 V9.0.0, "3rd Generation Partnership Project; Technical Specification Group Services and System Aspects; Architecture aspects of Home NodeB and Home eNodeB (Release 9)", LTE, pp. 1-55, (Sep. 2009).

3GPP TR 36.819 V11.0.0, "3rd Generation Partnership Project; Technical Specification Group Radio Access Network; Coordinated multi-point operation for LTE physical layer aspects (Release 11)", LTE Advanced, pp. 1-68, (Sep. 2011).

3GPP TSG-RAN WG1 #66b R1-113064, "Further Considerations on Scenario3", Hitachi Ltd., pp. 1-6, (Oct. 10-14, 2011).

(56) References Cited

OTHER PUBLICATIONS

3GPP TS 23.271 V10.2.0, "3rd Generation Partnership Project; Technical Specification Group Services and System Aspects; Functional stage 2 description of Location Services (LeS) (Release 10)", LTE Advanced, pp. 1-31, (Mar. 2011).
3GPP TS 36.305 V10.3.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)", LTE Advanced, pp. 1-51, (Sep. 2011).
3GPP TSG-RAN WG1#66bis meeting R1-113092, "Discussions on TP associations for CoMP", Samsung, pp. 1-3, (Oct. 10-14, 2011).
3GPP TSG RAN WG1 Meeting #66 bis R1-113157, "Summary of email discussion on enhanced PDCCH", NOKIA, Total 7 Pages, (Oct. 10-14, 2011).
3GPP TSG RAN WG1 #67 R1-114214, "TxD Tradeoffs for PUCCH Format 1b with Channel Selection", Samsung, pp. 1-2, (Nov. 14-18, 2011).
3GPP TS 36.322 V10.0.0, "3rd Generation Partnership Project; Technical Specification Group Radio Access Network; Evolved Universal Terrestrial Radio Access (E-UTRA); Radio Link Control (RLC) protocol specification (Release 10)", LTE Advanced, pp. 1-39, (Dec. 2010).
3GPP TS 36.321 V10.4.0, "3rd Generation Partnership Project; Technical Specification Group Radio Access Network; Evolved Universal Terrestrial Radio Access (E-UTRA); Medium Access Control (MAC) protocol specification (Release 10)", LTE Advanced, pp. 1-54, (Dec. 2011).
3GPP TS 23.203 V11.2.0, "3rd Generation Partnership Project; Technical Specification Group Services and System Aspects; Policy and charging control architecture (Release 11)", LTE Advanced, pp. 1-142, (Jun. 2011).
International Preliminary Report on Patentability and Written Opinion issued Aug. 7, 2014, in International Application No. PCT/JP2013/051454 (with English translation).
Extended European Search Report issued Sep. 4, 2015 in Patent Application No. 13740777.1.
"Design Considerations for COMP Joint Transmission", 3GPP TSG RAN WG1 Meeting #56bis R1-091232, Samsung, 10 Pages, (Mar. 23-27, 2009).
"Proposal for CoMP Terminology Alignment", 3GPP TSG RAN WG1 Meeting #56bis R1-091188, LG Electronics, 6 Pages, (Mar. 23-27, 2009).
Office Action issued Nov. 8, 2016 in Japanese Patent Application No. 2013-555306 (with English-language Translation).
Japanese Office Action issued Jan. 31, 2017 in Patent Application No. 2013-555306 (with English Translation).
Office Action issued Mar. 3, 2023, in European Application No. 19163158.9, 7 pages.
Office Action issued Nov. 24, 2022, in corresponding Chinese Patent Application No. 201810150731.2 (with English Translation), 27 pages.
Office Action issued Nov. 30, 2022, in corresponding Chinese Patent Application No. 201810150729.5 (with English Translation), 17 pages.
Notice of Reexamination issued Jun. 24, 2022 in Chinese Application No. 201810150731.2 (with Computer Generated English Translation).
Office Action issued Jul. 5, 2022 in Japanese Application No. 2021-077369 (with Computer Generated English Translation).
"E-PDCCH Design Considerations", 3GPP TSG RAN WG1 Meeting #67, R1-113875, NEC Group, Nov. 14-18, 2011, 6 pages.
"Design Consideration for E-PDCCH", 3GPP TSG RAN WG1 Meeting #66 bis, R1-113236, Research In Motion, UK Limited, Oct. 10-14, 2011, 6 pages.
"Discussions on Enhanced PDCCH in Rel-11", 3GPP TSG RAN WG1 Meeting #66bis, R1-113067, ETRI, Oct. 10-14, 2011, 4 pages.
Chinese Decision of Refusal issued Aug. 31, 2021 in Chinese Application No. 201810150729.5 (with Computer Generated English Translation.

Chinese Decision of Refusal issued Aug. 2, 2021 in Chinese Application No. 201810150731.2 (with Computer Generated English Translation).
Indian Office Action issued Sep. 7, 2021 in Indian Application No. 202048015906.
Indian Office Action issued Sep. 6, 2021 in Indian Application No. 202048015905.
Indian Office Action issued Sep. 7, 2021 in Indian Application No. 202048015907.
Chinese Office Action issued Jun. 9, 2021 in corresponding Chinese Patent Application No. 201810150432.9 (with English translation), 11 pages.
Communication Pursuant to Article 94(3) EPC issued May 25, 2021 in European Application No. 19163158.9.
3GPP TR 36.819 V11.1.0, "3rd Generation Partnership Project; Technical Specification Group Radio Access Network; Coordinated multi-point operation for LTE physical layer aspects (Release 11)", LTE Advanced, Dec. 2011, 69 pages.
Office Action issued Apr. 6, 2021 in corresponding Chinese Patent Application No. 201810150731.2 (with English Translation), 16 pages.
Combined Chinese Office Action and Search Report issued Apr. 16, 2021 in corresponding Chinese Patent Application No. 201810150729.5 (with English Translation), 13 pages.
Huawei, HiSilicon, "Considerations on the ePDCCH design", 3GPP TSG RAN WG1 Meeting #67, R1-113655, Nov. 14-18, 2011, 6 pages.
Combined Chinese Office Action and Search Report issued Nov. 27, 2020 in corresponding Chinese Patent Application No. 201810150432.9 (with English Translation), 14 pages.
Office Action issued Jan. 19, 2021 in corresponding Japanese Patent Application No. 2019-081719 (with English Translation), 12 pages.
Intel Corporation, "Clarifications and Design Requirements for CoMP Scenarios 1-3", TSG—RAN WG1#64, R1-110973, Feb. 21-25, 2011, 4 pages <URL:http://www.3gpp.org/ftp/tsg_ran/WG1_RL1/TSGR1_64/Docs/R1-110973,2011.
Combined Chinese Office Action and Search Report issued Oct. 12, 2020 in corresponding Chinese Patent Application No. 201810150605.7 (with English Translation), 22 pages.
Chinese Office Action issued Aug. 3, 2020 in Chinese Application No. 201810150731.2 (with Computer Generated English Translation).
Chinese Office Action issued Sep. 3, 2020 in Chinese Patent Application No. 201810150729.5 (with Computer Generated English Translation).
Chinese Office Action issued Aug. 20, 2020 in Chinese Patent Application No. 201810150591.9 (with Computer Generated English Translation).
3GPP TSG RAN WG1 Meeting #64, R1-110894, "CoMP set configuration for evaluation", LG Electronics, Feb. 21-25, 2011, pp. 1-3.
Japanese Office Action dated Jun. 23, 2020 in Japanese Patent Application No. 2019-081719 with computer-generated translation.
Office Action issued Oct. 22, 2019 in corresponding Indian Patent Application No. 5778/CHENP/2014 (with English Translation), 7 pages.
Extended European Search Report issued on May 22, 2019 in Patent Application No. 19163158.9, 10 pages.
Japanese Office Action issued Feb. 5, 2019 in Japanese Patent Application No. 2017-087112 (with unedited computer generated English translation), 4 pages.
"Impact of CoMP on Control Plane", CATT, 3GPP TSG RAN WG2 Meeting #67 bis, R2-095488 (Resubmission of R2-094330), Oct. 12-16, 2009, 6 pages.
Japanese Office Action issued Jul. 3, 2018 in Japanese Patent Application No. 2017-087112 (with unedited computer generated English translation), 6 pages.
Extended European Search Report issued Feb. 1, 2018 in European Patent Application No. 17197827.3.
Combined Chinese Office Action and Search Report issued Jul. 3, 2017 in Chinese Patent Application No. 201380006853.X.

(56) References Cited

OTHER PUBLICATIONS

3GPP TSG-RAN WGI #67 R1-113762, "CSI-RS configurations for CoMP", ZTE, Nov. 14-18, 2011, pp. 1-3.

* cited by examiner

F I G . 1
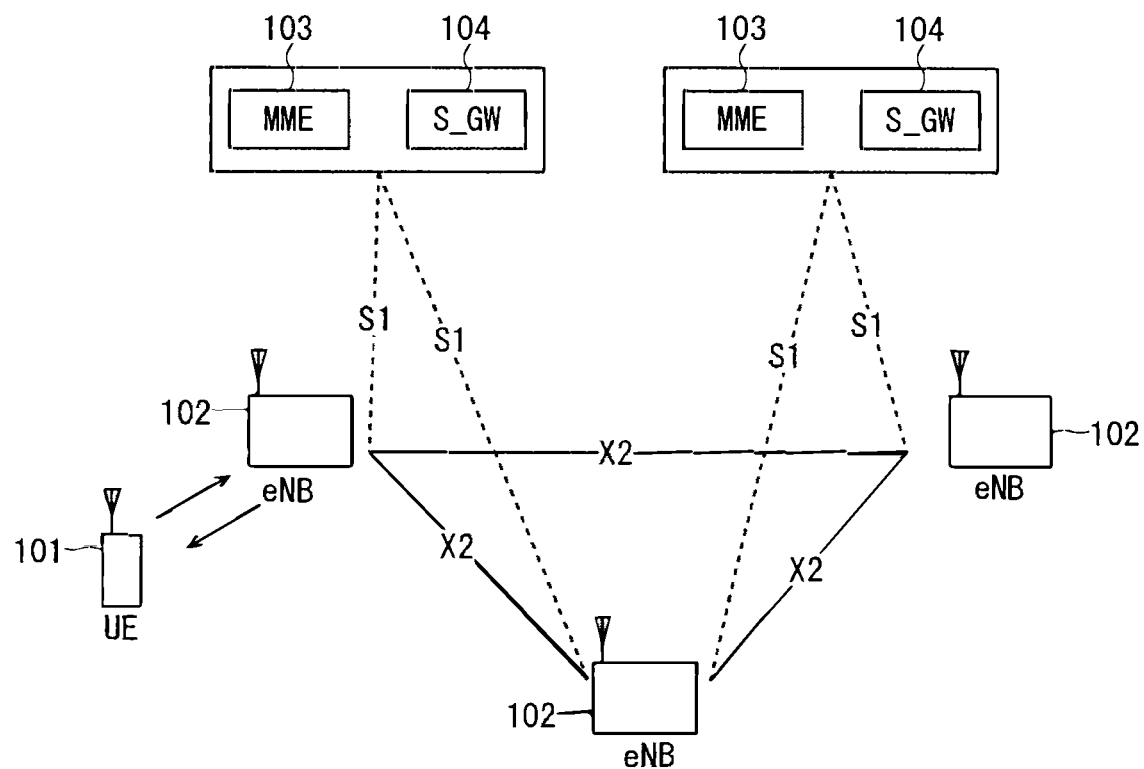

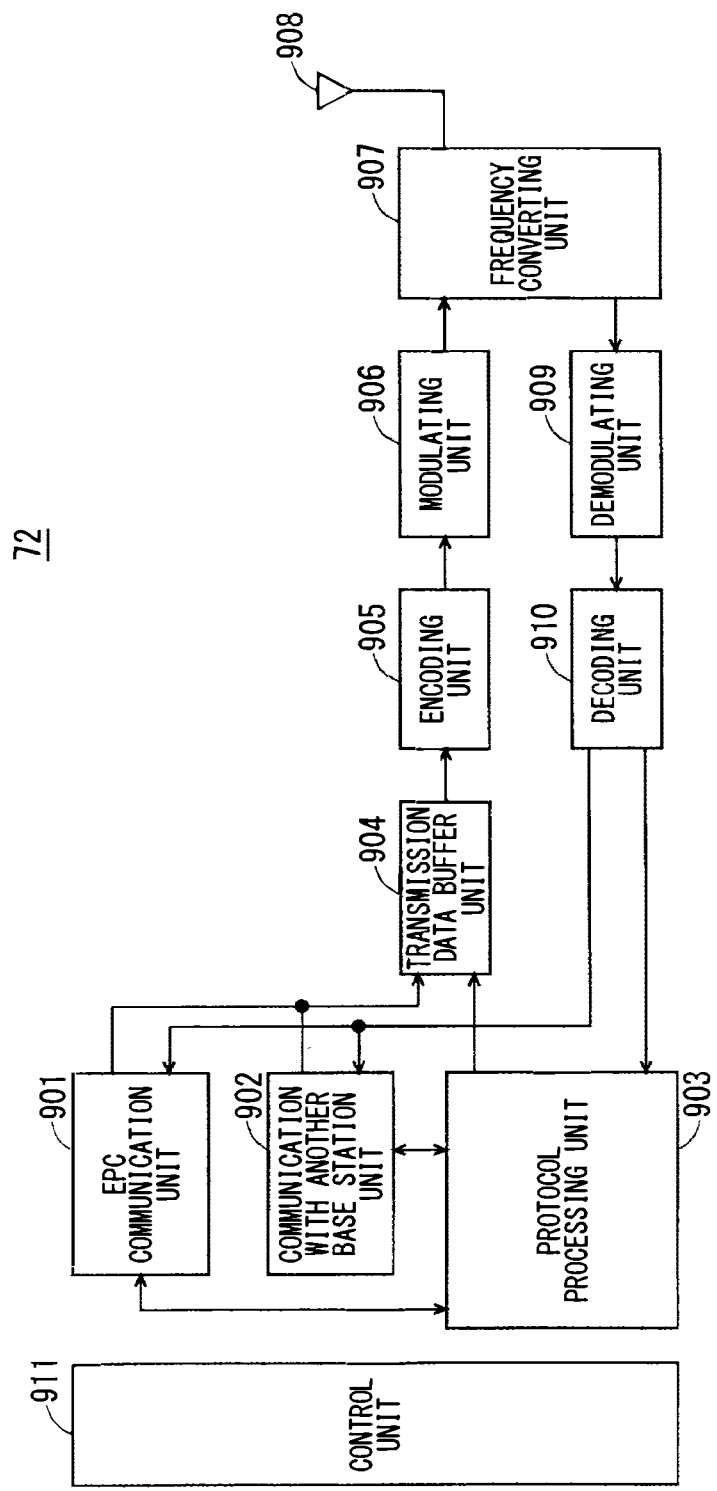

F I G . 1 0
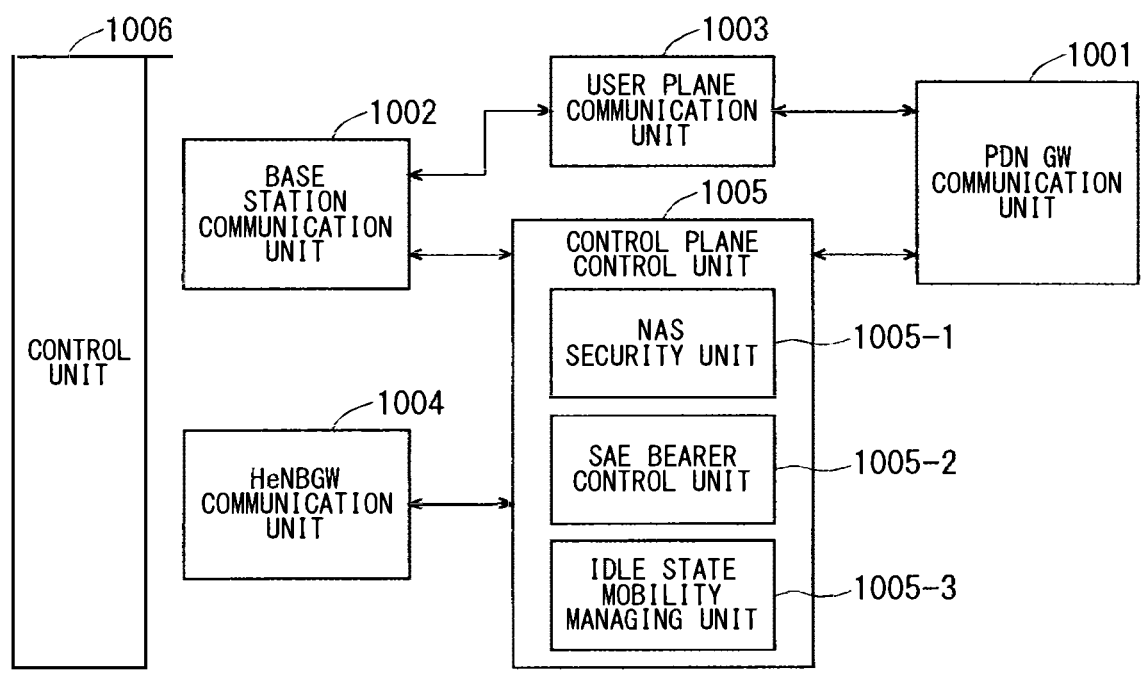

F I G . 1 1
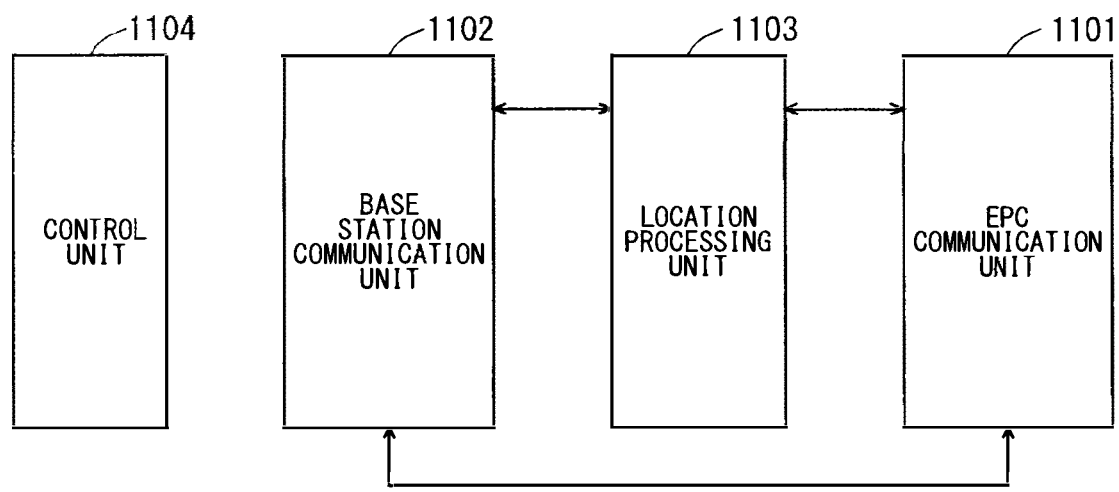

F I G. 1 5
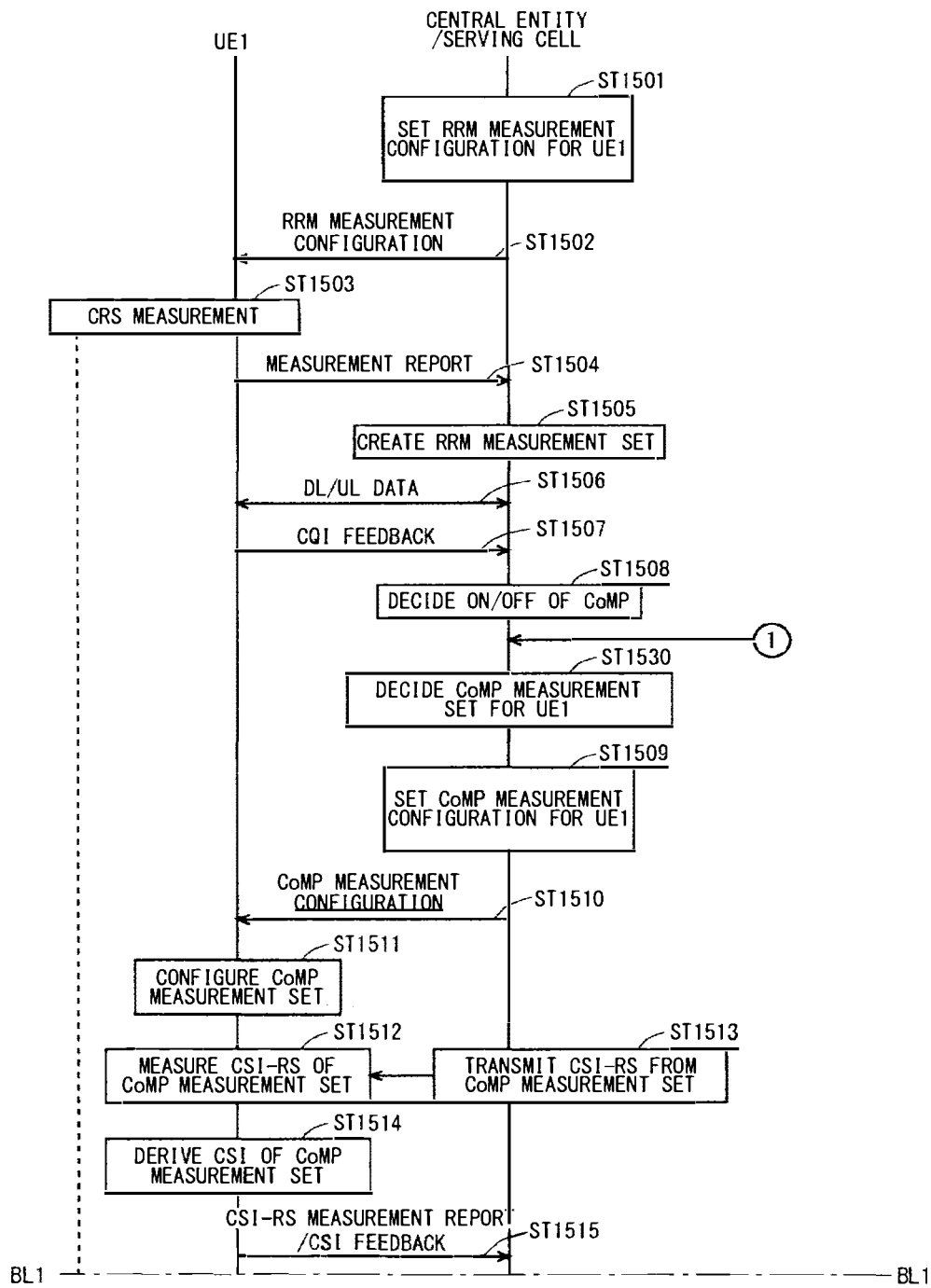

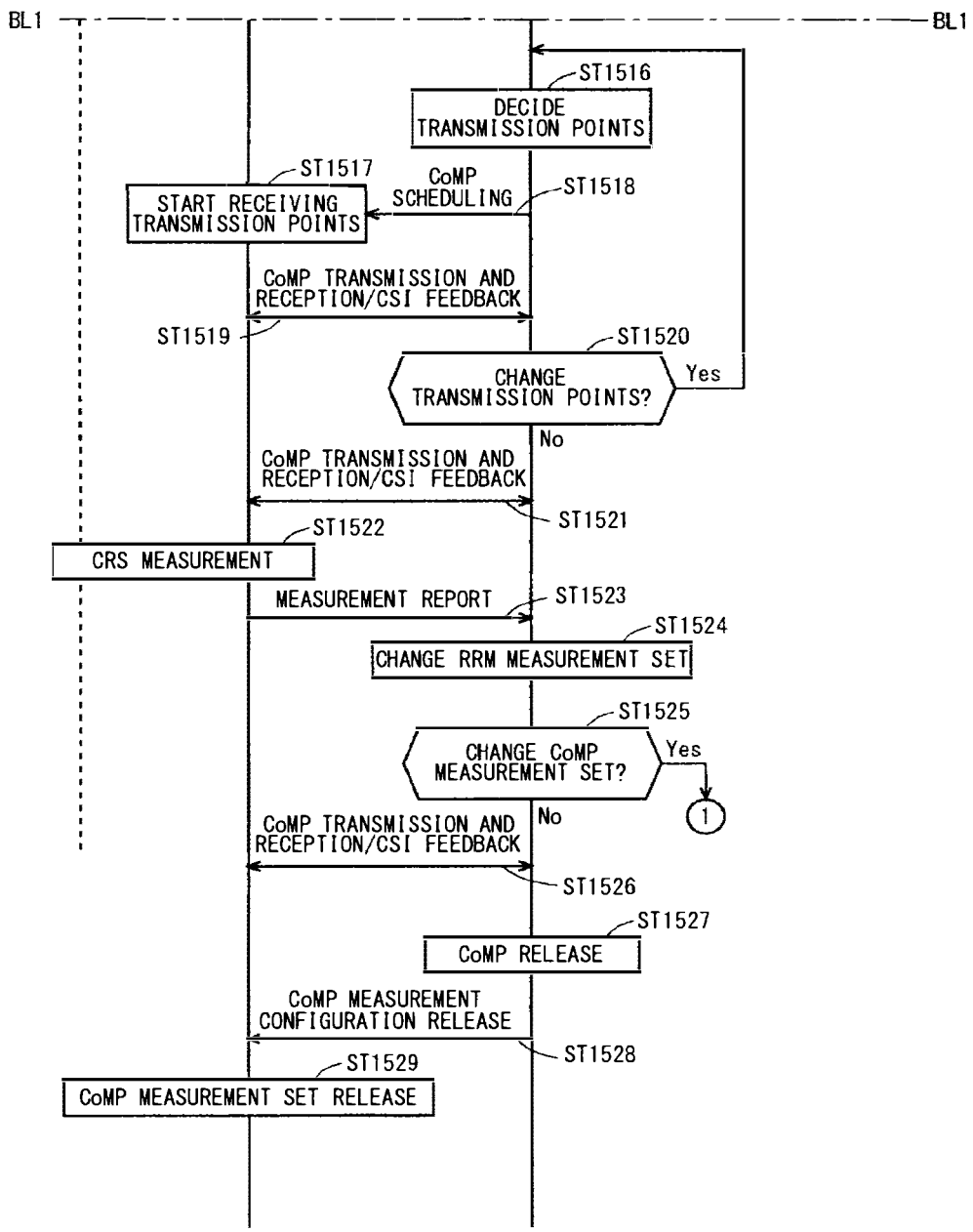
F I G . 1 6

F I G . 1 9
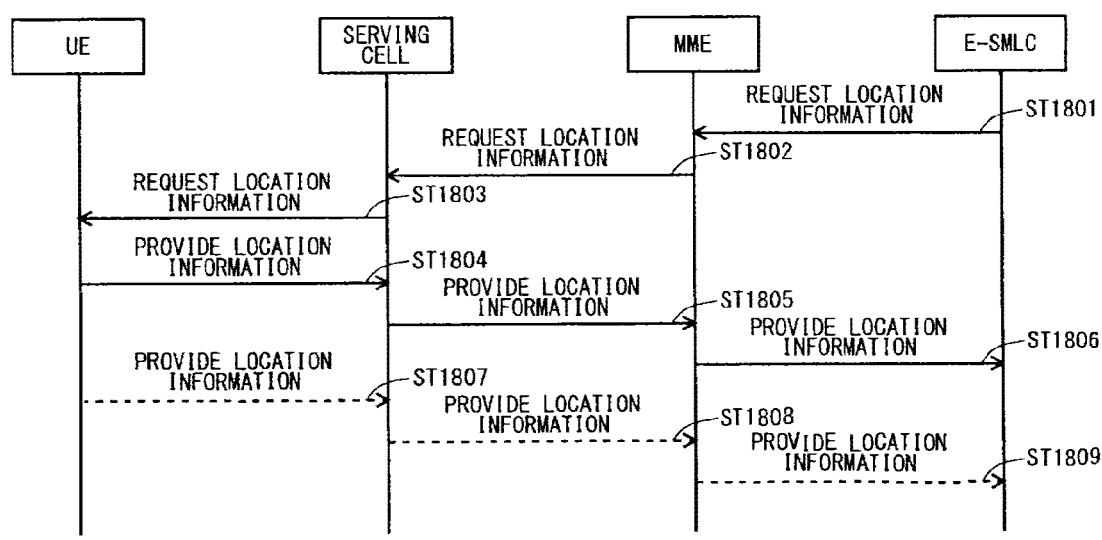

F I G . 2 1
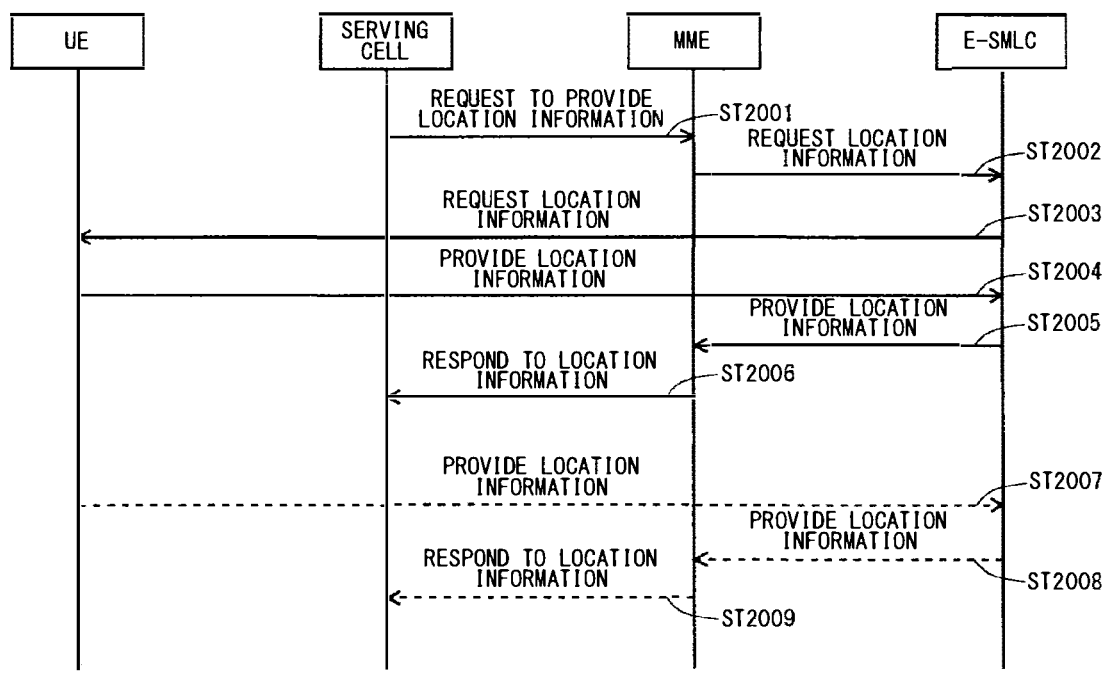

F I G. 2 7
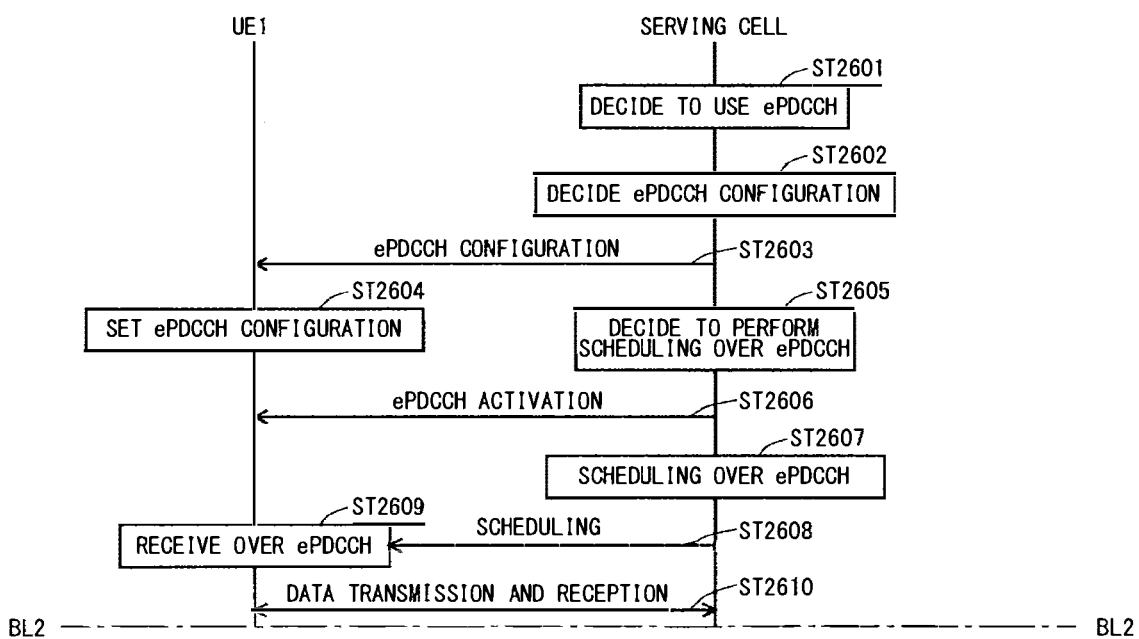

F I G . 2 8
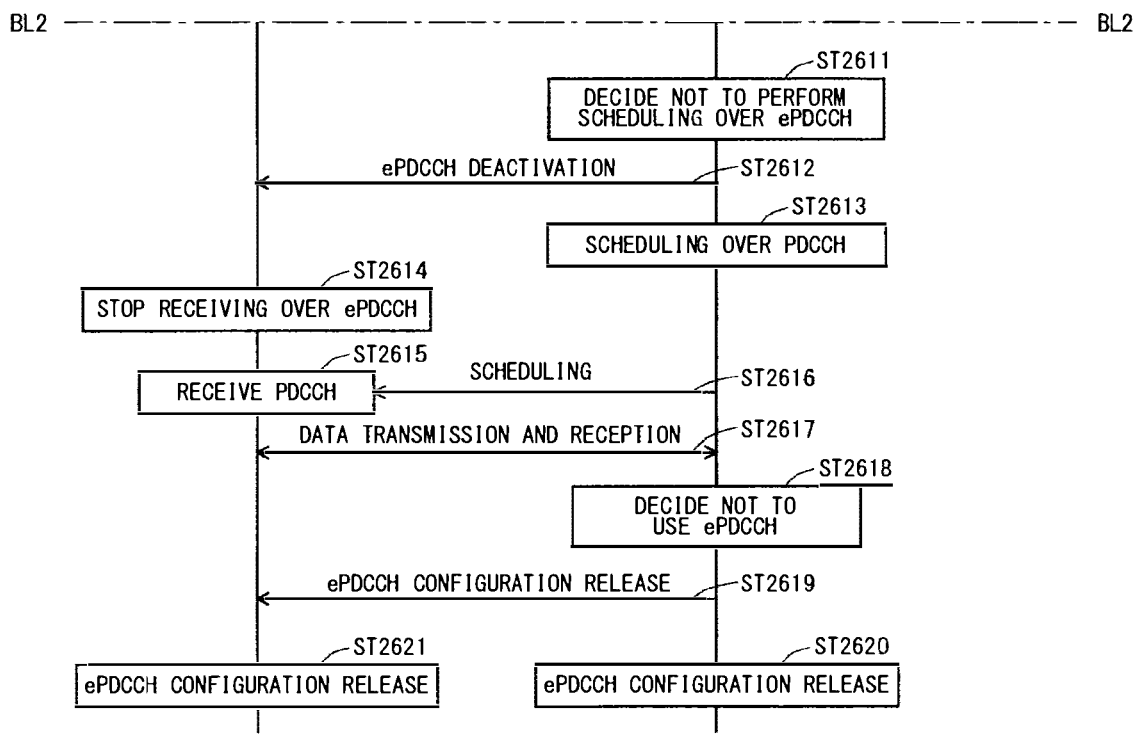

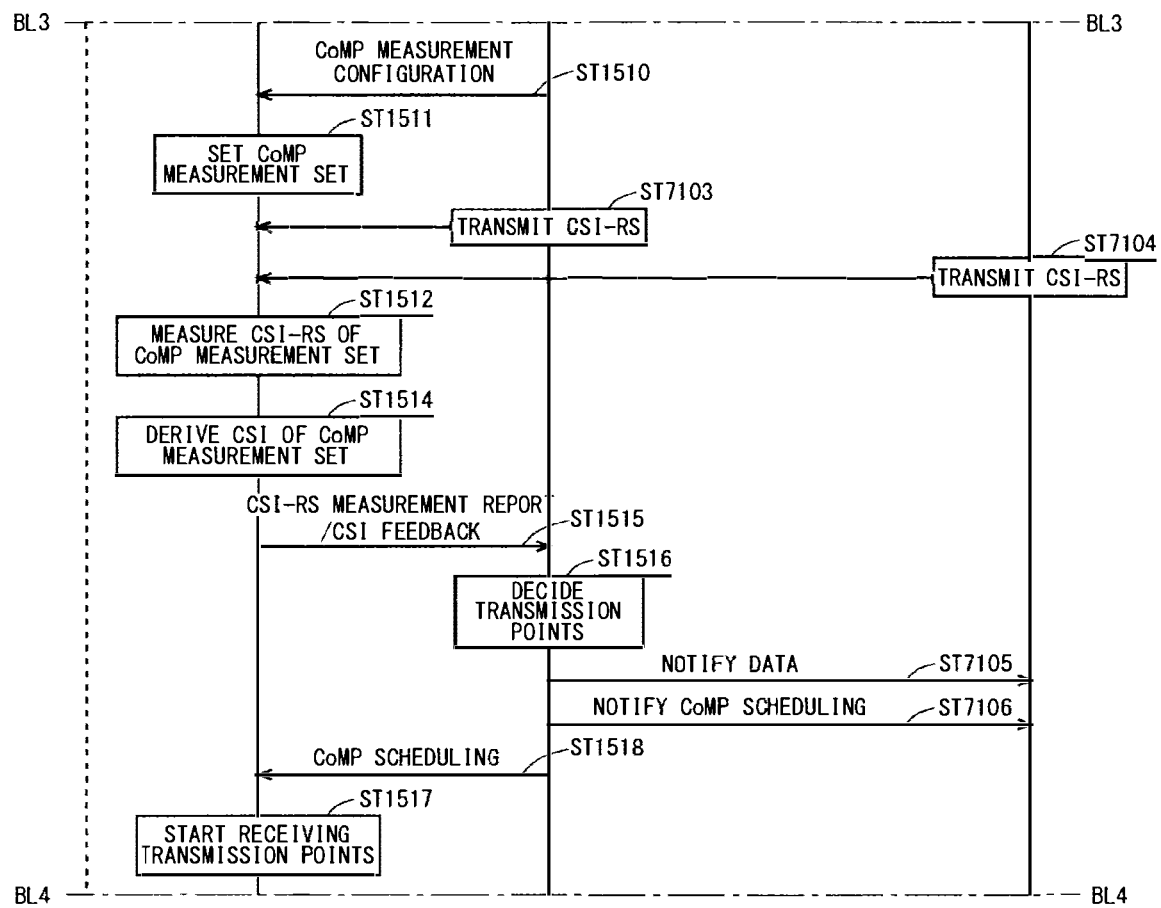
F I G . 3 0

F I G. 3 4
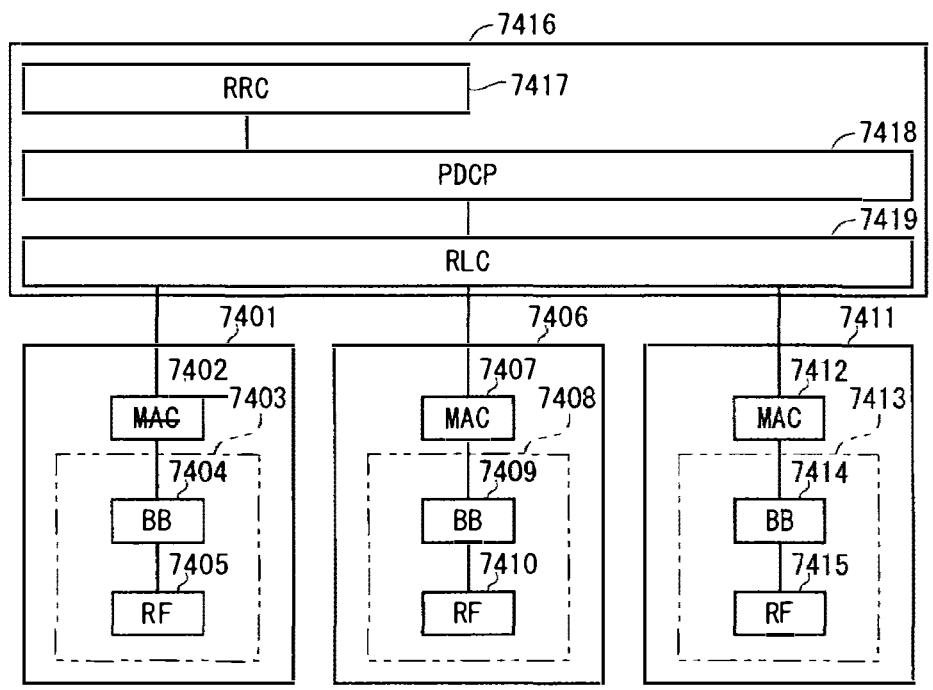
F I G. 3 5
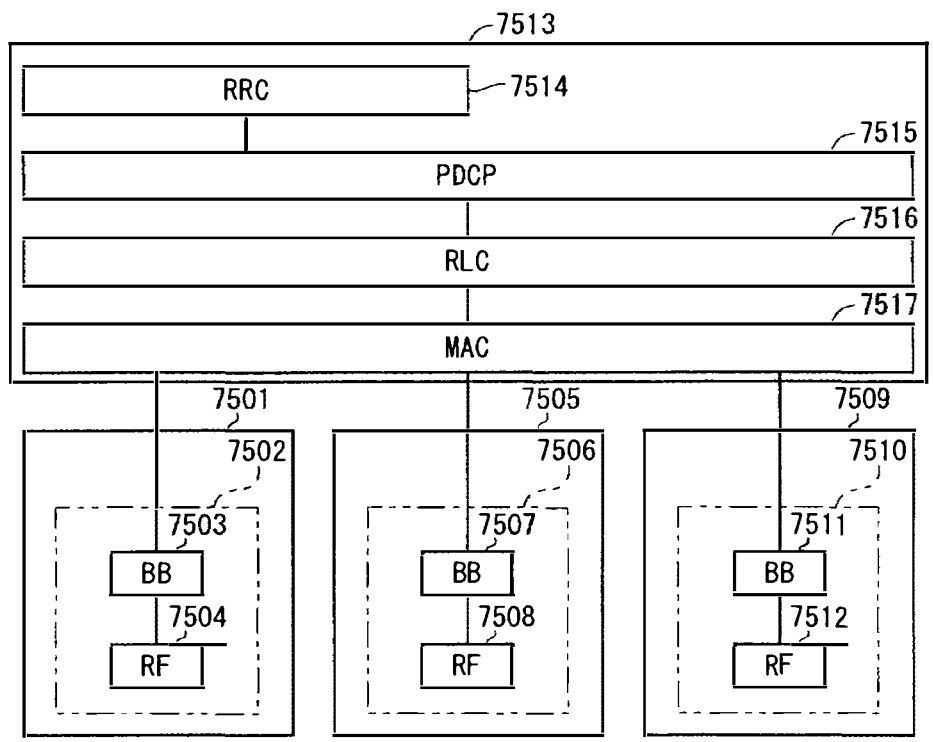

F I G. 3 8
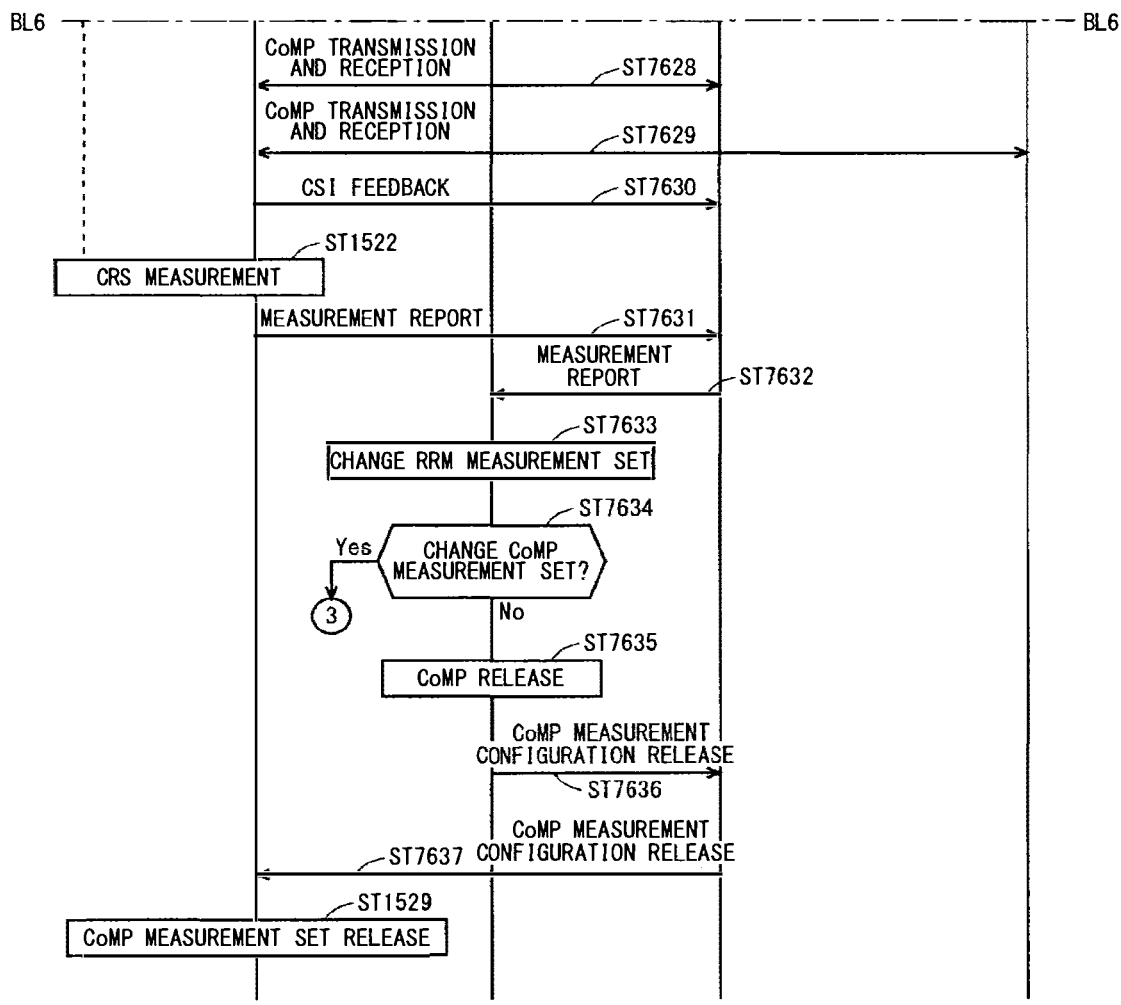

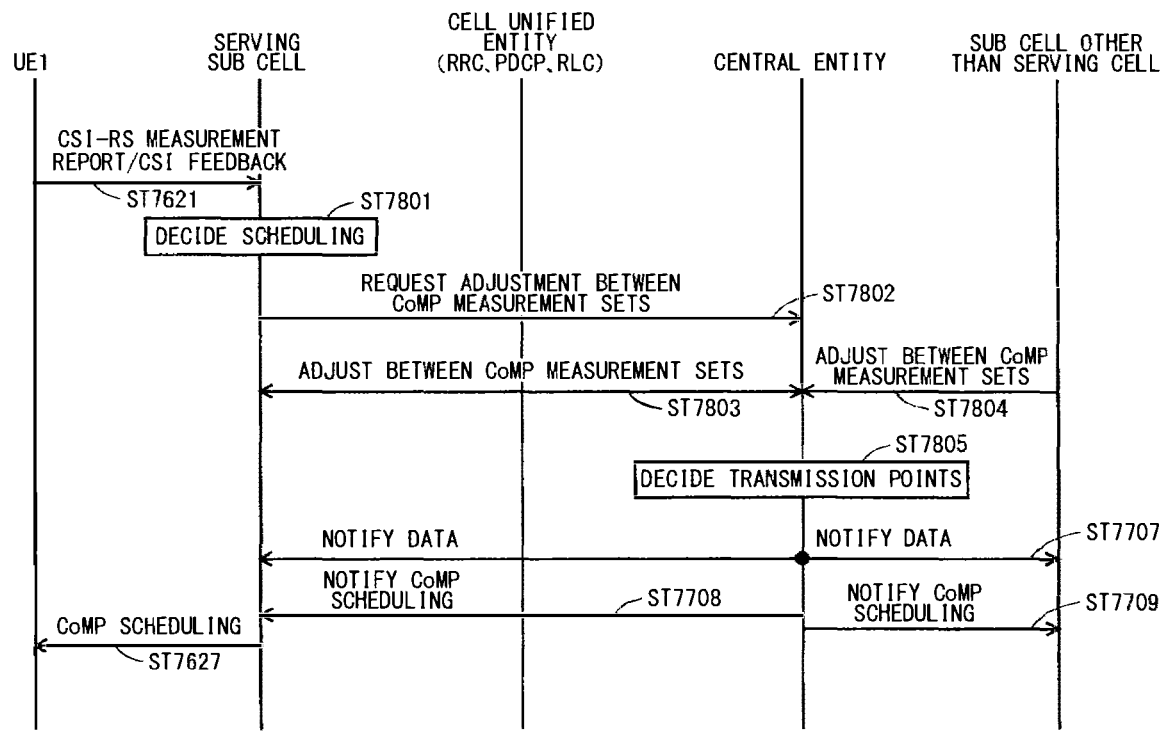
F I G . 4 0

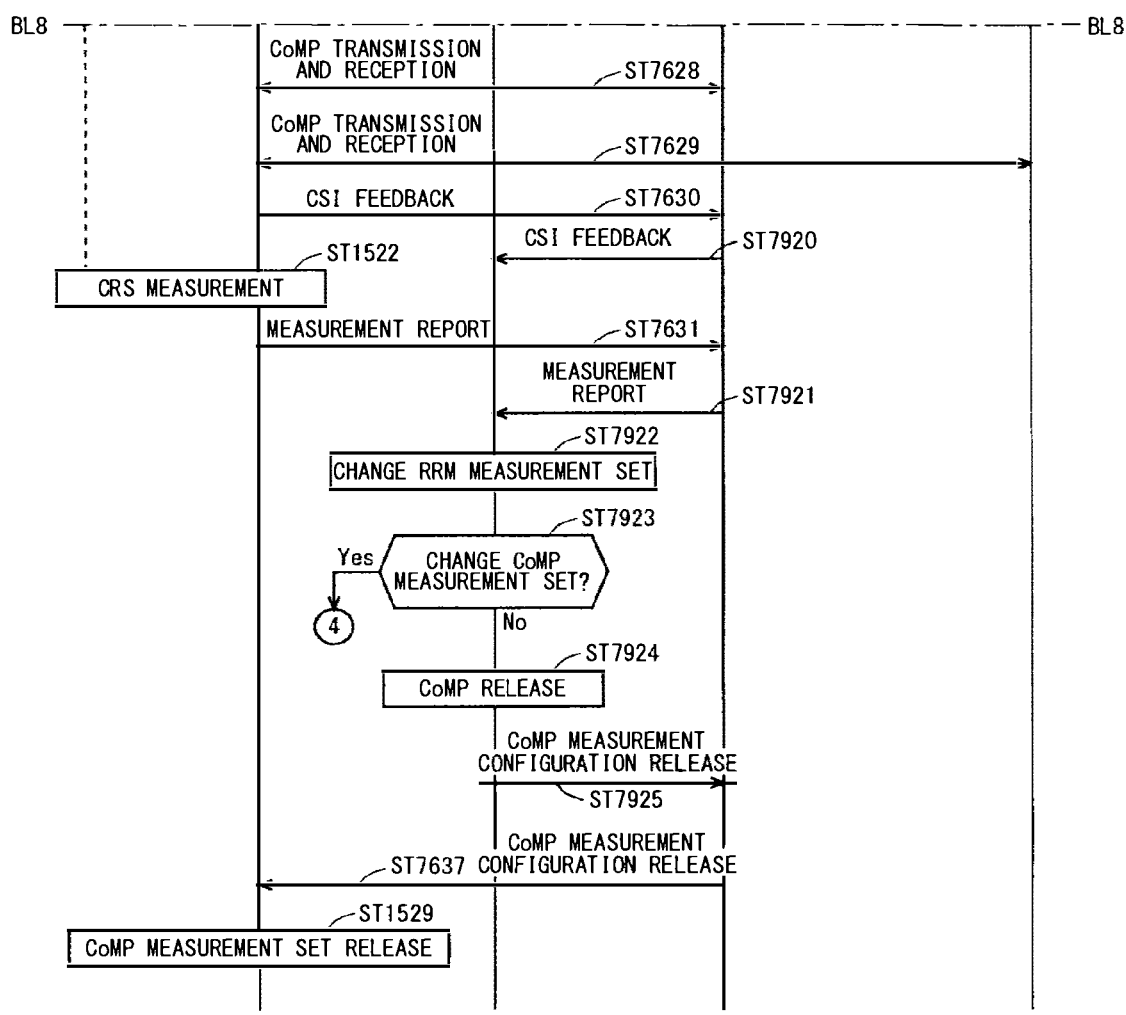
F I G . 4 3

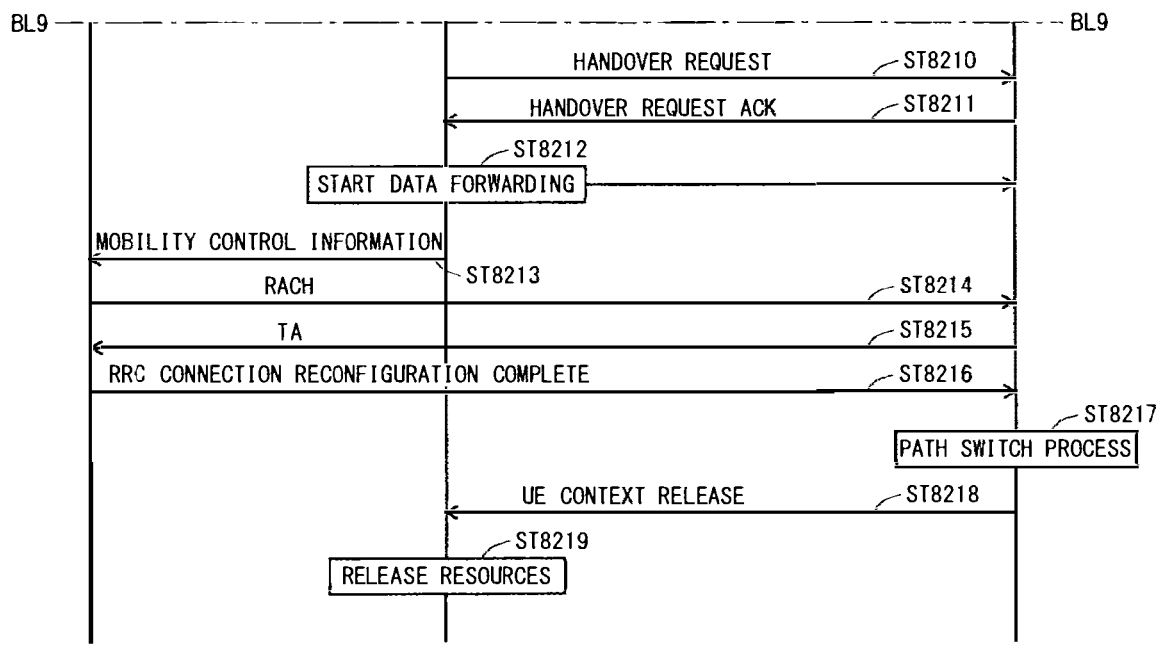
F I G. 4 7

F I G. 5 0
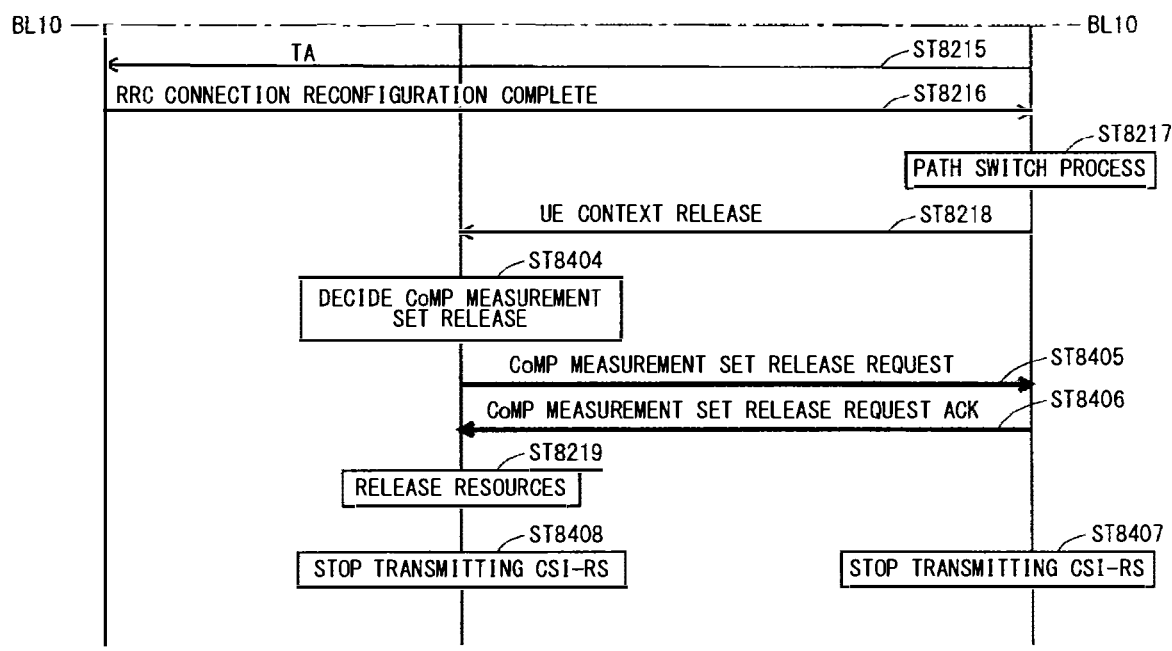

F I G. 5 1
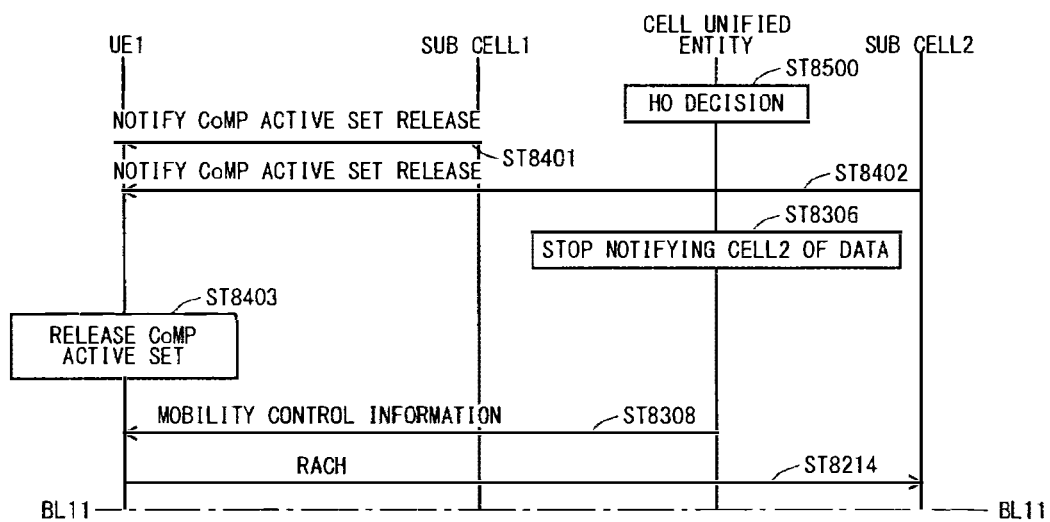

F I G. 5 2
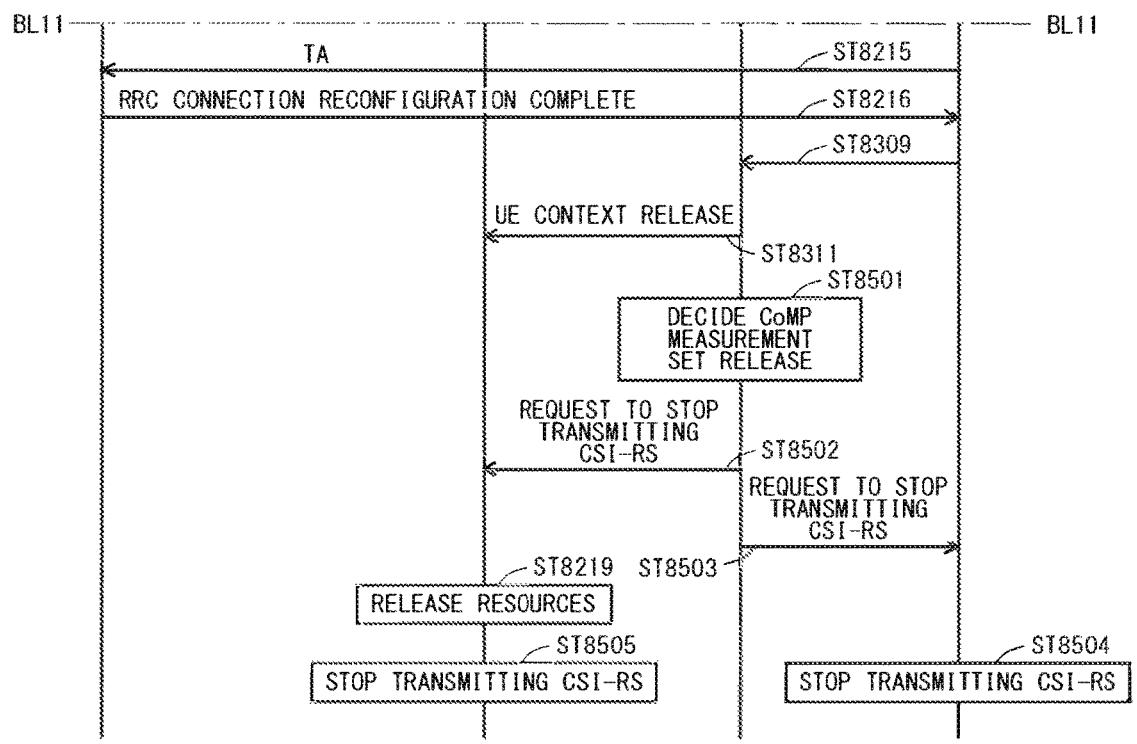

F I G. 5 3
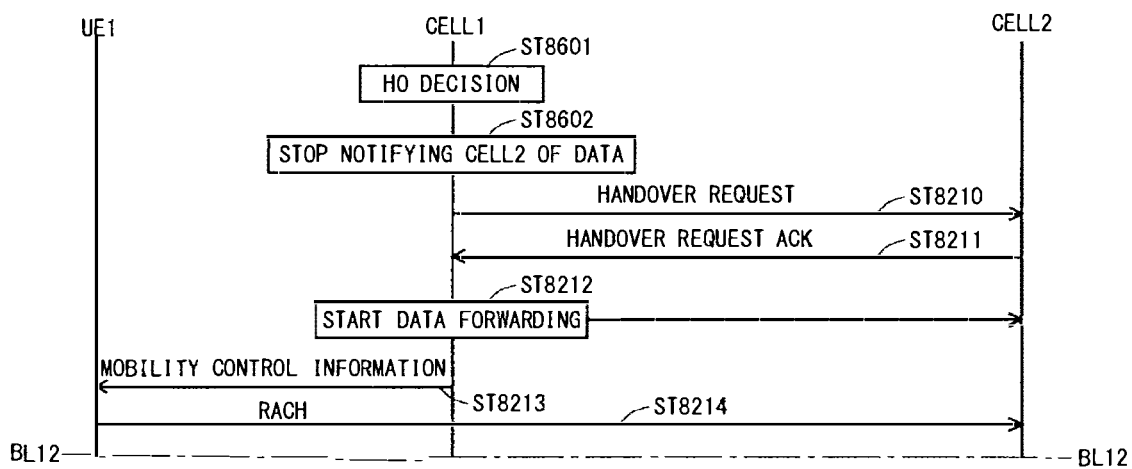

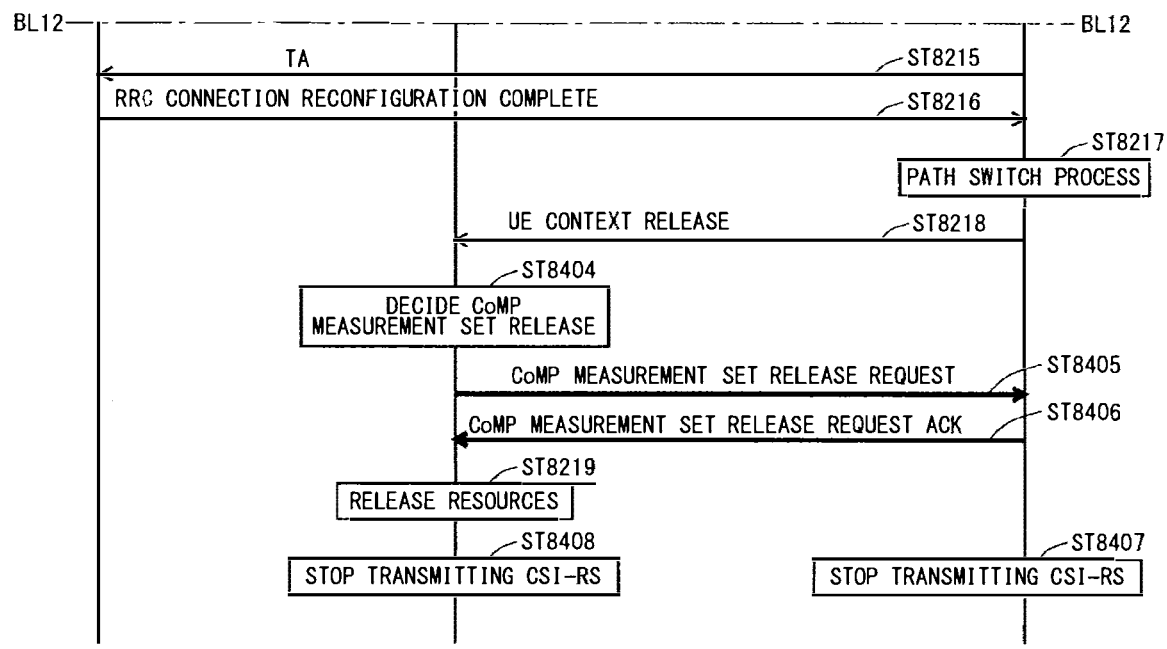
F I G. 5 4

F I G . 5 5
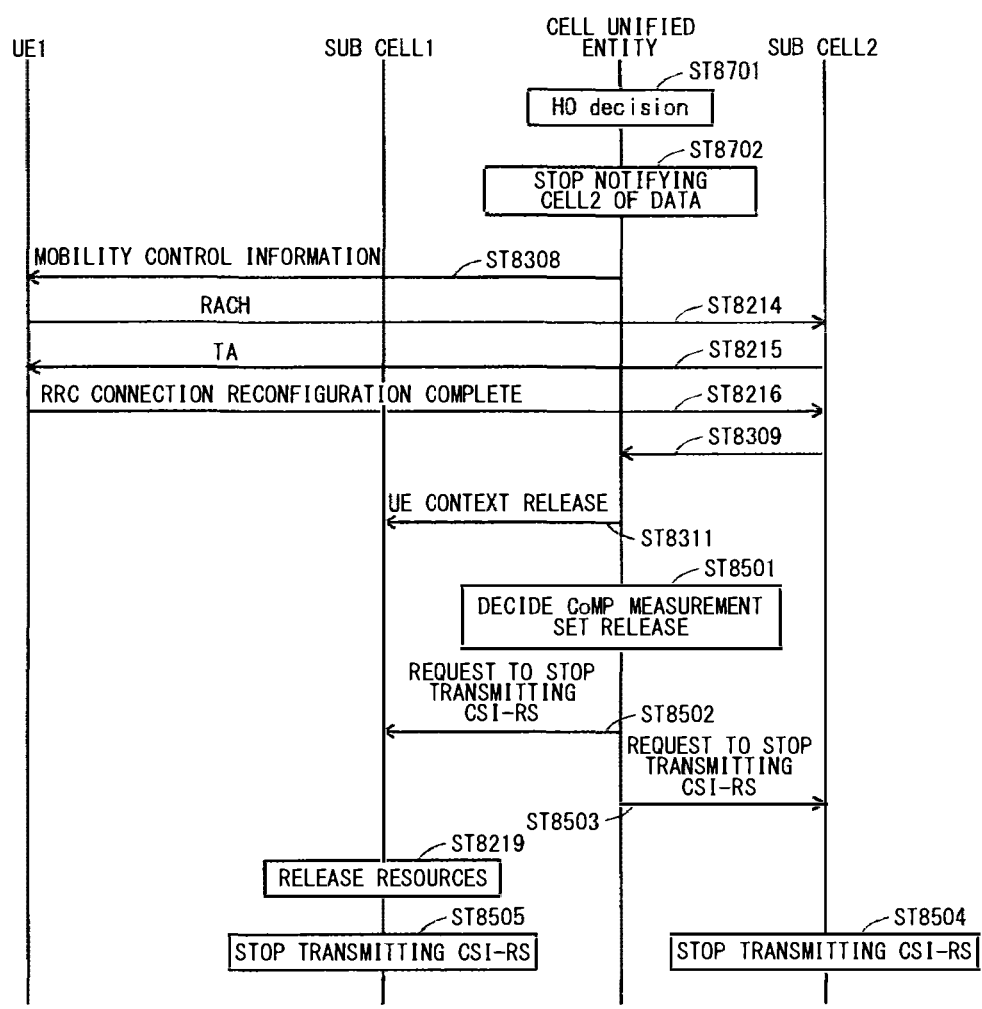

F I G . 5 7
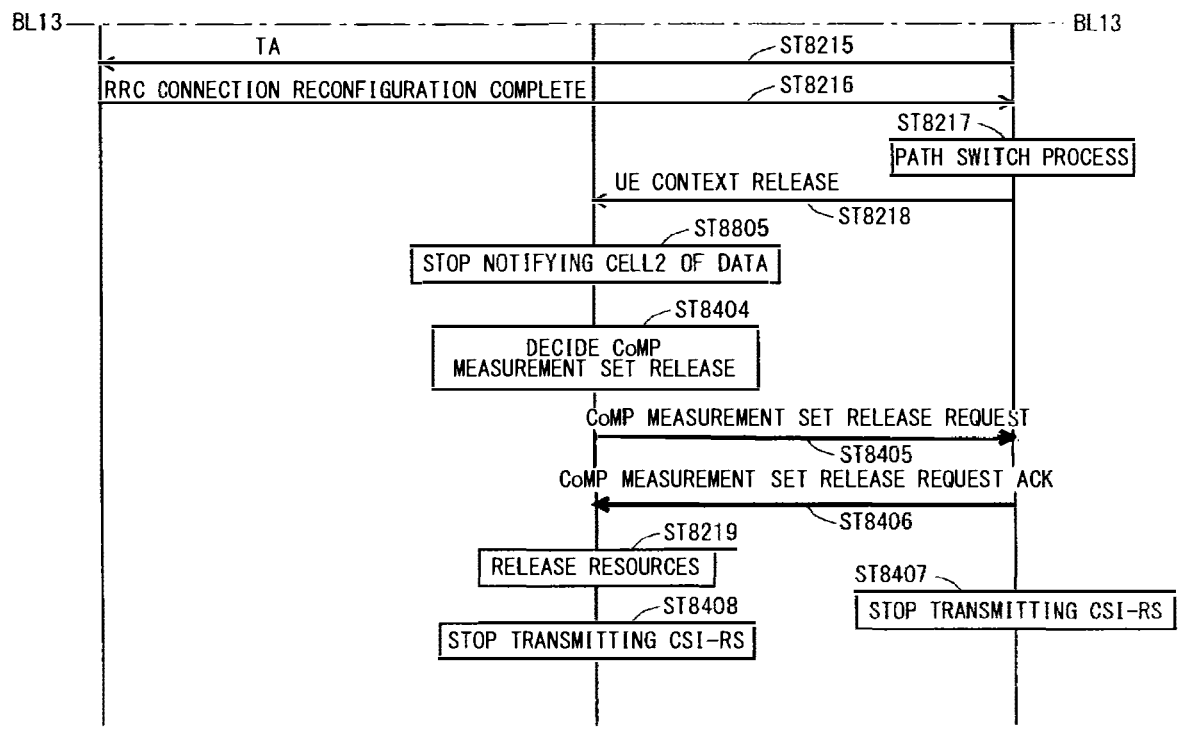

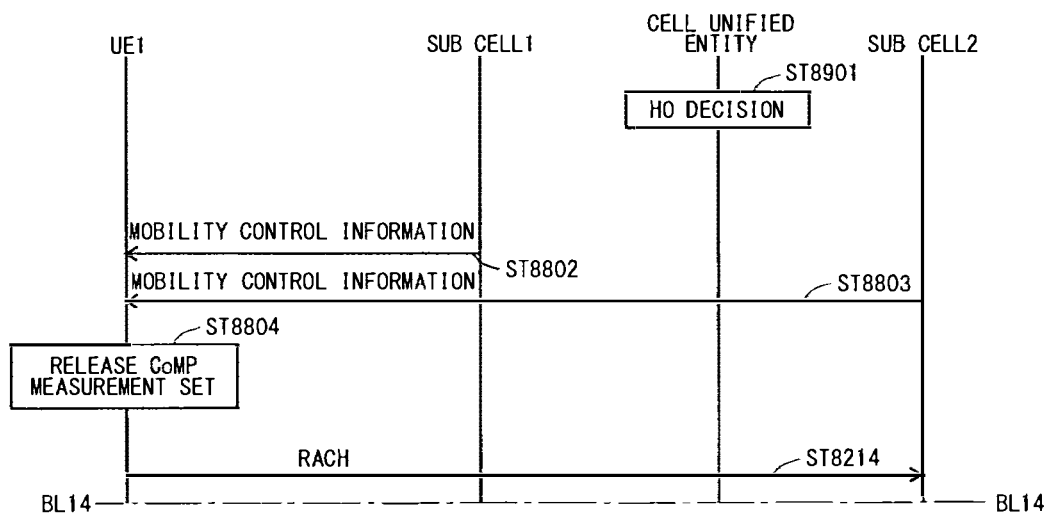
F I G. 5 8

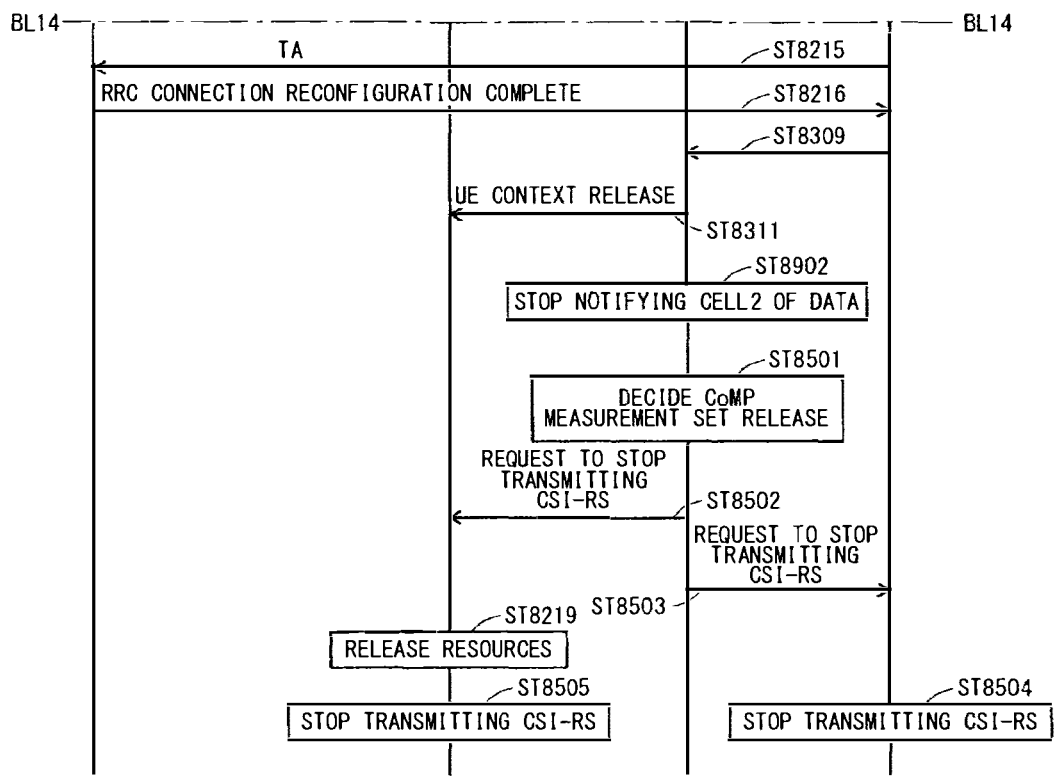
F I G. 5 9

F I G . 6 0
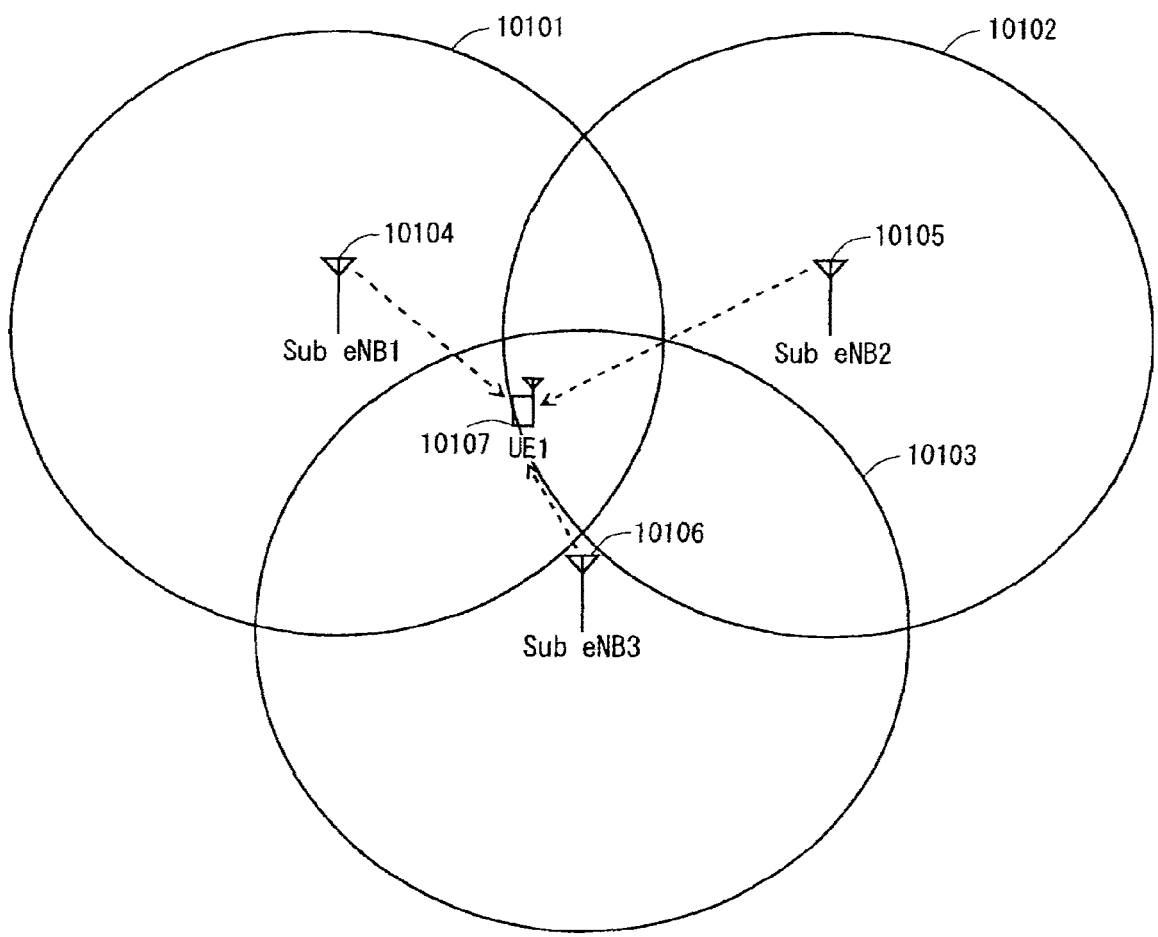

F I G . 6 1
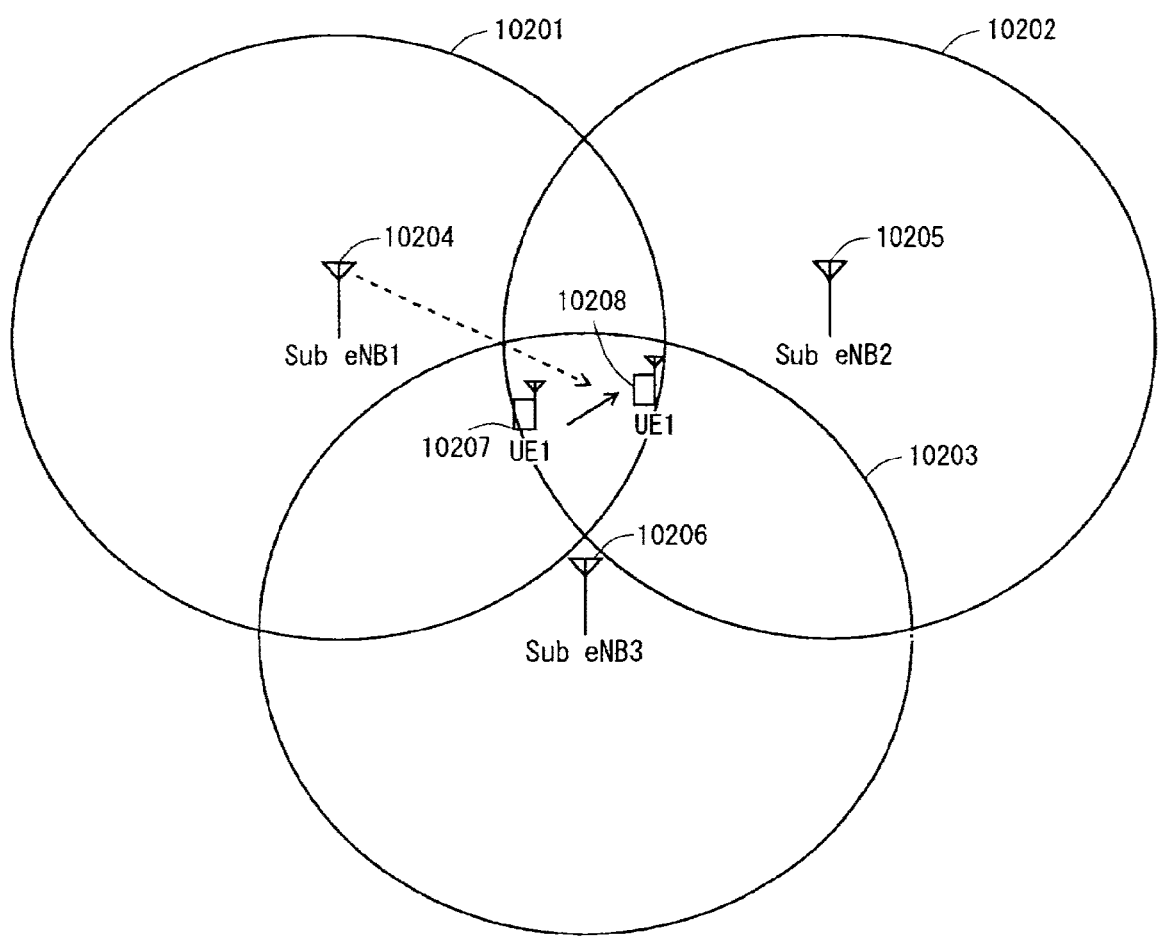

F I G . 6 2
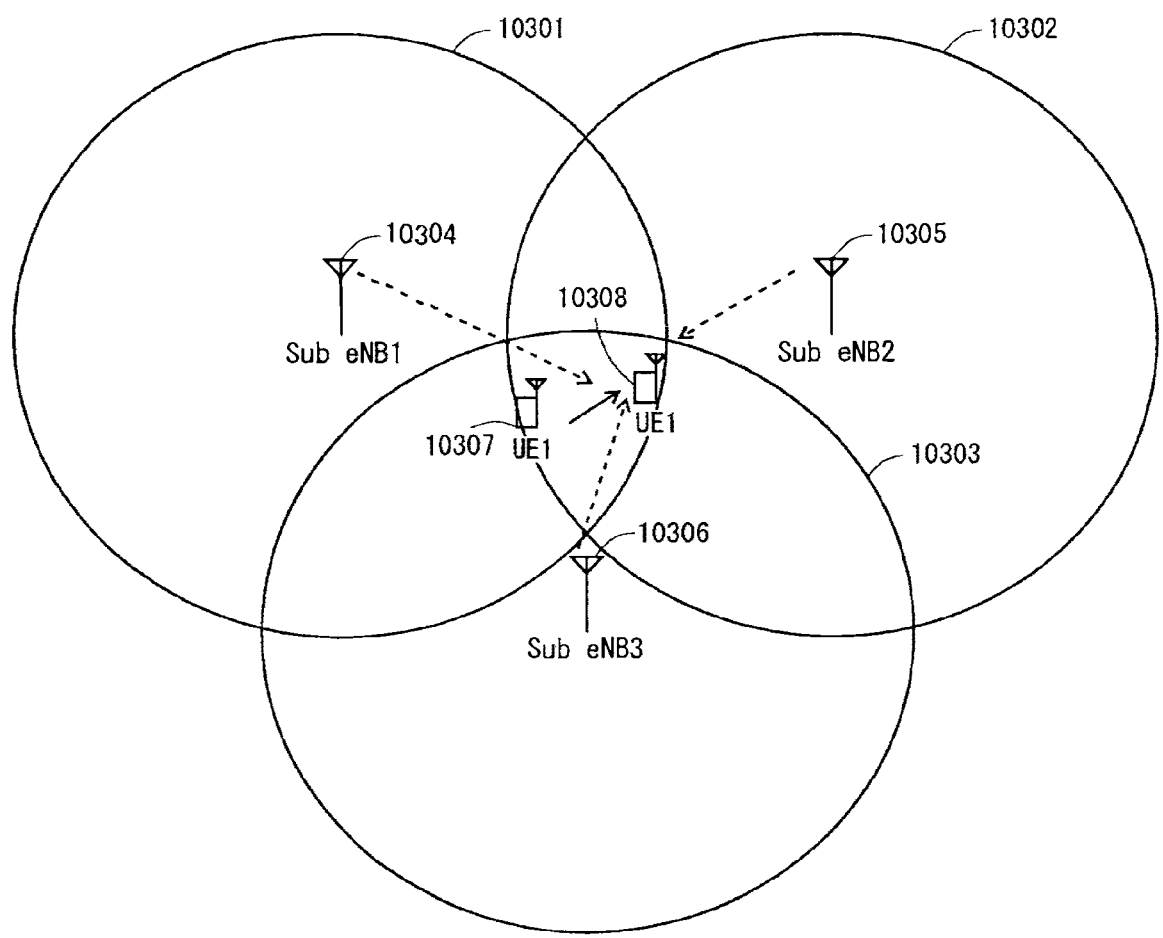

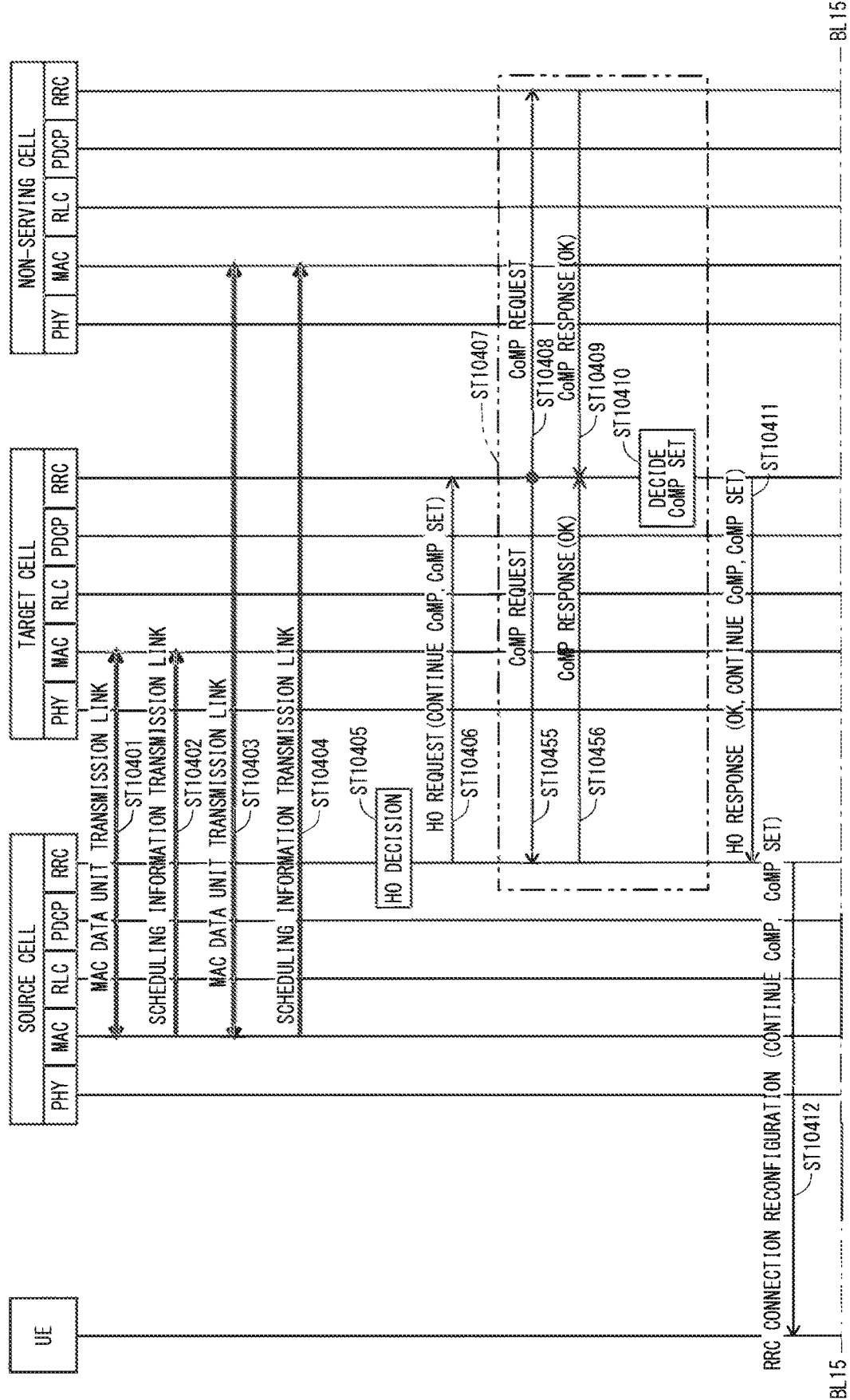

FIG. 65

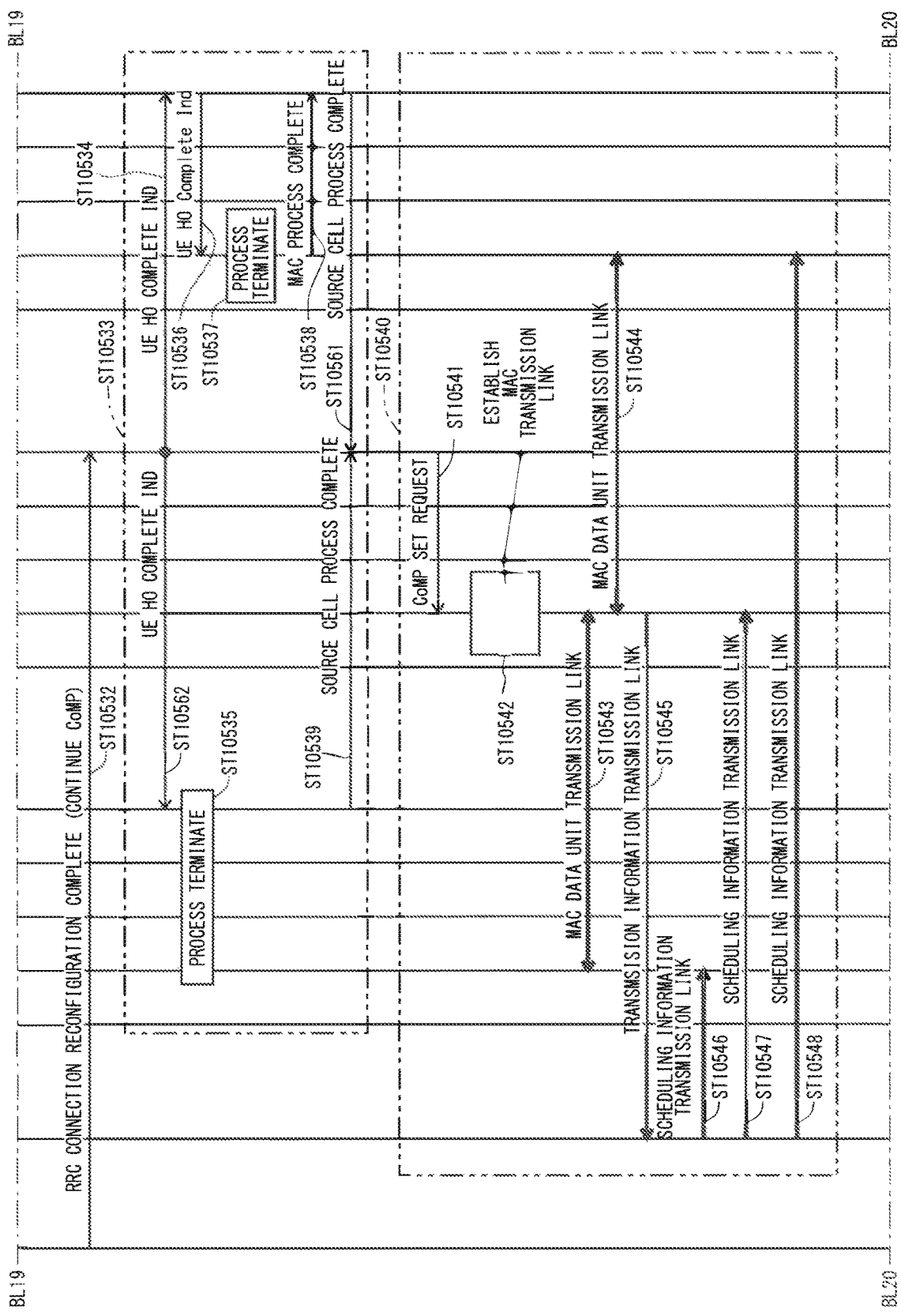

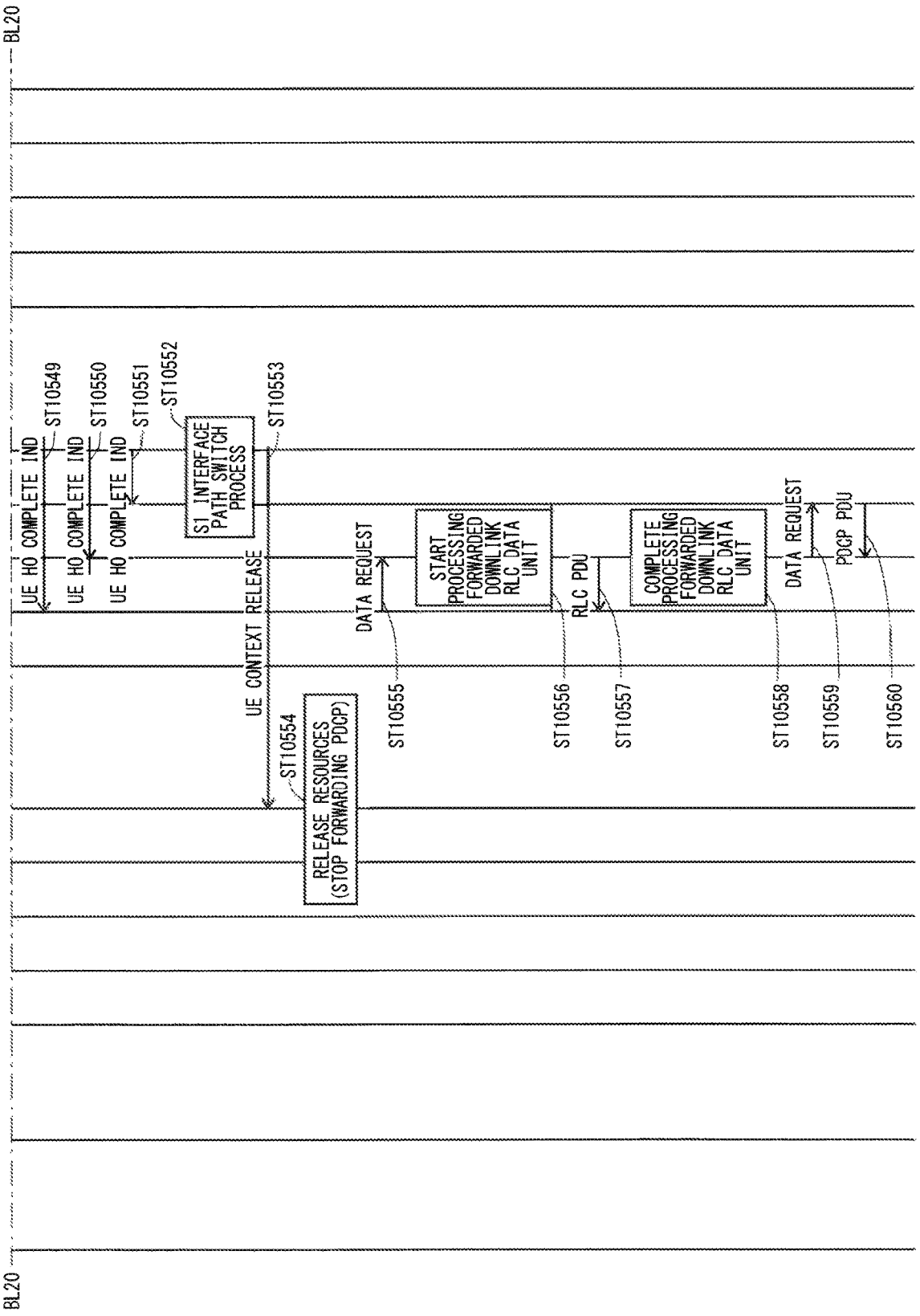

F I G. 7 1
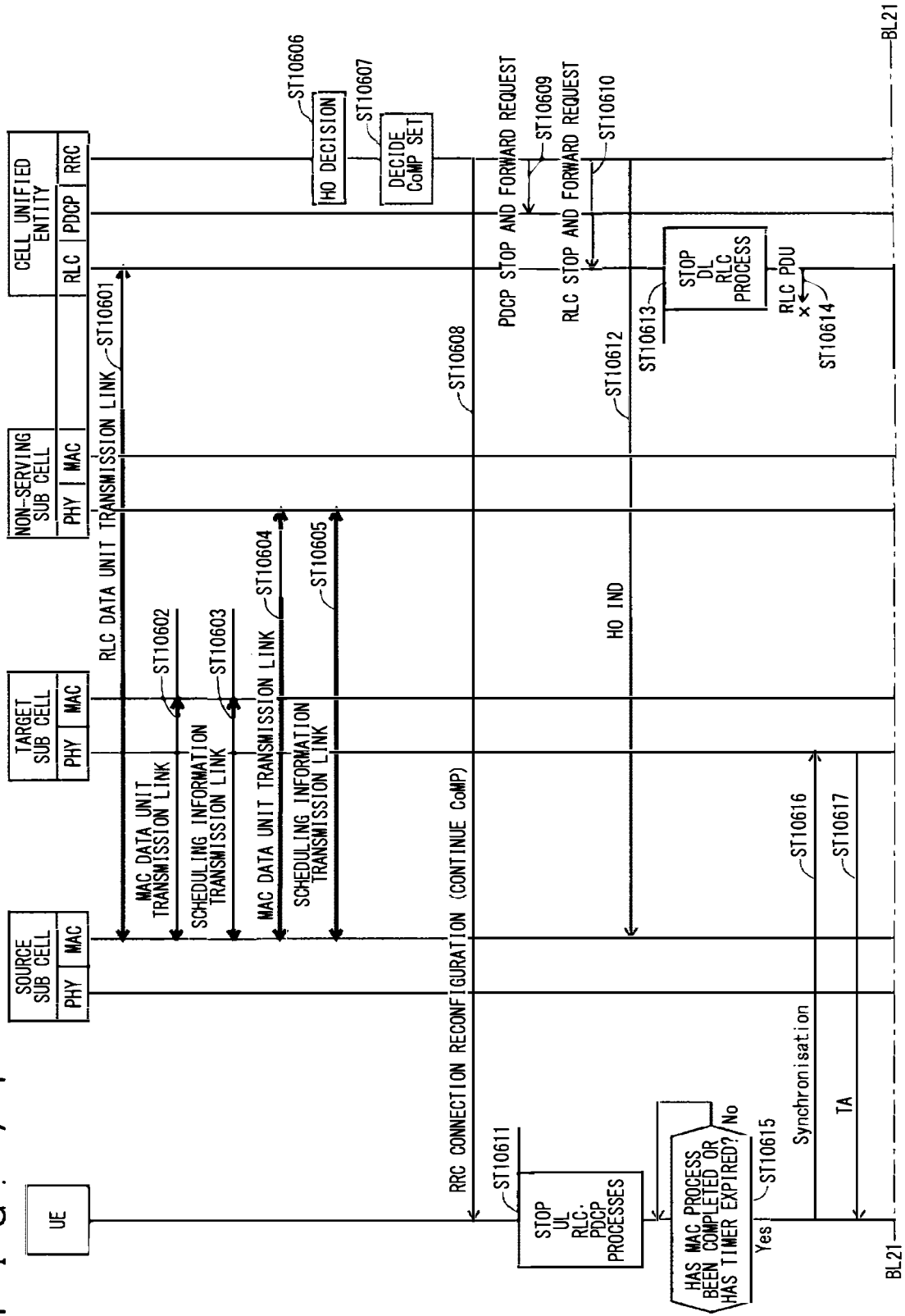

F I G . 7 4
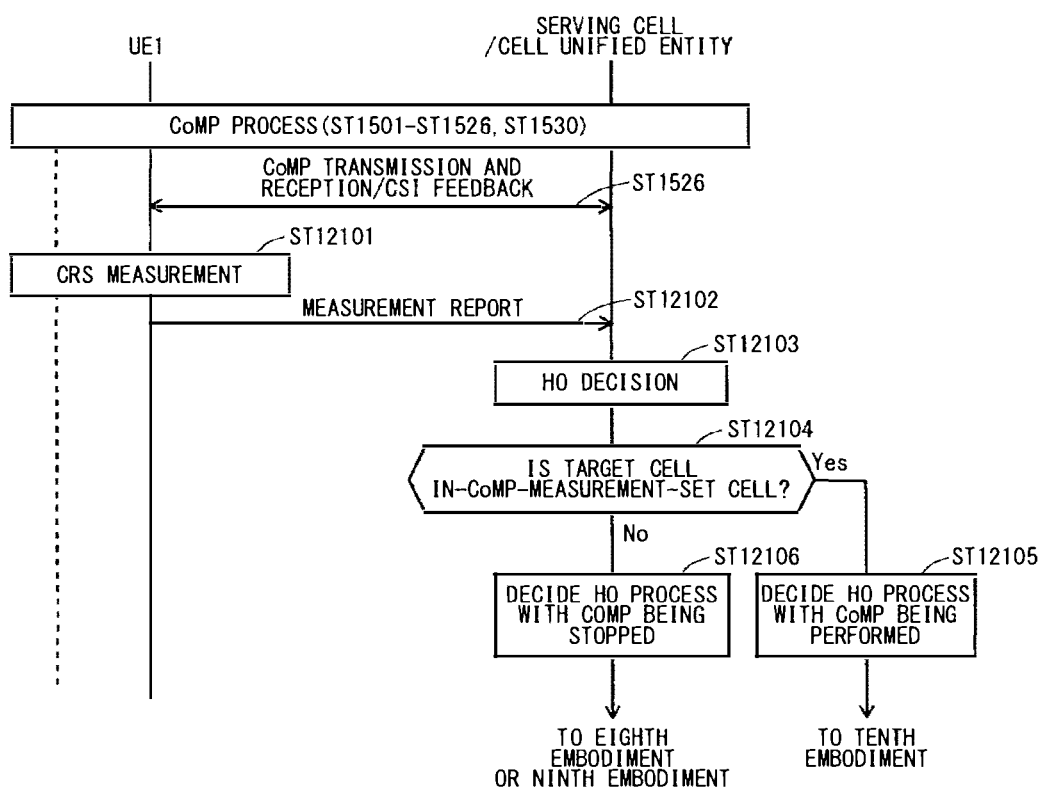

MOBILE COMMUNICATION SYSTEM

CROSS-REFERENCE TO RELATED APPLICATIONS

This application is a continuation application of Ser. No. 15/624,126, filed Jun. 15, 2017, which is a divisional of U.S. application Ser. No. 14/374,744 filed Jul. 25, 2014 (now U.S. Pat. No. 9,712,213), which is a National Phase of PCT/JP2013/051454 filed Jan. 24, 2013, and claims priority to Japanese Patent Application No. 2012-015282 filed Jan. 27, 2012. The entire contents of each of which are incorporated herein by reference.

TECHNICAL FIELD

The present invention relates to a mobile communication system in which a base station device performs radio communication with a plurality of mobile terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio areas and system architecture evolution (SAE) regarding the overall system configuration including a core network and a radio access network (hereinafter, also referred to as a network) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single carrier frequency division multiple access (SC-FDMA) is used in an uplink direction. In addition, the bandwidth is 5 MHz in the W-CDMA, while in the LTE, the bandwidth can be selected from 1.4 MHZ, 3 MHZ, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access network (E-UTRAN), respectively, in the LTE communication system. Also in the radio access network, the base station that communicates with a mobile terminal (user equipment (UE)) is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in this LTE communication system. The E-MBMS service is broadcast multimedia service. The E-MBMS service is merely referred to as MBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The current decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio frame is 10 ms. The radio frame is divided into ten equally sized sub-frames. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$SFN \bmod radioFrameAllocationPeriod = radioFrameAllocationOffset \quad (1)$$

The MBSFN subframe is allocated with six bits. The leftmost bit in FIG. 3 defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIGS. 5(A) and 5(B) described below, resource allocation information for a paging channel (PCH) being one of the transport channels shown in FIGS. 5(A) and 5(B), and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIGS. 5(A) and 5(B) is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in a mobile communication system. The following five types of downlink reference signals are defined: cell-specific reference signals (CRSs), MBSFN reference signals, data demodulation reference signals (DM-RSs) being UE-specific reference signals, positioning reference signals (PRSs), and channel-state information reference signals (CSI-Ss). The physical layer measurement objects of a user equipment include reference symbol received power (RSRP).

The transport channels described in Non-Patent Document 1 (Chapter 5) will be described with reference to FIGS. 5(A) and 5(B). FIGS. 5(A) and 5(B) are diagrams illustrating transport channels used in the LTE communication system. FIG. 5(A) shows mapping between downlink transport channels and downlink physical channels. FIG. 5(B) shows mapping between uplink transport channels and uplink physical channels.

A broadcast channel (BCH) among the downlink transport channels shown in FIG. 5(A) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in FIG. 5(B). The UL-SCH supports dynamic or semi-static resource allocation. The UL-SCH is mapped to the physical uplink shared channel (PUSCH).

A random access channel (RACH) shown in FIG. 5(B) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. In a case where the receiver fails to successfully decode the received data, in other words, in a case where a cyclic redundancy check (CRC) error occurs (CRC-NG), the receiver transmits "Nack" to the transmitter. The transmitter that has received "Nack" retransmits the data. In a case where the receiver successfully decodes the received data, in other words, in a case where a CRC error does not occur (CRC-OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIGS. 6(A) and 6(B). FIGS. 6(A) and 6(B) are diagrams illustrating logical channels used in an LTE communication system. FIG. 6(A) shows mapping between downlink logical channels and downlink transport channels. FIG. 6(B) shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a point-to-point channel that transmits dedicated control information between a user equipment and a network. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below. The CSG cell will be described below (see Chapter 3.1 of Non-Patent Document 3).

The closed subscriber group (CSG) cell is a cell in which subscribers who are allowed to use are specified by an operator (also referred to as a "cell for specific subscribers").

The specified subscribers are allowed to access one or more cells of a public land mobile network (PLMN). One or more cells in which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whiltelist or an allowed CSG list as well. As to the access of user equipments through a CSG cell, the MME performs access control (see Chapter 4.3.1.2 of Non-Patent Document 4). Specific examples of the access of user equipments include attach, combined attach, detach, service request, and a tracking area update procedure (see Chapter 4.3.1.2 of Non-Patent Document 4).

The service types of a user equipment in an idle state will be described below (see Chapter 4.3 of Non-Patent Document 3). The service types of user equipments in an idle state include a limited service, normal service, and operator service. The limited service includes emergency calls, earthquake and tsunami warning system (ETWS), and commercial mobile alert system (CMAS) on an acceptable cell described below. The standard service (also referred to as normal service) is a public service on a suitable cell described below. The operator service includes a service for operators only on a reserved cell described below.

A "suitable cell" will be described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):
 (a) the cell is not a barred cell;
 (b) the cell is part of a tracking area (TA), not part of the list of "forbidden LAs for roaming", where the cell needs to fulfill (1) above;
 (c) the cell shall fulfill the cell selection criteria; and
 (d) for a cell specified as CSG cell by system information (SI), the CSG-ID is part of a "CSG whitelist" of the UE, that is, is contained in the CSG whitelist of the UE.

An "acceptable cell" will be described below. The "acceptable cell" is the cell on which a UE may camp to obtain limited service. Such a cell shall fulfill the all following requirements (1) and (2).

(1) The cell is not a prohibited cell (also referred to as a "barred cell").

(2) The cell fulfills the cell selection criteria.

"Barred cell" is indicated in the system information. "Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell".

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 5 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. To being served by a base station means to take the base station as a serving cell.

Non-Patent Document 6 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 7 and 8).

As to the LTE-A system, it is studied that a relay and a relay node (RN) are supported for achieving a high data rate, high cell-edge throughput, new coverage area, and the like. The relay node being a relay device is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP is also connectable to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency band, and a link from an RN to a DeNB and a link from a UE to an RN are also time-division multiplexed at one frequency band. In a relay, accordingly, the transmission of the relay is prevented from interfering the reception of its own relay.

Not only a normal eNB (macro cell) but also so-called local nodes such as pico eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 9 describes the frequency bands.

Carrier aggregation (CA) is studied in the LTE-A system, in which two or more component carriers (CCs) are aggregated to support wider transmission bandwidths up to 100 MHz.

A UE supporting Release 8 or 9 of 3GPP, which supports LTE, is capable of transmission/reception only on one CC corresponding to one serving cell. Meanwhile, it is conceivable that a UE supporting Release 10 of 3GPP may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9 of 3GPP.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The above-mentioned LTE Advanced (LTE-A) is studied as a further advanced communication system regarding radio areas in 3GPP (see Non-Patent Documents 7 and 8). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Document 10.

CoMP is the technique of expanding the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into joint transmission (JT) and dynamic point selection (DPS). DPS includes dynamic cell selection (DCS). In JT, the PDSCH is transmitted from multiple points, specifically, part of or entire CoMP cooperating set, at a time. In DPS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission at multiple points. In some cases, the unit and cell that perform coordinated multiple point transmission are also referred to as a multi-point unit and a multi-point cell, respectively.

PRIOR ART DOCUMENTS

Non-Patent Documents

Non-Patent Document 1: 3GPP TS 36.300 V10.5.0
Non-Patent Document 2: 3GPP TS 36.331 V10.3.0
Non-Patent Document 3: 3GPP TS 36.304 V10.3.0 Chapter 3.1, Chapter 4.3, Chapter 5.2.4
Non-Patent Document 4: 3GPP TR 23.830 V9.0.0
Non-Patent Document 5: 3GPP S1-083461
Non-Patent Document 6: 3GPP R2-082899
Non-Patent Document 7: 3GPP TR 36.814 V9.0.0
Non-Patent Document 8: 3GPP TR 36.912 V10.0.0
Non-Patent Document 9: 3GPP TS 36.101 V10.3.0 Non-Patent Document 10: 3GPP TR 36.819 V11.0.0

SUMMARY OF INVENTION

Problems to be Solved by the Invention

As described above, the coordinated multiple point transmission and reception (CoMP) technique is studied in 3GPP. The execution of CoMP on a UE expands the high-date-rate coverage, improves a cell-edge throughput, and increases a throughput in a communication system. However, the CoMP technique has yet to be studied thoroughly in 3GPP.

For example, it is studied to provide some collections of CoMP-related cells. Considering, for example, the communication quality in CoMP, power consumption of the UE, and a signaling amount between the UE and the serving cell, however, the collections currently proposed are not always sufficient. In the case where only the complicated radio wave environment that varies over time is used as selection criteria in the method of selecting a cell in the collection, a good reception quality is not always obtained even if CoMP is performed.

There is no discussion on the HO process of a UE being subjected to CoMP. The coordinated process is performed between a plurality of cells in CoMP. Thus, if the UE is subjected to the HO process while being subjected to CoMP, the plurality of cells need to be processed, which does not allow for HO by the conventional HO process. Therefore, the communication between the UE and the cell cannot be continued.

The present invention has an object to provide a mobile communication system capable of at least continuing communication depending on the state of a UE to be subjected to CoMP, and further, capable of obtaining a better communication quality through the execution of CoMP.

Means to Solve the Problems

A mobile communication system according to the present invention is a mobile communication system in which a plurality of cells configured to perform radio communication with a movable user equipment device are operated, wherein: the plurality of cells include a cell configured to perform coordinated communication to perform radio communication with the user equipment device in a coordinated manner with other cell; among the plurality of cells, a serving cell that controls the user equipment device configures a detection target cell set and notifies the user equipment device of the detection target cell set that has been configured, the detection target cell set being a collection of cells to be subjected to a process of detecting, by the user equipment device, whether or not radio communication is allowed; the mobile communication system includes an adjustment unit that adjusts the coordinated communication; the adjustment unit configures a coordination-enabled cell set and a coordination target cell set and notifies the user equipment device of the coordination-enabled cell set and the coordination target cell set that have been configured, the coordination-enabled cell set being a collection of cells to become candidates on which the user equipment device performs a process of detecting whether or not the coordinated communication is allowed among the cells in the detection target cell set, the coordination target cell set being a collection of cells to be subjected to a process of detecting whether or not the coordinated communication is allowed among the cells in the coordination-enabled cell set; and the user equipment device: (a) performs, when being notified of the coordination target cell set from the adjustment unit, the process of detecting whether or not the coordinated communication is allowed on each of the cells in the coordination target cell set; and (b) performs, when being notified of the coordination-enabled cell set and not being notified of the coordination target cell set from the adjustment unit, the process of detecting whether or not the coordinated communication is allowed on each of the cells in the coordination-enabled cell set.

Effects of the Invention

The mobile communication system according to the present invention is capable of at least continuing communication depending on the state of a user equipment device to execute coordinated communication, and further, is capable of obtaining a better communication quality through the execution of coordinated communication.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 9 is a block diagram showing the configuration of a base station 72 of FIG. 7 being a base station according to the present invention.

FIG. 10 is a block diagram showing the configuration of an MME unit 73 of FIG. 7 being an MME according to the present invention.

FIG. 11 is a block diagram showing the configuration of a HeNBGW 74 of FIG. 7 being a HeNBGW according to the present invention.

FIG. 15 is a diagram showing an exemplary sequence of a mobile communication system in a first embodiment.

FIG. 16 is another diagram showing the exemplary sequence of the mobile communication system in the first embodiment.

FIG. 19 is a diagram showing an exemplary sequence of a mobile communication system in a third embodiment.

FIG. 21 is a diagram showing still another exemplary sequence of the mobile communication system in the third embodiment.

FIG. 27 is a diagram showing an exemplary sequence of a mobile communication system in a sixth embodiment.

FIG. 28 is another diagram showing the exemplary sequence of the mobile communication system in the sixth embodiment.

FIG. 30 is another diagram showing the exemplary sequence of the mobile communication system in the seventh embodiment.

FIG. 34 is a block diagram for describing a specific example of a cell unified entity.

FIG. 35 is a block diagram for describing a specific example of another cell unified entity.

FIG. 38 is still another diagram showing the exemplary sequence of the mobile communication system in the seventh embodiment.

FIG. 40 is a diagram showing an exemplary sequence of the mobile communication system in the seventh embodiment.

FIG. 43 is still another diagram showing the exemplary sequence of the mobile communication system in the seventh embodiment.

FIG. 47 is another diagram showing the exemplary sequence of the mobile communication system in the eighth embodiment.

FIG. 50 is another diagram showing the exemplary sequence of the mobile communication system in the first modification of the eighth embodiment.

FIG. 51 is a diagram showing an exemplary sequence of the mobile communication system in the first modification of the eighth embodiment.

FIG. 52 is another diagram showing the exemplary sequence of the mobile communication system in the first modification of the eighth embodiment.

FIG. 53 is a diagram showing an exemplary sequence of a mobile communication system in a second modification of the eighth embodiment.

FIG. 54 is another diagram showing the exemplary sequence of the mobile communication system in the second modification of the eighth embodiment.

FIG. 55 is a diagram showing an exemplary sequence of a mobile communication system in the second modification of the eighth embodiment.

FIG. 57 is another diagram showing the exemplary sequence of the mobile communication system in the ninth embodiment.

FIG. 58 is a diagram showing an exemplary sequence of the mobile communication system in the ninth embodiment.

FIG. 59 is another diagram showing the exemplary sequence of the mobile communication system in the ninth embodiment.

FIG. 60 is a diagram for describing the concept of CoMP communication among a plurality of sub eNB devices and a UE.

FIG. 61 is a diagram for describing the concept of CoMP communication among a plurality of sub eNB devices and a UE.

FIG. 62 is a diagram for describing a change of a serving cell in a tenth embodiment.

FIG. 63 is a diagram showing an exemplary sequence of a mobile communication system in the tenth embodiment.

FIG. 65 is still another diagram showing the exemplary sequence of the mobile communication system in the tenth embodiment.

FIG. 69 is still another diagram showing the exemplary sequence of the mobile communication system in the first modification of the tenth embodiment.

FIG. 70 is yet still another diagram showing the exemplary sequence of the mobile communication system in the first modification of the tenth embodiment.

FIG. 71 is a diagram showing an exemplary sequence of a mobile communication system in a second modification of the tenth embodiment.

FIG. 74 is a diagram showing an exemplary sequence of a mobile communication system in an eleventh embodiment.

DESCRIPTION OF EMBODIMENTS

First Embodiment

Figure 2:
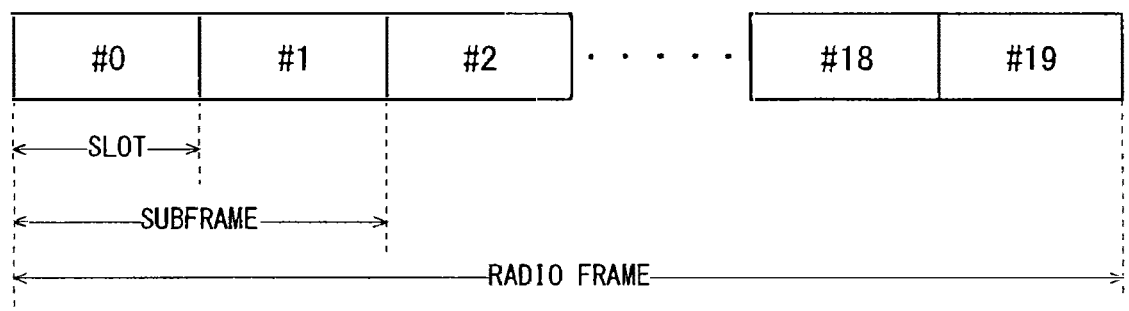
FIG. 2 is a diagram illustrating the configuration of a radio frame used in the LTE communication system.
Figure 3:
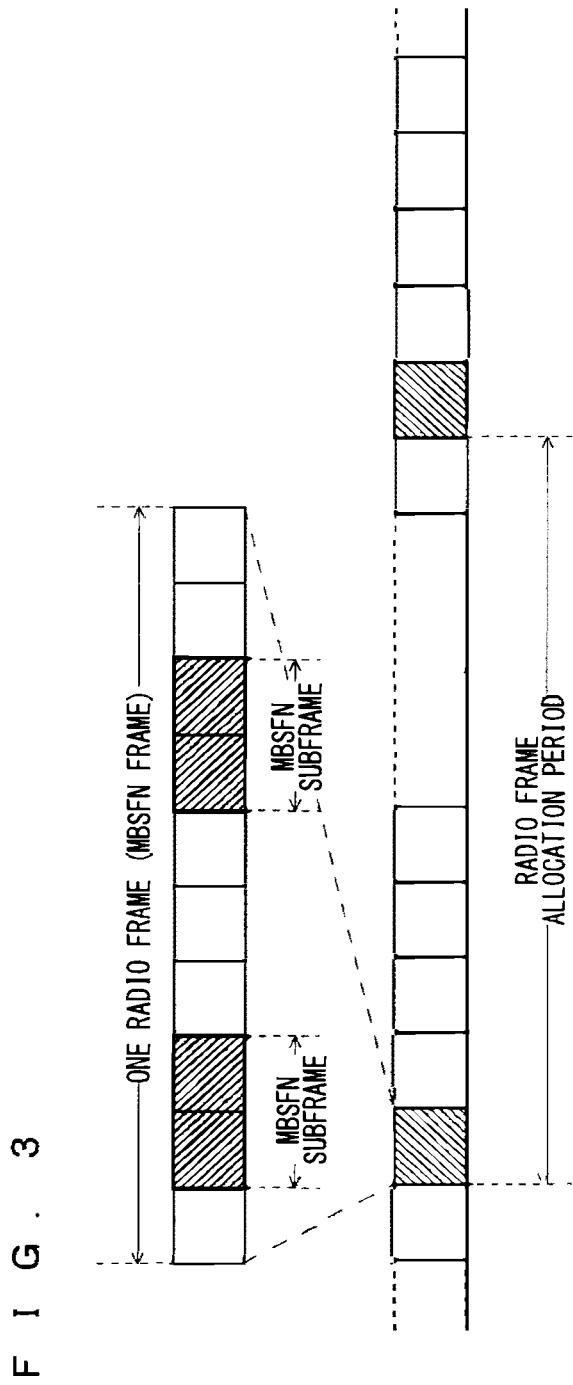
FIG. 3 is a diagram illustrating the configuration of an MBSFN frame.
Figure 4:
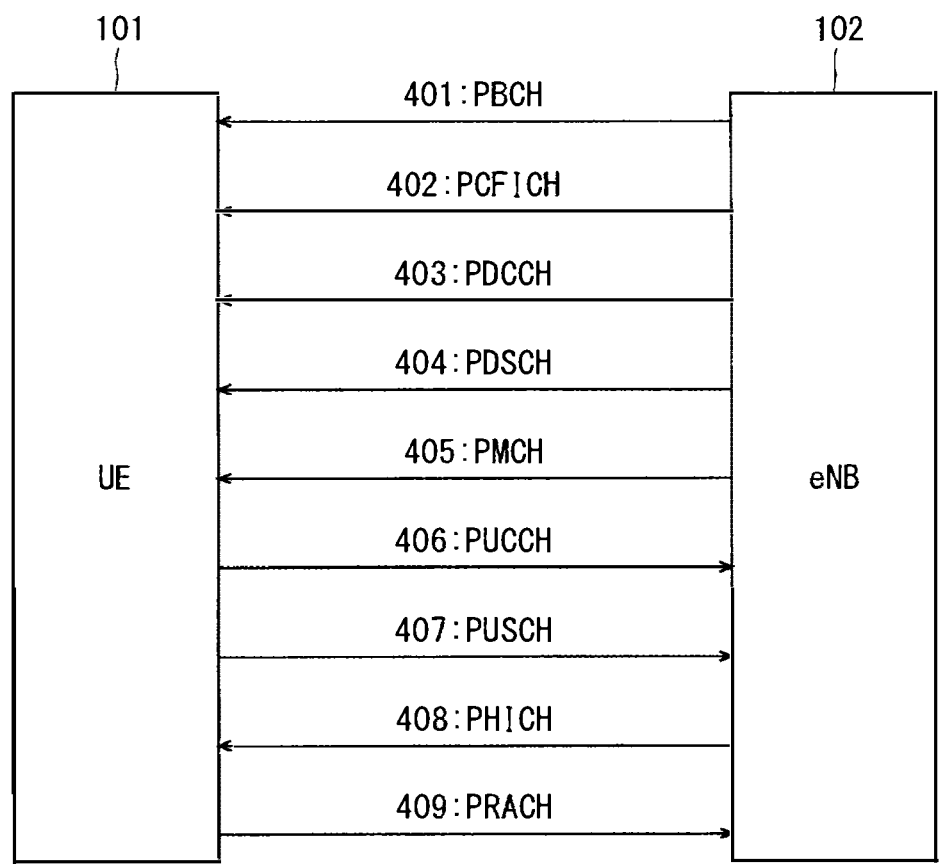
FIG. 4 is a diagram illustrating physical channels used in the LTE communication system.
Figure 5A:
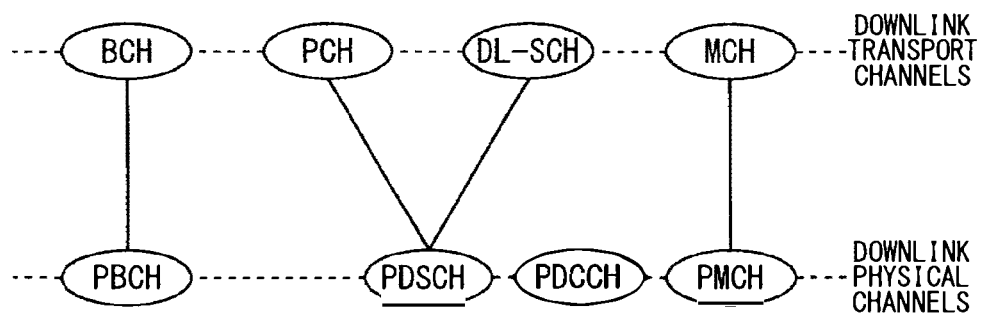
FIGS. 5(A) and 5(B) are diagrams illustrating transport channels used in the LTE communication system.
Figure 5B:
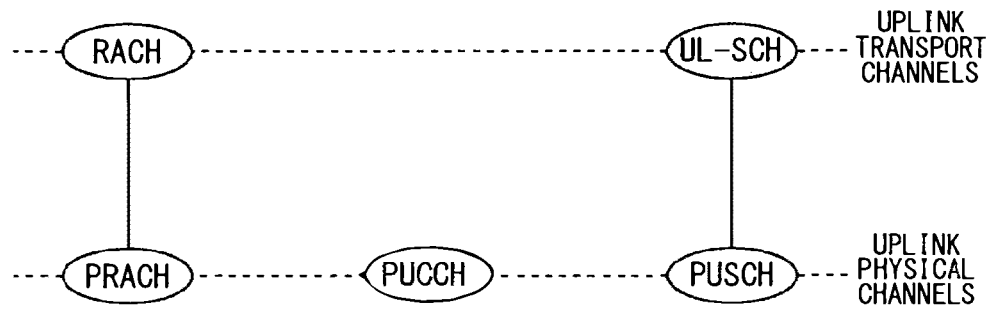
Figure 6A:
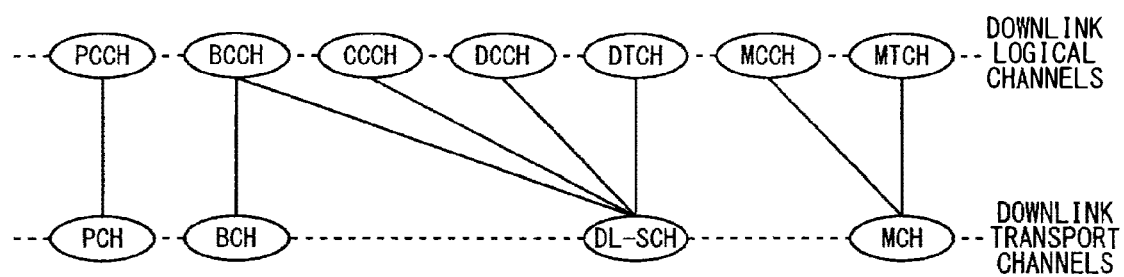
FIGS. 6(A) and 6(B) are diagrams illustrating logical channels used in the LTE communication system.
Figure 6B:
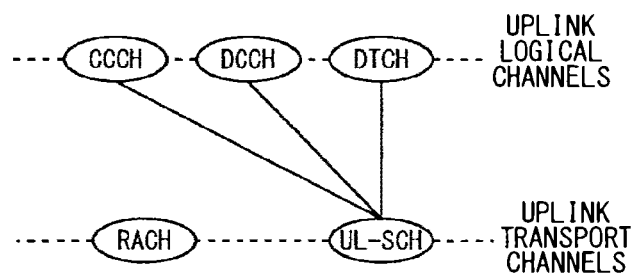
Figure 7:
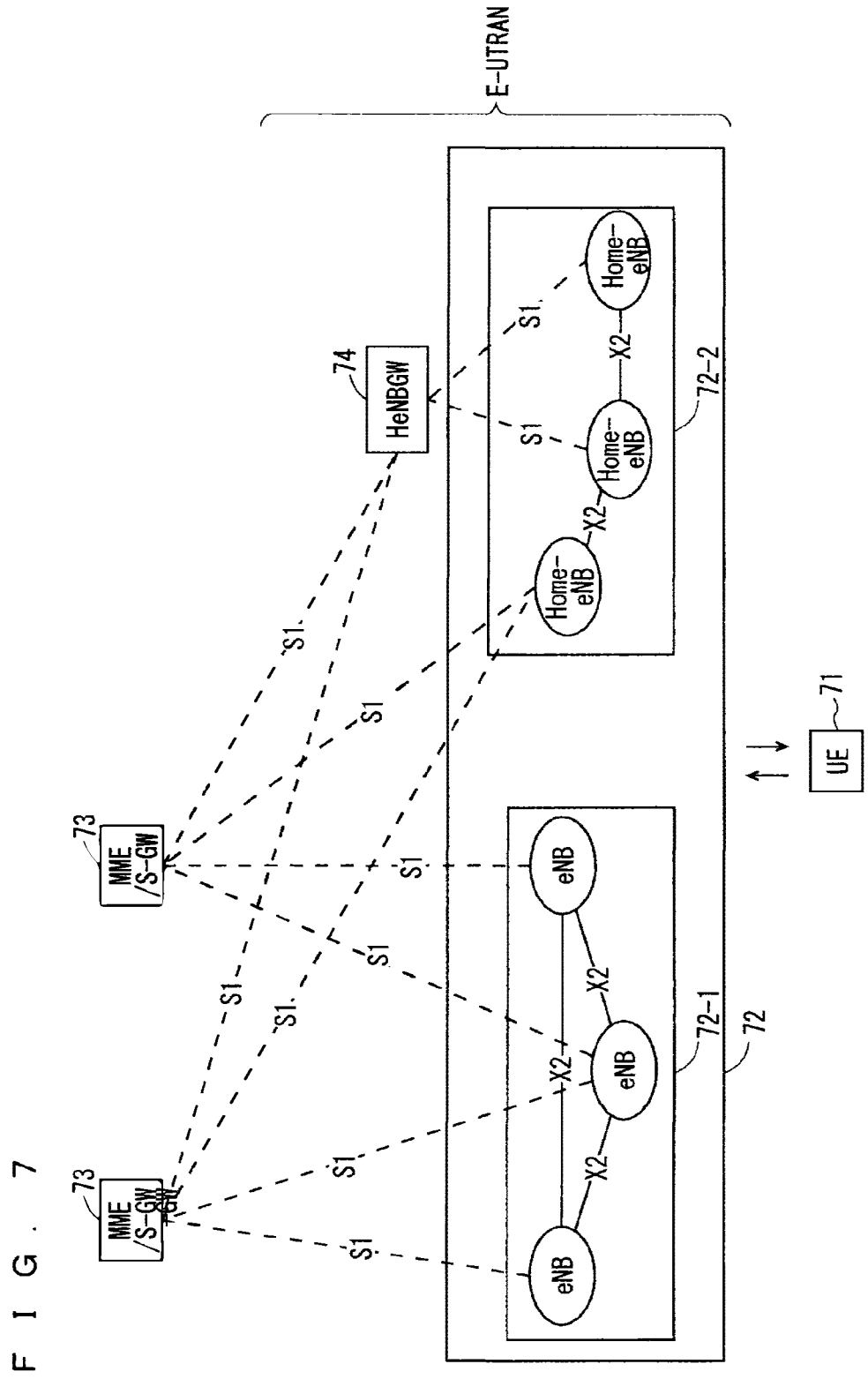
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 will be described. A user equipment device (hereinafter, referred to as a "user equipment" or "UE") 71 is capable of performing radio communication with a base station device (hereinafter, referred to as a "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which communication is allowed with the user equipment (UE) 71. The Home-eNB 72-2 has a relatively small-scale coverage as the coverage.

The eNB 72-1 is connected to an MME/S-GW unit (hereinafter, also referred to as an "MME unit") 73 including an MME, S-GW, or MME and S-GW through an S1 interface, and control information is communicated between the eNB 72-1 and the MME unit 73. A plurality of MME units 73 may be connected to one eNB 72-1. The MME unit 73 is equivalent to management means. The MME unit 73 is included in an EPC being a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connection between the user equipment (UE) 71 and the eNB 72-1 or Home-eNB 72-2 being a base station. The MME units 73, specifically, the MME and S-GW constituting the MME unit 73 and the HeNBGW 74 are equivalent to management means. The MME units 73 and HeNBGW are included in an EPC being a core network.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the eNB 72-1. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The HeNBGW 74 does not support the mobility to the Home-eNB 72-2 or the mobility from the Home-eNB 72-2 that spans a plurality of MME units 73. The Home-eNB 72-2 constitutes and supports a single cell.

The base station device supports a single cell alone, such as the Home-eNB 72-2, which is not limited thereto. One base station device may support a plurality of cells. In a case where one base station device supports a plurality of cells, every cell functions as a base station device.

Figure 8:
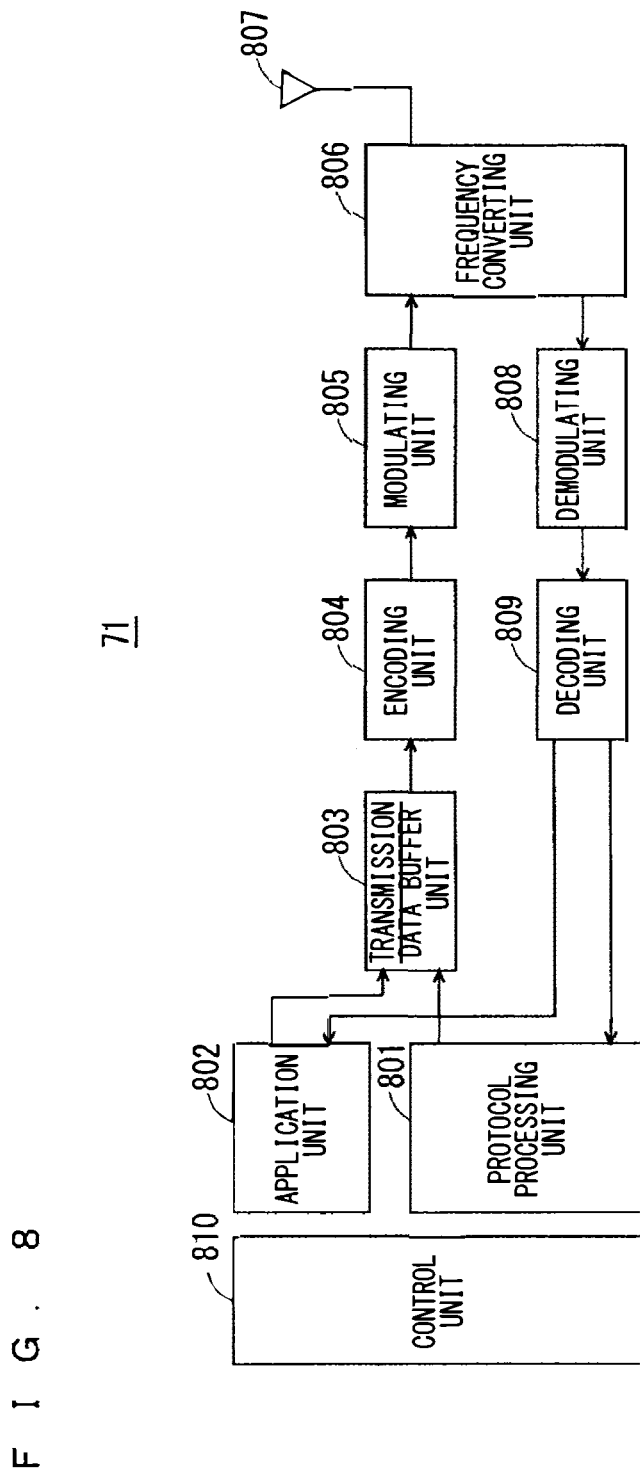
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and is then converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency into a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The communication with another base station unit 902 is equivalent to a notification unit and an acquisition unit. The transmission data buffer unit 904, encoding unit 905, modulating unit 906, frequency converting unit 907, antenna 908, demodulating unit 909, and decoding unit 910 are equivalent to a communication unit.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of by the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3, and other unit, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP will be described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 of FIG. 7 being a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP will be described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

Figure 12:
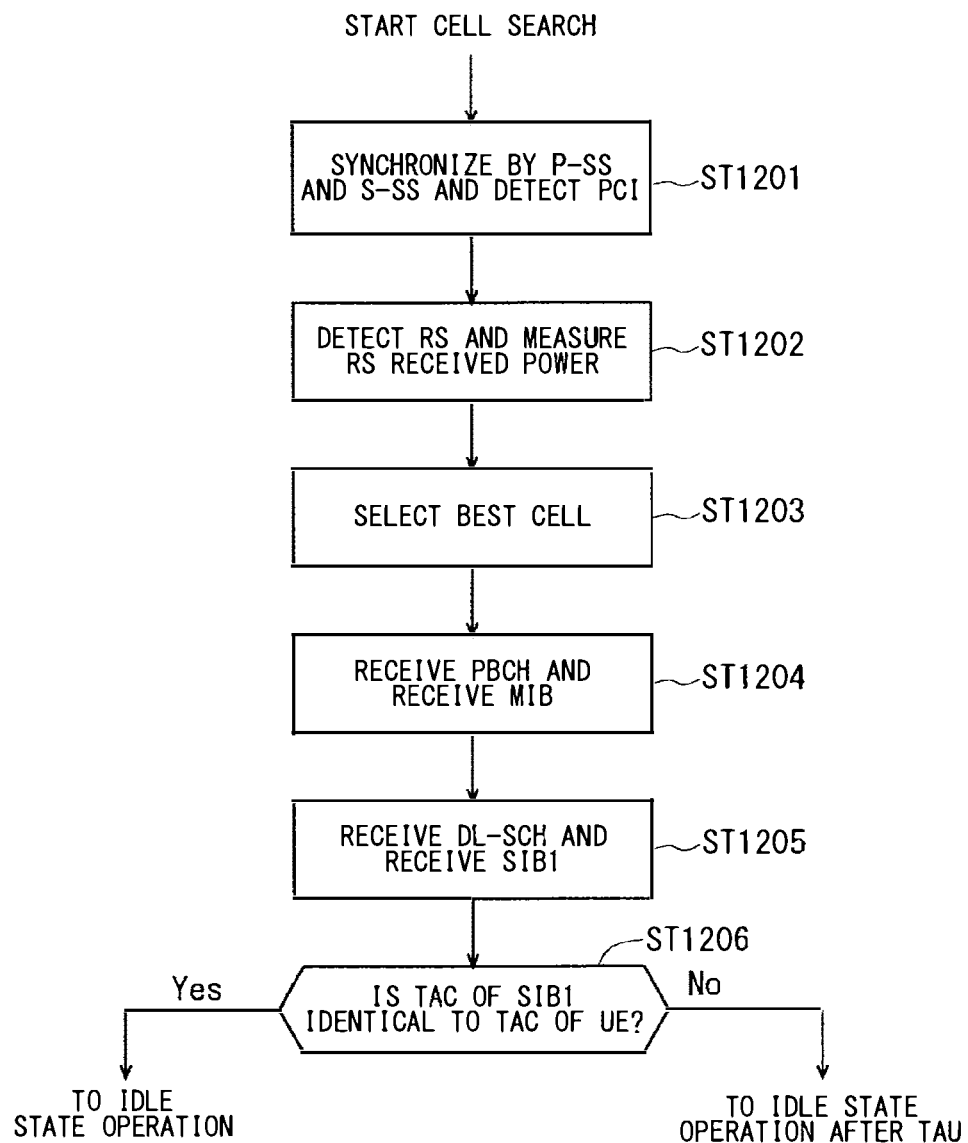
FIG. 12 is a flowchart showing an outline from a cell search to an idle state operation performed by a user equipment (UE) in the LTE communication system.

An example of a cell search method in a mobile communication system will be described next. FIG. 12 is a flowchart showing an outline from a cell search to an idle state operation performed by a user equipment (UE) in the LTE communication system. When starting a cell search, in Step ST1201, the user equipment synchronizes the slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. These 504 ways are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, cell having the highest RS received power, that is, best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information on cell selection, and scheduling information about other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area (TA) list that has been already possessed by the user equipment. The tracking area (TA) list is also referred to as a TAI list. TAI is a TA identity and is formed of a mobile country code (MCC), a mobile network code (MNC), and a tracking area code (TAC). MCC is a country code. MNC is a network code. TAC is a TA code number.

In a case where the TAC received in Step ST1205 is identical to the TAC included in the tracking area (TA) list as a result of the comparison of Step ST1206, the user equipment enters an idle state operation in the cell. In a case where the TAC received in Step ST1205 is not included in the tracking area (TA) list as a result of the comparison, the user equipment requires a core network (EPC) including MME and the like to change a tracking area (TA) through the cell for performing tracking area update (TAU). The core network updates the tracking area (TA) list based on an identification number (such as a UE-ID) of the user equipment transmitted from the user equipment with a TAU request signal. The core network transmits the updated tracking area (TA) list to the user equipment. The user equipment rewrites (updates) the TAC list of the user equipment based on the received tracking area (TA) list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may contain a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as the CSG cell in some cases. The user equipment registered with the CSG cell has a whitelist. Specifically, the whitelist is stored in the subscriber identity module (SIM) or USIM. The whitelist stores the CSG information of the CSG cell with which the user equipment has been registered. Specific examples of the CSG information may include CSG-ID, tracking area identity (TAI), and TAC. Any one of the CSG-ID and TAC is adequate as long as they are associated with each other. Alternatively, ECGI is adequate as long as the CSG-ID and TAC are associated with ECGI.

As can be seen from the above, the user equipment that has no whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

The HeNB and HNB are required to support various services. For example, in certain service, an operator causes the predetermined HeNB and HNB to register user equipments therein and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. A large number of closed subscriber group (CSG) cells are required to be installed in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

As described above, it is studied to support CoMP as a new LTE-A technique. Also, collection (set) of cells or points used for performing CoMP is studied. Examples of the collection of cells used for performing CoMP in the present invention include (1) to (5) below. The collection of points suffices, not limited to the collection of cells. In the following description, the collection of points or cells used for performing CoMP is collectively referred to as a "CoMP set".

(1) RRM measurement set. The radio resource management (RRM) measurement set refers to the collection of cells obtained from the measurement described in the specifications of Releases 8 to 10, specifically, cell-specific reference signal (CRS) measurement.

(2) CoMP cooperating set. The CoMP cooperating set refers to the collection of cells that enable CoMP.

(3) CoMP coordination area (CoMP coordination cells). The CoMP coordination area refers to a radio area configured by cells that enable CoMP.

(4) CoMP measurement set. The CoMP measurement set refers to a collection of cells which channel state indication (CSI)-RS of the cell is measured to be reported. The CoMP measurement set is selected from the RRM measurement set.

(5) CoMP transmission point. The CoMP transmission point refers to a cell that transmits data to a UE being subjected to CoMP. The CoMP transmission point is selected from the CoMP measurement set. If there is a CoMP active set described below, the CoMP transmission point may be selected from the CoMP active set. If there is no CoMP active set described below, the CoMP transmission point is selected from the CoMP measurement set.

The RRM measurement set is equivalent to a detection target cell set. The measurement described in the specifications of Releases 8 to 10, specifically, the CRS measurement is equivalent to the process of detecting whether or not radio communication is allowed, which is performed by a UE.

The CoMP cooperating set is equivalent to a coordination-enabled cell set, which is the collection of cells to become candidates on which the UE performs the process of detecting whether or not coordinated communication (CoMP communication) is allowed. The CoMP measurement set is equivalent to a coordination target cell set, which is the collection of cells to become targets on which the UE performs the process of detecting whether or not CoMP communication is allowed.

The above-mentioned central entity refers to an entity that intensively adjusts (coordinates) CoMP performed by one or a plurality of points (see Non-Patent Document 10). The central entity is equivalent to an adjustment unit. The central entity is a logical entity and may be physically configured in any device. As an example, the central entity may be configured in the eNB or RRH, or may be configured separately from the eNB and RRH. Or, the central entity may be configured in the HeNBGW.

Figure 13:
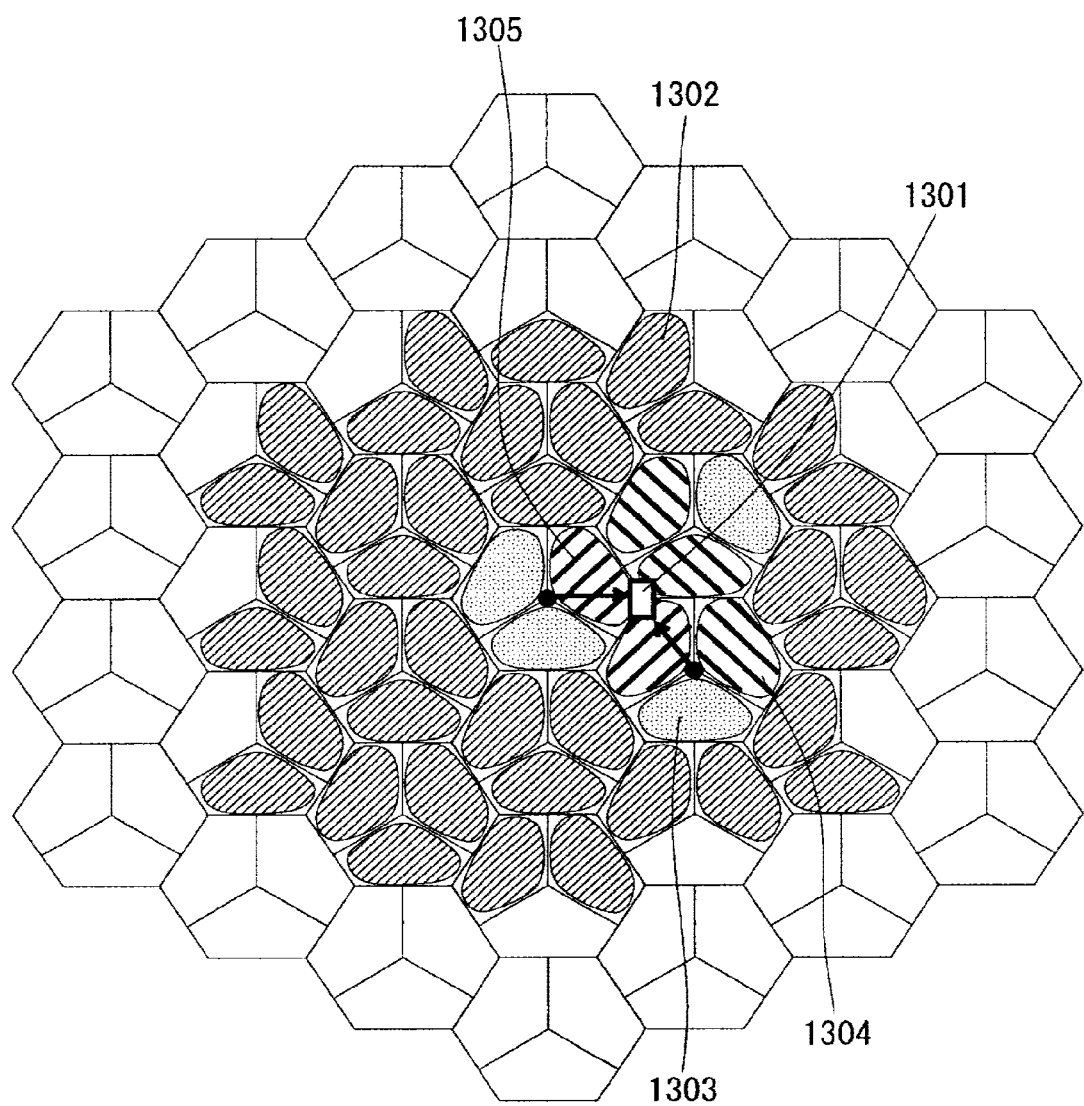
FIG. 13 is a diagram for describing collections of cells used for performing CoMP.

FIG. 13 is a diagram for describing collections of cells used for performing CoMP. FIG. 13 shows RRM measurement sets 1302 by left-downward hatching by thin diagonal lines, CoMP cooperating sets 1303 by textured hatching, CoMP measurement sets 1304 by right-downward hatching by thick diagonal lines, and CoMP transmission points 1305 by left-downward hatching by thick diagonal lines.

The RRM measurement sets 1302, the CoMP cooperating sets 1303, the CoMP measurement sets 1304, and the CoMP transmission points 1305 are each configured for a UE 1301. FIG. 13 shows the case where the CoMP cooperating set 1303 is included in the RRM measurement set 1302.

Figure 14:
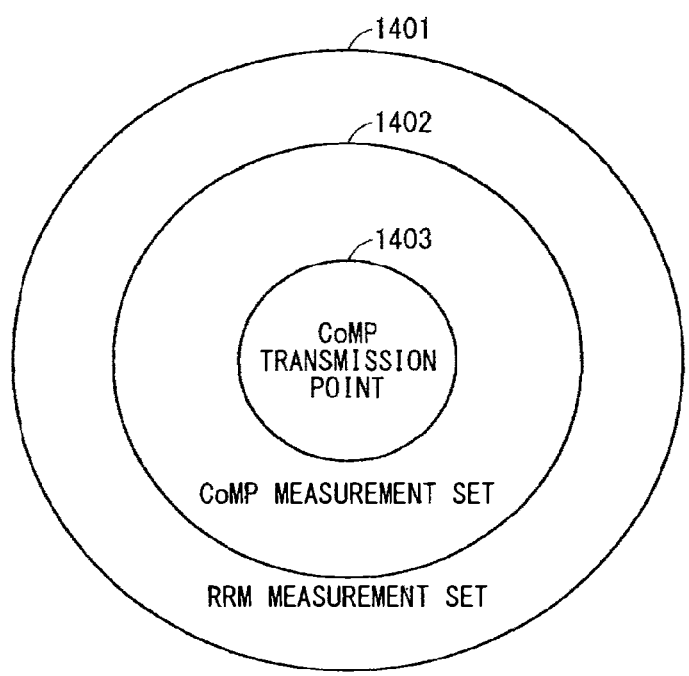
FIG. 14 is a diagram for describing the inclusion relation of the collections of cells used for performing CoMP.

FIG. 14 is a diagram for describing the inclusion relation of collections of cells used for performing CoMP. FIG. 14 shows an RRM measurement set by a circle indicated by reference numeral "1401", a CoMP measurement set by a circle indicated by reference numeral "1402", and a CoMP transmission point by a circle indicated by reference numeral "1403". As shown in FIG. 14, a part or the whole of the RRM measurement set 1401 is the CoMP measurement set 1402, and a part or the whole of the CoMP measurement set 1402 is the CoMP transmission point 1403.

3GPP has disclosed nothing about the procedure of actually performing CoMP. For example, it is not clear how to use the collections of cells used for performing CoMP, and thus, CoMP cannot be performed. This embodiment discloses, to perform CoMP, the methods of using and configuring collections of cells, a notification method between a UE and a serving cell, and a procedure thereof.

FIGS. 15 and 16 are diagrams showing an exemplary sequence of a mobile communication system in a first embodiment. FIGS. 15 and 16 are continuous with each other at a position of a boundary BL1. FIGS. 15 and 16 show the sequence when CoMP is performed on a desired UE in a case where a central entity is configured in a serving cell. This sequence shows the case where a central entity is configured in a serving cell, and thus, the central entity and the serving cell are not particularly differentiated from each other and are referred to as a serving cell.

In Step ST1501, the serving cell sets an RRM measurement configuration to set a range in which a desired UE is caused to perform RRM measurement. Herein, the desired UE is referred to as "UE1". For example, any one or both of a frequency and a report condition are set as the RRM measurement configuration. As the report condition, for example, an event that triggers the execution of a report is set. The cell to be measured may be specified and a cell-identity (ID) such as a PCI of the cell may be set as an RRM measurement configuration. For example, if the network has set the RRM measurement set for the UE1, this RRM measurement set may be used. Or, a list of neighbor cells (neighbor cell list) may be used as the RRM measurement set.

The RRM measurement configuration, its notification, and measurement report may be provided for CoMP. The frequency, report condition, cell identity, or the like suitable for CoMP is set.

As another method, the RRM measurement configuration, its notification, and measurement report for conventional mobility may be used. If the serving cell can use the frequency, report condition, or cell identity set for mobility in CoMP, the serving cell may use the RRM measurement configuration, its notification, and measurement report for conventional mobility. Or, the serving cell may set the frequency, report condition, or cell identity that can be used for mobility as well as for CoMP. This allows the RRM measurement configuration, its notification, and measurement report to be shared, reducing a signaling amount and a control load.

In Step ST1502, the serving cell notifies the UE1 of the RRM measurement configuration set in Step ST1501. Dedicated signaling is used in notification of the RRM measurement configuration. RRC signaling is used as the dedicated signaling.

In Step ST1503, the UE1 performs measurement of CRS (hereinafter, also referred to as "CRS measurement") in accordance with the received RRM measurement configuration. Specifically, as the CRS measurement, the UE1 uses the frequency notified in the RRM measurement configuration to detect a cell whose carrier frequency is the notified frequency.

The CRS measurement may be performed until the UE1 receives a change in or a release of the RRM measurement configuration after receiving the RRM measurement configuration. In this case, the CRS measurement may be performed regularly or periodically. The broken line connecting Step ST1503 and Step ST1522 in FIGS. 15 and 16 indicates that the CRS measurement is performed until the UE1 receives a change in or a release of the RRM measurement configuration after receiving the RRM measurement configuration, as described above.

In Step ST1504, if the CRS measurement results of the detected cell agree with the report condition, the UE1 reports the CRS measurement results to the serving cell in a measurement report message. For example, for the cell in which the received power of the CRS (RSRP) becomes not less than the threshold set in the RRM measurement configuration, the UE1 notifies the serving cell of the cell identity and the RSRP of this cell. Alternatively, for example, for the cell in which a difference between the CRS received power (RSRP) of the detected cell and the CRS received power (RSRP) of the serving cell becomes not less than the threshold set in the RRM measurement configuration, the UE1 may notify the serving cell of the cell identity and the RSRP of this cell. It is not limited to the CRS received power but may be a reception quality (reference signal received quality: RSRQ). The CRS measurement results may be reported regularly or periodically. The RRM measurement configuration and measurement report may include a serving cell. Or, the CRS measurement results of the serving cell may be reported in the measurement report without fail.

In Step ST1505, the serving cell creates an RRM measurement set composed of one or a plurality of cells reported, based on the measurement report message notified from the UE1.

If the RRM measurement set has been provided for the UE1, the serving cell may add, delete, or change cells in the RRM measurement set based on the message of the measurement report of Step ST1504. Or, the serving cell may associate whether the threshold is exceeded, the received power or reception quality of the cell at that time with the cell identity of the cell in the RRM measurement set, and then record and manage them.

In Step ST1506, the UE1 and the serving cell perform at least any one of downlink (DL) and uplink (UL) data communications.

In Step ST1507, the UE1 derives a channel quality indicator (CQI) from the CRS and feeds back the CQI to the serving cell.

In Step ST1508, the serving cell decides whether or not to perform CoMP, that is, to turn on or off CoMP, using the CQI received from the UE1. For example, the serving cell decides to perform CoMP if the CQI falls below a predetermined threshold (hereinafter, referred to as a "threshold A") or decides to stop performing CoMP if the CQI exceeds a predetermined threshold (hereinafter, referred to as a "threshold B"). The threshold A and the threshold B may be provided with a predetermined offset to exhibit hysteresis. This allows the serving cell to judge whether or not to perform CoMP on the UE1. After the process of Step ST1508 is complete, the serving cell moves to Step ST1530.

In Step ST1530, the serving cell decides the CoMP measurement set for the UE1. In other words, the serving cell selects a CoMP measurement set. Specifically, the serving cell selects cells in the CoMP measurement set (hereinafter, also referred to as "in-CoMP-measurement-set cells"). The in-CoMP-measurement-set cells are selected from the cells in the RRM measurement set (hereinafter, also referred to as "in-RRM-measurement-set cells"). The cell identities of the cells in the RRM measurement set, the number of cells that can be included in the CoMP measurement set, the received power (RSRP) or reception quality (RSRQ) of the reference symbol of the cell (hereinafter, also referred to as "RSRP/RSRQ"), or the like may be used as an indicator for selection. They may be used with the CQI.

As another indicator for selection, for example, the load of each cell may be used. The serving cell does not select a cell for the CoMP measurement set if the load of that cell is high or selects a cell for the CoMP measurement set if the load of that cell is low. With the use of the load of each cell with the indicator, whether or not to allow CoMP can be decided depending on the load condition of each cell, improving a throughput as the mobile communication system.

The RRM measurement set, however, may include a cell that does not belong to a CoMP cooperating set. In this case, CoMP cannot be performed if the cell that does not belong to the CoMP cooperating set is selected for a CoMP measurement set. It is therefore useless to select the cell that does not belong to the CoMP cooperating set for a CoMP measurement set, which may cause a malfunction.

This embodiment limits the cells, which are to be selected for a CoMP measurement set, to the cells belonging to the CoMP cooperating set in the RRM measurement set. This allows only the cells capable of CoMP to be included in the CoMP measurement set.

If only the serving cell is included as the in-CoMP-measurement-set cell in Step ST1530, the serving cell may judge to stop performing CoMP. In that case, the serving cell may decide to release the CoMP measurement configuration and notify the UE1 of the release or may move to the process of Step ST1527. If the serving cell is not included in the CoMP measurement set as disclosed below, the serving cell may judge not to stop performing CoMP when there is only one in-CoMP-measurement-set cell. The serving cell and the in-CoMP-measurement-set cell may perform CoMP. When the process of Step ST1530 is complete, the serving cell moves to Step ST1509.

In Step ST1509, the serving cell sets a CoMP measurement configuration for the UE1. For example, the serving cell sets the cell identity of the in-CoMP-measurement-set cell, CSI-RS the the configuration of in-CoMP-measurement-set cell, the configuration of a demodulation reference signal (DM-RS) for the UE1 of the in-CoMP-measurement-set cell, or the like. The cycle at which the CSI-RS is transmitted per cell is set as the CSI-RS configuration.

In Step ST1510, the serving cell notifies the UE1 of the CoMP measurement configuration. Dedicated signaling is used in notification of the CoMP measurement configuration. RRC signaling is used as the dedicated signaling.

In Step ST1511, the UE1 that has received the CoMP measurement configuration in Step ST1510 sets at least any one of the CSI-RS configuration and DM-RS configuration of the in-CoMP-measurement-set cell set in the CoMP measurement configuration.

In Step ST1513, the serving cell causes the CoMP measurement set to transmit the CSI-RS.

In Step ST1512, the UE1 measures the CSI-RS of the in-CoMP-measurement-set cell. For example, the UE1 measures the RSRP/RSRQ of the CSI-RS. In this embodiment, in Step ST1514, the UE1 derives the CSI from the measurement value of the CSI-RS. The process of deriving the CSI in Step ST1514 needs not to be always performed.

The CSI-RS may be measured per cell or per point. The method of measuring the CSI-RS may be preliminarily decided in specifications or may be included in the CoMP measurement configuration to be notified the UE1 from the serving cell. The measurement method is included in the CoMP measurement configuration to be notified, allowing the measurement method to be changed dynamically or semi-statically. This allows for selection of CoMP transmission points suitable for CoMP.

The CSI-RS of the CoMP measurement set may be measured until the UE1 receives the release of the CoMP measurement configuration after receiving the CoMP measurement configuration. The CSI-RS may be measured regularly or periodically.

In Step ST1515, the UE1 reports, to the serving cell, the CSI-RS measurement results (CSI-RS measurement report) of the in-CoMP-measurement-set cell, for example, the RSRP/RSRQ measurement results. If deriving the CSI in Step ST1514 as in this embodiment, in Step ST1515, the UE1 reports the CSI derivation results (CSI feedback) to the serving cell with the CSI-RS measurement results. The CSI-RS measurement results may be reported regularly or periodically, or may be reported if a predetermined condition is met. The CoMP measurement configuration or CSI-RS measurement report may include the serving cell. Or, the CSI-RS measurement results of the serving cell may be reported in the CSI-RS measurement report without fail.

In Step ST1516, the serving cell decides CoMP transmission points from the CSI-RS measurement results (CSI-RS measurement report) reported from the UE1, for example, from the RSRP/RSRQ measurement results and the CSI derivation results (CSI feedback). If the CSI derivation results are not reported in Step ST1515, the serving cell decides CoMP transmission points from the CSI-RS measurement results. In this case, other indicator, for example, the load of each cell or the like may be used. If the load of each cell is high, the serving cell does not make the cells as CoMP transmission points. If the load of each cell is low, the serving cell makes the cells as CoMP transmission points. With the use of the load of each cell as described above, the serving cell can decide whether or not to perform CoMP depending on the load condition of each cell, improving a throughput as the mobile communication system. When the process of Step ST1516 is complete, the serving cell moves to Step ST1518.

In Step ST1518, the serving cell includes the information indicative of the CoMP transmission points in the physical downlink control channel (PDCCH) for the UE1, and then performs scheduling (CoMP scheduling). The information indicative of the CoMP transmission points may be included in the downlink control information (DCI) of the PDCCH.

The information indicative of the CoMP transmission points may be the cell identities such as PCIs. However, the number of bits required increases for the cell identities such as PCIs, causing a problem that the capacity of the PDCCH becomes scarce if the information is included in the PDCCH.

In order to solve the problem that the capacity of the PDCCH becomes scarce, cells in the CoMP measurement set may be numbered and the resulting numbers may indicate the CoMP transmission points. The numbers are limited to the number of cells in the CoMP measurement set, and thus, the use of the numbers reduces an amount of information. If the numbers are used, the relationship between the cell identities of the in-CoMP-measurement-set cells and the resulting numbers may be included in the CoMP measurement configuration set in Step ST1509 to be notified the UE1 from the serving cell in Step ST1510.

In Step ST1517, the UE1 receives the PDCCH from the serving cell and obtains the CoMP transmission point information included in the DCI of the PDCCH, to thereby receive the CoMP transmission points. The CoMP measurement configuration received in Step ST1510 may be used in receiving the CoMP transmission points.

In Step ST1519, the UE1 and the serving cell perform CoMP transmission/reception. The UE1 derives the CSI from the CSI-RS and then feeds back the CSI to the serving cell.

In Step ST1520, the serving cell judges whether or not to change the CoMP transmission points. Specifically, the serving cell judges whether or not to change the CoMP transmission points using the CSI feedback information.

If judging to change the CoMP transmission points, the serving cell selects a cell to be added to the CoMP measurement set or a cell to be deleted from or changed in the CoMP measurement set, using the CSI-RS measurement results of the CoMP measurement set and the above-mentioned other indicator. In this case, the serving cell may use the CSI feedback information of the CoMP transmission points and the CSI-RS measurement results of the CoMP measurement set together.

The serving cell returns to Step ST1516 after performing the cell selection if judging to change the CoMP transmission points in Step ST1520 or moves to Step ST1521 if judging not to change the CoMP transmission points in Step ST1520.

The serving cell that has performed the cell selection adds, deletes, or changes the CoMP transmission points in Step ST1516 and then moves to Step ST1518. In Step ST1518, the serving cell includes the information indicative of the CoMP transmission points after the change in the DCI of the PDCCH for the UE1, and then performs CoMP scheduling.

In Step ST1521, the UE1 and the serving cell perform CoMP transmission/reception. Also, the UE1 derives the CSI from the CSI-RS and feeds back the CSI to the serving cell.

In Step ST1523, the UE1 that has performed CRS measurement in Step ST1522 reports the CRS measurement results to the serving cell in a measurement report message.

In Step ST1524, the serving cell that has received the measurement report message changes the RRM measurement set, specifically, changes the in-RRM-measurement-set cell, as required. If deciding to change the RRM measurement set using the cell identity and the CRS measurement results information received in the measurement report message, the serving cell selects cells to be added, deleted, or changed to add, delete, or change the RRM measurement set.

If the RRM measurement set is changed in Step ST1524, the CoMP measurement set selected from the RRM measurement set may need to be changed, specifically, the in-CoMP-measurement-set cells may need to be added, deleted, or changed. In Step ST1525, the serving cell accordingly judges whether or not to change the CoMP measurement set. Specifically, the serving cell judges whether or not to change the in-CoMP-measurement-set cells.

If judging to change the CoMP measurement set, specifically, change the in-CoMP-measurement-set cells in Step ST1525, the serving cell returns to Step ST1530 to perform the process of Step ST1530. In Step ST1510, the serving cell notifies the UE1 of the CoMP measurement configuration changed in Step ST1530.

In this case, the serving cell may notify all of the CoMP measurement configuration or notify a difference with the CoMP measurement configuration recently notified. The notification of all of the CoMP measurement configuration allows the UE and the network to use the same CoMP measurement configuration without fail, preventing a malfunction. Meanwhile, the notification of a difference with the CoMP measurement configuration recently notified reduces a signaling amount to be notified the UE from the serving cell.

If judging not to change the CoMP measurement set, specifically, change the in-CoMP-measurement-set cells in Step ST1525, the serving cell moves to Step ST1526.

In Step ST1526, the UE1 and the serving cell continuously perform CoMP transmission/reception. Also, the UE1 derives the CSI from the CSI-RS and feeds back the CSI to the serving cell.

The serving cell that performs CoMP transmission/reception to/from the UE1 in Step ST1526 decides whether or not to perform CoMP. The serving cell may decide whether or not to perform CoMP using the CSI-RS measurement results. The serving cell may perform a similar method using the CSI-RS in place of the CQI in the process of Step ST1507. Or, the serving cell may decide whether or not to perform CoMP using the CRS measurement results. Or, the serving cell may use the CSI-RS measurement results and the CRS measurement results.

Considered here is the case where the serving cell decides to release CoMP, that is, stop performing CoMP in Step ST1527. In this case, in Step ST1528, the serving cell notifies the UE1 of the release of the CoMP measurement configuration. Dedicated signaling is used in notification of the release of the CoMP measurement configuration. RRC signaling is used as dedicated signaling.

The serving cell that has notified the UE1 of the release of the CoMP measurement configuration in Step ST1528 stops performing CoMP on the UE1. This stops the transmission of the CSI-RS from the CoMP measurement set, the transmission of CoMP transmission point scheduling from the serving cell, and the transmission of data from the CoMP transmission points.

In Step ST1529, the UE1 that has received the release of the CoMP measurement configuration releases the setting of the CoMP measurement configuration such as the CoMP measurement set. This also stops the measurement of the CoMP measurement set. The UE1 is not notified of scheduling of the CoMP transmission points from the serving cell, and accordingly does not perform CoMP transmission/reception.

This embodiment has disclosed the method of using the collections of cells, the notification method between the UE and the serving cell, and the procedure thereof in a case where CoMP is performed. The use of the methods disclosed above allows for performing CoMP.

Second Embodiment

As described in the first embodiment, the UE measures the CSI-RS of each cell in the CoMP measurement set. Thus, the power consumption of the UE increases as the number of cells in the CoMP measurement set increases. An increase in UE power consumption can be prevented by reducing the number of cells in the CoMP measurement set. However, the number of cells to become candidates for CoMP transmission points reduces as the number of cells in the CoMP measurement set is reduced, causing a problem that optimum CoMP transmission points cannot be selected.

Although the problem that optimum CoMP transmission points cannot be selected is solved by rapidly and frequently changing the CoMP measurement set, the in-CoMP-measurement-set cells are changed through RRC signaling, hindering a rapid change, which causes a delay. The changed CoMP measurement set needs to be frequently notified the UE, leading to a problem that an RRC signaling amount increases.

In order to solve the above-mentioned problem, this embodiment will disclose to provide a subset of in-CoMP-measurement-set cells. This embodiment provides a subset composed of a part or the whole of the in-CoMP-measurement-set cells. Such a subset is referred to as a CoMP active set.

Figure 17:
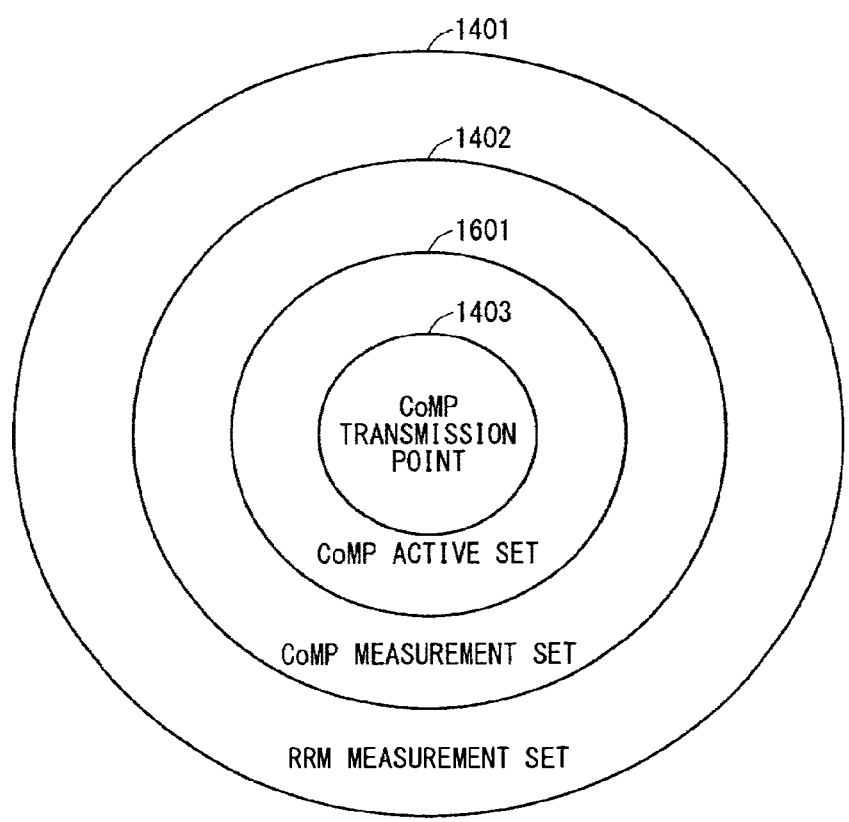
FIG. 17 is a diagram for describing the inclusion relation between a CoMP active set and other sets.

FIG. 17 is a diagram for describing the inclusion relation between the CoMP active set and other sets. As shown in FIG. 17, the CoMP active set is configured such that a part or the whole of the RRM measurement set 1401 is the CoMP measurement set 1402, a part or the whole of the CoMP measurement set 1402 is a CoMP active set 1601, and a part or the whole of the CoMP active set 1601 is the CoMP transmission point 1403.

The method of selecting cells in the CoMP active set (also referred to as "in-CoMP-active-set cells") will be disclosed. The in-CoMP-active-set cells are selected from the in-CoMP-measurement-set cells. The following two (1) and (2) will be disclosed as indicators for judging which cell is selected.

(1) The CSI-RS measurement results of the UE are used as the judgment indicator.

(2) The uplink communication quality transmitted from the UE is used as the judgment indicator.

As the CSI-RS measurement results being the judgment indicator of (1) above, the RSRP or RSRQ of the CSI-RS may be used or the CSI derived from the CSI-RS measurement value may be used. Or, the RSRP or RSRQ of the CSI-RS and the CSI derived from the CSI-RS measurement value may be used together. The use of the CSI-RS measurement results as the judgment indicator for cell selection shows the communication quality of the PDSCH area to which the data for performing CoMP is mapped, allowing for the selection of cells suitable for performing CoMP.

As the uplink communication quality being the judgment indicator of (2) above, the measurement results of a sounding reference signal (SRS) may be used or the measurement results of the RS for PUCCH or PUSCH modulation may be used. The use of the uplink communication quality as the judgment indicator for cell selection eliminates the need for the UE to measure and report the CSI. This reduces the power consumption of the UE. In time division duplex (TDD), downlink uses the same frequency band as that of uplink, allowing for the selection of cells suitable for performing CoMP also in downlink CoMP.

The judgment indicators of (1) and (2) above may be used together rather than being used independently. The cells of the CoMP active set may be selected using the both indicators. Or, those judgment indicators and the CRS measurement results of the UE may be used together.

The method of notifying the UE of the CoMP active set will be disclosed. The serving cell notifies the UE of the cells in the CoMP active set. The serving cell may notify the CoMP active set as required. For example, the serving cell may avoid notifying a CoMP active set if the CoMP active set is not configured. In this case, when not being notified of the CoMP active set, the UE may judge that the CoMP active set is not configured.

The CoMP active set may be notified through MAC signaling. The use of MAC signaling allows for the notification of a CoMP active set with a lower delay than the use of RRC signaling. Besides, RRC signaling is not required, and thus, an RRC signaling amount does not increase by notification of a CoMP active set.

The information indicative of cells in a CoMP active set may be cell identities such as the PCIs. The cell identities such as PCIs, however, increase the required number of bits, causing a problem that an overhead in MAC increases if the cell identities are included in MAC signaling.

In order to solve this problem, the in-CoMP-measurement-set cells may be numbered such that the resulting numbers indicate the in-CoMP-active-set cells. The numbers are limited to the number of cells in the CoMP measurement set, and accordingly, the use of the numbers reduces the amount of information. These numbers may be the same as the numbers of the in-CoMP-measurement-set cells provided for CoMP transmission points disclosed in the first embodiment.

If the numbers are used, the relationship between the cell identities of the in-CoMP-measurement-set cells and the resulting numbers may be included in the CoMP measurement configuration set in Step ST1509 to be notified the UE1 from the serving cell in Step ST1510.

If the CoMP active set is notified through MAC signaling, for example, the CoMP active set information may be included in a MAC control element (MAC CE) to be notified. There may be provided a bit map indicating, by one bit, whether or not each of the cells in the CoMP measurement set is included in the CoMP active set. Or, there may be provided a bit map in an ascending order or a descending order of the numbers of the cells in the CoMP measurement set. Thus, an amount of information for only the number of bits for the number of cells in the CoMP measurement set is required.

The case where the cells are included in the CoMP measurement set may be referred to as "activate (act)", and the case where the cells are not included in the CoMP measurement set may be referred to as "deactivate (deact)". In other words, the collection of cells to be activated in the CoMP measurement set may be a CoMP active set.

The operation of the UE when being notified of a CoMP active set will be disclosed. The UE measures the CSI-RS of the cell in the CoMP active set notified through MAC signaling and reports the measurement results to the serving cell.

In the case where a CoMP active set is set, the UE may avoid measuring and reporting the CSI-RSs of the cells outside the CoMP active set. This eliminates the need for the UE to measure the CSI-RSs of all the cells in the CoMP measurement set, reducing the power consumption. In this case, the CRS measurement and report results of the UE or the uplink communication quality from the UE may be used as the judgment indicator for cell selection to be included in the CoMP active set.

As another method, in the case where a CoMP active set is set, the UE may cause at least any one of the CSI-RS measurement cycle and report cycle to differ between the cells in the CoMP active set and the cells outside the CoMP active set. Specifically, it suffices to make the CSI-RS measurement cycle and report cycle of the cells outside the CoMP active set longer than the CSI-RS measurement cycle and report cycle of the cells in the CoMP active set.

This allows for the use of the CSI-RS measurement results with a shorter cycle in selecting CoMP transmission points, whereby the CoMP transmission points suitable for CoMP can be selected. Meanwhile, the use of the CSI-RS measurement results with a longer cycle in selecting a CoMP active set reduces the UE power consumption. Thus, the UE power consumption can be reduced while allowing for the selection of the CoMP transmission points suitable for CoMP.

In the case where a CoMP active set is set, the serving cell may notify the UE, through dedicated signaling, of the setting that the UE avoids measuring and reporting the CSI-RSs of the cells outside the CoMP active set or the setting that the UE causes at least any one of the CSI-RS measurement cycle and report cycle to differ between the cells in the CoMP active set and the cells outside the CoMP active set. RRC signaling may be used as dedicated signaling. For example, the setting may be notified together when the CoMP measurement configuration is notified the UE. Or, the setting may be made dynamically or semi-statically.

Alternatively, the above-mentioned setting may be semi-statically decided in specifications in advance. This allows the UE to judge, when being notified of a CoMP active set through MAC signaling, how to measure the CSI-RSs of the cells outside the CoMP active set.

When the CoMP active set is set, the cells outside the CoMP active set may avoid transmitting the CSI-RS. This eliminates the need for unnecessary transmission from the cells.

When the CoMP active set is set, the cells outside the CoMP active set may avoid performing CoMP on the UE being a CoMP target.

In the CoMP measurement set, CoMP can be performed on the UE being a CoMP target, requiring the data on the UE, the information related thereto and scheduling information to be transmitted/received between the cells in the CoMP measurement set. Therefore, a control load and a signaling load increase on the network if the number of cells in the CoMP measurement set is large.

CoMP is not executed from the cells outside the CoMP active set as described above, suppressing the above-mentioned increases in the control load and signaling load on the network.

In this case, the CSI-RS may be transmitted from the cell outside the CoMP active set, or the UE may measure the CSI-RS from the cell outside the CoMP active set. Even in such a case, the data for the UE being a CoMP target, the information related thereto, and scheduling information need not to be exchanged on the network by avoiding CoMP from the cells outside the CoMP active set. This suppresses increases in the control load and signaling load on the network.

The method of selecting CoMP transmission points from the cells in the CoMP active set will be disclosed. The serving cell selects CoMP transmission points using the CSI-RS measurement results reported from the UE. If the CoMP active set has not been set, the serving cell selects CoMP transmission points from the cells in the CoMP measurement set. If the CoMP active set has not been set, the serving cell may select CoMP transmission points using the CSI-RS measurement results of the cells in the CoMP measurement set reported from the UE.

Figure 18:
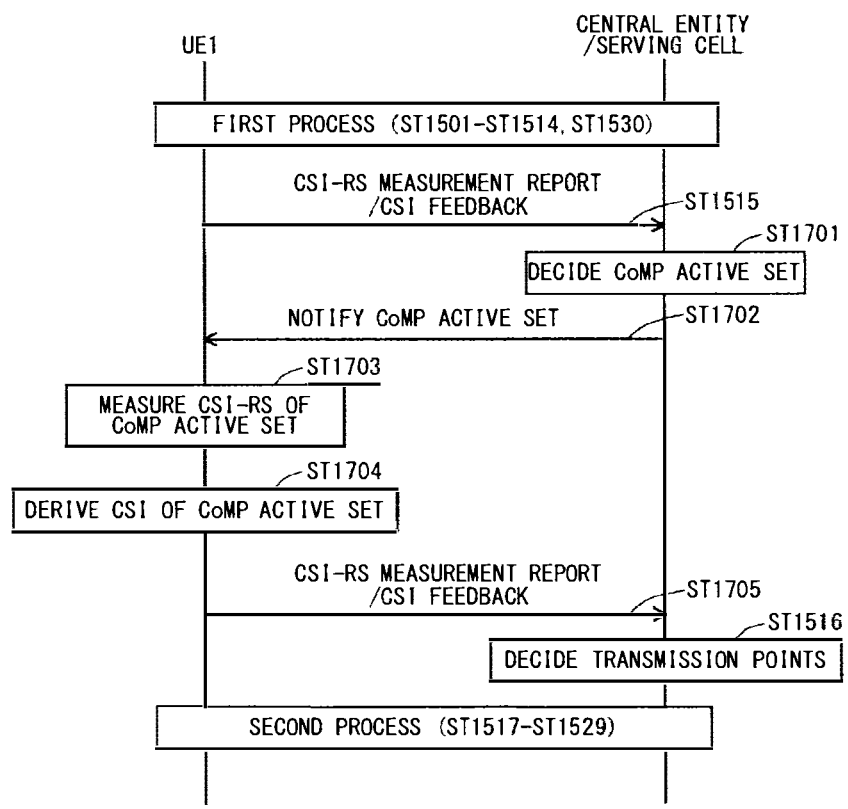
FIG. 18 is a diagram showing an exemplary sequence of a mobile communication system in a second embodiment.

An exemplary sequence for performing CoMP in a case where a CoMP active set is set will be disclosed. The CoMP active set is decided between the decision of a CoMP measurement set and the decision of CoMP transmission points. FIG. 18 is a diagram showing an exemplary sequence of a mobile communication system in the second embodiment. The sequence shown in FIG. 18 is similar to the sequence shown in FIGS. 15 and 16, and thus, the same steps will be denoted by the same step numbers and common description will be omitted. FIG. 18 shows the sequence for performing CoMP in the case where a CoMP active set is set.

The UE1 and the serving cell perform, as a first process, the processes of Steps ST1501 to ST1514 and the process of Step ST1530 shown in FIGS. 15 and 16.

In Step ST1515, the UE1 reports the CSI-RS measurement results to the serving cell. In Step ST1701, the serving cell that has received the report of the CSI-RS measurement results from the UE1 decides to set a CoMP active set. Specifically, the serving cell decides a cell to be active among the cells in the CoMP measurement set. The CSI-RS measurement results reported from the UE are used in judging to decide a cell to be active.

In Step ST1702, the serving cell notifies the UE1 of the CoMP active set. MAC signaling is used in notification of the CoMP active set.

In Step ST1703, the UE1 that has received the CoMP active set measures the CSI-RSs of the cells in the CoMP active set. For example, the UE1 measures the RSRP/RSRQ of the CSI-RS.

The CSI-RS may be measured in Step ST1703 per cell or per point. The CSI-RS measurement method may be preliminarily decided in specifications or may be included in the CoMP measurement configuration to be notified the UE from the serving cell. The measurement method is included in the CoMP measurement configuration to be notified, allowing for dynamic or semi-static change of the measurement method. This enables the selection of CoMP transmission points suitable for CoMP.

The CSI-RS of the CoMP active set may be measured until the UE1 receives the release of the configuration of the CoMP active set after receiving the configuration of the CoMP active set. Or, the CSI-RS of the CoMP active set may be measured until all the in-CoMP-active-set cells are rendered deactive. The CSI-RS may be measured regularly or periodically.

In Step ST1704, the UE1 derives the CSI from the CSI-RS measurement value. The CSI derivation process in Step ST1704 may not to be performed.

In Step ST1705, the UE1 reports, to the serving cell, the CSI-RS measurement results (CSI-RS measurement report) of the in-CoMP-active-set cells, for example, the RSRP/RSRQ measurement results and the CSI derivation results (CSI feedback). If the above-mentioned CSI derivation process in Step ST1704 is not performed, the CSI derivation results are not reported. The CSI-RS measurement results may be reported regularly, may be reported periodically, or may be reported if a predetermined condition is met. The CoMP active set and the CSI-RS measurement report may include the serving cell. Or, the CSI-RS measurement results of the serving cell may be reported in the CSI-RS measurement report without fail.

In Step ST1516, the serving cell decides CoMP transmission points from the reported CSI-RS measurement results, for example, the RSRP/RSRQ measurement results and the CSI derivation results. Or, the serving cell may use the indicator such as a cell load together. If the CSI derivation results are not reported in Step ST1705, the serving cell decides CoMP transmission points from the CSI-RS measurement results.

The UE1 that has ended the process of Step ST1705 and the serving cell that has ended the process of Step ST1516 perform, as a second process, the processes of Steps ST1517 to ST1529 shown in FIGS. 15 and 16.

The method disclosed in this embodiment only needs the UE to, at least, measure the CSI-RSs of the in-CoMP-active-set cells, reducing the power consumption.

The UE is notified through MAC signaling, allowing for setting of a CoMP active set with a low delay. This suppresses an increase in RRC signaling amount, allowing for the selection of CoMP transmission points suitable for CoMP.

Therefore, CoMP becomes executable, which is suitable for UE movement and rapid fluctuations in radio wave environment. This expands a high-data-rate coverage, improves a cell-edge throughput, and increases a throughput in the communication system.

Third Embodiment

R1-113295 (hereinafter, referred to as "Reference 1") by 3GPP discloses that according to Releases 8, 9, and 10, the RRM measurement set is managed based on the CRS measurement results from one UE.

It is also disclosed that an additional RRM measurement mechanism is necessary for selecting a CoMP measurement set.

It is further disclosed that as an additional RRM measurement mechanism, the use of both of the CRS based RSRP/RSRQ measurement, that is, a normal RRM measurement and the CSI-RS based CQI, the use of the SRS, and the use of CSI-RS based RSRP/RSRQ measurement.

R1-113064 (hereinafter, referred to as "Reference 2") by 3GPP discloses that as the method of selecting CoMP transmission points, the network selects CoMP transmission points based on the CSI-RS measurement results of the cells in the CoMP measurement set by the UE.

As described above, as to CoMP, the use of the results of CRS or CSI-RS measurement by the UE is studied as the method of selecting a CoMP measurement set and CoMP transmission points.

In the case where the CRS or CSI-RS measurement results by the UE are used, there arises a problem that depending on a location, a good reception quality cannot be obtained even if CoMP is performed using the multiple input multiple output (MIMO) technique via a plurality of antenna ports. This is because effects of, for example, an interference from other many cells, a delay, a phase, and power of each path, the relation among the paths, and a multi-path cannot be evaluated accurately, whereby cells suitable for CoMP cannot be selected.

In order to solve the problem that cells suitable for CoMP cannot be selected, this embodiment uses the location information being the information related to the UE location to select cells in the set (also referred to as "in-set cells") in a CoMP set.

Described here is the case where the UE location information is used to select cells in the set being the CoMP measurement set. The entity or device that selects a CoMP measurement set, specifically, in-CoMP-measurement-set cells obtains the location information of the UE to be subjected to CoMP.

The CoMP measurement set is selected using the obtained location information. For example, in the sequence shown in FIGS. 15 and 16, the serving cell obtains the location information of the UE1 before performing the process of Step ST1530. In Step ST1530, the serving cell selects a CoMP measurement set using the obtained location information. The serving cell can recognize the positional relationship between the cell and the UE by obtaining the UE location information. Therefore, a CoMP measurement set can be selected using the indicator decided geographically, namely, the positional relationship, rather than using the varying indicator such as the radio wave environment. This allows for the selection of a CoMP measurement set more suitable for CoMP.

Not only the UE location information but also the CRS measurement results reported from the UE may be used to select a CoMP measurement set. Or, the CSI-RS measurement results may be used together. Or, the indicator such as a cell load may be used together. The above-mentioned combination of the varying indicator and the geographical indicator allows for the support for a dynamic time variance, and further allows for the selection of a CoMP measurement set more suitable for CoMP.

As disclosed in TS23.271 V10.2.0 (hereinafter, referred to as "Reference 3") by 3GPP, the mobile communication system has the function referred to as a location service (LCS). The LCS is the function aimed for estimating the location of a user equipment device for the purpose of, for example, commercial services using location information, management of a radio communication system, emergency location identification, and location identification of a user equipment device for legal reasons such as a criminal investigation.

Examples of the method of estimating the location of a user equipment device include the LTE positioning protocol (LPP) disclosed in TS36.305 V10.3.0 (hereinafter, referred to as "Reference 4") by 3GPP.

The methods disclosed in References 3 and 4 may be used as the method of obtaining the UE location information by the entity that selects a CoMP measurement set. In these methods, however, the evolved serving mobile location centre (E-SMLC) being the entity that manages the LCS including the LPP manages the UE location information. The UE location information is accordingly notified the E-SMLC, and thus, the entity that selects a CoMP measurement set normally cannot obtain the UE location information.

This embodiment will disclose the method in which the entity that selects a CoMP measurement set obtains the UE location information.

The entity that selects a CoMP measurement set receives a message by which the UE notifies the E-SMLC of the location information of its own UE to retrieve only the information related to the UE location.

FIG. 19 is a diagram showing an exemplary sequence of a mobile communication system in a third embodiment. FIG. 19 shows the sequence in which the entity that selects a CoMP measurement set obtains the UE location information. In this sequence, the entity that selects a CoMP measurement set is a serving cell.

In Step ST1801, the E-SMLC notifies the MME of a request location information message.

In Step ST1802, the MME notifies the serving cell of the received request location information message as a NAS message.

In Step ST1803, the serving cell forwards the received request location information message to the UE.

In Step ST1804, the UE includes the location information of its own UE in the provide location information message and then notifies the serving cell. The UE location information may be obtained using, for example, a global positioning system (GPS).

The serving cell that has received the provide location information message retrieves only the information related to the UE location of the provide location information message. It suffices that the serving cell stores the thus obtained UE location information.

In Step ST1805, the serving cell notifies the MME of the received provide location information message.

In Step ST1806, the MME notifies the E-SMLC of the received provide location information message.

The request location information message is notified the UE via the MME and the serving cell. The provide location information message is notified the E-SMLC via the serving cell and the MME. The NAS message is used between the MME and the serving cell and between the serving cell and the UE.

The serving cell receives the message type information of the NAS message from the NAS message received from the UE in Step ST1804 to retrieve only the information related to the UE location. If the message type information of the NAS message indicates the information related to the LPP or LCS, the serving cell may receive a NAS message and retrieve the information related to the UE location. This eliminates the need for receiving and retrieving all the NAS messages notified from the UE, reducing the power consumption and lowering a delay at the serving cell. The "generic message container type" information may be used as the message type information of the NAS message.

The location information may be provided from the UE to the E-SMLC in Steps ST1804 to ST1806 regularly or periodically, as shown in Steps ST1807 to ST1809.

In this case, the serving cell successively receives the information related to the UE location from the provide location information message from the UE and updates the UE location information obtained by decoding. This allows the serving cell to always obtain the latest UE location information. Thus, the serving cell can always use the latest UE location information when selecting a CoMP measurement set.

Another method in which the entity that selects a CoMP measurement set obtains the UE location information will be disclosed.

The entity that selects a CoMP measurement set is configured to have the LCS client functionality. As an example, the RRC of the serving cell may have the LCS client functionality.

This allows the entity that selects a CoMP measurement set to obtain the desired UE location information from the E-SMLC as required.

Figure 20:
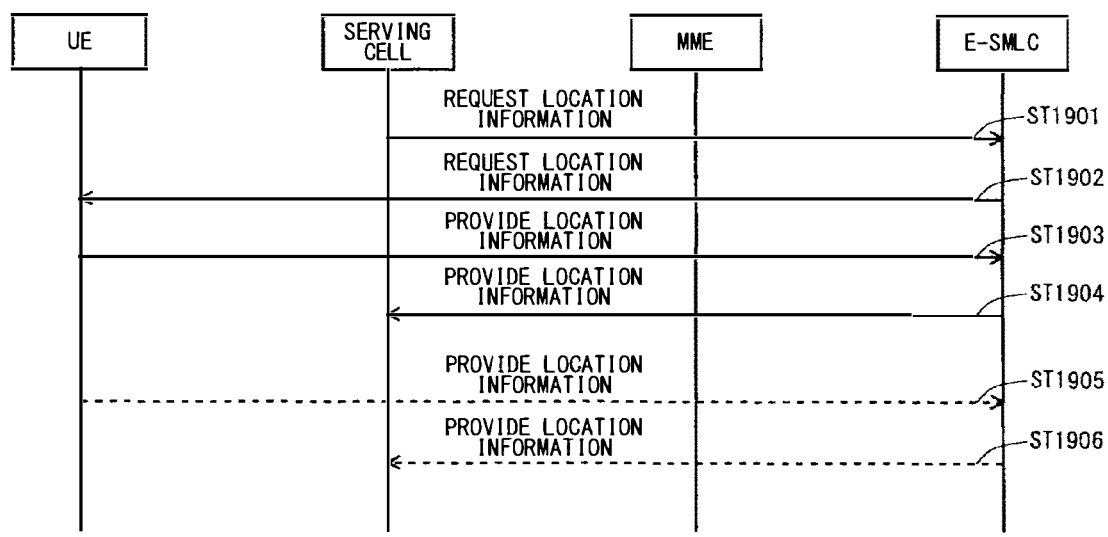
FIG. 20 is a diagram showing another exemplary sequence of the mobile communication system in the third embodiment.

FIG. 20 is a diagram showing another exemplary sequence of the mobile communication system in the third embodiment. FIG. 20 shows the sequence in which the entity that selects a CoMP measurement set having the LCS client functionality obtains the UE location information. In this sequence, the serving cell has the entity that selects a CoMP measurement set.

In Step ST1901, the serving cell having the LCS client functionality notifies the E-SMLC of the request location information message of a desired UE via the MME. The S1 message may be used in the notification from the serving cell to the MME. The serving cell has the LCS client functionality and is thus capable of requesting the desired UE location information from the E-SMLC.

In Step ST1902, the E-SMLC notifies the UE of the received request location information message. The method shown in FIG. 19 may be used as this notification method.

In Step ST1903, the UE includes the location information of its own UE in the provide location information message and then notifies the E-SMLC via the serving cell and the MME. The NAS message may be used in the notification from the UE to the MME.

In Step ST1904, the E-SMLC notifies the serving cell being a request location information source of the provide location information message received from the desired UE. This allows the serving cell to obtain the desired UE location information.

The location information may be provided from the UE to the E-SMLC in Step ST1903 and the location information may be provided from the E-SMLC to the serving cell in Step ST1904 regularly or periodically as shown in Steps ST1905 and ST1906.

In this case, the serving cell may successively receive the information related to a UE location from the provide location message from the UE to update the obtained UE location information. This allows the serving cell to always obtain the latest UE location information. The serving cell can accordingly use the latest UE location information when selecting a CoMP measurement set.

Still another method in which the entity that selects a CoMP measurement set obtains the UE location information will be disclosed.

The MME has the LCS client functionality, and the entity that selects a CoMP measurement set requests the information related to the UE location from the MME. This allows the entity that selects a CoMP measurement set to obtain the desired UE location information from the E-SMLC as required.

FIG. 21 is a diagram showing still another exemplary sequence of the mobile communication system in the third embodiment. FIG. 21 shows the sequence in which the entity that selects a CoMP measurement set requests the information related to the UE location from the MME to obtain the UE location information, where the MME has the LCS client functionality. In this sequence, the entity that selects a CoMP measurement set is the serving cell.

In Step ST2001, the serving cell notifies the MME of a message for requesting the provision of desired UE location information. In other words, the serving cell that needs to be provided with the desired UE request location information requests the MME to provide the desired UE location information. The S1 message may be used in the notification from the serving cell to the MME. The message for requesting the provision of the desired UE location information may be newly provided as the S1 message.

In Step ST2002, the MME notifies the E-SMLC of a request location information message. The MME has the LCS client functionality, and is thus capable of requesting the desired UE location information from the E-SMLC. The MME may receive a message for requesting the provision of the desired UE location information from an appropriate cell to activate the request location information message of the desired UE for the E-SMLC.

In Step ST2003, the E-SMLC notifies the UE of the request location information message. The method shown in FIG. 19 may be used as this notification method.

In Step ST2004, the UE includes the location information of its own UE in the provide location information message and then notifies the E-SMLC via the serving cell and the MME. The NAS message may be used in the notification from the UE to the MME.

In Step ST2005, the E-SMLC notifies the MME being a request location information source of the provide location information message received from the desired UE.

In Step ST2006, the MME notifies the cell that has requested the provision of the location information, here, the serving cell, of the information related to the desired UE location included in the received provide location information message as a response to the request to provide the location information (hereinafter, also referred to as a "location information response"). This allows the serving cell to obtain the desired UE location information.

As shown in Steps ST2007 and ST2008, the location information may be regularly or periodically provided from the UE to the MME in Steps ST2004 and ST2005.

The process of Step ST2005 may urge the location information response from the MME to the serving cell in Step ST2006 to be regularly or periodically performed as shown in Step ST2009.

In this case, the serving cell may successively receive the information related to the UE location from the provide location message from the UE to update the UE location information obtained by decoding. This allows the serving cell to always obtain the latest UE location information. Thus, the serving cell is capable of always using the latest UE location information when selecting a CoMP measurement set.

The following four (1) to (4) will be disclosed as the method of selecting a CoMP measurement set using the UE location information obtained by the entity that selects a CoMP measurement set.

(1) At least a cell closest to the latest UE location is selected.

(2) Top k cells are selected starting from the cell positioned closest to the latest UE location, where k is a natural number and may be decided in advance.

(3) A cell having a distance from the latest UE location that is smaller than a predetermined threshold is selected, where the predetermined threshold may be decided in advance.

(4) Combination of (1) to (3) above.

Although the latest location is derived based on the latest UE location information in the methods (1) to (4) above, a current location may be derived from the past and latest UE location information. The thus obtained results may be the UE location.

The above-mentioned methods may use the cell location information. The entity that selects a CoMP measurement set may obtain the location information of a neighbor cell in advance. Examples of the neighbor cell include a neighbor cell capable of CoMP and a cell in a CoMP cooperating set. Or, the neighbor cell may be not limited to a cell capable of CoPM. Each cell notifies the operation administration and maintenance (OAM) of the location on its own cell recognized by, for example, GPS. The entity that selects a CoMP measurement set obtains the location information of the neighbor cell from the OAM. Thus, the entity that selects a CoMP measurement set may notify the OAM of a message for requesting the location information of a neighbor cell. If the E-SMLC manages the cell location information, the entity that selects a CoMP measurement set may obtain the location information of a neighbor cell from the E-SMLC. The method in which the entity that selects a CoMP measurement set obtains the UE location information, disclosed in this embodiment, is applicable as this method. This allows for the selection of a CoMP measurement set using the UE location information and the cell location information.

Not only the UE location information but also the CRS measurement results or CSI-RS measurement results reported from the UE may be used together in selecting a CoMP measurement set. Or, indicators such as a cell load may be used together. The dynamic time variations can be supported through the combination of a varying indicator and a geographical indicator, allowing for the selection of a CoMP measurement set more suitable for CoMP.

The methods disclosed in this embodiment are applicable to the selection of an RRM measurement set, specifically, the cells included in the RRM measurement set.

The methods disclosed in this embodiment are applicable to the selection of a CoMP active set, specifically, the cells included in the CoMP active set.

The methods disclosed in this embodiment are applicable to the selection of CoMP transmission points.

Fourth Embodiment

Reference 1 discloses the following four methods (a) to (d) based on what reference signal (RS) a CoMP measurement set is selected: (a) judgment is made based on an RRM measurement report, namely, RSRP/RSRQ of the CRS; (b) judgment is made based on the CSI feedback information and the RSRP/RSRQ of the CRS; (c) judgment is made based on the SRS/PUCCH/PUSCH; and (d) judgment is made based on the RSRP/RSRQ of the CSI-RS.

Reference 2 discloses that in-CoMP-measurement-set cells are selected based on a predetermined threshold (RSRP/RSRQ) or a fixed measurement set size (N).

However, Reference 2 discloses nothing about the method of deciding the value of the fixed measurement set size (N). The number of cells that need CSI-RS measurement increases as the measurement set size (N) increases. Thus, the UE has problems such as increases in circuit size, power consumption, and cost.

In order to solve the above-mentioned problems, the measurement set size (N) may be an individual value per UE. This allows for setting of an optimum measurement set size per UE.

In this case, the number of cells (Nu) capable of CoMP is included in the UE capability, and the UE notifies the network of the number of cells (Nu) capable of CoMP as capability information. Specifically, the number of cells (Nu) capable of CoMP may be included in an attach or a TAU message to be notified. The number of cells capable of CSI-RS measurement may be the number of cells (Nu) capable of CoMP. The network stores the number of cells (Nu) capable of CoMP.

The network notifies the central entity of the number of cells (Nu) capable of CoMP. Or, the central entity may request the network to notify the number of cells (Nu) capable of CoMP. This allows the central entity to recognize the number of cells (Nu) capable of CoMP on a desired UE.

The central entity uses the number of cells (Nu) capable of performing CoMP on a UE to select a CoMP measurement set for a desired UE. For example, the measurement set size (N) may be the number of cells (Nu) capable of performing CoMP on a UE. Or, the measurement set size (N) may be made smaller than the number of cells (Nu) capable of performing CoMP on a UE.

As a result, the cells capable of CoMP can be limited for low-cost UEs, preventing increases in circuit size, power consumption, and cost. The measurement set size can be optimized depending on the UE capability, so that CoMP can be performed without increasing the circuit size, power consumption, and cost.

In the method disclosed in Reference 2, the measurement set size (N) is fixed. In the case where, for example, cells are installed densely, the UE located at the coverage edge can obtain a desired reception quality by being subjected to CoMP by a small number of cells.

The situation in which a desired reception quality can be obtained with a small number of cells as described above has such a drawback that waste is created in power consumption of the UE, the serving cell, or the in-CoMP-measurement-set cell if a measurement set size (N) is larger than the small number of cells with which a desired reception quality can be obtained. The UE needs to measure the CSI-RS of an unnecessary cell, whereby waste is created in power consumption. Also, in the cells in the CoMP measurement set, the unnecessary cell has to transmit the CSI-RS, and thus, waste is created in power consumption.

In order to solve such a problem that waste is created in power consumption, this embodiment changes the value of a measurement set size (N) (hereinafter, also referred to as an "N value") based on the reception quality. It suffices to reduce the N value for a good reception quality from the UE or increase the N value for a poor reception quality from the UE.

In order to change the N value, the threshold may be set for the reception quality. For example, thresholds A and B are set for the reception quality such that the N value takes a maximum value of the measurement set size (N) Nmax (N=Nmax) if the reception quality from the UE being subjected to CoMP is not larger than the threshold A. If the reception quality is larger than the threshold A and is not larger than the threshold B, the N value is a value obtained by integer-converting a value obtained by dividing Nmax by 2 (N-int(Nmax/2)). If the reception quality is larger than the threshold B, the N value is "1" (N=1).

Through the above, the number of cells in the CoMP measurement set can be changed based on the reception quality from the UE, suppressing an increase in power consumption.

Although the N value is "1" (N=1) if the reception quality is larger than the threshold B in this embodiment, CoMP can be stopped as long as there is one radio link having a good reception quality. For example, the execution of CoMP may be stopped if only the serving cell is included as the in-CoMP-measurement-set cell. If the in-CoMP-measurement-set cell is not the serving cell, CoMP may be stopped by the method disclosed in a ninth embodiment described below such that a UE to become a target is subjected to HO, that is, is caused to change a cell to the cell having a good reception quality.

The N value may be changed based on an average value of the received qualities from the UE during a predetermined period. This allows the N value to be changed without being affected by temporal variations in reception quality. Thus, the CoMP operation can be performed stably.

The method disclosed in this embodiment is applicable to the selection of a CoMP active set, specifically, cells included in a CoMP active set.

The method disclosed in this embodiment is applicable to the selection of CoMP transmission points.

The method disclosed in this embodiment is applicable to the selection of an RRM measurement set. The UE measures the CRS in the RRM measurement set.

There is no discussion in Reference 2 or 3GPP as to whether or not the serving cell is included in the CoMP measurement set. For this reason, it is unclear how to handle the serving cell, whereby CoMP cannot be performed.

This embodiment will disclose the following three methods (1) to (3) regarding how to handle the serving cell.

(1) The serving cell is also included in handling of the CoMP measurement set. In other words, the method of selecting a CoMP measurement set is applied. For example, in the case where CoMP measurement set includes the serving cell, the serving cell may be inadvertently deleted from the CoMP measurement set if the CSI-RS measurement value of the serving cell by the UE deteriorates. Even if the serving cell is deleted from the CoMP measurement set, however, the CoMP to be performed on a UE being served thereby can be performed by any other cell in the CoMP measurement set. Therefore, there arises no problem if the serving cell is also included in handling of the CoMP measurement set. The serving cell is included in handling of the CoMP measurement set, simplifying the control of the CoMP measurement set.

(2) The CoMP measurement set does not include the serving cell. This enables the CoMP measurement set and the serving cell to be handled differently, allowing for flexible control. In this case, the UE may measure the CSI-RS of the serving cell irrespective of the CoMP measurement set. The serving cell may notify the UE of the CoMP measurement configuration of its own cell irrespective of the CoMP measurement set. Dedicated signaling may be used in this notification. Dedicated signaling may be RRC signaling. The CSI-RS measurement results of the serving cell by the UE may be reported to the serving cell. The setting of the report method may be notified the UE with the CoMP measurement configuration of its own cell. This method can solve the problem that in the method (1) above, the measurement using the CSI-RS of the serving cell cannot be performed when the serving cell is deleted from the CoMP measurement set. In this method, the serving cell is not included in the CoMP measurement set but may be the cell capable of CoMP. The CoMP transmission cell may be selected from the in-CoMP-measurement-set cells and the serving cell. This is allowed because the measurement using the CSI-RS of the serving cell is performed.

(3) The CoMP measurement set includes the serving cell without fail. Differently from the method (1) above, the serving cell is included in the CoMP measurement set without fail, so that the CSI-RS of the serving cell is measured in accordance with the handling of the CoMP measurement set, leading to easy control. In this case, the serving cell is not counted in the number N of the CoMP measurement set but may be included in the CoMP measurement set without fail. Or, the serving cell may be included in the CoMP measurement set without fail irrespective of a predetermined threshold for including the serving cell in the CoMP measurement set. This allows the UE to perform measurement using the CSI-RS of the serving cell. The method (1) above can solve the problem that the measurement using the CSI-RS of the serving cell cannot be performed if the serving cell is deleted from the CoMP measurement set.

The methods disclosed in this embodiment are applicable to the selection of a CoMP active set, specifically, cells included in the CoMP active set.

The methods disclosed in this embodiment are applicable to the selection of an RRM measurement set. The UE measures the CRS in the RRM measurement set.

Fifth Embodiment

When the UE being subjected to CoMP moves, the reception quality of the serving cell may degrade, which requires switching of the serving cell. R1-113092 (hereinafter, referred to as "Reference 5") by 3GPP discloses to use an RRM measurement report for mobility control. If the RRM measurement report is used for mobility control when the UE being subjected to CoMP moves, the following problem arises.

Figure 22:
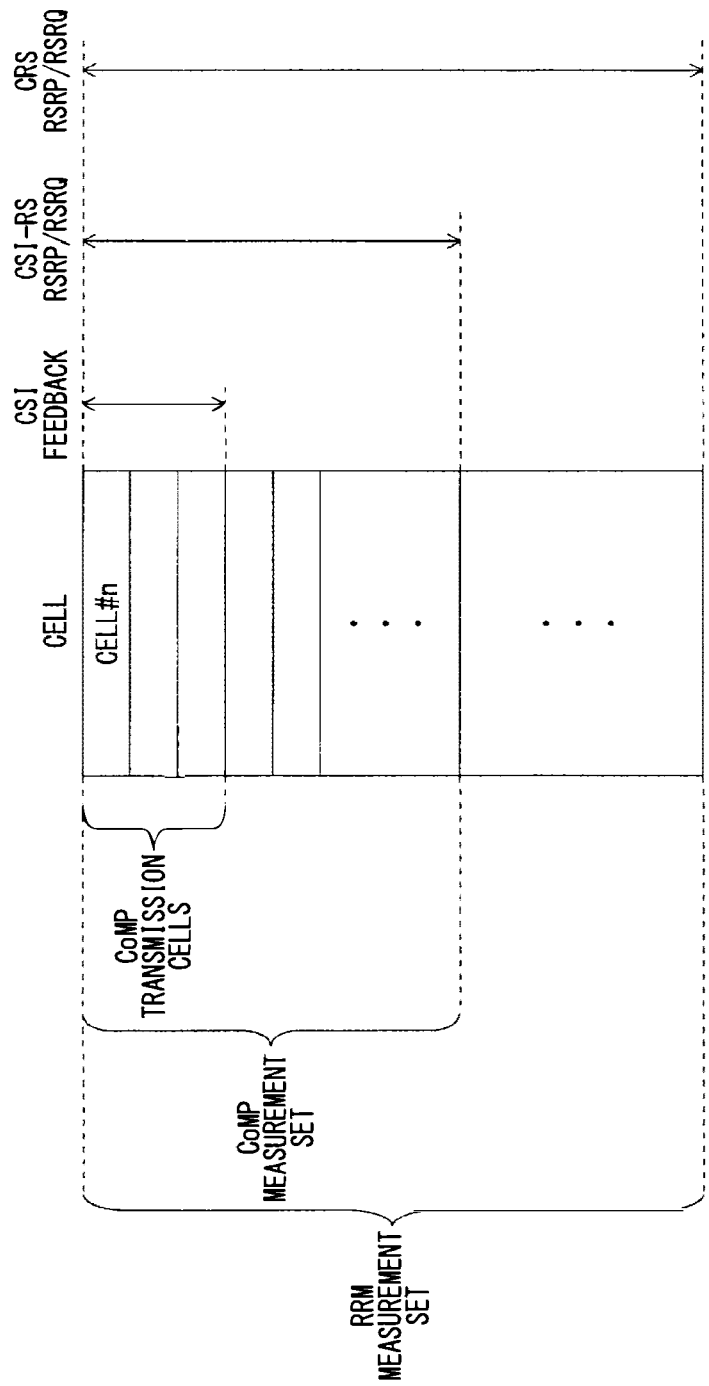
FIG. 22 is a diagram for describing CoMP-related sets and the RS measured by a UE.

FIG. 22 is a diagram for describing sets related to CoMP and an RS to be measured by the UE. The cells in the RRM measurement set are normally configured through RRM measurement by the UE, and thus, the RSRP/RSRQ of the CRS is measured. As described above, the CoMP measurement set is the collection of cells whose CSI-RS is measured and reported by the UE. Thus, the RSRP/RSRQ of the CSI-RS is measured by the UE for the cells in a CoMP measurement set. The cells in the CoMP active set are similar to the cells in the CoMP measurement set, though not shown. The CoMP transmission point is a cell that actually transmits data to the UE, and thus, the CSI-RS thereof is measured by the UE. The CSI derived from the CSI-RS measurement results by the UE is fed back to the serving cell.

Figure 23:
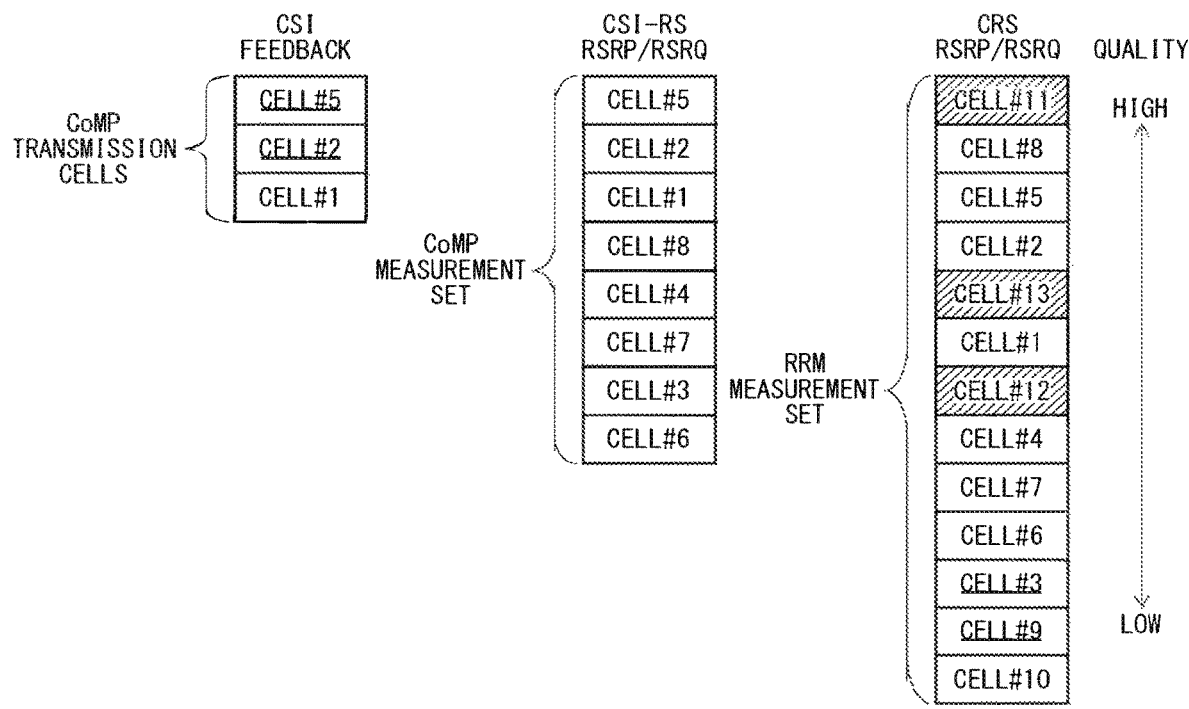
FIG. 23 is a diagram for describing the communication quality of cells in the CoMP-related sets.

FIG. 23 is a diagram for describing the communication qualities of the in-set cells related to CoMP. FIG. 23 shows the cell numbers in the set related to each CoMP and the communication quality. With reference to FIG. 23, the communication quality increases toward the top of FIG. 23 and the communication quality decreases toward the bottom thereof.

In the RRM measurement set, cells are ranked based on the RSRP/RSRQ of the CRS by the UE being a communication quality. In the example shown in FIG. 23, a cell #11

(Cell #11) has the highest communication quality, and a cell #10 (Cell #10) has the lowest communication quality. The cells diagonally hatched in FIG. 23 are cells that cannot perform CoMP with the serving cell.

In the CoMP measurement set, cells are ranked based on the RSRP/RSRQ of the CSI-RS by the UE being a communication quality. The CoMP measurement set is selected from the RRM measurement set. In this case, as disclosed in the first embodiment, cells are selected from only the cells in the CoMP cooperating set. This limits the CoMP measurement set to the cells capable of CoMP. In the example shown in FIG. 23, a cell #5 (Cell #5) has the highest communication quality and a cell #6 (Cell #6) has the lowest communication quality.

The ranking of the communication quality differs between the RRM measurement set and the CoMP measurement set because an indicator used for communication quality differs therebetween. This is because the RSRP/RSRQ of the CRS is used as the indicator of the communication quality for the RRM measurement set, whereas the CSI-RS is used as the indicator of the communication quality for the CoMP measurement set.

As to the CoMP transmission points, the cells are ranked based on the CSI derived from the CSI-RS measurement value by the UE being a communication quality. The CoMP transmission points are selected from the CoMP measurement set. In the example shown in FIG. 23, the cell #5 (Cell #5) has the highest communication quality and the cell #1 (Cell #1) has the lowest communication quality.

In the example shown in FIG. 23, if the serving cell is switched based on an RRM measurement report when the UE being subjected to CoMP has moved, the serving cell may be inadvertently switched to the cell that cannot perform CoMP. For example, the cell #11 (Cell #11) becomes the cell having the best communication quality according to the RRM measurement report. In the case where the serving cell is switched such that the cell #11 (Cell #11) becomes a new serving cell, the new serving cell cannot perform CoMP, causing a problem that a good communication quality cannot be obtained.

This embodiment will disclose the method for solving the above-mentioned problem that a good communication quality cannot be obtained.

In switching of the serving cell performing CoMP, the cell capable of CoMP is prioritized in selecting a new serving cell.

The serving cell performing CoMP is switched in the HO (including cell change) process. The cell capable of CoMP is prioritized in selecting a target cell in the HO decision process.

The cells in the CoMP cooperating set may be prioritized. In other words, the cells outside the CoMP cooperating set may be excluded.

The cells in the CoMP measurement set may be prioritized in selecting a target cell in the HO decision process.

If the UE being subjected to CoMP moves, a new serving cell is the cell capable of CoMP. This allows the UE to perform CoMP with the new serving cell, so that a good communication quality can be obtained.

For example, if the reception quality of the serving cell degrades and the HO (including cell change) process is activated in FIG. 23, not the cell #11 (Cell #11) that cannot perform CoMP but a cell #8 (Cell #8) capable of CoMP is selected in the selection of a target cell in the HO decision process. This allows the UE to perform CoMP with a new serving cell, so that a good communication quality can be obtained.

As another example, if the reception quality of the serving cell degrades and the HO (including cell change) process is activated in FIG. 23, not the cell #11 (Cell #11) in the RRM measurement set but the cell #5 (Cell #5) in the CoMP measurement set is selected in the selection of a target cell in the HO decision process. This further improves the reception quality in the case where a new serving cell performs CoMP.

Figure 24:
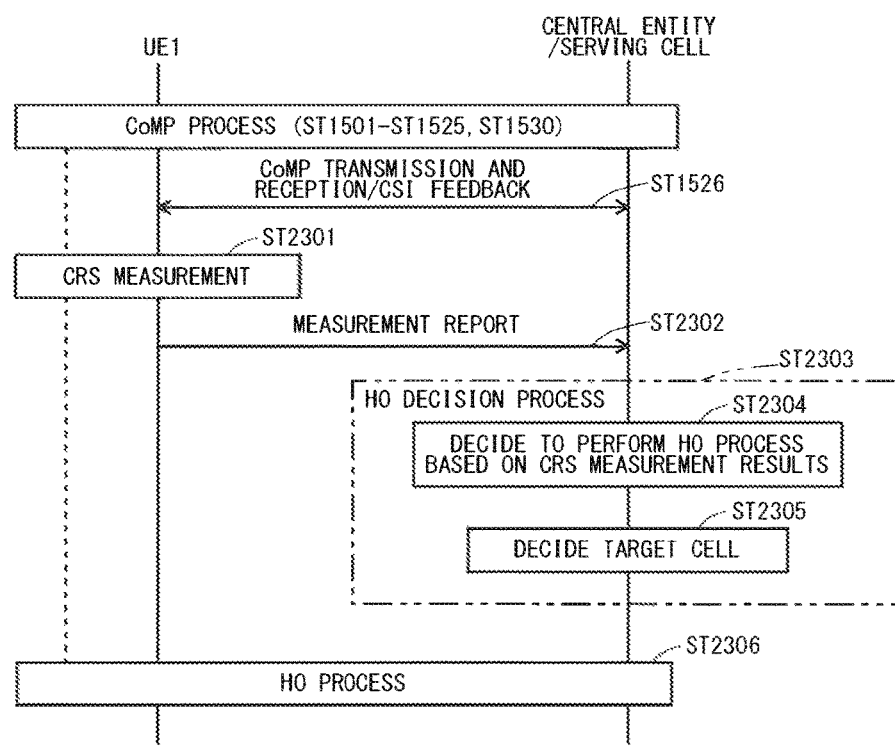
FIG. 24 is a diagram showing an exemplary sequence of a mobile communication system in a fifth embodiment.

FIG. 24 is a diagram showing an exemplary sequence of a mobile communication system in a fifth embodiment. The sequence shown in FIG. 24 is similar to the sequence shown in FIGS. 15 and 16, and thus, the same steps will be denoted by the same step numbers and common description will be omitted. FIG. 24 shows the sequence in a case where the cells capable of CoMP are prioritized in the selection of a target cell in the HO decision process.

The serving cell having the central entity function performs the CoMP process on the UE1 as shown in Steps ST1501 to ST1526 and Step ST1530 of FIGS. 15 and 16.

In Step ST1526, the serving cell and the UE1 perform CoMP transmission/reception and CSI feedback.

In Step ST2301, the UE1 performs RRM measurement through CRS measurement. In Step ST2302, the UE1 reports, to the serving cell, the measurement results of the RRM measurement in Step ST2301 as a measurement report message, according to the report condition. The measurement in Step ST2301 includes the CRS measurement of the serving cell per se. The measurement report in Step ST2302 includes the CRS measurement results of the serving cell per se.

In Step ST2303, the serving cell performs the HO decision process. The HO decision process of Step ST2303 includes processes of Steps ST2304 and ST2305.

In Step ST2304, the serving cell decides to perform the HO process on the UE1 using the measurement report from the UE1. For example, if the CRS measurement results of the serving cell fall below a predetermined threshold, the serving cell decides to perform the HO process on the UE1.

In Step ST2305, the serving cell decides a target cell. The serving cell selects the cell having the best communication quality as a target cell among the cells in the CoMP measurement set. The serving cell selects a cell having the best communication quality in the CoMP measurement set from the CSI-RS measurement results by the UE being a HO target.

In Step ST2306, the serving cell that has performed the HO decision process in Step ST2303 performs the HO process, with the cell selected in Step ST2305 as a target cell.

Although as a new serving cell, the cell having the best CSI-RS reception quality in the CoMP measurement set is selected as a target cell in the example shown in FIG. 24, the cell having the best CSI-RS measurement results needs not to be selected. In other words, a target cell may be selected also in consideration of other indicator, for example, the load of each cell. The target cell may be any in-CoMP-measurement-set cell.

If there is no cell to be prioritized, a conventional selection method may be used in the selection of a target cell in the HO decision process. For example, in the case where only the measurement results of the cell #11 (Cell #11), the cell #12 (Cell #12), and the cell #13 (Cell #13) are reported in the RRM measurement report of the UE, a target cell may be selected from those cells.

This allows for switching of the serving cell such that a new serving cell keeps performing CoMP on the UE as long as possible to obtain a good reception quality, in the case where the UE being subjected to CoMP moves and the reception quality of the serving cell degrades, requiring switching of the serving cell.

Although the cells in the CoMP measurement set have been disclosed as the cells capable of CoMP, the in-CoMP-active-set cells may be prioritized. Or, the in-CoMP-transmission-point cells may be prioritized.

The priority may be decided in the CoMP set. For example, the cells in the CoMP transmission point may have the priority "1", the cells in the CoMP active set may have the priority "2", the cells in the CoMP measurement set may have the priority "3", the cells in the CoMP operation set may have the priority "4", and the other cells may have the priority "5".

The selection of a new serving cell (target cell) in this manner allows the new serving cell to keep performing CoMP on a UE to become a target to obtain a good reception quality as good as possible.

First Modification of Fifth Embodiment

Reference 5 discloses the use of the RRM measurement report for mobility control. This means that the RSRP/RSRQ measurement results of the CRS by the UE are used for mobility control. If the RSRP/RSRQ measurement results of the CRS by the UE are used for mobility control when the UE being subjected to CoMP moves, the following problem arises.

The problem arising in the case the RSRP/RSRQ measurement results of the CRS by the UE are used for mobility control will be described using an example shown in FIG. 23. Described below is the case where the UE being subjected to CoMP moves and then the serving cell is switched based on a conventional RRM measurement report.

In application of the method of selecting a target cell from the cells capable of CoMP, disclosed in the fifth embodiment, the cell #8 (Cell #8) becomes the cell having the best communication quality according to the RRM measurement report. Thus, the serving cell is switched such that the cell #8 (Cell #8) becomes a new serving cell.

In some cases, however, the cell #8 (Cell #8) in the CoMP measurement set does not become the cell having the best communication quality, and further, is not selected as a CoMP transmission point. In other words, the cell #8 (Cell #8) becomes the cell that does not perform CoMP data transmission to the UE. The cell #8 (Cell #8) does not perform CoMP data transmission/reception though it becomes a new serving cell. This increases, for example, the number of cells other than the serving cell related to CoMP, whereby the serving cell cannot be switched to one suitable for CoMP.

As described above, the cell having the best communication quality through RRM measurement differs from the cell having the best communication quality with the in-CoMP-measurement-set cell or the cell being a CoMP transmission point. This is because the CRS measurement results present in the area to which the PDCCH is mapped are used for the reception quality through RRM measurement, whereas the CSI-RS measurement results present in the area to which the PDSCH is mapped are used for the reception quality of the CoMP measurement set or the CoMP transmission point. The data to be subjected to CoMP is mapped to the symbols in the PDSCH area, meaning that the CRS measurement by the conventional RRM measurement does not correctly indicate the quality of the PDSCH during the execution of CoMP.

This modification will disclose the method for solving the above-mentioned problem. In switching of the serving cell performing CoMP, the CSI-RS measurement results by the UE are used when a new serving cell is selected. The process of switching the serving cell performing CoMP is performed in the HO (including cell change) process, and the CSI-RS measurement results are used when a target cell in the HO decision process is selected. The CSI-RS measurement results may be the RSRP/RSRQ of the CSI-RS or the CSI (CSI feedback) derived from the CSI-RS measurement results.

For example, in FIG. 23, if the HO (including cell change) process is activated due to a reduction in the reception quality of the serving cell, not the cell #8 (Cell #8) having the best reception quality according to the CRS measurement results but the cell #5 (Cell #5) having the best reception quality according to the CSI-RS measurement results is selected in the selection of a target cell in the HO decision process. This allows the UE to obtain a good communication quality with a new serving cell.

The sequence in this modification may be obtained by changing a part of the sequence shown in FIG. 24. That is, in this modification, in Step ST2305 of FIG. 24, the process of selecting a cell, which has the best communication quality according to the measurement results, as a target cell may be performed, from the CSI-RS measurement results by the UE being a HO target.

The cell in the CoMP measurement set or the cell in the CoMP transmission point may be selected as the cell that has the best reception quality according to the CSI-RS measurement results. When the UE being subjected to CoMP moves, a new serving cell becomes the cell in the CoMP measurement set or the cell in the CoMP transmission points. This allows the UE to be subjected to CoMP including a new serving cell, so that a good communication quality can be obtained.

Second Modification of Fifth Embodiment

If the UE being subjected to CoMP moves, in some cases, the reception quality of the serving cell degrades and the serving cell needs to be switched. In the conventional process of switching a serving cell for the UE not being subjected to CoMP, for example, in the HO process, the CRS measurement results of the serving cell by the UE are used to evaluate the reception quality of the serving cell.

As disclosed in the fifth embodiment and the first modification of the fifth embodiment, however, for the UE being subjected to CoMP, the CRS measurement results do not correctly indicate the communication quality during CoMP. Thus, for the UE being subjected to CoMP, if the reception quality is judged to have degraded from the CRS measurement results of the serving cell and then the serving cell is switched as in the conventional case, in actuality, the communication quality during CoMP may be good and there may be no need to switch the serving cell. In such a case, a good communication quality may not be obtained with a new serving cell if the serving cell is switched.

This modification will disclose the method for solving the above-mentioned problem. The CSI-RS measurement results of the serving cell by the UE are used when the serving cell performing CoMP is judged to be switched. The CSI-RS measurement results by the UE are used as the reception quality of the serving cell. When the UE being subjected to CoMP moves, if the reception quality of the serving cell degrades, it is decided to switch a serving cell. For example, it may be judged to switch the serving cell if the reception quality of the serving cell is not larger than a predetermined threshold. The CSI-RS measurement results may be the RSRP/RSRQ of the CSI-RS or the CSI (CSI feedback) derived from the CSI-RS measurement results.

This solves such a problem that the serving cell is inadvertently switched though the UE being subjected to CoMP has a good communication quality with the serving cell. This allows the UE being subjected to CoMP to obtain a good communication quality with the serving cell.

Among the methods of handing a serving cell disclosed in the fourth embodiment, the method (2) or (3) may be used as the method of causing the UE being subjected to CoMP to measure the CSI-RS of the serving cell. The UE measures the CSI-RS of the serving cell. The UE may measure the CSI-RS of the serving cell regularly or periodically.

The serving cell may be switched in the HO (including cell change) process and the CSI-RS measurement results of the serving cell may be used in judging to perform HO in the HO decision process.

Figure 25:
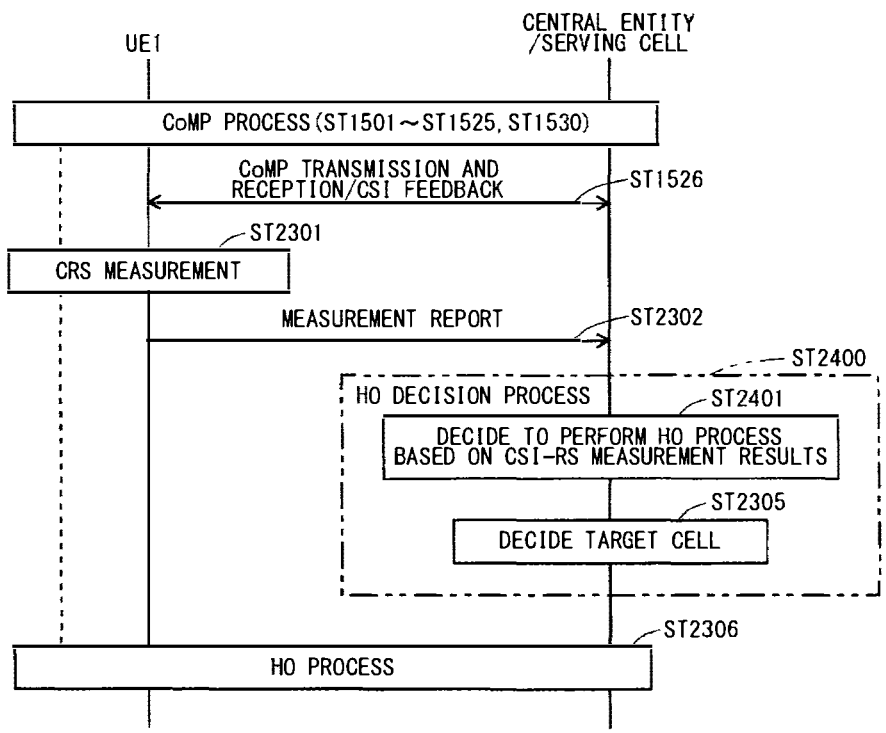
FIG. 25 is a diagram showing an exemplary sequence of a mobile communication system in a second modification of the fifth embodiment.

FIG. 25 is a diagram showing an exemplary sequence of a mobile communication system in the second modification of the fifth embodiment. The sequence shown in FIG. 25 is similar to the sequence shown in FIGS. 15 and 16 and FIG. 24, and thus, the same steps will be denoted by the same step numbers and common description will be omitted. FIG. 25 shows the sequence in the case where the CSI-RS measurement results of the serving cell are used in judging to perform HO in the HO decision process. In this sequence, the process of Step ST2401 is performed in place of the process of Step ST2304 of FIG. 24.

The serving cell having the central entity function performs CoMP on the UE1, similarly to the processes of Steps ST1501 to ST1526 and ST1530 of FIGS. 15 and 16. In Step ST1515, the CSI-RS measurement report or CSI feedback to be notified the serving cell from the UE may include the CSI-RS measurement results of the serving cell. Or, in Step ST1526, the CSI feedback to be notified the serving cell from the UE may include the CSI-RS measurement results of the serving cell. Or, the CSI-RS RSRP/RSRQ measurement results of the serving cell may be notified together in Step ST1526. This allows the serving cell to obtain the CSI-RS measurement results of its own cell by the UE1.

In Step ST2400, the serving cell performs the HO decision process. The HO decision process of Step ST2400 includes the processes of Steps ST2401 and ST2305.

In Step ST2401, the serving cell decides to perform the HO process on the UE1 using the CSI-RS measurement results from the UE1. For example, the serving cell decides to perform the HO process on the UE1 if the CSI-RS measurement results of the serving cell fall below a predetermined threshold.

In Step ST2305, the serving cell decides a target cell. In Step ST2306, the serving cell that has performed the HO decision process in Step ST2400 performs the HO process with the cell selected in Step ST2305 as a target cell.

The method disclosed in this modification allows the UE being subjected to CoMP to obtain a good communication quality with the serving cell.

This embodiment and the modifications thereof have disclosed that in switching of the serving cell performing CoMP, the CSI-RS measurement results by the UE are used to select a new serving cell and decide to perform HO.

For the use of the CSI-RS measurement results by the UE, the report condition for CSI-RS measurement may be newly provided. In place of the CRS measurement results being the report condition for the conventional CRS measurement results, the CSI-RS measurement results may be used.

The serving cell notifies the UE of the report condition for CSI-RS measurement. Or, the serving cell may provide an indicator showing that the relevant measurement is used while CoMP is performed and then notify the indicator. The serving cell may include at least any one of the report condition and the indicator in the measurement configuration and then notify the UE.

It may be statically decided that the measurement during CoMP is the CSI-RS measurement. For example, the measurement may be preliminarily decided in, for example, specifications such that the UE and the network can share the recognition. This eliminates the need for the indicator, reducing the amount of information that requires signaling.

The cells on which CSI-RS measurement is performed by the UE may be limited to the cells notified of the CSI-RS configuration. It suffices that the serving cell also notifies the UE of the CSI-RS configuration of its own cell.

The CSI-RS configuration of the cell whose CSI-RS is to be measured is notified the UE when the serving cell performs CoMP and, in this case, the relevant cells may be limited to the cells whose CSI-RS is to be measured. This may include the CSI-RS configuration of its own cell.

This allows the UE to recognize the CSI-RS configuration of the cell, so that the UE can perform CSI-RS measurement.

The cells to be limited may be its own cell as well as the cell that performs additional RRM measurement, the cell in CoMP measurement set, and the cell in the CoMP active set.

The UE notifies the serving cell of the CSI-RS measurement results in accordance with the CSI-RS report condition notified from the serving cell. This allows, in switching the serving cell for the UE being subjected to CoMP, the serving cell to use the CSI-RS measurement results by the UE to select a new serving cell and decide to perform HO.

This embodiment has disclosed that in switching of the serving cell performing CoMP, the CSI-RS measurement results by the UE are used to select a new serving cell and decide to perform HO, but not limited thereto, and the following four indicators (1) to (4) below may be used.

(1) Communication quality of uplink from UE. The uplink communication quality may be the communication quality of the SRS, PUCCH, and PUSCH.

(2) Location information of UE.

(3) Measurement results on a downlink demodulation reference signal (DM-RS) by UE.

(4) Mobility speed information of UE.

The use of the indicators (1) to (4) above allows the UE being subjected to CoMP to switch the serving cell more suitable for CoMP, obtaining a good communication quality.

Sixth Embodiment

For CoMP and CA, an ePDCCH is studied as a new physical control channel in Release 11 of 3GPP (see R1-113157 (hereinafter, referred to as "Reference 6") by 3GPP).

R1-114214 (hereinafter, referred to as "Reference 7") by 3GPP discloses that the ePDCCH is multiplexed with the PDSCH on a symbol to which the PDSCH is mapped and that the ePDCCH can be mapped even in a subframe free from the PDCCH.

Figure 26:
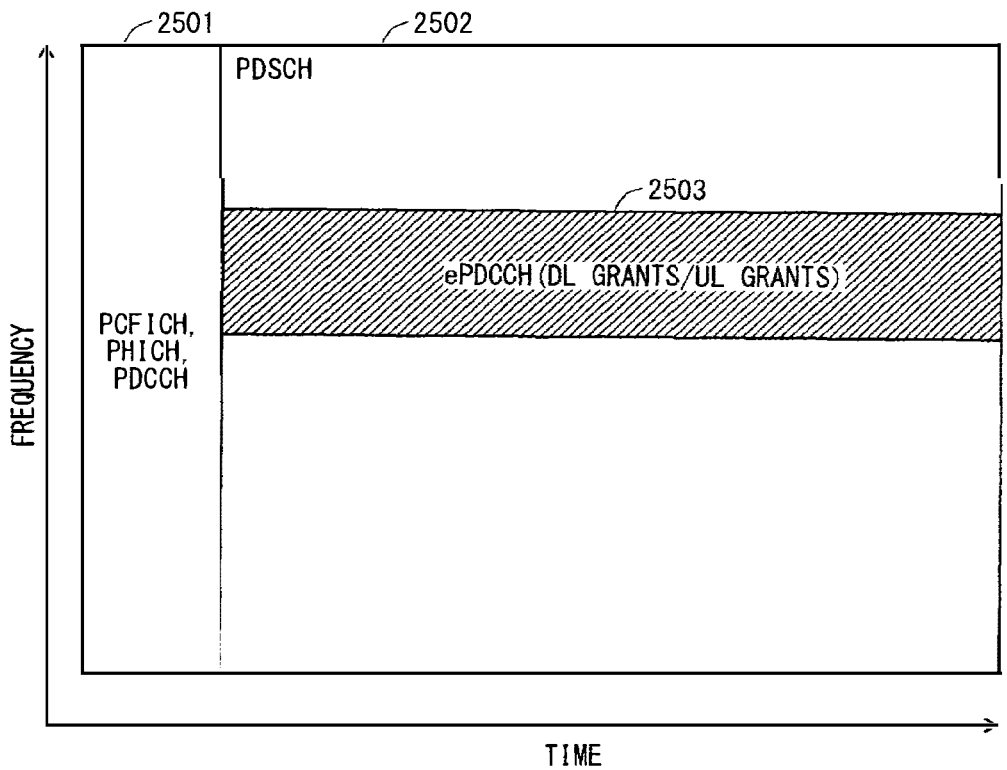
FIG. 26 is a diagram for describing ePDCCH.

FIG. 26 is a diagram for describing the ePDCCH. FIG. 26 shows frequency-time resources for one subframe. The vertical axis and horizontal axis of FIG. 26 indicate the frequency and time, respectively. In FIG. 26, the area represented by reference numeral "2501" indicates a symbol to which the PCFICH, PHICH, and PDCCH are mapped, and the area represented by reference numeral "2502"

indicates a symbol to which the PDSCH is mapped. The area indicated by reference numeral "2503" is the ePDCCH, which is multiplexed with the PDSCH on a symbol to which the PDSCH can be mapped.

As described above, the ePDCCH is mapped on a symbol to which the PDSCH can be mapped, and thus, the UE fails to recognize whether or not the ePDCCH has been mapped if no contrivance is made. Therefore, the UE cannot monitor the ePDCCH.

This embodiment will disclose the method of solving this problem. In the use of the ePDCCH, the serving cell notifies the UE of the ePDCCH configuration through dedicated signaling. RRC signaling may be used as dedicated signaling.

In the use of the ePDCCH, the activation or deactivation of the ePDCCH is notified through MAC signaling. For example, the timing at which the UE starts or stops monitoring the ePDCCH is shown as the notification of activation or deactivation of the ePDCCH. The UE may start or stop monitoring the ePDCCH upon receipt of the notification of activation or deactivation of the ePDCCH. This reduces a delay time more before starting or stopping monitoring the ePDCCH than notifying the activation or deactivation through RRC signaling, whereby a change in surrounding radio wave environment can be supported.

As another method, the information on the activation or deactivation of the ePDCCH may be included in the DCI to be mapped to the PDCCH, and then may be notified the UE. Or, the information on activation may be included in the DCI to be mapped to the PDCCH, and the information on deactivation may be included in the DCI to be mapped to the ePDCCH, so that the information is notified the UE. This allows for setting of starting or stopping monitoring of the ePDCCH in subframes. Therefore, a change in the surrounding radio wave environment for a shorter period of time can be supported.

If the serving cell notifies the UE of the activation of the ePDCCH through MAC signaling, the UE starts monitoring the ePDCCH. If the serving cell notifies the UE of the deactivation of the ePDCCH through MAC signaling, the UE stops monitoring the ePDCCH.

In the use of the ePDCCH for CoMP, the DCI of the ePDCCH to a target UE may include the CoMP transmission point information. The information similar to that in the case of the PDCCH may be included. The UE can recognize CoMP transmission points by monitoring the ePDCCH.

If the ePDCCH is provided dedicatedly for the UE, the ePDCCH may be a CoMP target. This is possible when the serving cell preliminarily notifies the in-CoMP-measurement-set cell or in-CoMP-active-set cell of the ePDCCH of the UE being a CoMP target. As disclosed in the embodiment below, the scheduling information of the UE being a CoMP target is notified the in-CoMP-measurement-set cell or the in-CoMP-active-set cell. Thus, the use of the ePDCCH configuration information and the scheduling information of the UE allows each cell in the set to set the ePDCCH of the UE as a CoMP target. The ePDCCH is also subjected to CoMP, so that the reception quality of the ePDCCH can be improved.

In the use of the ePDCCH, scheduling over the PDCCH may be avoided in the subframe that is scheduled over the ePDCCH. The UE may avoid monitoring the PDCCH in the subframe in which the ePDCCH is monitored.

In the use of the ePDCCH, the PDCCH may be used in notification of paging (paging indication (PI)). The UE monitors the PDCCH in discontinuous reception cycles for receiving paging. If the ePDCCH is mapped in a subframe in which paging is notified, the UE monitors both of the PDCCH and the ePDCCH. Examples of the uses of paging include notification of an incoming call from the network, notification of a change in system information (SI), and notification of a public warning system (PWS) such as ETWS and CMAS. Thus, the UE can monitor both of the PDCCH and the ePDCCH to receive, for example, the notification of an incoming call from the network, notification of a change in system information, and notification of the PWS while performing CoMP.

In the use of the ePDCCH, the PDCCH may be used in scheduling of the system information. The UE monitors the PDCCH at a reception timing for system information. In the case where the ePDCCH is mapped in the subframe in which the system information is scheduled, the UE monitors both of the PDCCH and the ePDCCH.

The UE can monitor both of the PDCCH and the ePDCCH to receive the system information while performing CoMP.

FIGS. 27 and 28 are diagrams showing an exemplary sequence of a mobile communication system in a sixth embodiment. FIGS. 27 and 28 are continuous with each other at a boundary BL2. FIGS. 27 and 28 show the sequence in the case where the ePDCCH is used.

In Step ST2601, the serving cell decides to use the ePDCCH for a target UE (UE1) in cases of, for example, deciding to perform CoMP on the UE1 and deciding to perform CA on the UE1.

In Step ST2602, the serving cell decides the ePDCCH configuration for the

UE1. Examples of the parameters to be configured include the information indicative of physical resources to which the ePDCCH is mapped, the cycle in which the ePDCCH is mapped, the sequence specific to the UE to be used for the ePDCCH, and a monitoring mode. The information indicative of physical resources to which the ePDCCH is mapped is, for example, a PRB number. The cycle in which the ePDCCH is mapped is, for example, the number of subframes, the number of radio frames, and the offsets of subframes. Examples of the monitoring mode include a mode in which the PDCCH and the ePDCCH are both monitored, a mode in which the ePDCCH and at least any one of the PDCCH for paging notification and the PDCCH for system information scheduling are monitored, and a mode in which only the ePDCCH is monitored, and these mode types are made settable.

In Step ST2603, the serving cell notifies the UE1 of the ePDCCH configuration through RRC signaling.

In Step ST2604, the UE1 sets the received ePDCCH configuration.

In Step ST2605, the serving cell decides scheduling to the UE1 over the ePDCCH.

In Step ST2606, the serving cell notifies the UE1 of the ePDCCH activation of through MAC signaling.

In Step ST2607, the serving cell performs scheduling to the UE1 over the ePDCCH.

In Step ST2608, the serving cell transmits the ePDCCH to the UE1 using the resources, cycle, and sequence configured in Step ST2602 in a symbol to which the PDSCH is mapped.

The UE1 notified of an ePDCCH activation signal in Step ST2606 starts monitoring the ePDCCH.

In Step ST2609, the UE1 monitors the ePDCCH transmitted from the serving cell to obtain the scheduling information directed to its own UE.

In Step ST2610, the UE1 communicates with the serving cell based on the received scheduling information.

Next, the case where the use of the ePDCCH is stopped will be described. In Step ST2611, the serving cell decides not to use the ePDCCH for the UE1. In Step ST2612, the serving cell notifies the UE1 of ePDCCH deactivation through MAC signaling. This notification is performed over the ePDCCH.

In Step ST2613, the serving cell stops scheduling to the UE1 over the ePDCCH and performs scheduling to the UE1 over the PDCCH.

In Step ST2616, the serving cell performs scheduling to the UE1 over the PDCCH.

In Step ST2614, the UE that has notified of an ePDCCH deactivation signal in Step ST2612 stops monitoring the ePDCCH.

In Step ST2615, the UE1 starts monitoring the PDCCH transmitted from the serving cell to obtain the scheduling information directed to its own UE.

In Step ST2617, the UE1 communicates with the serving cell based on the received scheduling information.

Next, the case where the serving cell decides not to use the ePDCCH for the UE1 will be described. In Step ST2618, the serving cell decides not to use the ePDCCH for the UE1. For example, the serving cell decides not to use the ePDCCH in the case of, for example, stopping or having stopped performing CoMP on the UE1 or stopping or having stopped CA on the UE1.

In Step ST2619, the serving cell notifies the UE1 of an ePDCCH configuration release. The UE1 can recognize that the use of the ePDCCH has been ended by receiving the ePDCCH configuration release.

In Step ST2620, the serving cell that has notified the ePDCCH configuration release in Step ST2619 releases the ePDCCH configuration for the UE1. Or, when being notified of a reception response to the process of Step ST2619 from the UE1, in Step ST2620, the serving cell may release the ePDCCH configuration for the UE1. Thus, the physical resources and sequence reserved for the UE1 can be released, allowing for efficient use of resources.

In Step ST2621, the UE1 releases (resets) the set ePDCCH configuration.

The method disclosed in this embodiment allows the UE to recognize whether or not the ePDCCH has been mapped and then monitor the ePDCCH. This allows for communication over the ePDCCH, which is effective in the case where the ePDCCH is used in, for example, CoMP and CA.

Seventh Embodiment

Figure 29:
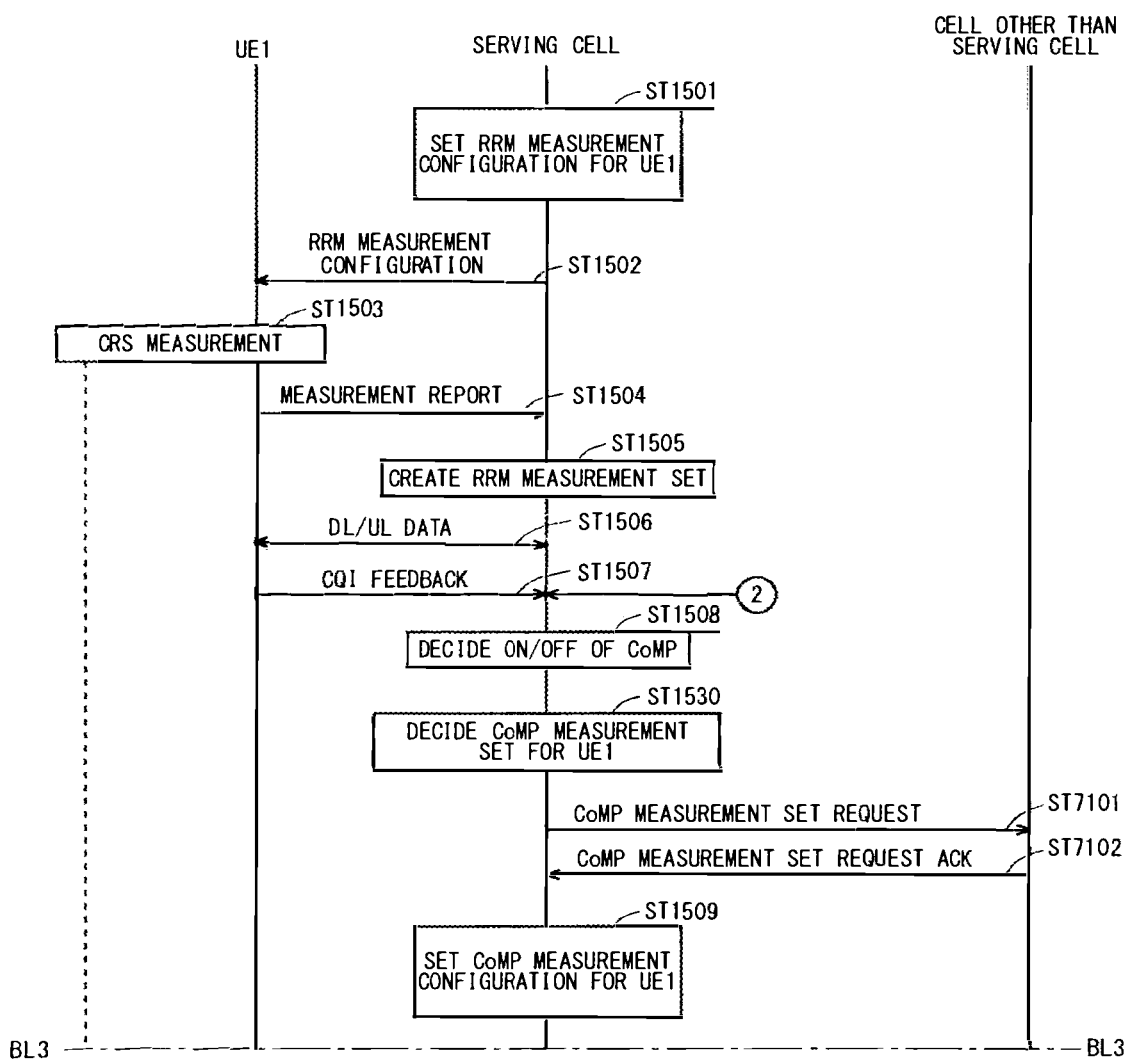
FIG. 29 is a diagram showing an exemplary sequence of a mobile communication system in a seventh embodiment.
Figure 31:
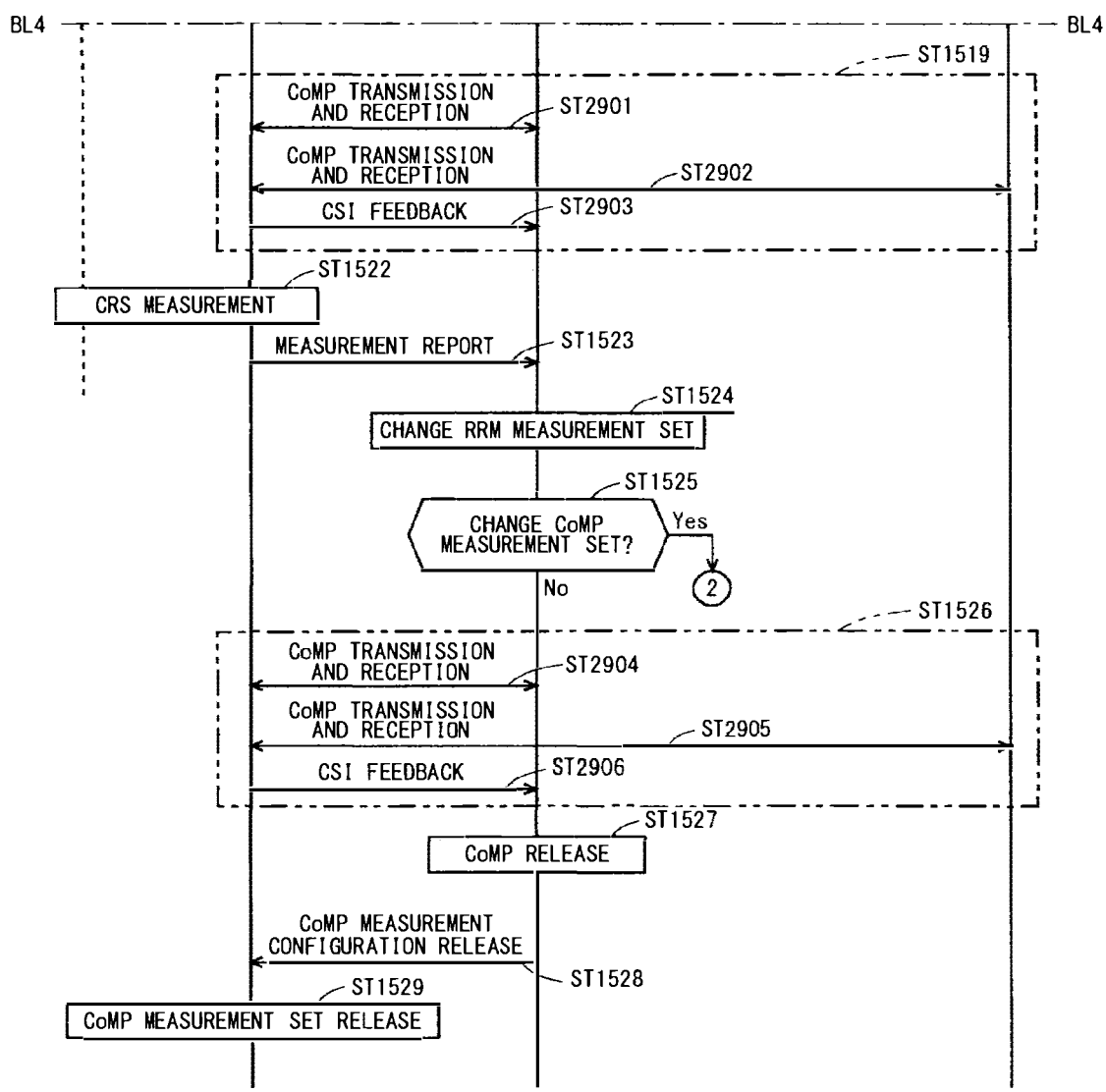
FIG. 31 is still another diagram showing the exemplary sequence of the mobile communication system in the seventh embodiment.

A seventh embodiment will mainly disclose the signaling method and data forwarding method between the serving cell and other cell different from the serving cell in the first embodiment. FIGS. 29, 30, and 31 are diagrams showing an exemplary sequence of a mobile communication system in the seventh embodiment. FIGS. 29 and 30 are continuous with each other at a boundary BL3. FIGS. 30 and 31 are continuous with each other at a boundary BL4. The sequence shown in FIGS. 29 to 31 is similar to the sequence shown in FIGS. 15 and 16, and thus, the same steps will be denoted by the same step numbers and common description will be omitted. FIGS. 29 to 31 show the case where the central entity is configured in the serving cell, and thus, the central entity and the serving cell are not particularly differentiated from each other and are referred to as a serving cell.

In Step ST7101, the serving cell requests the cell other than the serving cell of the cells included in the CoMP measurement set decided in Step ST1530 to join the CoMP measurement set for the UE1. In the description below, the cell other than the serving cell of the cells included in the CoMP measurement set may be merely referred to as a "CoMP measurement set cell".

As a specific example, the serving cell notifies the CoMP measurement set cell of a CoMP measurement set request message. The following three (1) to (3) will be disclosed as specific examples of the information shown in the CoMP measurement set request message.

(1) Joining the CoMP measurement set for the UE1 is requested.

(2) Start of transmission of CSI-RS is requested.

(3) Combination of (1) and (2) above.

In Step ST7102, the CoMP measurement set cell that has received, from the serving cell, the request to join the CoMP measurement set for the UE1 in Step ST7101 responds to the request to join the CoMP measurement set, to the serving cell. This response may be omitted. This reduces a load of the process to the response process. If it can join the CoMP measurement set for the UE1 or if it can start transmitting the CSI-RS to the UE1, the CoMP measurement set cell notifies the serving cell of this. Specifically, the CoMP measurement set cell notifies the serving cell of a CoMP measurement set request Ack message.

If it cannot join the CoMP measurement set for the UE1 or if it cannot start transmitting the CSI-RS to the UE1, the CoMP measurement set cell notifies the serving cell of this. Specifically, the CoMP measurement set cell notifies the serving cell of a CoMP measurement set request Nack message.

Specific examples of the indicator by which the CoMP measurement set cell judges that it cannot join the CoMP measurement set for the UE1 or it cannot start transmitting the CSI-RS to the UE1 include a high load of the CoMP measurement set cell. This sequence will describe the case where the CoMP measurement set cell can join the CoMP measurement set for the UE1.

In Step ST7103, the serving cell transmits the CSI-RS to the UE1.

In Step ST7104, the CoMP measurement set cell that has notified the serving cell that it can join the CoMP measurement set in Step ST7102 starts transmitting the CSI-RS to the UE1.

In Step ST7105, the serving cell notifies the data directed to the UE1. Specifically, the serving cell notifies the CoMP data directed to the UE1. The following three (1) to (3) will be disclosed as specific examples of the destination to be notified of the data by the serving cell.

(1) CoMP measurement set cell. In the case where the CoMP measurement set cell that has notified the data is not selected as a CoMP transmission point, the CoMP measurement set cell discards the notified data. In this specific example (1), contrary to the specific example (3) below, data notification can be started to increase the time available for data notification irrespective of whether or not CoMP transmission points are decided in Step ST1516. Data is notified at any timing as long as it is after the serving cell decides to perform CoMP in Step ST1508 and before CoMP transmission/reception is performed in Step ST1519. There is ample time before the data notification timing, reducing a momentary high load.

(2) A cell other than the serving cell of the cells included in the CoMP active set. In the description below, the cell other than the serving cell of the cells included in the CoMP active set may be merely referred to as a "CoMP active set cell". If the CoMP active set cell that has notified the data is not selected as a CoMP transmission point, the CoMP active set cell discards the notified data. Contrary to the specific example (3) below, the specific example (2) can start data notification to increase a time available for data notification irrespective of whether or not CoMP transmission points are decided in Step ST1516. Data is notified at any timing as long as it is after the serving cell decides to perform CoMP in Step ST1508 and before CoMP transmission/reception is performed in Step ST1519. There is ample time before the data notification timing, reducing a momentary high load.

(3) A cell other than the serving cell of the cells included in the CoMP transmission points. In the description below, the cell other than the serving cell of the cells included in the CoMP transmission points may be merely referred to as a "CoMP transmission point". Contrary to the specific examples (1) and (2) above, in the specific example (3), the cell that is not selected as the CoMP transmission point will not be notified of data, so that the process of discarding data is not necessary. This leads to an effect that an unnecessary process is not required. Data is notified at any timing as long as it is after the serving cell decides CoMP transmission points in Step ST1516 and before CoMP transmission/reception is performed in Step ST1519.

The following three (1) to (3) will be disclosed as specific examples of the types of data to be notified.

(1) PDCP data unit, which may be PDCP PDU data or PDCP SDU data.

(2) RLC data unit, which may be RLC PDU data or RLC SDU data.

(3) MAC data unit, which may be MAC PDU data or MAC SDU data.

Parameters required for data may be notified together depending on the types of data to be notified.

In Step ST7106, the serving cell notifies the CoMP transmission point of scheduling information including the information indicative of the CoMP transmission points decided in Step ST1516. In Step ST7106, the necessary scheduling information may be notified depending on the types of data notified in Step ST7105. Scheduling including the information indicative of CoMP transmission points, or the scheduling information being the scheduling results is referred to as "CoMP scheduling".

After the process of Step ST7106, the processes of Steps ST1518 to ST1529 are performed as in the first embodiment described above. FIG. 31 shows the processes of Steps ST1519 and ST1526 more specifically.

Step ST1519 includes Steps ST2901 to ST2903. In Step ST2901, the UE1 and the serving cell perform CoMP transmission/reception. In Step ST2902, the UE1 and the cell other than the serving cell included in the CoMP measurement set perform CoMP transmission/reception. In Step ST2903, the UE1 derives the CSI from the CSI-RS and then feeds back the CSI to the serving cell.

Step ST1526 includes Steps ST2904 to ST2906. The processes of Steps ST2904 to ST2906 are performed similarly to the processes of Steps ST2901 to ST2093.

Figure 32:
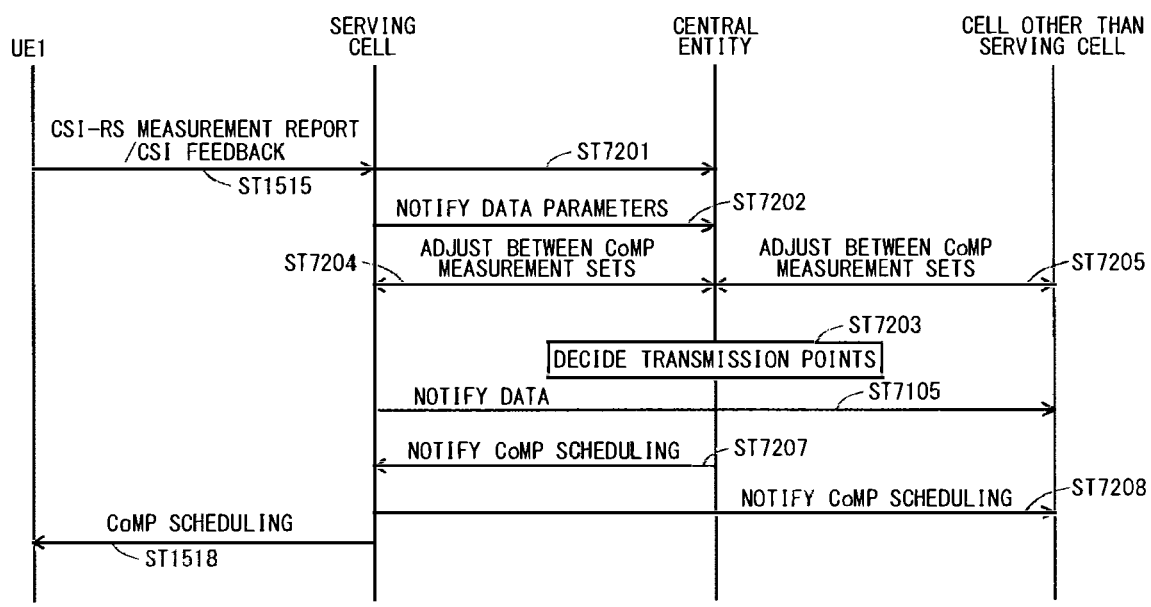
FIG. 32 is a diagram showing an exemplary sequence of the mobile communication system in the seventh embodiment.

FIG. 32 is a diagram showing another exemplary sequence of the mobile communication system in the seventh embodiment. The same steps of the sequence shown in FIG. 32 as those shown in the sequence shown in FIGS. 15 and 16 will be denoted by the same step numbers, and common description will be omitted. FIG. 32 shows the sequence in the case where the central entity decides CoMP transmission points, where the central entity is differentiated from the serving cell. FIG. 32 shows another specific example of the processes of Steps ST1515 to ST1518 of FIGS. 29 to 31.

In Step ST7201, the serving cell notifies the central entity of the CSI-RS measurement results received in Step ST1515. Specific examples of the CSI-RS measurement results include a CSI-RS measurement report and CSI feedback information.

In Step ST7202, the serving cell notifies the central entity of the information on the data to be subjected to CoMP (hereinafter, also referred to as "data parameters"). Specific examples of the data parameters include an amount of data and the quality of service (QOS) information. Or, the serving cell may notify the data to be subjected to CoMP as the data parameters.

In Step ST7204, the central entity performs adjustment between CoMP measurement sets for achieving CoMP of the data to be subjected to CoMP that has been received in Step ST7202. Specifically, the central entity performs adjustment as to whether or not the serving cell can accept the transmission of the data. The serving cell performs scheduling to the UE that is not a CoMP target, being served by the serving cell, whereby the adjustment allows for optimum scheduling.

In Step ST7205, the central entity performs adjustment between the CoMP measurement sets for achieving CoMP of the data to be subjected to CoMP that has been received in Step ST7202. Specifically, the central entity performs adjustment as to whether or not the CoMP measurement set cell can accept the transmission of the data. The CoMP measurement set cell performs scheduling to a UE that is not a CoMP target, being served by the CoMP measurement set cell, whereby the adjustment allows for optimum scheduling. Adjustment may be performed between CoMP active sets.

In Step ST7203, the central entity performs scheduling for the UE1 based on the information on the data to be subjected to CoMP that has been received in Step ST7202, the results of the adjustment performed with the serving cell in Step ST7204, and the results of the adjustment performed with the CoMP measurement set cell in Step ST7205. Specifically, the central entity decides CoMP transmission points. The details of the process of Step ST7203 are similar to those of the process of Step ST1516 of FIGS. 15 and 16.

After that, the central entity may perform adjustment again between the CoMP transmission points to decide the final CoMP scheduling.

In Step ST7207, the central entity notifies the serving cell of the CoMP scheduling decided in Step ST7203.

In Step ST7208, the serving cell notifies the CoMP measurement set cell of the scheduling received in Step ST7207. The central entity may notify the CoMP measurement set cell of the scheduling decided in Step ST7203.

Figure 33:
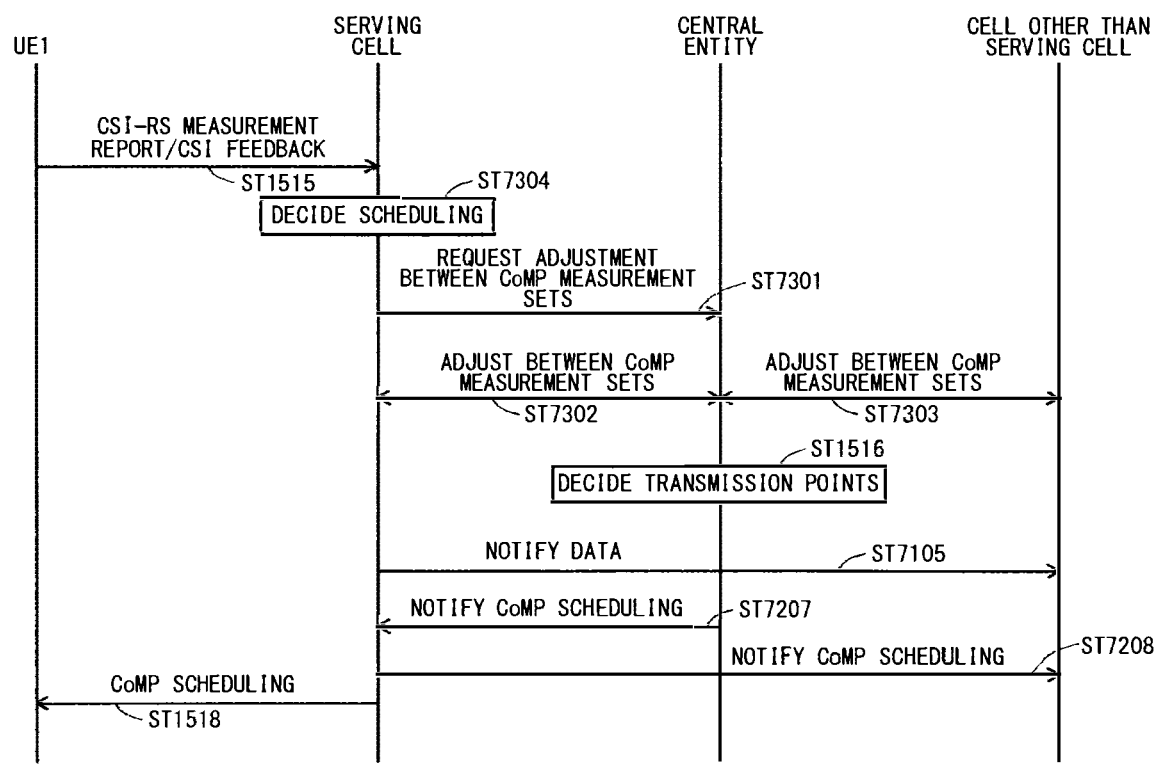
FIG. 33 is a diagram showing an exemplary sequence of the mobile communication system in the seventh embodiment.

FIG. 33 is a diagram showing another exemplary sequence of the mobile communication system in the seventh embodiment. The same steps of the sequence shown in FIG. 33 as those of the sequence shown in FIGS. 15 and 16 and FIG. 32 will be denoted by the same step numbers, and common description will be omitted. FIG. 33 shows the sequence when the serving cell and the central entity decide CoMP transmission points together, where the central entity is differentiated from the serving cell. FIG. 33 shows another specific example of the processes of Steps ST1515 to ST1518 of FIGS. 29 to 31.

In Step ST7304, the serving cell decides scheduling, by its own cell alone, on the data to be subjected to CoMP for the UE1. The serving cell may decide scheduling temporarily.

In Step ST7301, the serving cell notifies the central entity of a request for adjustment between CoMP measurement sets. When notifying an adjustment request, the serving cell may notify the scheduling decided in Step ST7304. Specific examples of scheduling include time-frequency resources. The serving cell may notify a request for adjustment between CoMP active sets.

In Step ST7302, the central entity performs adjustment between the CoMP measurement sets for achieving scheduling that has been received in Step ST7301. Specifically, the central entity performs adjustment as to whether or not the serving cell can accept the scheduling received in Step ST7301. The serving cell performs scheduling to the UE that is not a CoMP target, being served by the serving cell, whereby the adjustment allows for optimum scheduling. The serving cell performs scheduling in Step ST7304, and thus, this step may be omitted assuming that the serving cell is capable of accepting scheduling.

In Step ST7303, the central entity performs adjustment between the CoMP measurement sets for achieving scheduling received in Step ST7301. Specifically, the central entity performs adjustment as to whether or not the CoMP measurement set cell can accept the scheduling received in Step ST7301. The CoMP measurement set cell performs scheduling to the UE that is not a CoMP target, being served by the CoMP measurement set cell, whereby the adjustment allows for optimum scheduling. The central entity may perform adjustment between CoMP active sets.

In Step ST1516, the central entity performs CoMP scheduling for the UE1 based on the scheduling received in Step ST7301, the results of the adjustment performed with the serving cell in Step ST7302, and the results of the adjustment performed with the CoMP measurement set cell in Step ST7303. Specifically, the central entity decides CoMP transmission points. The details of the process are similar to those of the process of Step ST1516 of FIGS. 15 and 16.

Next disclosed is the case where a cell unified entity is newly provided. The cell unified entity is defined as the entity that has appropriate functions of radio resource control (RRC), packet data convergence protocol (PDCP), radio link control (RLC), and medium access control (MAC) in a plurality of radio areas together. Hereinafter, in the seventh embodiment, eighth embodiment, ninth embodiment, and tenth embodiment, the cell refers to the entity composed of all of the functions of the RRC, PDCP, RLC, MAC, and physical layer (PHY) constituting one radio area. Also, a sub cell refers to the entity composed of part of the functions of the RRC, PDCP, RLC, MAC, and PHY constituting one radio area.

The cell and sub cell having the PHY function have the function of broadcasting broadcast information. They may have the function of broadcasting an identifier identifiable by the UE.

FIG. 34 is a block diagram for describing a specific example of the cell unified entity. A cell unified entity 7416 is connected to a first sub cell 7401, a second sub cell 7406, and a third sub cell 7411.

The first sub cell 7401 defines one radio area and includes a MAC 7402 and a PHY 7403. The PHY 7403 includes a baseband unit (BB) 7404 and a radio frequency unit (RF) 7405.

The second sub cell 7406 defines one radio area and includes a MAC 7407 and a PHY 7408. The PHY 7408 includes a BB 7409 and an RF 7410.

The third sub cell 7411 defines one radio area and includes a MAC 7412 and a PHY 7413. The PHY 7413 includes a BB 7414 and an RF 7415.

The cell unified entity 7416 has the functions of the RRC 7417, the PDCP 7418, and the RLC 7419 in the radio area defined by the first sub cell 7401, the radio area defined by the second sub cell 7406, and the radio area defined by the third sub cell 7412 together. In the description below, the cell unified entity that has the functions of the RRC, PDCP, and RLC in a plurality of radio areas together, such as the cell unified entity 7416, may also be referred to as a "first cell unified entity".

FIG. 35 is a block diagram for describing a specific example of another cell unified entity. A cell unified entity 7513 is connected to a fourth sub cell 7501, a fifth sub cell 7505, and a sixth sub cell 7509.

The fourth sub cell 7501 defines one radio area and includes a PHY 7502. The PHY 7502 includes a BB 7503 and an RF 7504.

The fifth sub cell 7505 defines one radio area and includes a PHY 7506. The PHY 7506 includes a BB 7507 and an RF 7508.

The sixth sub cell 7509 defines one radio area and includes a PHY 7510. The PHY 7510 includes a BB 7511 and an RF 7512.

The cell unified entity 7513 has the functions of the RRC 7514, the PDCP 7515, the RLC 7516, and the MAC 7517 in the radio area defined by the fourth sub cell 7501, the radio area defined by the fifth sub cell 7505, and the radio area defined by the sixth sub cell 7509 together. In the description below, the cell unified entity that has the functions of the RRC, PDCP, RLC, and MAC in a plurality of radio areas together, such as the cell unified entity 7513, may also be referred to as a "second cell unified entity".

As another specific example, a cell unified entity, which has the functions of the RRC, the functions of the PDCP, the functions of the RLC, and at least the scheduling function of the functions of the MAC in a plurality of radio areas together, is conceivable. This cell unified entity may also be referred to as a "third cell unified entity".

Figure 36:
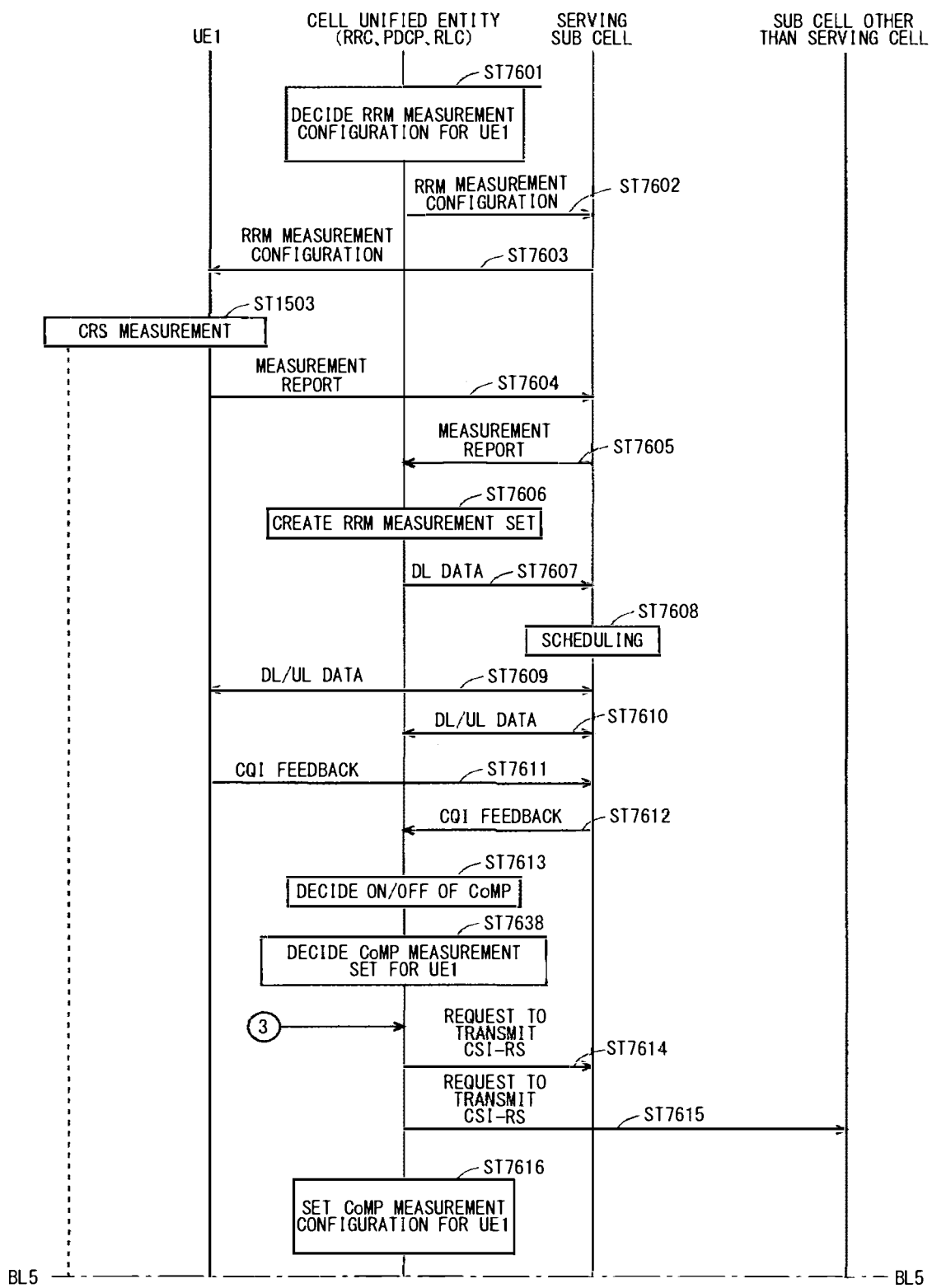
FIG. 36 is a diagram showing an exemplary sequence of the mobile communication system in the seventh embodiment.
Figure 37:
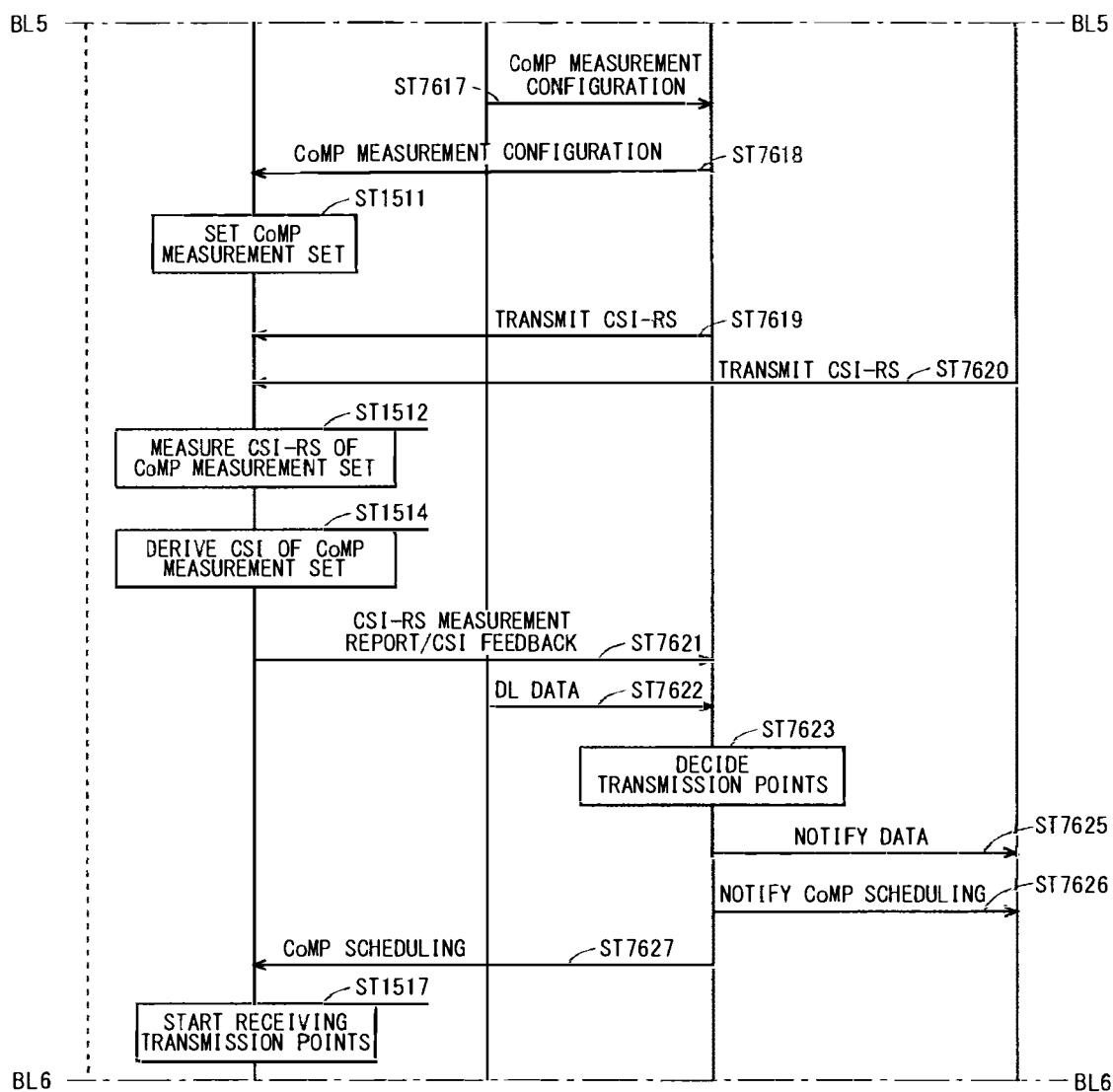
FIG. 37 is another diagram showing the exemplary sequence of the mobile communication system in the seventh embodiment.

FIGS. 36, 37, and 38 are diagrams showing another exemplary sequence of the mobile communication system in the seventh embodiment. FIGS. 36 and 37 are continuous with each other at a boundary BL5. FIGS. 37 and 38 are continuous with each other at a boundary BL6. The sequence shown in FIGS. 36 to 38 is similar to the sequence shown in FIGS. 15 and 16, and thus, the same steps will be denoted by the same step numbers and common description will be omitted. FIGS. 36 to 38 show the sequence when CoMP in a case where the first cell unified entity including the RRC 7417, the PDCP 7418, and the RLC 7419 is differentiated from the sub cell. This sequence shows the case where the central entity is configured in the serving sub cell, and thus, the central entity and the serving sub cell are not particularly differentiated from each other and are referred to as a serving cell.

In Step ST7601, the first cell unified entity sets an RRM measurement configuration. The details of the process of Step ST7601 are similar to those of the process of Step ST1501 of FIGS. 15 and 16.

In Step ST7602, the first cell unified entity notifies the serving sub cell of the RRM measurement configuration set in Step ST7601.

In Step ST7603, the serving sub cell notifies the UE1 of the RRM measurement configuration received in Step ST7602. The details of the process of Step ST7603 are similar to those of the process of Step ST1502 of FIGS. 15 and 16.

In Step ST7604, the UE1 reports the CRS measurement results to the serving sub cell. The details of the process of Step ST7604 are similar to those of the process of Step ST1504 of FIGS. 15 and 16.

In Step ST7605, the serving sub cell notifies the first cell unified entity of the report of the measurement results received in Step ST7604.

In Step ST7606, the first cell unified entity creates an RRM measurement set. The details of the process of Step ST7606 are similar to those of the process of Step ST1505 of FIGS. 15 and 16.

In Step ST7607, the first cell unified entity notifies the serving sub cell of the data. Specifically, the first cell unified entity notifies the data directed to the UE1. Specific examples of the types of data to be notified include an RLC data unit. The data to be notified may be RLC PDU data. The first cell unified entity may notify the parameters required for the data together. Specific examples of the parameters required include the parameters required for the MAC process of the serving sub cell.

In Step ST7608, the serving sub cell performs scheduling of the data received in Step ST7607. The serving sub cell may perform MAC scheduling.

In Step ST7609, the UE1 and the serving sub cell communicate data in at least any one of downlink (DL) and uplink (UL).

In Step ST7610, the serving sub cell communicates data with the first cell unified entity for the DL data to be transmitted to the UE1 and the UL data received from the UE1. The data to be notified is processed similarly to the process of Step ST7607.

In Step ST7611, the UE1 feeds back the CQI derived from the CRS to the serving sub cell.

In Step ST7612, the serving sub cell notifies the first cell unified entity of the CQI feedback data received in Step ST7611.

In Step ST7613, the first cell unified entity decides whether or not to perform CoMP. The details of the process of Step ST7613 are similar to those of the process of Step ST1508 of FIGS. 15 and 16.

In Step ST7638, the first cell unified entity selects and decides a CoMP measurement set. The details of the process of Step ST7638 are similar to those of the process of Step ST1530 of FIGS. 15 and 16.

If the first cell unified entity can recognize, for example, the load condition of the sub cell included in the CoMP measurement set to judge whether or not the CoMP measurement set sub cell can join the CoMP measurement set for the UE1, the processes corresponding to Steps ST7101 and ST7102 of FIGS. 29 to 31 can be omitted. The first cell unified entity is provided in the mobile communication system that supports CoMP in this manner, preventing a control delay.

In Step ST7614, the first cell unified entity requests the serving sub cell to start transmitting the CSI-RS.

In Step ST7615, the first cell unified entity requests the cell or the sub cell other than the serving sub cell of the cells included in the CoMP measurement set to start transmitting the CSI-RS. In the description below, the cell or the sub cell other than the serving sub cell among the sub cells included in the CoMP measurement set may be also referred to as a "CoMP measurement set sub cell".

In Step ST7616, the first cell unified entity sets the CoMP measurement configuration for the UE1. The details of the process of Step ST7616 are similar to those of the process of Step ST1509 of FIGS. 15 and 16.

In Step ST7617, the first cell unified entity notifies the serving sub cell of the CoMP measurement configuration for the UE1 set in Step ST7616.

In Step ST7618, the serving sub cell notifies the UE1 of the CoMP measurement configuration received in Step ST7617. The details of the process of Step ST7618 are similar to those of the process of Step ST1510 of FIGS. 15 and 16.

In Step ST7619, the serving sub cell transmits the CSI-RS to the UE1. The serving sub cell may start transmitting the CSI-RS upon receipt of a request to start transmitting the CSI-RS from the first cell unified entity in Step ST7614. This allows the serving sub cell to transmit CSI-RS only in the case where the user equipment being served by the serving sub cell performs measurement using the CSI-RS, reducing the power consumption of the serving sub cell.

In Step ST7620, the CoMP measurement set sub cell transmits the CSI-RS to the UE1. The CoMP measurement set sub cell may start transmitting the CSI-RS upon receipt of a request to start transmitting the CSI-RS from the first cell unified entity in Step ST7615. This allows the CoMP measurement set sub cell to transmit the CSI-RS only in the case where the user equipment being served by the CoMP measurement set sub cell performs measurement using the CSI-RS, reducing the power consumption of the CoMP measurement set sub cell.

In Step ST7621, the UE1 reports the CSI-RS measurement results to the serving sub cell. The details of the process of Step ST7621 are similar to those of the process of Step ST1515 of FIGS. 15 and 16.

In Step ST7622, the first cell unified entity notifies the serving sub cell of the data. The details of the process of Step ST7622 are similar to those of the process of Step ST7607.

In Step ST7623, the serving sub cell decides CoMP transmission points. The details of the process of deciding CoMP transmission points are similar to those of the process of Step ST1516 shown in FIG. 16.

In Step ST7625, the serving sub cell notifies the CoMP measurement set sub cell of the data directed to the UE1. Specifically, the serving sub cell notifies the data for CoMP directed to the UE1.

Specific examples of the types of data to be notified include a MAC data unit, MAC PDU data, and MAC SDU data.

Or, the first cell unified entity may notify the CoMP measurement set sub cell of the data directed to the UE1. Specifically, the first cell unified entity notifies the data for CoMP directed to the UE1. The following three (1) to (3) will be disclosed as specific examples of the types of data to be notified.

(1) PDCP data unit, which may be PDCP PDU data or PDCP SDU data.

(2) RLC data unit, which may be RLC PDU data or RLC SDU data.

(3) MAC data unit, which may be MAC PDU data or MAC SDU data. For MAC data unit, the first cell unified entity may obtain the MAC data unit required from the serving sub cell.

The parameters required for the data at each layer may be notified together. As a specific example of the parameters, in the case where (1) the PDCP data unit is notified, the parameters required for the RLC process and the parameters required for the MAC process are notified. Meanwhile, in the case where (2) the RLC data unit is notified, the parameters required for the MAC process are notified.

The following two (1) and (2) will be disclosed as specific examples of the cell notified the data directed to the UE1 by the serving sub cell.

(1) The serving sub cell notifies the CoMP transmission sub cell decided in Step ST7623 of the data directed to the UE1. In this case, the notification of the unnecessary data to the CoMP transmission sub cell can be reduced compared with the specific example (2) described below, though the cell is a CoMP measurement set sub cell.

(2) The serving sub cell notifies the CoMP measurement set sub cell of the data directed to the UE1. In this case, there is no need to wait the decision of CoMP transmission sub cell in Step ST7623 for data notification. Thus, the serving sub cell notifies the CoMP measurement set sub cell of the data directed to the UE1 at any timing as long as it is after the decision of a CoMP measurement set in Step ST7638 and before the notification of scheduling of Step ST7626. The first cell unified entity may notify the serving sub cell of the decided CoMP measurement set. It suffices to discard the data directed to the UE1 in the CoMP measurement set sub cells that have not been selected as the CoMP transmission sub cell. In this case, compared with the specific example (1), there is ample time before the data notification timing, reducing a momentary high load.

In Step ST7626, the serving sub cell may notify the CoMP transmission sub cell of CoMP scheduling including the information indicative of the CoMP transmission points decided in Step ST7623. The serving sub cell may notify the CoMP measurement set sub cell via the first cell unified entity.

In Step ST7627, the serving sub cell performs CoMP scheduling including the information on the CoMP transmission points decided in Step ST7623, and then notifies the UE1. The details of the process of Step ST7627 are similar to those of the process of Step ST1518 of FIGS. 15 and 16.

In Steps ST7628 and ST7629, the UE1, the serving sub cell, and the CoMP transmission sub cell perform CoMP transmission/reception.

In Step ST7630, the UE1 derives the CSI from the CSI-RS and then feeds back the CSI to the serving sub cell.

In Step ST7631, the UE1 reports the CRS measurement results to the serving sub cell. The details of the process of Step ST7631 are similar to those of the process of Step ST1504 of FIGS. 15 and 16.

In Step ST7632, the serving sub cell notifies the first cell unified entity of the report of the CRS measurement results received in Step ST7631.

In Step ST7633, the first cell unified entity that has received the measurement report in Step ST7632 changes an RRM measurement set as required. The details of the process of Step ST7633 are similar to those of the process of Step ST1524 of FIGS. 15 and 16.

In Step ST7634, the first cell unified entity judges whether or not to change the CoMP measurement set. The details of the process of Step ST7634 are similar to those of the process of FIGS. 15 and 16. If judging to change the CoMP measurement set in Step ST7634, the first cell unified entity changes the cells in the CoMP measurement set and returns to the process of Step ST7614. If judging not to change the CoMP measurement set in Step ST7634, the first cell unified entity moves to Step ST7635.

In Step ST7635, the first cell unified entity decides to release CoMP, namely, stop performing CoMP.

In Step ST7636, the first cell unified entity notifies the serving sub cell of the release of the CoMP measurement configuration of the UE1.

In Step ST7637, the serving sub cell notifies the UE1 of the release of the CoMP measurement configuration of the UE1 that has been received in Step ST7636. The details of the process of Step ST7637 are similar to those of the process of Step ST1528 of FIGS. 15 and 16.

Figure 39:
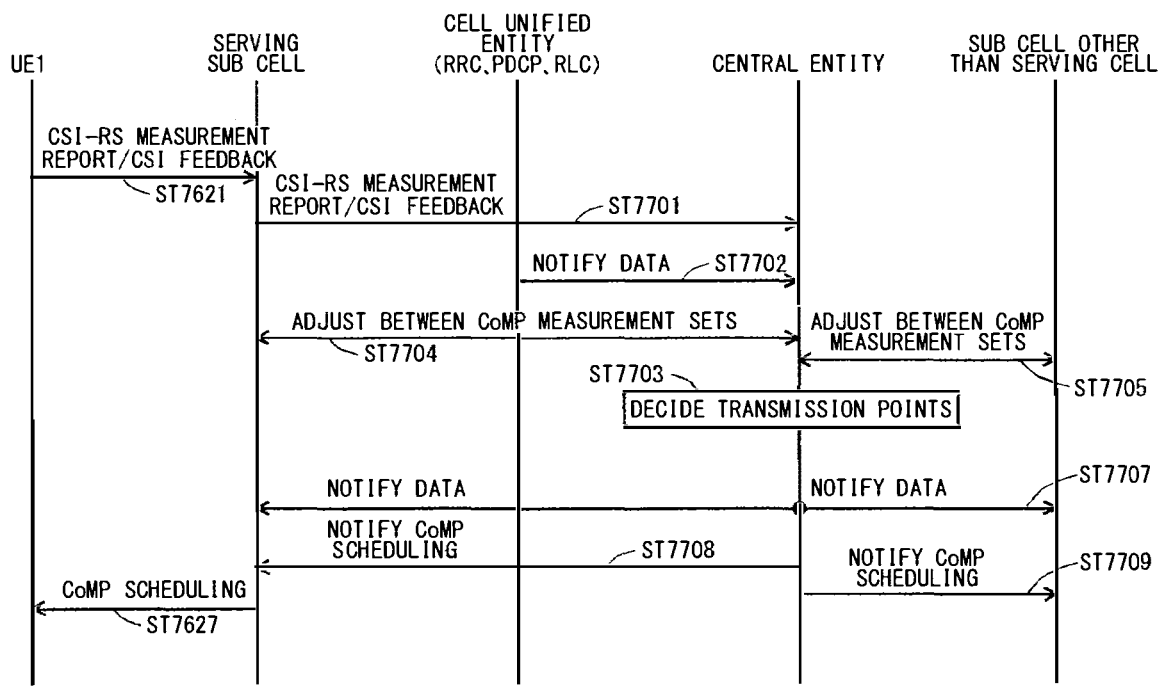
FIG. 39 is a diagram showing an exemplary sequence of the mobile communication system in the seventh embodiment.

FIG. 39 is a diagram showing another exemplary sequence of the mobile communication system in the seventh embodiment. The same steps of the sequence shown in FIG. 39 as those of the sequence shown in FIG. 38 will be denoted by the same step numbers, and common description will be omitted. FIG. 39 shows the sequence when the central entity decides CoMP transmission points, where the central entity is differentiated from the serving sub cell. FIG. 39 shows another specific example of the processes of Steps ST7621 to ST7627 of FIGS. 36 to 38.

In Step ST7701, the serving sub cell notifies the central entity of the CSI-RS measurement results received in Step ST7621. Specific examples of the CSI-RS measurement results include a CSI-RS measurement report and CSI feedback information.

In Step ST7702, the first cell unified entity notifies the central entity of data. The details of the process of Step ST7702 are similar to those of the process of Step ST7607 of FIGS. 36 to 38.

In Step ST7704, the central entity performs adjustment between CoMP measurement sets for achieving CoMP of the data to be subjected to CoMP that has been received in Step ST7702. Specifically, the central entity performs adjustment as to whether or not the serving sub cell can accept the transmission of the data. The serving sub cell performs scheduling to the UE that is not a CoMP target, being served by the serving sub cell, whereby the adjustment allows for optimum scheduling.

In Step ST7705, the central entity performs adjustment between the CoMP measurement sets for achieving CoMP of the data to be subjected to CoMP that has been received in Step ST7702. Specifically, the central entity performs adjustment as to whether or not the CoMP measurement set sub cell can accept the transmission of the data. The CoMP measurement set sub cell performs scheduling to the UE that is not a CoMP target, being served by the CoMP measurement set sub cell, whereby the adjustment allows for optimum scheduling. The CoMP measurement set sub cell may perform adjustment between CoMP active sets.

In Step ST7703, the central entity performs scheduling for the UE1 based on the information on the data to be subjected to CoMP that has been received in Step ST7702, the results of the adjustment performed with the serving sub cell in Step ST7704, and the results of the adjustment performed with the CoMP measurement set sub cell in Step ST7705. Specifically, the central entity decides CoMP transmission points. The details of the process of Step ST7703 are similar to those of the process of Step ST1516 of FIGS. 15 and 16.

After that, the central entity may perform adjustment again between the CoMP transmission points to decide the final CoMP scheduling.

In Step ST7707, the central entity notifies the serving sub cell and the CoMP measurement set sub cell of the data directed to the UE1. Specifically, the central entity notifies the data for CoMP directed to the UE1.

In Step ST7708, the central entity notifies the serving sub cell of CoMP scheduling including the information indicative of the CoMP transmission points decided in Step ST7703. The central entity may notify the serving sub cell of CoMP scheduling including the information indicative of the CoMP transmission points decided in Step ST7703 via the first cell unified entity.

In Step ST7709, the central entity notifies the CoMP measurement set sub cell of the CoMP scheduling including the information indicative of the CoMP transmission points decided in Step ST7703. The central entity may notify the CoMP measurement set sub cell via the first cell unified entity.

FIG. 40 is a diagram showing another exemplary sequence of the mobile communication system in the seventh embodiment. The same steps of the sequence shown in FIG. 40 as those of the sequence shown in FIGS. 36 to 39 will be denoted by the same step numbers, and common description will be omitted. FIG. 40 shows the sequence when the serving sub cell and the central entity decide CoMP transmission points together, where the central entity is differentiated from the serving sub cell. FIG. 40 shows another specific example of the processes of Steps ST7621 to ST7627 of FIGS. 36 to 38.

In Step ST7801, the serving sub cell decides scheduling, by its own cell alone, on the data to be subjected to CoMP for the UE1. The serving sub cell may temporarily decide scheduling.

In Step ST7802, the serving sub cell notifies the central entity of a request for adjustment between CoMP measurement sets. When notifying an adjustment request, the serving sub cell may notify the scheduling decided in Step ST7801. Specific examples of scheduling include time-frequency resources. The serving sub cell may notify a request for adjustment between CoMP active sets.

In Step ST7803, the central entity performs adjustment between the CoMP measurement sets for achieving scheduling that has been received in Step ST7802. Specifically, the central entity performs adjustment as to whether or not the serving sub cell can accept the scheduling received in Step ST7802. The serving sub cell performs scheduling to the UE that is not a CoMP target, being served by the serving sub cell, and thus, the adjustment allows for optimum scheduling. The serving sub cell performs scheduling in Step ST7801, whereby the serving sub cell may judge that the central entity can accept the scheduling and omit this step.

In Step ST7804, the central entity performs adjustment between the CoMP measurement sets for achieving the scheduling that has been received in Step ST7802. Specifically, the central entity performs adjustment as to whether or not the CoMP measurement set sub cell can accept the scheduling received in Step ST7802. The CoMP measurement set sub cell performs scheduling to the UE that is not a CoMP target, being served by the CoMP measurement set sub cell, and thus, the adjustment allows for optimum scheduling. The central entity may perform adjustment between CoMP active sets.

In Step ST7805, the central entity performs CoMP scheduling for the UE1 based on the scheduling received in Step ST7802, the results of the adjustment performed with the serving sub cell in Step ST7803, and the results of the adjustment performed with the CoMP measurement set sub cell in Step ST7804. Specifically, the central entity decides CoMP transmission points. The details of the process are similar to those of the process of Step ST1516 of FIGS. 15 and 16.

The first cell unified entity may have the function of the central entity. Or, the central entity may have the function of the first cell unified entity. Or, the same entity may have the function of the central entity and the function of the first cell unified entity. This eliminates the need for signaling and communication between the first cell unified entity and the central entity, preventing a control delay. Specifically, for example, the process of Step ST7702 of FIG. 39 can be omitted.

Figure 41:
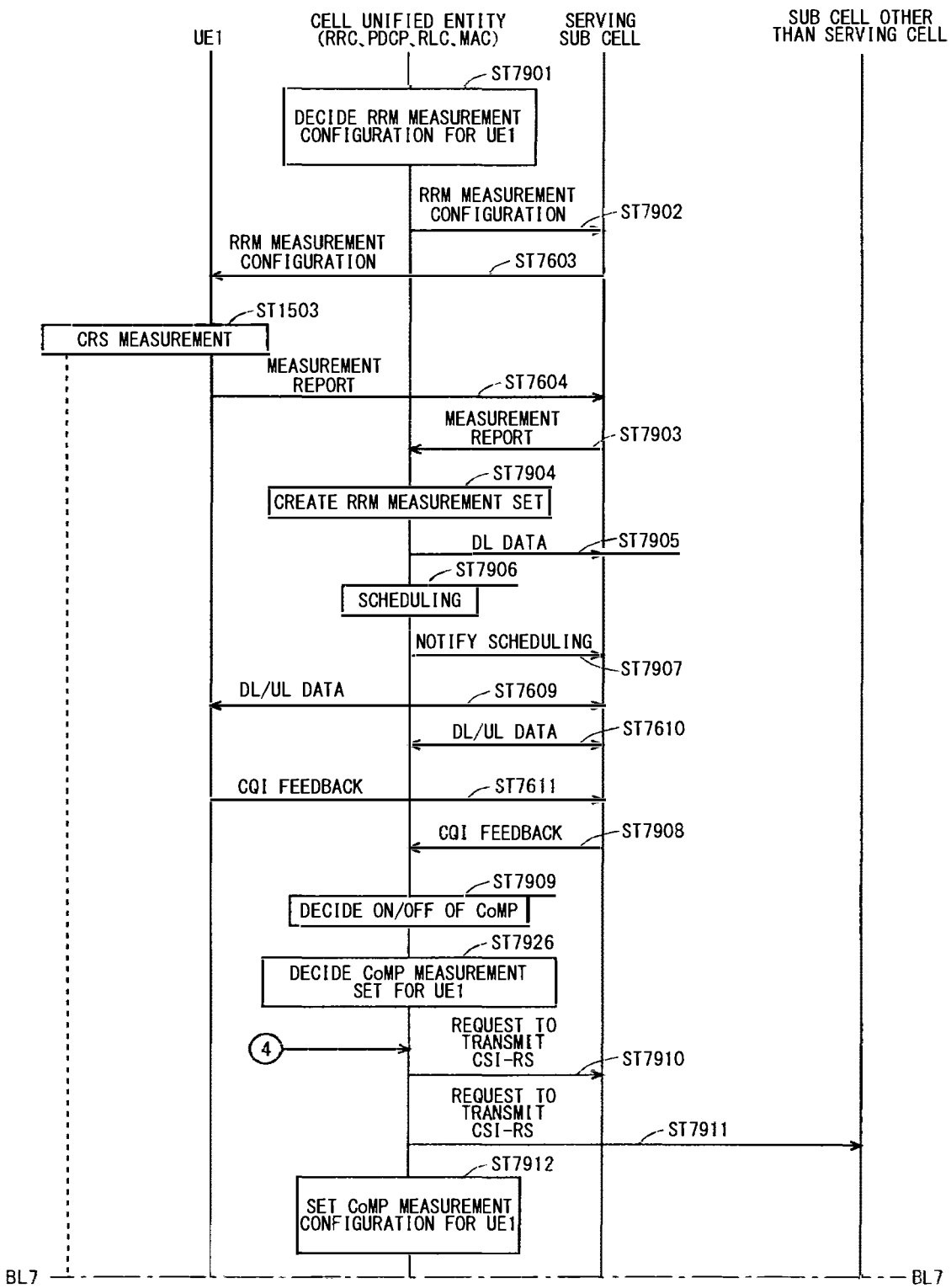
FIG. 41 is a diagram showing an exemplary sequence of the mobile communication system in the seventh embodiment.
Figure 42:
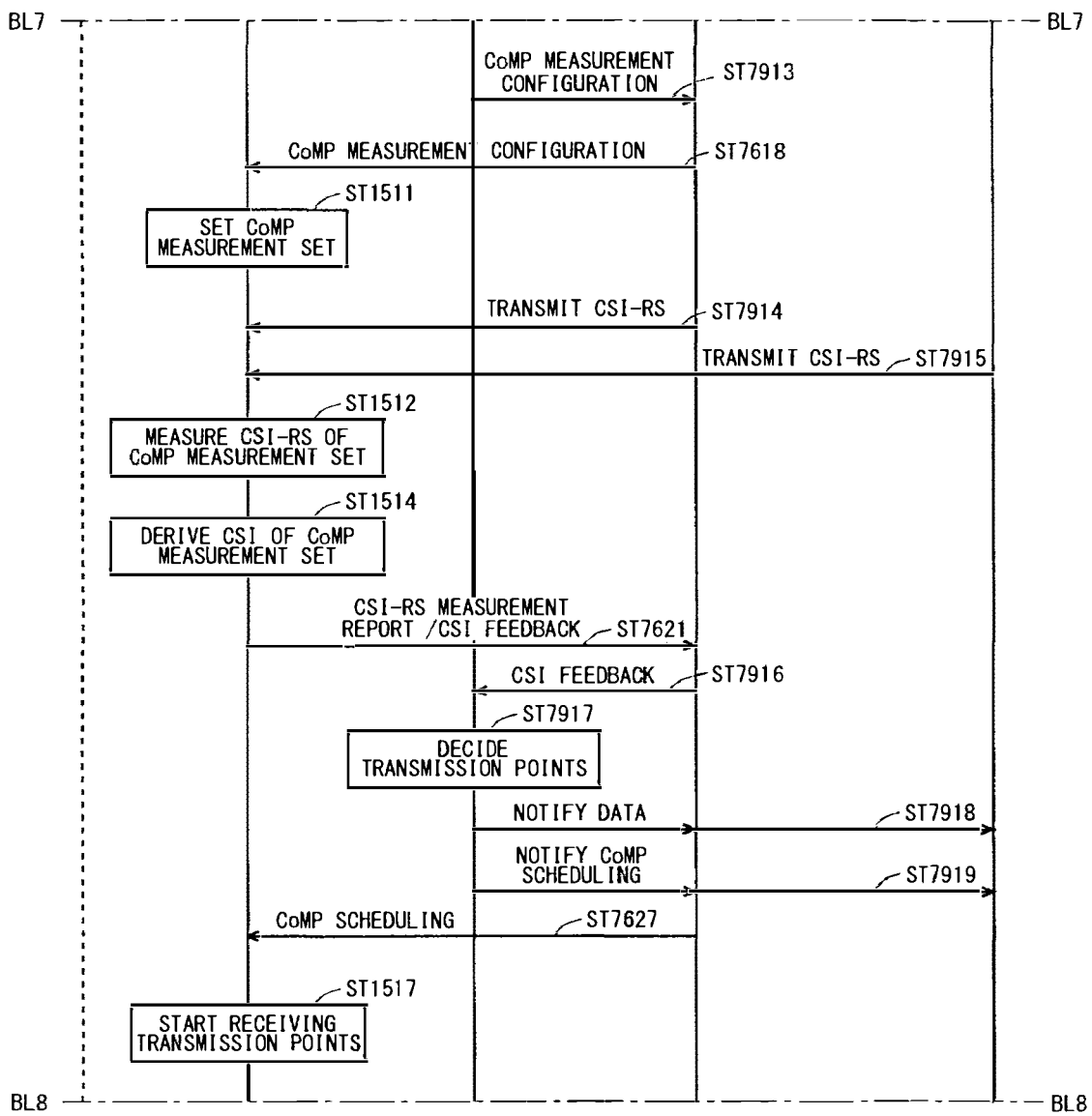
FIG. 42 is another diagram showing the exemplary sequence of the mobile communication system in the seventh embodiment.

FIG. 41 to FIG. 43 are diagrams showing another exemplary sequence of the mobile communication system in the seventh embodiment. FIGS. 41 and 42 are continuous with each other at a boundary BL7. FIGS. 42 and 43 are continuous with each other at a boundary BL8. The sequence shown in FIGS. 41 to 43 is similar to the sequences shown in FIGS. 15 and 16 and FIGS. 36 to 38, and thus, the same steps will be denoted by the same step numbers and common description will be omitted. FIG. 41 to FIG. 43 show the sequence of performing CoMP in the case where a sub cell is differentiated from a second cell unified entity including an RRC 7514, a PDCP 7515, an RLC 7516, and a MAC 7517. This sequence shows the case where the central entity is configured in the second cell unified entity, and thus, the central entity and the second cell unified entity are not particularly differentiated from each other and are referred to as a second cell unified entity. The same holds true for the case where the central entity is configured in a third cell unified entity.

In Step ST7901, the second cell unified entity sets an RRM measurement configuration. The details of the process of Step ST7901 are similar to those of the process of Step ST1501 of FIGS. 15 and 16.

In Step ST7902, the second cell unified entity notifies the serving sub cell of the RRM measurement configuration set in Step ST7901.

In Step ST7903, the serving sub cell notifies the second cell unified entity of the report of the measurement results received in Step ST7604.

In Step ST7904, the second cell unified entity creates an RRM measurement set. The details of the process of Step ST7904 are similar to those of the process of Step ST1505 of FIGS. 15 and 16.

In Step ST7905, the second cell unified entity notifies the serving sub cell of data. Specifically, the second cell unified entity notifies the data directed to the UE1. Specific examples of the types of data to be notified include a MAC data unit. The data to be notified may be MAC PDU data or MAC SDU data. The parameters required for the data may be notified together.

In Step ST7906, the second cell unified entity performs data scheduling. The second cell unified entity may perform MAC scheduling.

In Step ST7907, the second cell unified entity notifies the serving sub cell of the scheduling performed in Step ST7906.

In Step ST7908, the serving sub cell notifies the second cell unified entity of the CQI feedback data received in Step ST7611.

In Step ST7909, the second cell unified entity decides whether or not to perform CoMP. The details of the process of Step ST7909 are similar to those of the process of Step ST1508 of FIGS. 15 and 16.

In Step ST7926, the second cell unified entity selects and decides a CoMP measurement set. The details of the process of Step ST7926 are similar to those of the process of Step ST1530 of FIGS. 15 and 16.

If the second cell unified entity can recognize the load condition of the sub cell included in the CoMP measurement set to judge whether or not the CoMP measurement set sub cell can join the CoMP measurement set for the UE1, the processes equivalent to Steps ST7101 and ST7102 of FIGS. 29 to 31 can be omitted. The second cell unified entity is provided in the mobile communication system that supports CoMP in this manner, preventing a control delay.

In Step ST7910, the second cell unified entity requests the serving sub cell to start transmitting the CSI-RS.

In Step ST7911, the second cell unified entity requests the CoMP measurement set sub cell to start transmitting the CSI-RS.

In Step ST7912, the second cell unified entity sets the CoMP measurement configuration for the UE1. The details of the process of Step ST7912 are similar to those of the process of Step ST1509 of FIGS. 15 and 16.

In Step ST7913, the second cell unified entity notifies the serving sub cell of the CoMP measurement configuration for the UE1 set in Step ST7912.

In Step ST7914, the serving sub cell transmits the CSI-RS to the UE1. The serving sub cell may receive a request to start transmitting the CSI-RS from the second cell unified entity in Step ST7910 to start transmitting the CSI-RS. This allows the serving sub cell to transmit the CSI-RS only in the case where a user equipment being served by the serving sub cell performs measurement using the CSI-RS, reducing the power consumption of the serving sub cell.

In Step ST7915, the CoMP measurement set sub cell transmits the CSI-RS to the UE1. The CoMP measurement set sub cell may start transmitting the CSI-RS upon receipt of a request to start transmitting the CSI-RS from the second cell unified entity in Step ST7911. This allows the CoMP measurement set sub cell to transmit the CSI-RS only in the case where a user equipment being served by the CoMP measurement set sub cell performs measurement using the CSI-RS, reducing the power consumption of the sub cell included in the CoMP measurement set.

In Step ST7916, the serving sub cell notifies the second cell unified entity of the CSI-RS measurement results received in Step ST7621.

In Step ST7917, the second cell unified entity decides CoMP transmission points. The details of the process of deciding CoMP transmission points are similar to those of the process of Step ST1516 shown in FIG. 16.

In Step ST7918, the second cell unified entity notifies the serving sub cell and the CoMP measurement set sub cell of the data directed to the UE1. Specifically, the second cell unified entity notifies the data for CoMP directed to the UE1.

The following three (1) to (3) will be disclosed as specific examples of the types of data to be notified.

(1) PDCP data unit, which may be PDCP PDU data or PDCP SDU data.

(2) RLC data unit, which may be RLC PDU data or RLC SDU data.

(3) MAC data unit, which may be MAC PDU data or MAC SDU data.

The parameters required for the data at each layer may be notified together. As specific examples of the parameters, the parameters required for the RLC process and the parameters required for the MAC process are notified in the case where (1) the PDCP data unit is notified, or the parameters required for the MAC process are notified in the case where (2) the RLC data unit is notified.

A specific example of the cell notified of the data directed to the UE1 by the second cell unified entity is similar to that of the first cell unified entity of FIGS. 36 to 38, which will not be described here.

In Step ST7919, the second cell unified entity notifies the serving sub cell and the CoMP measurement set sub cell of CoMP scheduling including the information indicative of the CoMP transmission points decided in Step ST7917. Or, the second cell unified entity may notify the CoMP transmission sub cell and the CoMP active set sub cell of CoMP scheduling.

In Step ST7920, the serving sub cell notifies the second cell unified entity of the CSI feedback data received in Step ST7630.

In Step ST7921, the serving sub cell notifies the second cell unified entity of the report of the measurement results received in Step ST7631.

In Step ST7922, the second cell unified entity that has received the measurement report in Step ST7921 changes the RRM measurement set as required. The details of the process of Step ST7922 are similar to those of the process of Step ST1524 of FIGS. 15 and 16.

In Step ST7923, the second cell unified entity judges whether or not to change the CoMP measurement set. The details of the process of Step ST7923 are similar to those of the process of Step ST1525 of FIGS. 15 and 16. If judging to change the CoMP measurement set in Step ST7923, the second cell unified entity changes the cells in the CoMP measurement set and returns to the process of Step ST7910. If judging not to change the CoMP measurement set in Step ST7923, the second cell unified entity moves to Step ST7924.

In Step ST7924, the second cell unified entity decides to release CoMP, namely, stop performing CoMP.

In Step ST7925, the second cell unified entity notifies the serving sub cell of the release of the CoMP measurement configuration for the UE1.

Figure 44:
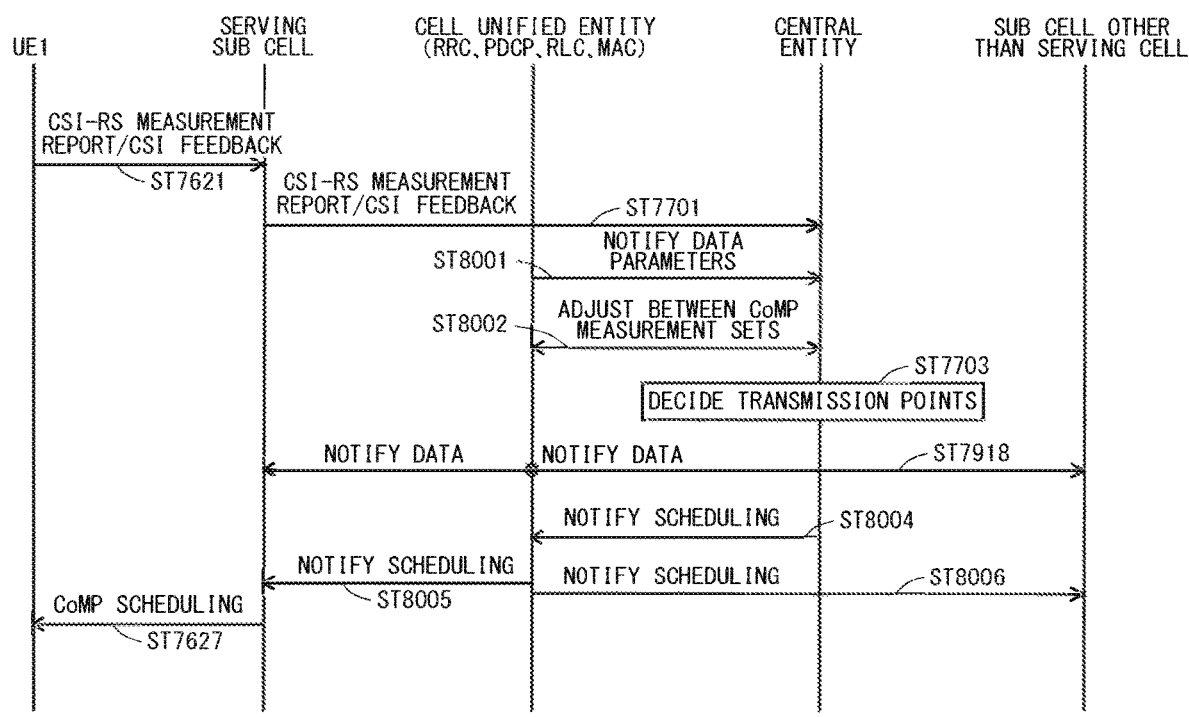
FIG. 44 is a diagram showing an exemplary sequence of the mobile communication system in the seventh embodiment.

FIG. 44 is a diagram showing another exemplary sequence of the mobile communication system in the seventh embodiment. The same steps of the sequence shown in FIG. 44 as those of the sequence shown in FIGS. 36 to 39 and FIGS. 41 to 43 will be denoted by the same step numbers, and common description will be omitted. FIG. 44 shows the sequence when the central entity decides CoMP transmission points, where the central entity is differentiated from the second cell unified entity. FIG. 44 shows another specific example of the processes of Steps ST7621 to ST7627 of FIG. 41 to FIG. 43. The same holds true for the case where the central entity is differentiated from the third cell unified entity.

In Step ST8001, the second cell unified entity notifies the central entity of the information on the data to be subjected to CoMP (hereinafter, also referred to as "data parameters"). Specific examples of the data parameters include an amount of data and service QoS information. The second cell unified entity may notify the central entity of the data to be subjected to CoMP.

In Step ST8002, the central entity performs adjustment between CoMP measurement sets for achieving CoMP of the data to be subjected to CoMP received in Step ST8001. The central entity may perform adjustment between CoMP active sets. Specifically, the central entity performs, with the second cell unified entity, adjustment as to whether or not the serving sub cell and the CoMP measurement set sub cell can accept the data transmission. The second cell unified entity performs scheduling to the UE that is not a CoMP target, being served by the serving sub cell, and scheduling to the UE that is not a CoMP target, being served by the CoMP measurement set sub cell, whereby the adjustment allows for optimum scheduling. Adjustment with each sub cell is not required but collective adjustment with the second cell unified entity is only required, and thus, a control delay can be prevented by providing the second cell unified entity in the mobile communication system that supports CoMP.

In Step ST7703, the central entity decides CoMP scheduling. The central entity performs CoMP scheduling for the UE1 based on the information on the data to be subjected to CoMP that has been received in Step ST8001 and the results of the adjustment performed with the second cell unified entity in Step ST8002. Specifically, the central entity decides CoMP transmission points. The details of the process of Step ST7703 are similar to those of the processes of Step ST1516 of the sequence shown in FIGS. 15 and 16.

After that, the central entity may perform adjustment again between the CoMP transmission points to decide the final CoMP scheduling.

In Step ST8004, the central entity notifies the second cell unified entity of the CoMP scheduling decided in Step ST7703.

In Step ST8005, the second cell unified entity notifies the serving sub cell of the scheduling received in Step ST8004. The central entity may notify the serving sub cell of the scheduling decided in Step ST7703.

In Step ST8006, the second cell unified entity notifies the CoMP measurement set sub cell of the CoMP scheduling received in Step ST8004. The central entity may notify the CoMP measurement set sub cell of the CoMP scheduling decided in Step ST7703.

Figure 45:
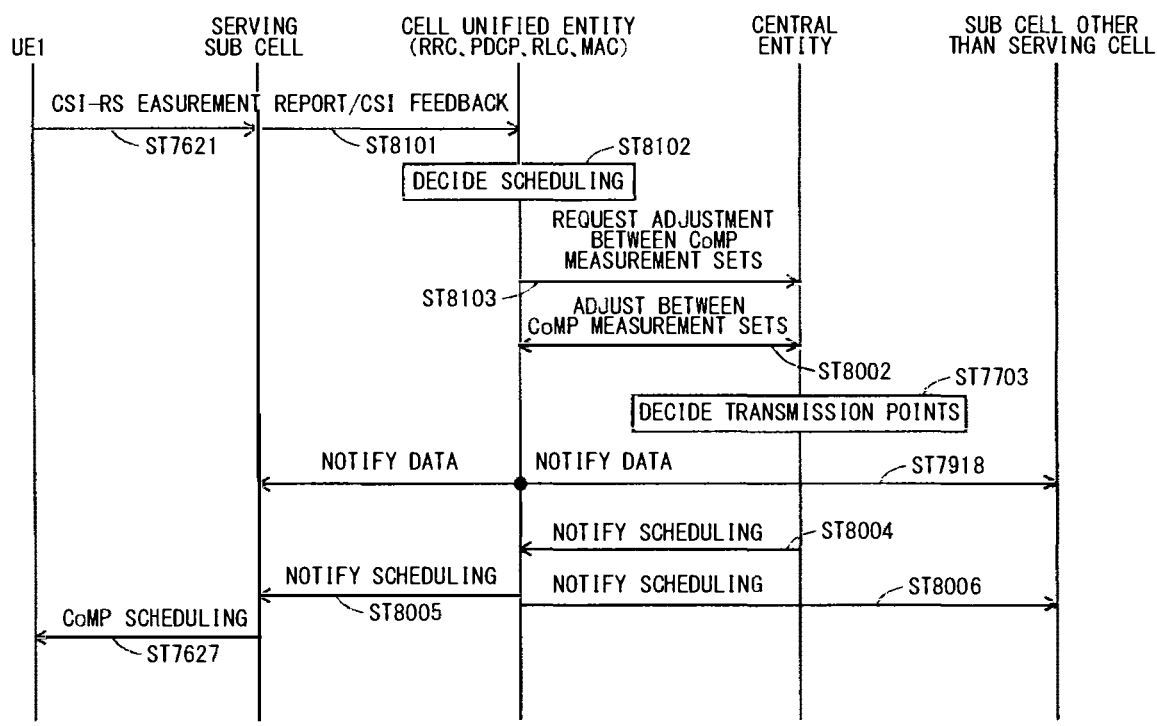
FIG. 45 is a diagram showing an exemplary sequence of the mobile communication system in the seventh embodiment.

FIG. 45 is a diagram showing another exemplary sequence of the mobile communication system in the seventh embodiment. The same steps of the sequence shown in FIG. 45 as those of the sequences shown in FIGS. 36 to 39 and FIGS. 41 to 43 will be denoted by the same step numbers, and common description will be omitted. FIG. 45 shows the sequence when the second cell unified entity and the central entity decide CoMP transmission points together, where the central entity is differentiated from the second cell unified entity. FIG. 45 shows another specific example of the processes of Steps ST7621 to ST7627 of FIG. 41 to FIG. 43. The same holds true for the case where the central entity is differentiated from the third cell unified entity.

In Step ST8101, the serving sub cell notifies the second cell unified entity of the CSI-RS measurement results received in Step ST7601. Specific examples of the CSI-RS measurement results include CSI-RS measurement report and CSI feedback information.

In Step ST8102, the second cell unified entity decides scheduling, by its own cell alone, for the UE1. The decision may be made temporally.

In Step ST8103, the second cell unified entity notifies the central entity of a request to perform adjustment between CoMP measurement sets. When notifying an adjustment request, the second cell unified entity may notify the scheduling decided in Step ST8102. Specific examples of scheduling include time-frequency resources. The second cell unified entity may request an adjustment between CoMP active sets.

The second cell unified entity may have the function of the central entity. Or, the central entity may have the function of the second cell unified entity. Or, the same entity may have the function of the central entity and the function of the second cell unified entity. FIGS. 41 to 43 show this example.

Alternatively, the third cell unified entity may have the function of the central entity. Or, the central entity may have the function of the third cell unified entity. Or, the same entity may have the function of the central entity and the function of the third cell unified entity. FIGS. 41 to 43 show this example.

This does not require the signaling and communication between the second cell unified entity and the central entity, preventing a control delay. Or, the signaling and communication between the third cell unified entity and the central entity are not necessary, preventing a control delay.

Specifically, for example, the processes of Steps ST8001, ST8002, and ST8004 of FIG. 44 or the processes of Steps ST8103, ST8002, and ST8004 of FIG. 45 can be omitted.

If the central entity has the function of scheduling all the UEs being served by the cell included in the CoMP measurement set of the second cell unified entity, the adjustment between CoMP measurement sets, the adjustment between CoMP active sets, or the adjustment between CoMP transmissions is not necessary. This prevents a control delay and reduces a processing load.

If the central entity has the function of scheduling all the UEs being served by the cell included in the CoMP measurement set of the third cell unified entity, the adjustment between CoMP measurement sets, the adjustment between CoMP active sets, or the adjustment between CoMP transmissions is not necessary. This prevents a control delay and reduces a processing load.

If the MAC functions which include the function difficult to be shared in a plurality of radio areas exist, the second cell unified entity is hard to obtain. In such a case, if this function is shared, the third cell unified entity is useful, which shares, among the MAC functions to prevent a control delay and reduce a processing load when CoMP is performed, at least the scheduling function in a plurality of radio areas.

Hereinafter, eNB refers to a device which has at least one cell and a related interface in the seventh embodiment, the eighth embodiment, the ninth embodiment, and the tenth embodiment. Also, sub eNB refers to a device in which one or a plurality of sub cells and related interfaces are installed. The sub eNB also includes an RRH.

The central entity may be installed in the eNB, sub eNB, MME, and HeNBGW or installed in a new device. Herein, the new device in which the central entity is installed is referred to as a CoMP adjustment device.

The cell unified entity may be installed in the eNB, sub eNB, MME, and HeNBGW or may be installed in a new device. Herein, the new device in which the cell unified entity is installed is referred to as a cell controller. The CoMP adjustment device and the cell controller may be the same device.

The interface between entities may differ depending on the device in which entities are mounted. For example, the S1 interface is used between the MME and the eNB. The S1 interface is used between the HeNBGW and the HeNB. The S1 interface is used between the HeNBGW and the MME. The X2 interface is used between the eNBs. A dedicated line is used between the eNB and the sub eNB. The dedicated line for the sub eNBs being RRHs may be also referred to as an optical fiber.

The seventh embodiment above can achieve similar effects to those of the first embodiment.

Eighth Embodiment

A problem to be solved in an eighth embodiment will be described below. 3GPP has disclosed nothing about the UE mobility during CoMP. This causes a problem that CoMP cannot be performed in the mobile communication system.

The solution to this problem will be described below. The serving cell before handover (hereinafter, also referred to as a "source cell") stops performing CoMP. Specifically, the source cell stops performing CoMP when deciding to perform handover. The source cell stops performing CoMP before notifying the UE being a handover target of an instruction of handover. That is, the source cell does not use CoMP when notifying the UE being a handover target of an RRC connection reconfiguration message including the mobility control information to which the parameters required for handover are mapped, and a handover command.

Specific examples of the method of stopping the execution of CoMP will be disclosed below. A CoMP measurement configuration is released as the mobile communication system.

The following three (1) to (3) will be disclosed as specific examples of the method of releasing a CoMP measurement configuration as the mobile communication system.

(1) If deciding to perform handover, the source cell requests the UE being a handover target to release the CoMP measurement configuration. The source cell may confirm that there is no continuing HARQ process and then request the UE being a handover target to release the CoMP measurement configuration. When requesting the UE being a handover target to release the CoMP measurement configuration, the source cell may notify together that handover is a cause.

The UE that has received the request to release the CoMP measurement configuration may release the CoMP measurement configuration and stop measuring the CSI-RS of the cell in the CoMP measurement set.

When releasing the CoMP measurement configuration, the UE may store the cell radio information (RAN information) included in the CoMP measurement set. The serving cell after handover (hereinafter, also referred to as a "target cell") may reset the CoMP measurement set at the source cell. In such a case, a control delay can be prevented by storing radio information by the UE.

The UE may store the radio information when releasing the CoMP measurement configuration due to handover. In this case, when requesting the UE being a handover target to release the CoMP measurement configuration, the source cell may notify together that handover is a cause.

The UE that has received a request to release the CoMP measurement configuration due to handover stores the radio information of the cell included in the CoMP measurement set. Meanwhile, the UE that has received a request to release the CoMP measurement configuration due to a cause other than handover may avoid storing the radio information of the cell included in the CoMP measurement set.

The following 14 (a) to (n) will be disclosed as specific examples of the radio information of the CoMP measurement set.

(a) PCI, (b) downlink timing, (c) MIB information, (d) SIB information, (e) CSI-RS information, (f) TA, (g) transmission-reception timing difference (TX-RX timing difference), (h) received MIMO information, (i) phase difference with other cell, (j) location information of UE during measurement, (k) time information during measurement, (l) EDPCCH configuration, (m) reception quality information, and (n) combination of (a) to (m) above.

(2) If deciding to perform handover, the source cell requests the cell included in the CoMP measurement set to release the CoMP measurement configuration. The source cell may confirm that there is no continuing HARQ process, and then request the cell included in the CoMP measurement set to release the CoMP measurement configuration. The cell included in the CoMP measurement set, which has received the request to release the CoMP measurement configuration, stops transmitting the CSI-RS.

(3) If deciding to perform handover, the source cell stops notifying the data for CoMP directed to the UE1. Specifically, the source cell stops notifying the cell included in the CoMP measurement set of the data directed to the UE1. The source cell may confirm that there is no continuing HARQ process and then stop notifying the data for CoMP directed to the UE1. The source cell may stop notifying the cell included in the CoMP active set of the data directed to the UE1 or notifying the CoMP transport point of the data directed to the UE1.

If deciding to perform handover, the source cell stops notifying CoMP scheduling for the UE1. Specifically, the source cell stops notifying the cell included in the CoMP measurement set of CoMP scheduling for the UE1. The source cell may confirm that there is no continuing HARQ process and then stop notifying CoMP scheduling for the UE1. The source cell may stop notifying the cell included in the CoMP active set of CoMP scheduling for the UE1 or notifying the CoMP transport point of CoMP scheduling for the UE1.

The serving cell or the central entity may manage a CoMP measurement set. The CoMP measurement set may be managed per UE. The serving cell or central entity being the entity that manages the CoMP measurement set may store the CoMP measurement configuration as the past information also after releasing the CoMP measurement configuration.

Figure 46:
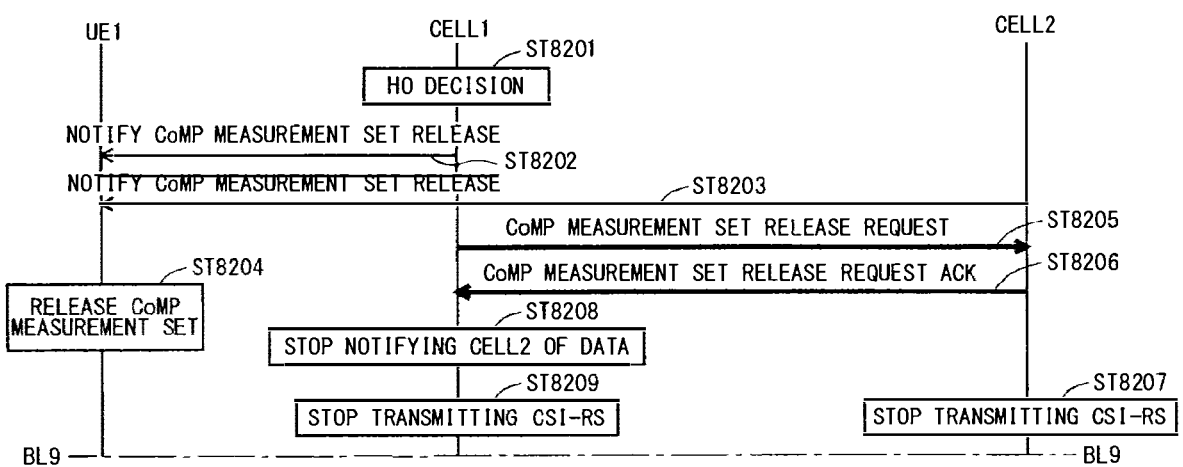
FIG. 46 is an exemplary sequence of a mobile communication system in an eighth embodiment.

FIGS. 46 and 47 are diagrams showing an exemplary sequence of a mobile communication system in the eighth embodiment. FIGS. 46 and 47 are continuous with each other at a boundary BL9. FIGS. 46 and 47 show the sequence in the case where the UE1 moves from the sub cell1 to the sub cell2 while CoMP is performed on the UE1 with the sub cell1 and the sub cell2 being serving sub cells. This sequence shows the case where the central entity is configured in the serving cell, and thus, the central entity and the serving cell are not particularly differentiated from each other and are referred to as a serving cell.

In Step ST8201, the cell1 judges whether or not to cause the UE1 to perform handover. If judging to cause the UE1 to perform handover, the cell1 stops performing CoMP on the UE1. Specifically, the cell1 decides to release the CoMP measurement configuration. Also, if judging to cause the UE1 to perform handover, the cell1 decides a target cell being a handover destination. In this exemplary operation, the cell2 is selected as a target cell.

In Step ST8202, the cell1 requests the UE1 to release the CoMP measurement configuration (CoMP measurement set release). In Step ST8203, the cell2 requests the UE1 to release the CoMP measurement configuration (CoMP measurement set release). This exemplary operation has disclosed that CoMP is performed with the cell1 and the cell2 when a release of the CoMP measurement configuration is requested. Alternatively, a request to release the CoMP measurement configuration may be notified only from the cell1 without using CoMP in releasing the CoMP measurement configuration.

In Step ST8204, the UE1 that has received the request to release the CoMP measurement configuration releases the CoMP measurement configuration.

In Step ST8205, the cell1 being the serving cell requests the cell2 being the cell included in the CoMP measurement set of the release of the CoMP measurement configuration.

In Step ST8206, the cell2 being the cell included in the CoMP measurement set notifies a response to the request to release the CoMP measurement configuration.

In Step ST8207, the cell2 being the cell included in the CoMP measurement set, which has received the request to release the CoMP measurement configuration in Step ST8205, stops transmitting the CSI-RS.

In Step ST8208, the cell1 being the serving cell stops notifying the cell2 being the cell included in the CoMP measurement set of the data directed to the UE1. Specifically, the cell1 stops notifying the data for CoMP directed to the UE1.

In Step ST8209, the cell1 stops transmitting the CSI-RS.

In Step ST8210, the cell1 being a source cell notifies the cell2 being a target cell of a handover request.

In Step ST8211, the cell2 being a target cell judges whether or not it can accept handover based on the resources and, if judging that it can, notifies the cell1 being a source cell of a handover request acceptance (handover request Ack).

In Step ST8212, the cell1 starts forwarding the data (data forwarding) related to the UE to the cell2. Specifically, the cell1 notifies the data for HO directed to the UE1. The data for HO is notified in PDCP SDU data (see Non-Patent Document 1).

In Step ST8213, the cell1 notifies the UE1 of an RRC connection reconfiguration message including the mobility control information to which the parameters required for handover are mapped. The cell1 simultaneously instructs the UE1 to perform handover. The instruction to perform handover may also be referred to as a "handover command".

In Step ST8214, the UE1 attempts the connection with the cell2 using the parameters received in Step ST8213. In other words, the UE1 transmits RACH to the cell2 and transmits an RRC connection request.

In Step ST8215, the cell2 notifies the UE1 of timing advance (TA) as a response to the process of Step ST8214.

In Step ST8216, the UE1 notifies the cell2 of an RRC connection reconfiguration complete.

The cell2 being a target cell that has received the RRC connection reconfiguration complete may judge that the handover has been completed. Or, the cell2 may judge that the procedure of changing the serving cell has been completed. The target cell that has received the RRC connection reconfiguration complete may reconstruct multiple point communication (CoMP communication). This improves, after handover, the communication quality by means of a plurality of radio links at a cell edge.

In Step ST8217, the cell2 that has received the notification of the RRC connection reconfiguration complete from the UE1 in Step ST8216 performs the path switch process.

In Step ST8218, the cell2 that has completed the path switch process notifies the cell 1 of a UE context release.

In Step ST8219, the cell1 that has received the notification of the UE context release from the cell2 in Step ST8218 releases the radio resources for the UE1.

The detailed operation in the case where CoMP is performed is similar to that of the seventh embodiment. As disclosed in the seventh embodiment, the central entity may decide CoMP transmission points or the serving cell and the central entity may decide CoMP transmission points together. The detailed operation in that case is similar to that of the seventh embodiment.

Figure 48:
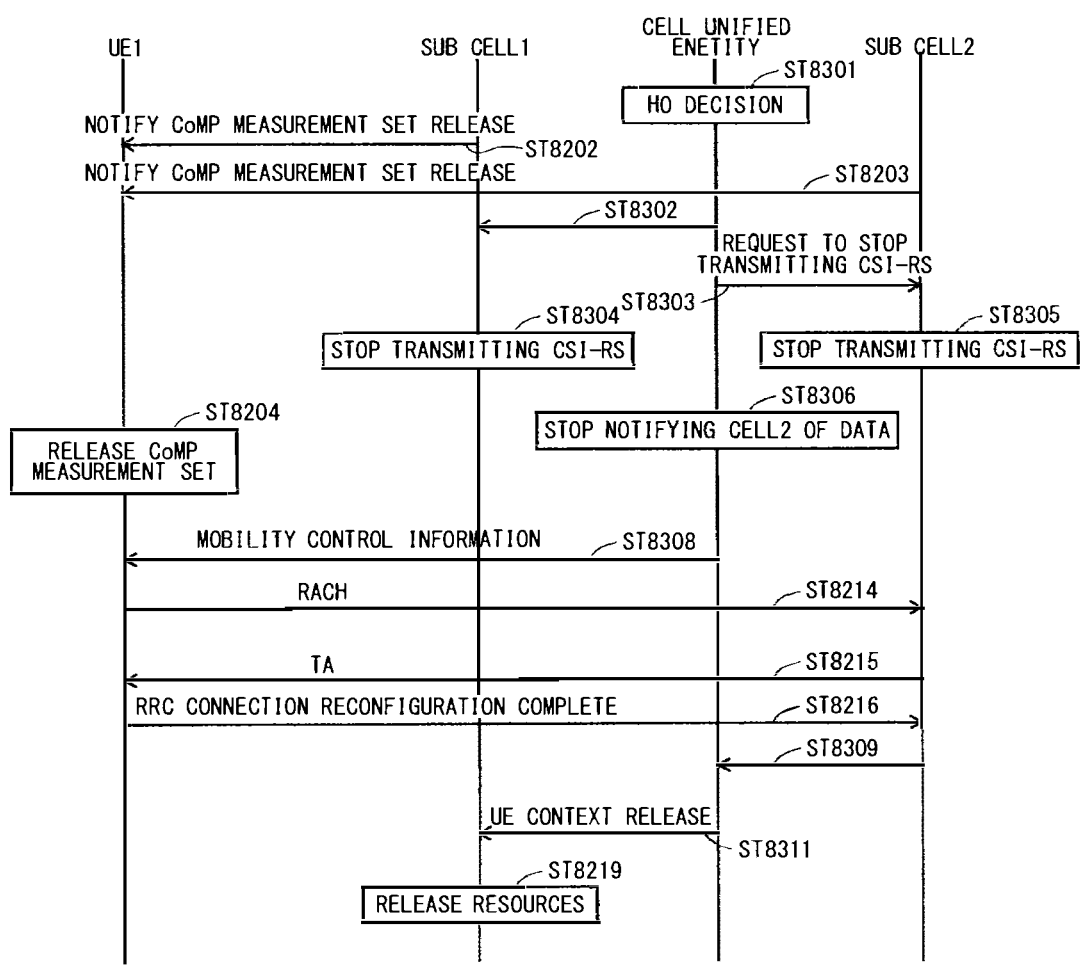
FIG. 48 is a diagram showing an exemplary sequence of the mobile communication system in the eighth embodiment.

FIG. 48 is a diagram showing another exemplary sequence of the mobile communication system in the eighth embodiment. The sequence shown in FIG. 48 is similar to the sequence shown in FIGS. 46 and 47, and thus, the same steps will be denoted by the same step numbers and common description will be omitted.

FIG. 48 shows the sequence of performing CoMP in the case where the cell unified entity is differentiated from the sub cells. This sequence shows the case where the central entity is configured in the serving sub cell or in the central entity, and thus, the central entity and the serving sub cell are not particularly differentiated from the central entity and are referred to as a serving sub cell or central entity.

FIG. 48 shows the sequence in the case where the UE1 moves from the sub cell1 to the sub cell2 while CoMP is performed on the UE1 with the sub cell1 and the sub cell2 being serving sub cells.

The sequence shown in FIG. 48 can be used if the cell unified entity is the first cell unified entity, the second cell unified entity, or the third cell unified entity.

In Step ST8301, the cell unified entity judges whether or not to cause the UE1 to perform handover. If judging to cause the UE1 to perform handover, the cell unified entity stops performing CoMP on the UE1. Specifically, the cell unified entity decides to release the CoMP measurement configuration. Also, if judging to cause the UE1 to perform handover, the cell unified entity decides a target cell being a handover destination. In this exemplary operation, the cell2 is selected as a target cell.

In Step ST8302, the cell unified entity requests the sub cell1 being the cell included in the CoMP measurement set to release the CoMP measurement configuration. The cell unified entity may request to stop transmitting the CSI-RS, not limited to requesting to release the CoMP measurement configuration. Though not shown in FIG. 48, the sub cell1 may notify the cell unified entity of a response to the request to release the CoMP measurement configuration.

In Step ST8303, the cell unified entity requests the sub cell2 being the cell included in the CoMP measurement set to release the CoMP measurement configuration. The cell unified entity may request to stop transmitting the CSI-RS, not limited to requesting to release the CoMP measurement configuration. Though not shown in FIG. 48, the sub cell2 may notify the cell unified entity of a response to the request to release the CoMP measurement configuration.

In Step ST8304, the sub cell1 being the cell included in the CoMP measurement set, which has received the request to release the CoMP measurement configuration, stops transmitting the CSI-RS.

In Step ST8305, the sub cell2 being the cell included in the CoMP measurement set, which has received the request to release the CoMP measurement configuration, stops transmitting the CSI-RS.

In Step ST8306, the cell unified entity stops notifying the sub cell2 included in the CoMP measurement set of the data directed to the UE1. Specifically, the cell unified entity stops notifying the data for CoMP directed to the UE1.

If the cell unified entity can recognize, for example, the load condition of the sub cell to judge whether or not the sub cell2 being a target cell can accept handover, the processes equivalent to Steps ST8210 and ST8211 of FIGS. 46 and 47 can be omitted. The provision of the cell unified entity as described above can prevent a control delay.

Considered here is the case where the cell unified entity has the PDCP functions shared in a plurality of radio areas. Specifically, the case where the cell unified entity has the PDCP functions in the radio area of the serving sub cell and the radio area of the target sub cell in common is considered. In this case, notification of the data for HO between the serving sub cell and the target sub cell is not required. The process equivalent to Step ST8212 of FIG. 47 can be thus omitted. A control delay can be prevented by providing the cell unified entity as described above.

In Step ST8308, the cell unified entity notifies the UE1 of an RRC connection reconfiguration message including the mobility control information to which the parameters required for handover are mapped. At the same time, the cell unified entity instructs the UE1 to perform handover. The instruction to perform handover may also be referred to as a "handover command".

In Step ST8309, the sub cell2 notifies the cell unified entity of the RRC connection reconfiguration complete received in Step ST8216.

Considered here is the case where the cell unified entity has the PDCP functions in a plurality of radio areas in common. Specifically, the case where the cell unified entity has the PDCP functions in the radio area of the serving sub cell and the radio area of the target sub cell in common is considered. In this case, the path switch process from the serving sub cell to the target sub cell is not required. The process equivalent to Step ST8217 of FIG. 47 can be thus omitted. A control delay can be prevented by providing the cell unified entity as described above.

In Step ST8311, the cell unified entity that has completed the path switch process notifies the sub cell1 of a UE context release.

The detailed operation in the case where CoMP is performed is similar to that of the seventh embodiment. The detailed operation of performing CoMP when the first cell unified entity is used and the detailed operation of performing CoMP when the second cell unified entity is used are similar to those of the seventh embodiment. Or, as disclosed in the seventh embodiment, the central entity may decide CoMP transmission points, the serving sub cell and the central entity may decide CoMP transmission points together, or the cell unified entity and the central entity may decide CoMP transmission points together. The detailed operation in that case is similar to that of the seventh embodiment.

The eighth embodiment described above can achieve the following effects. This embodiment has disclosed the handover method while CoMP is performed. The disclosed method allows for handover while CoMP is performed.

Control can be made easier in this embodiment than a tenth embodiment described below. Also, compared with the tenth embodiment, for moving of a UE being subjected to CoMP, this embodiment can allow a base station and a user equipment to operate in a unified manner while preventing the mobile communication system from becoming complicated, obtaining a stable mobile communication system.

First Modification of Eighth Embodiment

This modification will disclose a specific example of the method of stopping the execution of CoMP, which differs from that of the eighth embodiment.

As the mobile communication system, the CoMP active configuration is released. As the mobile communication system, the CoMP measurement configuration is not released, that is, is maintained.

The following six (1) to (6) will be disclosed as specific examples of the method of releasing a CoMP active configuration as the mobile communication system.

(1) If deciding to perform handover, the source cell requests the UE being a handover target to release the CoMP active configuration. The source cell may confirm that there is no continuing HARQ process and then request the UE being a handover target to release the CoMP active configuration.

The UE that has received the request to release the CoMP active configuration releases the CoMP active configuration. The CoMP measurement configuration may not be released. The measurement of the CSI-RS of the in-CoMP-measurement-set cell may be continued.

The UE may store the radio information (RAN information) of the cell included in the CoMP active set when releasing the CoMP active configuration. The target cell may reset the CoMP active configuration at the source cell. In such a case, the UE stores the radio information, preventing a control delay.

The UE may store the radio information when releasing the CoMP active configuration due to handover. In this case, when requesting the UE being a handover target to release the CoMP active configuration, the source cell may notify together that handover is a cause.

The UE that has received the request to release the CoMP active configuration due to handover stores the radio information of the cell included in the CoMP active set. The UE that has received the request to release the CoMP active configuration due to a cause other than handover may avoid storing the radio information of the cell included in the CoMP active set.

A specific example of the radio information of the CoMP active set is similar to that of the radio information of the CoMP measurement set in the eighth embodiment.

(2) If deciding to perform handover, the source cell does not request the cell included in the CoMP measurement set to release the CoMP measurement configuration. In other words, the cell included in the CoMP measurement set continues transmitting the CSI-RS.

(3) If deciding to perform handover, the source cell stops notifying the data for CoMP directed to the UE1. Specifically, the source cell stops notifying the cell included in the CoMP measurement set of the data directed to the UE1. The source cell may confirm that there is no continuing HARQ process and then stop notifying the data for CoMP directed to the UE1. The source cell may stop notifying the cell included in the CoMP measurement set of the data directed to the UE1, notifying the cell included in the CoMP active set of the data directed to the UE1, or notifying the CoMP transport point of the data directed to the UE1.

(4) How to handle the CoMP measurement set will be described.

(4-1) The CoMP measurement set at the source cell is continuously used also in the target cell. Specifically, the source cell notifies the target cell of the CoMP measurement set at the source cell, with a handover request. The target cell continuously uses the CoMP measurement set at the source cell, which has been notified with the handover request, as the CoMP measurement set of the UE being a handover target. In this case, if it can continuously use the CoMP measurement set at the source cell, the target cell notifies the source cell of this (Ack). The target cell may notify that it can continuously use the CoMP measurement set at the source cell, with a handover request acceptance (Handover request Ack).

If it cannot continuously use the CoMP measurement set at the source cell, the target cell notifies the source cell of this (Nack). The target cell may notify that it cannot continuously use the CoMP measurement set at the source cell, with a handover request acceptance (Handover Request Ack).

If it continuously uses the CoMP measurement set at the source cell, the target cell may notify the CoMP measurement configuration again with an RRC connection reconfiguration message including the mobility control information to which the parameters required for handover are mapped. This reduces a mismatch between the states of the target cell and the UE.

Or, the target cell may not notify the CoMP measurement configuration again but may notify the information indicating that the CoMP measurement set at the source cell is continuously used also in the target cell, such as an indicator, with the RRC connection reconfiguration message including the mobility control information to which the parameters required for handover are mapped. This reduces an amount of control information.

Or, the target cell may statically or semi-statically decide to keep the CoMP measurement set during handover as the mobile communication system. This reduces an amount of control information. The information to be added to the RRC connection reconfiguration message including the mobility control information to which the parameters required for handover are mapped is not required, allowing for construction of a mobile communication system having backward compatibility.

The CoMP active set can be handled similarly to the CoMP measurement set.

(4-2) The source cell preliminarily notifies the UE of the CoMP measurement set scheduled to be used for the UE in the target cell. The CoMP measurement set may be notified before handover.

If the target cell cannot continuously use the CoMP measurement set at the source cell, the target cell notifies the CoMP measurement set scheduled to be used for the UE in the target cell. The CoMP measurement set scheduled to be used for the UE may be notified with a handover request acceptance (Handover Request Ack).

The set preliminarily decided uniquely to the target cell may be used as the CoMP measurement set scheduled to be used for the UE in the target cell. For example, it may be the set to be decided depending on the location of the target cell, not to be decided per UE. This is because the UE does not perform measurement in the target cell.

The CoMP measurement set scheduled to be used for the UE in the target cell may be notified with the RRC connection reconfiguration message including the mobility control information to which the parameters required for handover are mapped. This allows the UE to preliminarily know the CoMP measurement set scheduled to be used for the UE in the target cell, preventing a control delay. After handover, the UE may use the CoMP measurement set scheduled to be used for the UE in the target cell.

The CoMP active set can be handled similarly to the CoMP measurement set.

(5) The UE that has received the handover command may continue measuring the CSI-RS of the in-CoMP-measurement-set cell in the target cell.

(6) The cell1 that has been notified from the target cell that it had completed the path switch process performs the following process. The source cell decides to release the CoMP measurement configuration for the UE being a handover target. The source cell may stop transmitting the CSI-RS. The source cell requests the cell included in the CoMP measurement set to release the CoMP measurement configuration. The source cell may confirm that there is no continuing HARQ process and then request the cell included in the CoMP measurement set to release the CoMP measurement configuration.

The cell included in the CoMP measurement set, which has received the request to release the CoMP measurement configuration, stops transmitting the CSI-RS.

Figure 49:
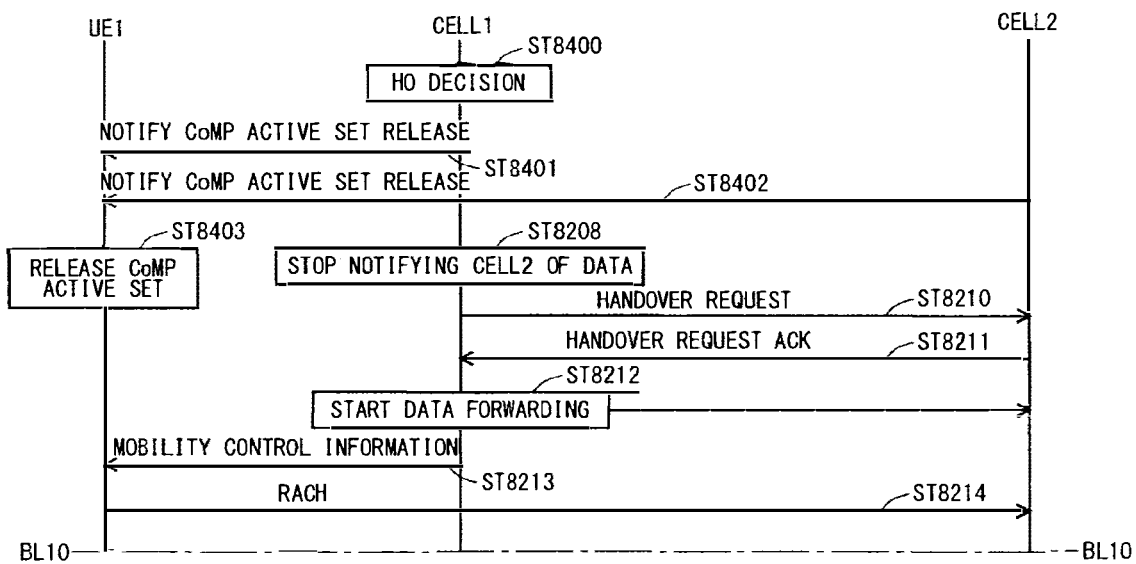
FIG. 49 is a diagram showing an exemplary sequence of a mobile communication system in a first modification of the eighth embodiment.

FIGS. 49 and 50 are diagrams showing an exemplary sequence of a mobile communication system in the first modification of the eighth embodiment. FIGS. 49 and 50 are continuous with each other at a boundary BL10. The sequence shown in FIGS. 49 and 50 is similar to the sequence shown in FIGS. 46 and 47, and thus, the same steps will be denoted by the same step numbers, and common description will be omitted. FIGS. 49 and 50 show the sequence in the case where the UE1 moves from the cell1 to the cell2 while CoMP is performed on the UE1 using the cell1 and the cell2 being serving cells. This sequence shows the case where the central entity is configured in the serving cell, and thus, the central entity and the serving cell are not particularly limited and are referred to as a serving cell.

In Step ST8400, the cell1 judges whether or not to cause the UE1 to perform handover. If judging to cause the UE1 to perform handover, the cell1 stops performing CoMP on the UE1. Specifically, the cell1 decides to release the CoMP active configuration. If judging to cause the UE1 to perform handover, the cell1 decides a target cell being a handover target. In the exemplary operation, the cell1 selects the cell2 as the target cell.

In Step ST8401, the cell1 requests the UE1 to release the CoMP active configuration (CoMP active set release). In Step ST8402, the cell2 requests the UE1 to release the CoMP active configuration (CoMP active set release). This exemplary operation has disclosed that CoMP is performed with the cell1 and the cell2 when the release the CoMP active configuration is requested. Alternatively, without CoMP used in the release of the CoMP active configuration, only the cell1 may notify the request to release the CoMP measurement configuration.

In Step ST8403, the UE1 that has received the request to release the CoMP active configuration releases the CoMP active configuration.

In Step ST8404, the cell1 that has received the notification of the UE context release from the cell2 in Step ST8218 decides to release the CoMP measurement configuration. The cell1 may decide to release the CoMP active configuration in place of releasing the CoMP measurement configuration.

In Step ST8405, the cell1 being the serving cell requests the cell2 being the cell included in the CoMP measurement set to release the CoMP measurement configuration.

In Step ST8406, the cell2 being the cell included in the CoMP measurement set notifies a response to the request to release the CoMP measurement configuration.

In Step ST8407, the cell2 being the cell included in the CoMP measurement set, which has received the request to release the CoMP measurement configuration in Step ST8405, stops transmitting the CSI-RS.

In Step ST8408, the cell1 that has decided to release the CoMP measurement configuration in Step ST8404 stops transmitting the CSI-RS.

The detailed operation in the case where CoMP is performed is similar to that of the seventh embodiment. As disclosed in the seventh embodiment, the central entity may decide CoMP transmission points, or the serving cell and the central entity may decide CoMP transmission points together. The detailed operation in that case is similar to that of the seventh embodiment.

FIGS. 51 and 52 are diagrams showing another exemplary sequence of the mobile communication system in the first modification of the eighth embodiment. The sequence shown in FIGS. 51 and 52 is similar to the sequence shown in FIGS. 46 to 50, and thus, the same steps will be denoted by the same step numbers and common description will be omitted. FIGS. 51 and 52 are continuous with each other at a boundary BL11. FIGS. 51 and 52 show the sequence of performing CoMP in the case where the cell unified entity is differentiated from the sub cell. This sequence shows the case where the central entity is configured in the serving sub cell or in the central entity, and thus, the central entity is not particularly differentiated and is referred to as a serving sub cell or a central entity. FIGS. 51 and 52 show the sequence in the case where the UE1 moves from the sub cell1 to the sub cell2 while CoMP is performed on the UE1 with the sub cell1 and the sub cell2 being serving sub cells. The sequence shown in FIGS. 51 and 52 can be used if the cell unified entity is the first cell unified entity, the second cell unified entity, or the third cell unified entity.

In Step ST8500, the cell unified entity judges whether or not to cause the UE1 to perform handover. If judging to cause the UE1 to perform handover, the cell unified entity stops performing CoMP on the UE1. Specifically, the cell unified entity decides to release the CoMP active configuration. If judging to cause the UE1 to perform handover, the cell unified entity decides a target cell being a handover destination. In this exemplary operation, the sub cell2 is selected as the target cell.

If receiving the RRC connection complete in Step ST8309, in Step ST8501, the cell unified entity decides to release the CoMP measurement configuration. The cell unified entity may decide to release the CoMP active configuration in place of releasing the CoMP measurement configuration.

In Step ST8502, the cell unified entity requests the sub cell1 being the cell included in the CoMP measurement set to release the CoMP measurement configuration. This may be a request to stop transmitting the CSI-RS, not limited to the request to release the CoMP measurement configuration. Though not shown in FIGS. 51 and 52, the sub cell1 may notify the cell unified entity of the response to the request to release the CoMP measurement configuration.

In Step ST8503, the cell unified entity requests the sub cell2 being the cell included in the CoMP measurement set to release the CoMP measurement configuration. This may be a request to stop transmitting the CSI-RS, not limited to the request to release the CoMP measurement configuration. Though not shown in FIGS. 51 and 52, the sub cell2 may notify the cell unified entity of a response to the request to release the CoMP measurement configuration.

In Step ST8504, the sub cell2 being the cell included in the CoMP measurement set, which has received the request to release the CoMP measurement configuration, stops transmitting the CSI-RS.

In Step ST8505, the sub cell1 being the cell included in the CoMP measurement set, which has received the request to release the CoMP measurement configuration, stops transmitting the CSI-RS.

The detailed operation in the case where CoMP is performed is similar to that of the seventh embodiment. The detailed operation of performing CoMP using the first cell unified entity and the detailed operation of performing CoMP using the second cell unified entity are similar to those of the seventh embodiment. Alternatively, as disclosed in the seventh embodiment, the central entity may decide CoMP transmission points, or the cell unified entity and the central entity may decide CoMP transmission points together. The detailed operation in that case is similar to that of the seventh embodiment.

The first modification of the eighth embodiment described above can achieve the following effects in addition to the effects of the eighth embodiment. The UE located at a position where CoMP is allowed or the UE that has maintained a reception quality by being subjected to CoMP can continue CoMP measurement. Thus, CoMP can be started promptly even after handover, compared with the eighth embodiment. Also, the source cell can preliminarily notify the UE of the CoMP measurement set scheduled to be used for the UE in the target cell. This eliminates the need for notifying the CoMP measurement set again from the target cell, whereby CoMP can be started promptly even after handover, compared with the eighth embodiment.

Second Modification of Eighth Embodiment

This modification will disclose another specific example of the method of stopping the execution of CoMP, which differs from those of the eighth embodiment and the first modification of the eighth embodiment.

CoMP scheduling is not performed as the mobile communication system. The selection of CoMP transmission points may be avoided.

Specific examples of the method of avoiding CoMP scheduling as the mobile communication system will be disclosed below.

(1) If deciding to perform handover, the source cell notifies the UE being a handover target of nothing because the execution of CoMP is stopped. This allows for effective use of radio resources, compared with the eighth embodiment and the first modification of the eighth embodiment. The CoMP measurement set or the CoMP active configuration need not to be released. The CSI-RS of the in-CoMP-measurement-set cell may be continued.

Other specific examples of the method of avoiding CoMP scheduling in this modification are similar to the specific examples (2), (3), (4), (5), and (6) of the method of releasing the CoMP active configuration in the first modification of the eighth embodiment, which will not be described here.

FIGS. 53 and 54 are diagrams showing an exemplary sequence of a mobile communication system in the second modification of the eighth embodiment. FIGS. 53 and 54 are continuous with each other at a boundary BL12. The sequence shown in FIGS. 53 and 54 is similar to the sequences shown in FIGS. 46 and 47, and FIGS. 49 and 50, and thus, the same steps will be denoted by the same step numbers and common description will be omitted. FIGS. 53 and 54 show the sequence in the case where the UE1 moves from the sub cell1 to the sub cell2 while CoMP is performed on the UE1 with the sub cell1 and the sub cell2 being serving sub cells. This sequence shows the case where the central entity is configured at the serving cell, and thus, the central entity and the serving cell are not particularly differentiated from each other and are referred to as a serving cell.

In Step ST8601, the cell1 judges whether or not to cause the UE1 to perform handover. If judging to cause the UE1 to perform handover, the cell1 stops performing CoMP on the UE1. Specifically, the cell1 decides not to perform CoMP scheduling. Also, if judging to cause the UE1 to perform handover, the cell1 decides the target cell being a handover target. In this exemplary operation, the cell1 selects the cell2 as a target cell.

In Step ST8602, the cell1 being the serving cell stops notifying the cell2 being the cell included in the CoMP transmission points of the data directed to the UE1. Specifically, the cell1 stops notifying the data for CoMP directed to the UE1.

The detailed operation in the case where CoMP is performed is similar to that of the seventh embodiment. As disclosed in the seventh embodiment, the central entity may decide CoMP transmission points, or the serving cell and the central entity may decide CoMP transmission points together. The detailed operation in that case is similar to that of the seventh embodiment.

FIG. 55 is a diagram showing another exemplary sequence of the mobile communication system in the second modification of the eighth embodiment. The sequence shown in FIG. 55 is similar to the sequences shown in FIGS. 46 to 48 and FIGS. 51 and 52, and thus, the same steps will be denoted by the same step numbers and common description will be omitted.

FIG. 55 shows the sequence of performing CoMP in the case where the cell unified entity is differentiated from the sub cell. This sequence shows the case where the central entity is configured in the serving sub cell or in the central entity, and thus, the central entity and the serving sub cell are not particularly differentiated and are referred to as a serving sub cell or central entity.

FIG. 55 shows the sequence in the case where the UE1 moves from the sub cell1 to the sub cell2 while CoMP is performed on the UE1 with the sub cell1 and the sub cell2 being serving sub cells. The sequence shown in FIG. 55 can be used if the cell unified entity is the first cell unified entity, the second cell unified entity, or the third cell unified entity.

In Step ST8701, the cell unified entity judges whether or not to cause the UE1 to perform handover. If judging to cause the UE1 to perform handover, the cell unified entity stops performing CoMP on the UE1. Specifically, the cell unified entity decides not to perform CoMP scheduling. Or, the serving sub cell may decide not to perform CoMP scheduling. Or, if judging to cause the UE to perform handover, the cell unified entity decides a target cell being a handover destination. In this exemplary operation, the sub cell2 is selected as a target cell.

In Step ST8702, the cell unified entity stops notifying the sub cell2 being the cell included in the CoMP transmission points of the data directed to the UE1. Specifically, the cell unified entity stops notifying the data for CoMP directed to the UE1.

The detailed operation in the case where CoMP is performed is similar to that of the seventh embodiment. The detailed operation of CoMP in the case where the first cell unified entity is used and the detailed operation of CoMP in the case where the second cell unified entity is used are similar to those of the seventh embodiment. As disclosed in the seventh embodiment, the central entity may decide CoMP transmission points, or the cell unified entity and the central entity may decide CoMP transmission points together. The detailed operation in that case is similar to that of the seventh embodiment.

The second modification of the eighth embodiment described above can achieve similar effects to those of the eighth embodiment and the first modification of the eighth embodiment.

Ninth Embodiment

A problem to be solved in a ninth embodiment will be described below. In the method of the eighth embodiment, the execution of CoMP is stopped temporarily. As a result, the reception quality of the link, which has been maintained through execution of CoMP, suddenly deteriorates, causing a problem that communication is disconnected. As a specific example, it is conceivable that the UE cannot normally receive the RRC connection reconfiguration message including the mobility control information to which the parameters required for handover are mapped, which is transmitted from the source cell. Thus, the UE cannot normally perform handover, and its communication is disconnected.

A solution to the above-mentioned problem that communication is disconnected will be described below. During the handover process, the source cell continues performing CoMP. In other words, during the handover process, the network including a cell and a sub cell does not release the configuration regarding CoMP. Specifically, the CoMP measurement set and the CoMP active configuration are not released. When notifying the UE being a handover target of the RRC connection reconfiguration message including the mobility control information to which the parameters required for handover are mapped and of a handover command, the source cell performs CoMP.

Specific examples during the handover process include a handover preparation phase, a handover execution phase, and a handover completion phase (see Chapter 10.1.2.1 of Non-Patent Document 1).

The following three (1) to (3) will be disclosed as specific examples of the method in which the source cell continues performing CoMP.

(1) When notifying the UE being a handover target of the RRC connection reconfiguration message including the mobility control information to which the parameters required for handover are mapped and of a handover command, the source cell performs CoMP.

(2) The source cell requests the UE being a handover target to release the CoMP measurement configuration with the RRC connection reconfiguration message including the mobility control information to which the parameters required for handover are mapped, or after notifying the RRC connection reconfiguration message. The source cell may request to release the CoMP active configuration in place of requesting to release the CoMP measurement configuration.

The UE that has received the request to release the CoMP measurement configuration may release the CoMP measurement configuration and stop measuring the CSI-RS of the in-CoMP-measurement-set cell. The UE may release the CoMP measurement configuration at the source cell and may stop measuring the CSI-RS of the cell in CoMP measurement set at the source cell.

Or, as a mobile communication system, the RRC connection reconfiguration message including the mobility control information to which the parameters required for handover during the execution of CoMP are mapped may also imply a request to release the CoMP measurement configuration or a request to release the CoMP active configuration. This reduces an amount of control information. In this case, during CoMP, the UE, which has received the RRC connection reconfiguration message including the mobility control information to which the parameters required for handover are mapped, may release the CoMP measurement configuration, may release the CoMP active configuration, or may stop measuring the CSI-RS of the in-CoMP-measurement-set cell.

The UE may store the radio information when releasing the CoMP measurement configuration due to handover. A specific example thereof is similar to that of the eighth embodiment, which will not be described here.

(3) The cell1 that has been notified that the path switch process had been completed from the target cell performs the following process. Specific examples of the notification that the path switch process has been completed include a notification of UE context release. The source cell stops notifying the data for CoMP directed to the UE1. Specifically, the source cell stops notifying the cell included in the CoMP measurement set of the data directed to the UE1. The source cell may confirm that there is no continuing HARQ process and then stop notifying the data for CoMP directed to the UE1. The source cell may stop notifying the cell included in the CoMP measurement set of the data directed to the UE1, notifying the cell included in the CoMP active set of the data directed to the UE1, or notifying the CoMP transport point of the data directed to the UE1.

Specific examples of another method of continuing performing CoMP by the source cell in this modification are similar to the specific examples (4), (5), and (6) of the method of releasing the CoMP active configuration in the first modification of the eighth embodiment, which will not be described here.

Figure 56:
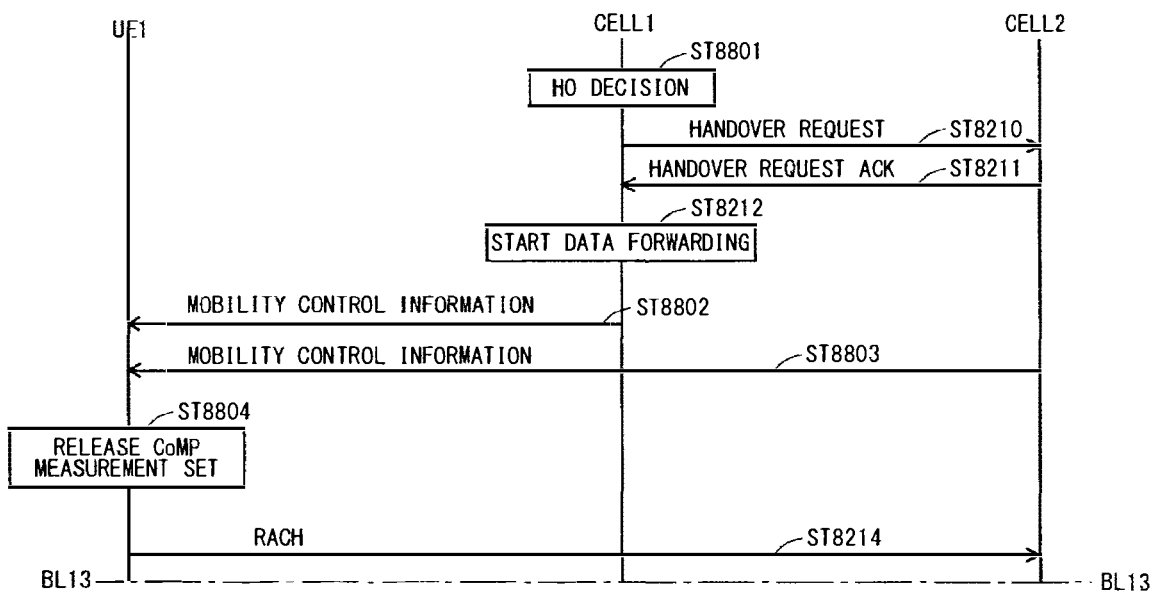
FIG. 56 is a diagram showing an exemplary sequence of a mobile communication system in a ninth embodiment.

FIGS. 56 and 57 are diagrams showing an exemplary sequence of a mobile communication system in a ninth embodiment. FIGS. 56 and 57 are continuous with each other at a boundary BL13. The sequence shown in FIGS. 56 and 57 is similar to the sequences shown in FIGS. 46 and 47 and FIGS. 49 and 50, and thus, the same steps will be denoted by the same step numbers and common description will be omitted. FIGS. 56 and 57 show the sequence in the case where the UE1 moves from the cell1 to the cell2 while CoMP is performed on the UE1 with the cell1 and the cell2 being serving cells. This sequence shows the case where the central entity is configured in the serving cell, and thus, the central entity and the serving cell are not particularly differentiated from each other and are referred to as a serving cell.

In Step ST8801, the cell1 judges whether or not to cause the UE1 to perform handover. If judging to cause the UE1 to perform handover, the cell1 decides to continue performing CoMP on the UE1 by the source cell during the handover process. Also, if judging to cause the UE1 to perform handover, the cell1 decides a target cell being a handover destination. In this exemplary operation, the cell1 selects the cell2 as a target cell.

In Step ST8802, the cell1 notifies the UE1 of the RRC connection reconfiguration message including the mobility control information to which the parameters required for handover are mapped. In Step ST8803, the cell2 notifies the UE1 of the RRC connection reconfiguration message including the mobility control information to which the parameters required for handover are mapped. At the same time, the cell1 instructs the UE1 to perform handover. In this exemplary operation, CoMP is performed with the cell1 and the cell2 in notifying the RRC connection reconfiguration message.

In Step ST8804, the UE1 that has received the request to release the CoMP measurement configuration releases the CoMP measurement configuration.

In Step ST8805, the cell1 that has received the UE context release in Step ST8218 stops notifying the cell included in the CoMP measurement set of the data directed to the UE1. Specifically, the cell1 stops notifying the data for CoMP directed to the UE1.

The detailed operation in the case where CoMP is performed is similar to that of the seventh embodiment. As disclosed in the seventh embodiment, the central entity may decide CoMP transmission points, or the serving cell and the central entity may decide CoMP transmission points together. The detailed operation in that case is similar to that of the seventh embodiment.

FIGS. 58 and 59 are diagrams showing another exemplary sequence of the mobile communication system in the ninth embodiment. FIGS. 58 and 59 are continuous with each other at a boundary BL14. The sequence shown in FIGS. 58 and 59 is similar to the sequences shown in FIGS. 46, 47 and 48, FIGS. 51 and 52, and FIGS. 56 and 57, and thus, the same steps will be denoted by the same step numbers and common description will be omitted.

FIGS. 58 and 59 show the sequence of performing CoMP in the case where the cell unified entity is differentiated from the sub cell. This sequence shows the configuration in which the central entity is configured in the serving sub cell or in the central entity, and thus, the central entity and the serving sub cell are not particularly differentiated from the central entity, which are referred to as a serving sub cell or a central entity.

FIGS. 58 and 59 show the sequence in the case where the UE1 moves from the sub cell1 to the sub cell2 while CoMP is performed on the UE1 with the sub cell1 and the sub cell2 being serving sub cells. The sequence shown in FIGS. 58 and 59 can be used if the cell unified entity is the first cell unified entity, the second cell unified entity, or the third cell unified entity.

In Step ST8901, the cell unified entity judges whether or not to cause the UE1 to perform handover. If judging to cause the UE1 to perform handover, the cell unified entity decides to continue CoMP on the UE1 by the source cell during the handover process. Also, if judging to cause the UE1 to perform handover, the cell unified entity decides a target cell being a handover destination. In this exemplary operation, the cell unified entity selects the sub cell2 as a target cell.

In Step ST8902, the cell unified entity that has received RRC connection complete in Step ST8309 stops notifying the cell included in the CoMP measurement set of the data directed to the UE1. Specifically, the cell unified entity stops notifying the data for CoMP directed to the UE1.

The detailed operation in the case where CoMP is performed is similar to that of the seventh embodiment. Or, as disclosed in the seventh embodiment, the central entity may decide CoMP transmission points, or the serving cell and the central entity may decide CoMP transmission points together. The detailed operation in that case is similar to that of the seventh embodiment.

The ninth embodiment described above can achieve the following effects in addition to the effects of the eighth embodiment and the first modification of the eighth embodiment. The handover process prevents the reception quality from suddenly deteriorating at the source cell. As a specific example, the RRC connection reconfiguration message including the mobility control information to which the parameters required for handover are mapped, transmitted from the source cell, is transmitted using CoMP. This allows the UE to normally receive the RRC connection reconfiguration message.

First Modification of Ninth Embodiment

A problem to be solved in a first modification of the ninth embodiment will be described below. 3GPP discloses the operation when a radio link failure occurs as follows (see Chapter 10.1.6 of Non-Patent Document 1). The radio link failure also refers to a handover failure. 3GPP discloses the conditions for successful reconnection of the UE when a radio link failure occurs. One example of the conditions for successful reconnection is the case where the UE selects an eNB that stores the UE context as a reconnection destination.

When a handover failure occurs, the target cell does not notify the source cell of UE context release. The source cell thus does not release the context of the UE being a handover target. Also, when a handover failure occurs, the UE selects the source cell as a reconnection destination, meeting the conditions for successful reconnection.

It is conceivable that while the UE being subjected to CoMP moves, the reception quality will be maintained through the execution of CoMP by the source cell. When handover fails, accordingly, the reception quality of the link is poor even if the source cell is selected as a reconnection destination, causing a problem that reconnection will be likely to fail.

A solution to the problem that the reconnection will be likely to fail will be described below. If selecting the source cell as a reconnection destination, the UE, which has detected a handover failure while moving during CoMP, resets a CoMP measurement set at the source cell. The UE may restart measuring the CSI-RS of the in-CoMP-measurement-set cell at the source cell. Or, a CoMP active set at the source cell is reset.

In the first modification of the ninth embodiment, the source cell is notified that the path switch process has been completed from the target cell, and then, releases the CoMP measurement configuration for the UE being a handover target. If a handover failure occurs, the source cell is not notified that the path switch process has been completed from the target cell. During a handover failure, the source cell does not release the CoMP measurement configuration for the UE being a handover target. This does not cause a mismatch between the CoMP measurement sets of the UE and the network that includes a cell and a sub cell.

In this case, the UE may store radio information when releasing a CoMP measurement configuration due to handover. A specific example thereof is similar to that of the eighth embodiment, which will not be described here.

The first modification of the ninth embodiment can achieve the following effects. If handover fails, the source cell is selected as a reconnection destination, keeping the reception quality of the link through the execution of CoMP. Therefore, reconnection is highly likely to succeed.

Tenth Embodiment

A problem to be solved in the tenth embodiment will be described below. The eighth embodiment and the modifications thereof, and the ninth embodiment and the modification thereof are configured such that in the set CoMP active set or CoMP measurement set, if the UE performing multiple point communication (CoMP communication) performs handover, that is, if the UE changes the serving cell, CoMP communication is stopped to be switched to single point communication with the serving cell and, after the completion of the procedure of changing the serving cell, multiple point communication is constructed again.

FIGS. 60 and 61 are diagrams for describing the concept of CoMP communication among a plurality of sub eNB devices and a UE. FIG. 60 shows the case where three sub eNB (Sub-eNB) devices, namely, a first sub eNB device (Sub-eNB1) 10104, a second sub eNB device (Sub-eNB2) 10105, and a third sub eNB device (Sub-eNB3) 10106, and a first UE (UE1) 10107 perform CoMP communication. The three sub eNB devices 10104 to 10106 define three cell areas 10101 to 10103.

FIG. 61 shows the case where the first UE (UE1) has moved from the location indicated by reference numeral "10207" to the location indicated by reference numeral "10208". In FIG. 61, the first UE (UE1) 10207, 10208 corresponds to the first UE (UE1) 10107 of FIG. 60, first to third sub eNB devices (Sub-eNB1 to Sub-eNB3) 10204 to 10206 correspond to the first to the third sub eNB devices (Sub-eNB1 to Sub-eNB3) 10104 to 10106 of FIG. 60, and cell areas 10201 to 10203 of the sub eNB devices 10204 to 10206 correspond to the cell areas 10101 to 10103 of FIG. 60.

When the first UE (UE1) moves from the location indicated by reference numeral "10207" to the location indicated by reference numeral "10208", the process of changing the serving cell is required, which stops CoMP communication. In this case, the first UE (UE1) 10208 communicates with, for example, the first sub eNB device (Sub-eNB1) 10204.

The serving cell is often changed when the UE is located at the edge of the cell of which coverage the UE is in, as shown in FIG. 61. It is conceivable in this positional relationship that the communication quality of the communication link between the serving cell and the UE will degrade by an amount for the distance therebetween. It is also conceivable that the serving cell will be changed per se to be changed to a cell having a better communication quality of the communication link.

If CoMP communication is stopped when the serving cell is changed, as shown in FIG. 61, gains of the communication quality in the multipoint communication (CoMP communication) over single point communication cannot be obtained while the above-mentioned communication is stopped, which allows for only communication with low communication quality. This may lead to a situation in which the procedure of changing a serving cell per se cannot be completed.

An object of CoMP communication is to improve the communication quality with a plurality of radio links at a cell edge. This also shows that the above-mentioned problem is serious.

The following problem is cited as another problem. Although the process of changing the serving cell by the UE, which is disclosed in, for example, Non-Patent Document 1, involves the recovery process through retransmission, it permits a partial loss of packets at Layer 2 during the procedure of the process.

Unfortunately, a loss of packets unnecessarily increases an unnecessary communication traffic associated with a change of the serving cell. Considering an influence of the quality deterioration caused by stopping CoMP communication, the influence of a loss of packets may increase further.

A solution to the problem in the tenth embodiment will be described below. To solve the above-mentioned problem, in this embodiment, the serving cell is changed while CoMP communication is continued. FIG. 62 is a diagram for describing a change of the serving cell in the tenth embodiment. FIG. 62 shows the case where the first UE (UE1) moves from the location indicated by reference numeral "10307" to the location indicated by reference numeral "10308" while CoMP communication is performed.

The cells to be included in the CoMP active set or CoMP measurement set for CoMP are likely to be geographically adjacent cells, and a serving cell to become a change destination is likely to be selected from those cells. FIG. 62 shows the case where among cells including first to third sub eNB devices (Sub-eNB1 to Sub-eNB3) 10304 to 10306, the serving cell of the CoMP active set is changed from the cell including the first sub eNB device (Sub-eNB1) 10304 to the cell including the second sub eNB device (Sub-eNB2) 10305.

In this case, the communication link quality of the cell being a change source (hereinafter, referred to as a "source cell") of the serving cell is likely to become insufficient due to moving of the UE, and the communication link quality of the cell being a change destination (hereinafter, referred to as a "target cell") of the serving cell is likely to become sufficient thanks to a reduced distance. Therefore, changing the serving cell while performing CoMP communication agrees with the object of CoMP communication and allows the serving cell to be changed in a good environment, which is highly effective.

The serving cell is changed while CoMP communication is performed, and thus, a conventional instantaneous interruption of physical layers can be expected to be minimized. Therefore, Layer 2 of the source cell is associated with Layer 2 of the target cell to minimize a packet loss at the existing Layer 2, suppressing an unnecessary traffic increase due to a change of the serving cell.

For this, the following four processes (1) to (4) are added to the procedure of changing a serving cell.

(1) The source cell notifies the target cell of a CoMP set.
(2) The data unit before, during, or after the process at Layer 2 (PDCP/RLC) excluding PDCP SDU (RLC SDU, RLC PDU, and other data unit during process) are not discarded, and are forwarded from the source cell to the target cell with the related parameters.
(3) Switching to the target cell is performed considering that the source cell will complete at least the process related to the physical layer process such as the HARQ process of the processes at Layer 2.
(4) The procedure of preserving the transmission order at the source cell and the target cell is added in data transmission at Layer 2 (PDCP/RLC) (re-establishment of the RLC, described in TS36.322 V10.0.0 (hereinafter, referred to as "Reference 8") by 3GPP, is not performed).

Although this embodiment does not describe forwarding of the MAC data unit, the data unit before starting the HARQ process at MAC layer can be forwarded to the target cell similarly to RLC/PDCP.

Figure 64:
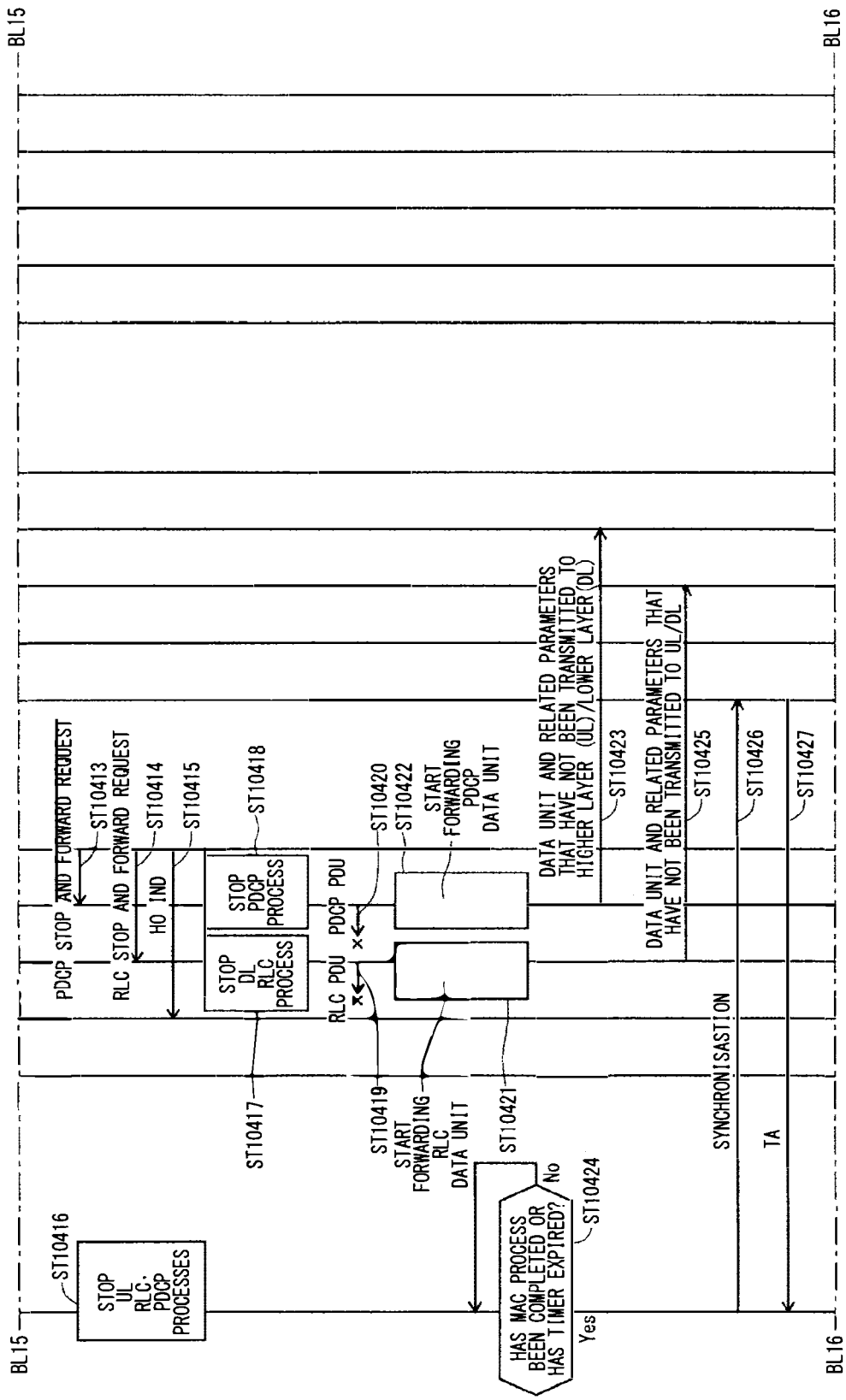
FIG. 64 is another diagram showing the exemplary sequence of the mobile communication system in the tenth embodiment.
Figure 65:
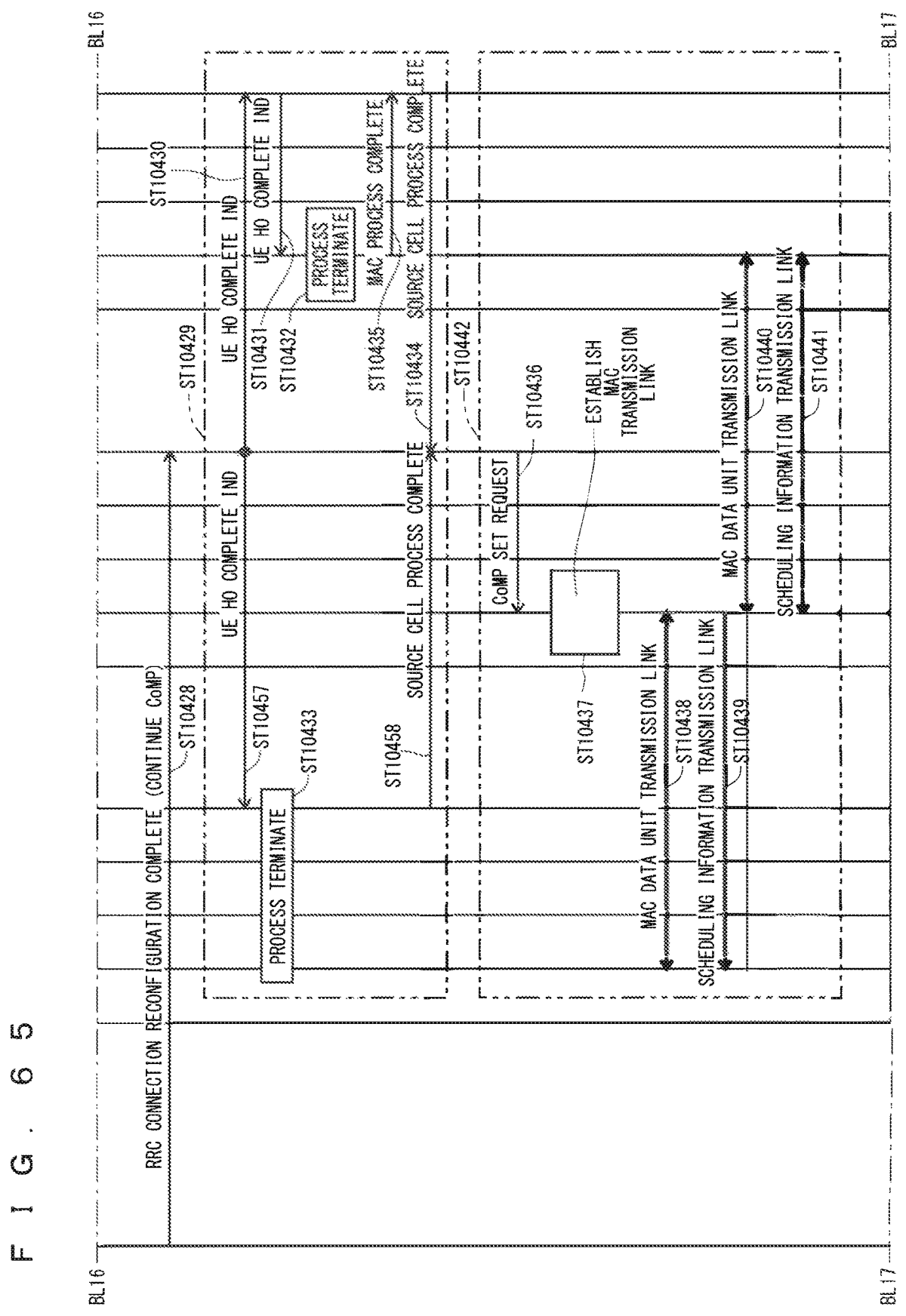
Figure 66:
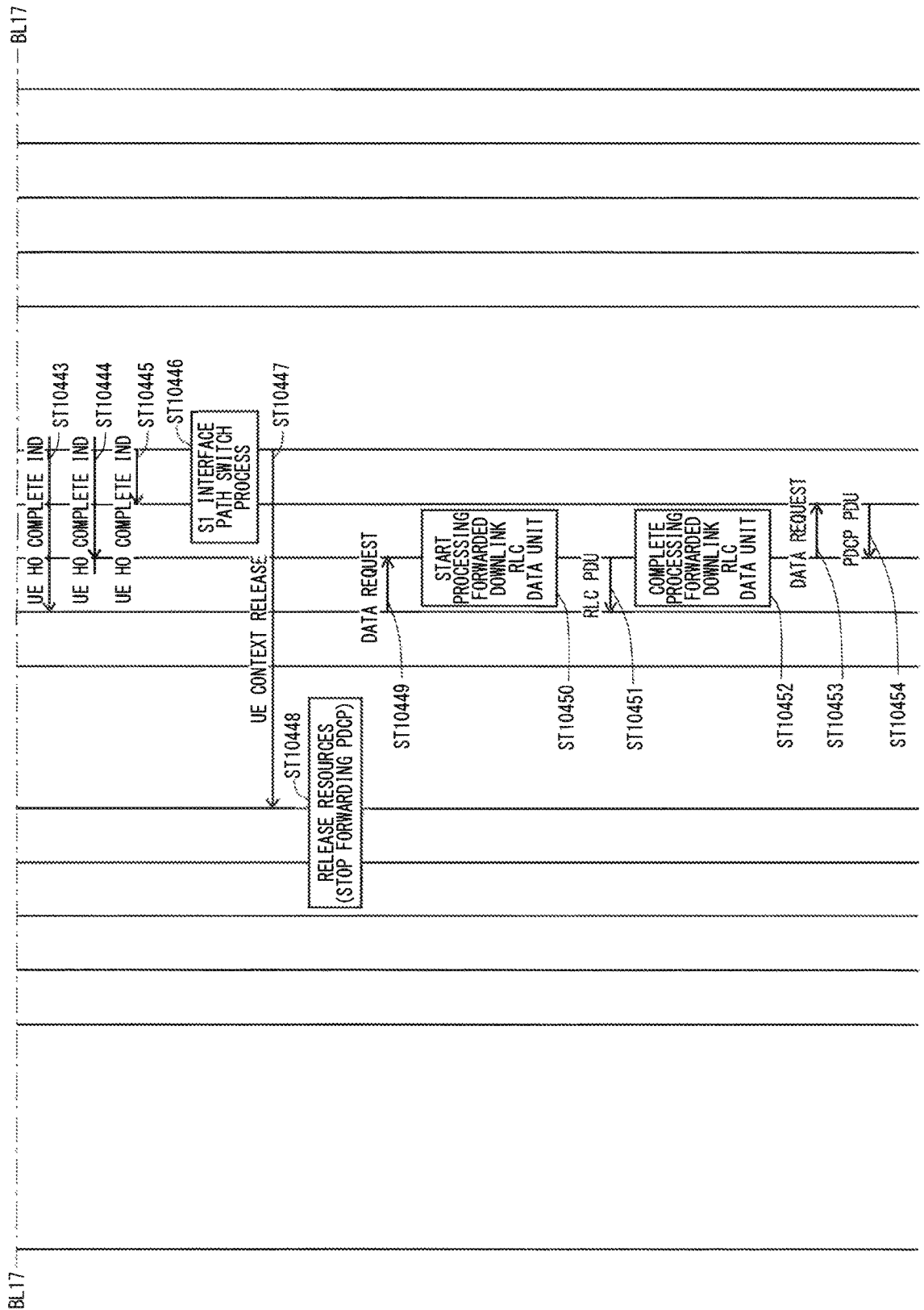
FIG. 66 is yet still another diagram showing the exemplary sequence of the mobile communication system in the tenth embodiment.

FIGS. 63 to 66 are diagrams showing an exemplary sequence of a mobile communication system in a tenth embodiment. FIGS. 63 and 64 are continuous with each other at a boundary BL15. FIGS. 64 and 65 are continuous with each other at a boundary BL16. FIGS. 65 and 66 are continuous with each other at a boundary BL17.

This sequence shows an example of the case where in communication between the UE and the E-UTRAN, the UE performs CoMP communication with three cells as the CoMP active set or CoMP measurement set, and changes the serving cell among those cells. Though not shown in FIGS. 63 to 66, for example, scheduling from the cell to the UE is notified over the PDCCH or the like.

Herein, among the cells in the CoMP active set or the CoMP measurement set, the serving cell before the serving cell is changed is taken as a source cell, the serving cell after the serving cell is changed is taken as a target cell, and the other one cell that does not serve as the serving cell in this sequence is taken as a non-serving cell.

Each cell configures the PHY, MAC, RLC, PDCP, and RRC layers and, as a rule, each of those layers has at least the function described in the specifications of 3GPP.

At the beginning of the sequence, first, the UE performs CoMP communication where three cells configure the CoMP active set or the CoMP measurement set. In this case, in Steps ST10401 to ST10404, the link for transmitting a MAC data unit and the link for notifying the scheduling information on the data unit scheduled at the MAC of the source cell exist between the source cell and the target cell and between the source cell and the non-serving cell. These links may be collectively referred to as a "MAC-data-unit-related transmission link".

The link is described here as a logical one, an installation manner of which differing depending on actual installation. For example, if the source cell and the target cell are installed as different eNBs, the communication interface therebetween may be an X2 interface. Not limited to the MAC-data-unit-related transmission link, a logical link is assumed to exist for a communication path for communication between cells.

In Step ST10405, the source cell performs the HO decision process. Specifically, the source cell decides to perform HO to the target cell.

After that, in Step ST10406, the RRC of the source cell issues a HO request. Specifically, for example, the RRC of the source cell notifies the RRC of the target cell of whether or not CoMP needs to be continued (proposal), which is currently operated in communication with a UE to become a target, and of the measurement information on the communication between the CoMP active set and the CoMP measurement set, and the cells thereof. Here, whether or not CoMP needs to be continued (proposal) may be judged from the CoMP set and needs not to be explicitly notified.

In Step ST10408 of Step ST10407, the RRC of the target cell that has received the HO request in Step ST10406 decides a CoMP set candidate at the target cell based on, for example, the information contained in the HO request, the traffic situation of its own cell, and the CoMP cooperating set information.

After that, in Steps ST10408 and ST10455, the RRC of the target cell notifies the CoMP active set being a CoMP set candidate or the cells included in the CoMP measurement set, in this example, the source cell and the non-serving cell, of a CoMP communication request (CoMP request) to the UE to become a target.

The source cell and the non-serving cell that have received the request in Steps ST10408 and ST10455 confirm the traffic of itself and the situation regarding other communication resource and, in Steps ST10409 and ST10456, notify the target cell of the results as a CoMP response.

In Step ST10410, the target cell that has received the CoMP responses in Steps ST10409 and ST10456 decides a CoMP set based on the results.

After that, in Step ST10411, based on the CoMP set judgment results, the target cell notifies the source cell of the response mainly including the information on whether or not HO is allowed, whether or not CoMP can be continued, and a supportable CoMP set, as the HO response. Here, whether or not CoMP can be continued needs not to be explicitly notified, assuming that it is judged from the CoMP set. The target cell needs not to notify a supportable CoMP set if continuing the CoMP set at the source cell that has been received in Step ST10406.

In Step ST10412, the source cell that has received a response indicating that HO is allowed (OK) transmits, to the UE, a message indicating that the serving cell will be changed, which contains the information indicating that CoMP is continued and indicating a CoMP set, as an RRC connection reconfiguration. The transmission of this message allows the UE that has received this message to operate differently from the case where the UE has received "RRC Connection Reconfiguration" described in Non-Patent Document 1, Reference 1, and the like.

The following three (1) to (3) will be disclosed as specific examples of the operation different from the case where the UE has received "RRC Connection Reconfiguration".

(1) "Re-establishment" of the RLC is not performed.
(2) The MAC is not reset.
(3) "Re-establishment" of the PDCP is not performed.

The following six (1) to (6) will be disclosed as specific examples of the message indicating that a serving cell continuing CoMP is changed.

(1) Whether or not CoMP can be continued is indicated.
(2) Whether or not to re-establish the RLC is indicated.
(3) Whether or not to reset the MAC is indicated.
(4) Whether or not to re-establish the PDCP is indicated.
(5) Combination of (1) to (4) above.
(6) "RRC Connection Reconfiguration" while CoMP is performed or while a CoMP set is set is statically decided to indicate (1) to (5) above. This eliminates the need for newly providing a message, compared with (1) to (5) described above, preventing the mobile communication system from becoming complicated.

The following three (1) to (3) will be disclosed as specific examples of the method of notifying a message indicating that the serving cell continuing CoMP is changed.

(1) An RRC connection reconfiguration indicator or an information element is newly added.

(2) An indicator or an information element is newly added to mobility control information.

(3) Other message is newly provided.

In Step ST10412 as well as in Steps ST10413 and ST10414, as a request to stop and forward the PDCP process (PDCP stop and forward request) and a request to stop and forward the RLC process (RLC stop and forward request), the RRC of the source cell instructs the PDCP and RLC to become targets to stop the process on the unprocessed data unit and stop downlink transmission to the MAC and RLC and also instructs to transmit, to the target cell, the "data unit and the related parameters that have not been transmitted for the higher layers in uplink and for lower layers in downlink". The request to stop and forward the RLC process (RLC stop and forward request) is newly provided in Step ST10414, allowing the data unit at Layer 2 (RLC) and the related parameters to be forwarded from the source cell to the target cell. Data forwarding of the RLC data is also allowed.

In Steps ST10417 to ST10422, the PDCP and RLC of the source cell that have received the instruction stop and forward the process and, in Steps ST10423 and ST10425, continue forwarding the data unit to be received at each layer after the instruction to the target cell. A timer may be managed for judgment per layer in the method of stopping forwarding, or forwarding may be stopped to coincide with the completion of the MAC timer as described below. If the HO completion by the UE in Step ST10457 described below is notified, an instruction thereof may be used in judging to stop forwarding.

In this forwarding, the level of the data unit, and the packets to be forwarded with the PDU, SDU, and the like are transmitted to the target cell in such a manner that the process order thereof becomes apparent if the HO did not exist. For example, the process order and the transmission order are caused to agree with each other, or the information on the process order is added.

Also for the RLC retransmission packets described in Reference 8, the information indicating this is added to the PDU, and the information is transmitted to the target cell in the processing order, for example, the numerical order of the RLC or SN.

In the transmission process at each layer, a data unit that has not completed the transmission process may be transmitted together at a layer lower than each layer (RLC for PDCP, MAC for RLC). In this case, if the target cell confirms the completion of the data unit transmission process at a corresponding lower layer, the data unit is not transmitted but is discarded.

Further, in Step ST10415, the RRC of the source cell notifies the MAC that HO has been started. Specifically, the RRC of the source cell notifies the start of HO (HO ind).

The MAC of the source cell that has been notified the start of HO continues the process until forwarding of the currently held data unit is completed as to downlink. To judge that the process is to be stopped, a timer may be provided to set a maximum process completion time. In this case, the process is stopped upon completion of the process or expiration of the timer.

In this case, the HARQ process (see TS36.321 V10.4.0 (hereinafter, referred to as "Reference 9") by 3GPP needs to be taken into account. The HARQ process is of an N process stop-and-wait system and thus needs to set a timer value in consideration of the retransmission.

For uplink, the process of receiving a data unit from a UE is continued. To judge that the process is to be stopped, a timer different from the above-mentioned timer is provided to stop the process after the MAC process of the UE is completed. As in downlink, the HARQ process needs to be taken into account in the time before the timer expires. For easy installation, the same timer may be used in uplink and downlink. If the HO completion by the UE described below is notified, an instruction thereof may be used in judging to stop forwarding.

Similarly to the cell, the UE that has received the RRC connection reconfiguration message in Step ST10412 stops the RLC and PDCP processes in UL, in the process of stopping UL RLC/PDCP in Step ST10416.

For uplink, the MAC continues the process until forwarding of the currently held data unit is completed, as in the cell. A timer is provided to judge that the process is to be stopped and, in Step ST10424, the UE judges whether or not the MAC process has been completed or the processing timer has expired.

For downlink, the process of receiving a data unit from the cell is continued. To judge that the process is to be stopped, a timer different from the above-mentioned timer is provided to stop the process after the completion of the MAC process by the cell. As in uplink, the HARQ process needs to be taken into account in the time before the timer expires. As in this embodiment, for easier installation, the same timer may be used in uplink and downlink.

If the MAC process has been completed or the processing timer has expired in Step ST10424, in Step ST10428, the UE transmits, to the target cell, an RRC connection reconfiguration complete message corresponding to the RRC connection reconfiguration. A synchronisation process of Step ST10426 and a TA notification process of Step ST10427 are performed as required.

After that, the UE performs communication in accordance with scheduling of the MAC of the target cell, where the target cell is a serving cell. Whether or not the message of the procedure of changing a serving cell in, for example, Step ST10427 shows CoMP communication depends on the presence/absence of the process of Step ST10429 and the completion status of the process of Step ST10442, described below. If the process of Step ST10429 has not been performed and the process of Step ST10442 has been completed, CoMP communication is allowed.

In Step ST10457 of Step ST10429, the RRC of the target cell that has received the RRC connection reconfiguration complete message in Step ST10428 notifies the source cell that the UE has completed a change of the serving cell (UE HO Complete Ind). In Step ST10430, the RRC of the target cell also notifies the non-serving cell that the UE has completed a change of the serving cell (UE HO Complete Ind).

In Step STST10433, the source cell, which has recognized that the serving cell had been changed from the notification that the UE had completed a change of the serving cell in Step ST10457, completes the MAC, RLC, and PDCP processes of the UE to become a target. After the process has been completed, in Step ST10458, the source cell notifies the target cell that the source cell has completed the process (Source cell process complete).

In Steps ST10431, ST10432, and ST10435, the non-serving cell, which has recognized that a change of the serving cell had been completed from the notification that the UE had completed the change of the serving cell in Step ST10430, completes the MAC process of the UE to become a target. After the process has been completed, in Step ST10434, the non-serving cell notifies the target cell that the source cell had completed the process (Source cell process complete).

A series of processes of Step ST10429 is the procedure for strictly preventing a mismatch occurring in the completion of the process between the UE and each cell, and is applicable as the procedure of completing the process at the source cell when the serving cell performing CoMP is changed. The processes of Step ST10429 may be omitted for simplifying the processing procedure and increasing the speed at which the serving cell is changed.

In Step ST10442, the target cell, which has transmitted a HO response in Step ST10411, performs the processes of Steps ST10436 and ST10437. After that, in Steps ST10438 and ST10440, the target cell sets data unit links between the MAC thereof and the MAC of the non-serving cell and between the MAC thereof and the MAC of the non-serving cell and, in Steps ST10439 and ST10441, sets scheduling information links.

A series of processes of Step ST10442 may be performed at an appropriate timing during an interval between the transmission of a HO response in Step ST10411 and a data request in Step ST10449. If the data unit link and the scheduling information link between the MACs of the source cell side and the links of the target cell side in Steps ST10401 to ST10404 cannot be established together, as shown in FIGS. 63 to 66, the links may be established after HO has been completed.

In Steps ST10443, ST10444, and ST10445, the RRC of the target cell, which has received an RRC connection reconfiguration complete notification in Step ST10428, notifies the MAC, RLC, and PDCP thereof that the serving cell has been changed, that is, that the UE has completed HO (UE HO Complete Ind). After that, the processes of Steps ST10446 to ST10454 are performed.

The MAC of the target cell that has received the notification of UE HO Complete Ind in Step ST10443 checks whether or not a MAC transmission link to become a target is established. If the link is established, the MAC of the target cell performs the process in accordance with a request from the UE for uplink or, for downlink, requests data from the RLC and performs the MAC process on the data transmitted from the RLC. The communication with the cell for which the MAC transmission link is established is started together. If the MAC transmission link to become a target is not established, the MAC of the target cell establishes the MAC transmission link to become a target and then performs the above-mentioned process.

For uplink, the RLC of the target cell that has received the notification of UE HO Complete Ind in Step ST10444 first performs the process on the forwarded data units in the transmission order, using the parameters transmitted in association with the data units, and then, successively processes the uplink RLC PDU transmitted from the MAC.

For downlink, when being requested to transmit data from the data transmission request (DATA request) in Step ST10449, the RLC of the target cell processes the forwarded data units for retransmission and transmits the RLC PDU to the MAC, and then, processes the forwarded data unit for initial transmission and transmits the RLC PDU to the MAC.

In Step ST10453, the RLC that has processed the forwarded data units requests the PDCP to transmit data, and then, processes the data received from the PDCP.

In Step ST10446, the PDCP of the target cell that has received the notification of UE HO Complete Ind in Step ST10445 performs the S1 interface path switch process to set a switch to the target cell. For uplink, the PDCP of the target cell processes the forwarded data units in the transmission order, using the parameters transmitted in association with the data units, and then, successively processes the uplink PDCP PDU transmitted from the RLC.

For downlink, when being requested to transmit data from DATA request of Step ST10453, the PDCP of the target cell processes the forwarded data units and transmits the PDCP PDU to the RLC.

As described above, in this embodiment, the data unit at each layer is transmitted between cells in the clarified process order assumed by the source cell. Then, the target cell performs the processes in the process order, and then performs the data unit processes from the higher layer to the lower layer. For downlink, data transmission is started in accordance with the request from the lower layer of the target cell. This allows for the processes in which the transmission order is preserved between the source cell and the target cell. Therefore, communication can be continued without performing RLC re-establishment described in Reference 8.

First Modification of Tenth Embodiment

A first modification of the tenth embodiment shows an example in which, when the configuration of the tenth embodiment includes a CoMP central entity that performs CoMP MAC level coordinated control, a serving cell is changed while performing CoMP communication.

Figure 67:
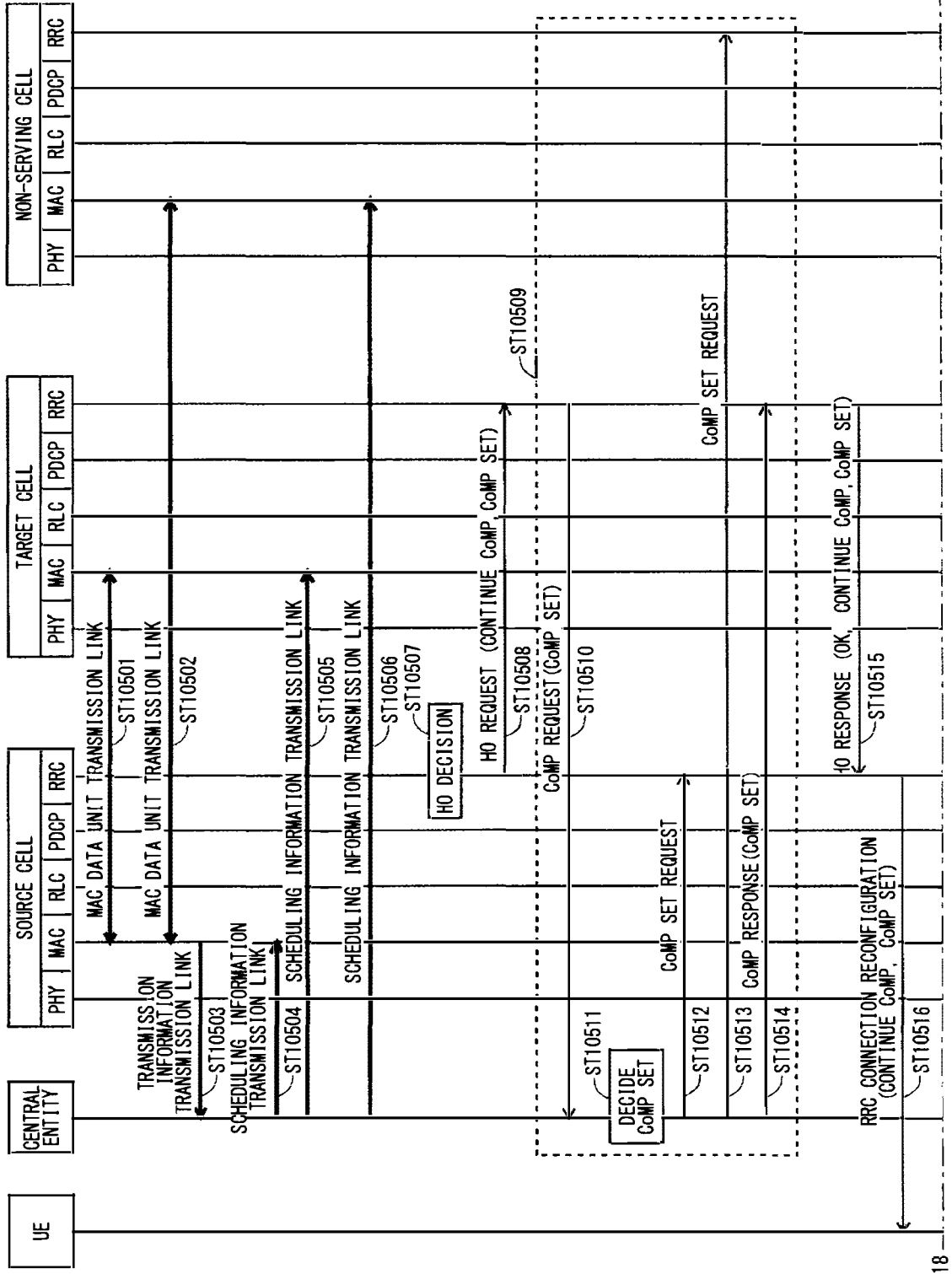
FIG. 67 is a diagram showing an exemplary sequence of a mobile communication system in a first modification of the tenth embodiment.
Figure 68:
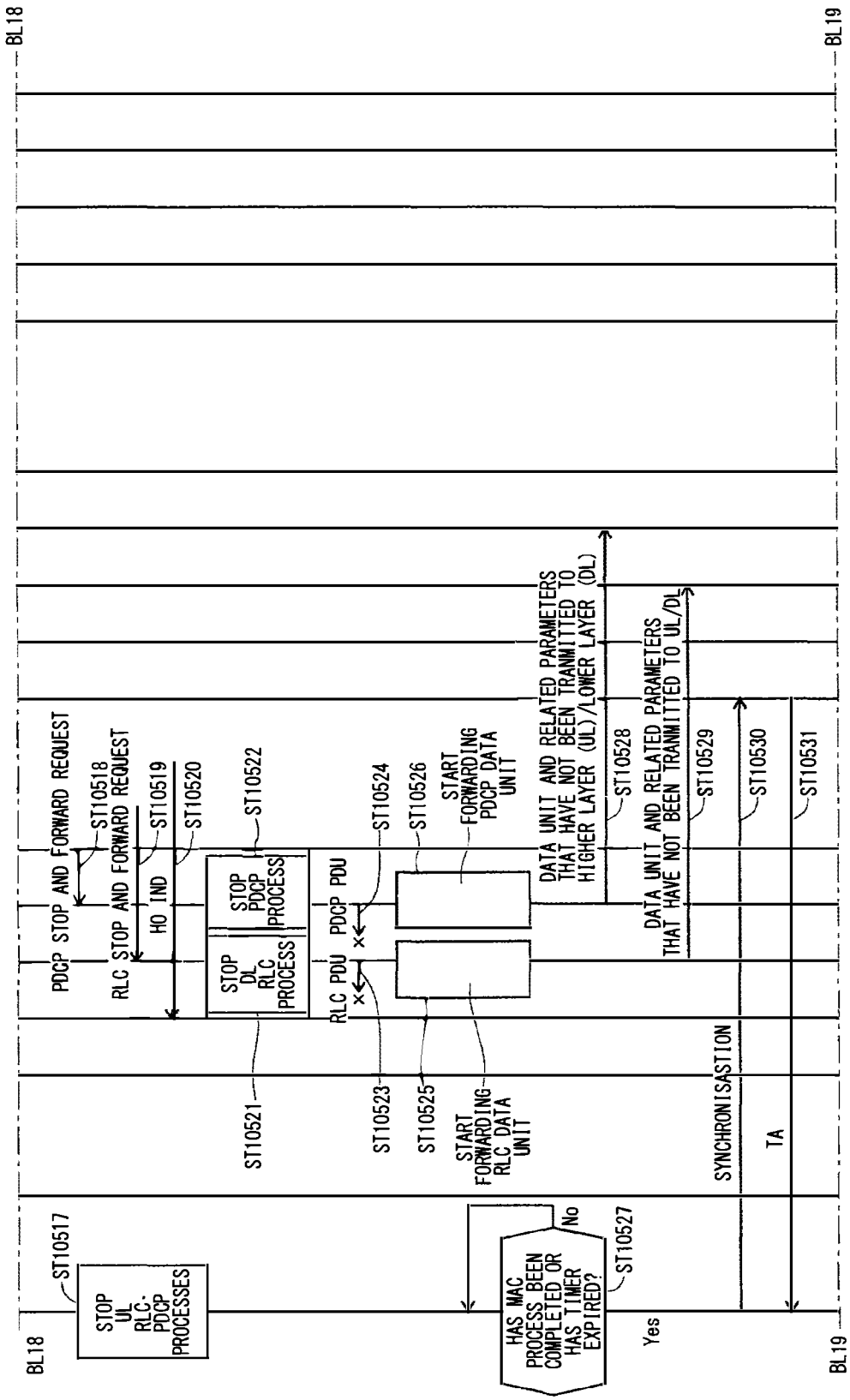
FIG. 68 is another diagram showing the exemplary sequence of the mobile communication system in the first modification of the tenth embodiment.

FIGS. 67 to 70 are diagrams showing an exemplary sequence of a mobile communication system in the first modification of the tenth embodiment. FIGS. 67 and 68 are continuous with each other at a boundary BL18. FIGS. 68 and 69 are continuous with each other at a boundary BL19. FIGS. 69 and 70 are continuous with each other at a boundary BL20.

This sequence shows, similarly to the sequence shown in FIGS. 63 to 66, an example in which, in communication between the UE and the E-UTRAN, the UE performs CoMP communication with three cells as the CoMP active set or CoMP measurement set, and changes a serving cell among those cells.

This modification differs from the tenth embodiment in that in this modification, the CoMP central entity performs MAC scheduling based on data transmission/reception information (data parameters) of the serving cell, and thus, the scheduling information transmission link of Steps ST10504 to ST10506 starts from the CoMP central entity and the CoMP central entity performs the CoMP set decision process when the serving cell is changed in Step ST10511.

In Steps ST10501 and ST10502, the links for transmitting MAC data units exist between the source cell and the target cell and between the source cell and the non-serving cell, similarly to Steps ST10401 and ST10403 of the tenth embodiment. In this modification, the MAC data units may also be transmitted via the central entity.

The scheduling information is notified as follows. In Steps ST10503 and ST10545, the CoMP central entity performs scheduling based on the transmission information notified from the MAC of the serving cell, using the transmission information transmission link. In Steps ST10504, ST10505, ST10506, ST10546, ST10547, and ST10548, scheduling results are notified each cell using the scheduling information transmission links.

In the process of deciding a CoMP set when the serving cell is changed, for a CoMP set candidate proposed by the RRC of the target cell in the CoMP request in Step ST10510 of Step ST10509, in Step ST10511, the CoMP central entity decides a CoMP set in consideration of a traffic situation of each cell. After that, in Steps ST10512, ST10513, and ST10514, the information decided in Step ST10511 is notified as a CoMP response.

This modification differs from the tenth embodiment as described above, and thus, this modification allows the serving cell to be changed while CoMP communication is continued, also in the case where there is a CoMP central entity.

The steps other than the steps described above, specifically, the processes of Steps ST10507, ST10508, and Steps ST10515 to ST10560 shown in FIGS. 67 to 70 are performed similarly to the processes of Steps ST10405 and ST10406, and Steps ST10411 to 10454 in the tenth embodiment shown in FIGS. 63 to 66 described above.

Second Modification of Tenth Embodiment

A second modification of the tenth embodiment describes an example in the case where the configuration of the tenth embodiment includes a cell unified entity composed of the RLC, PDCP, and RRC that manage three cells in common. In this modification, the RLCs and PDCPs of the cells that require data transmission between cells are aggregated in the cell unified entity, which simplifies each procedure compared with the tenth embodiment.

Figure 72:
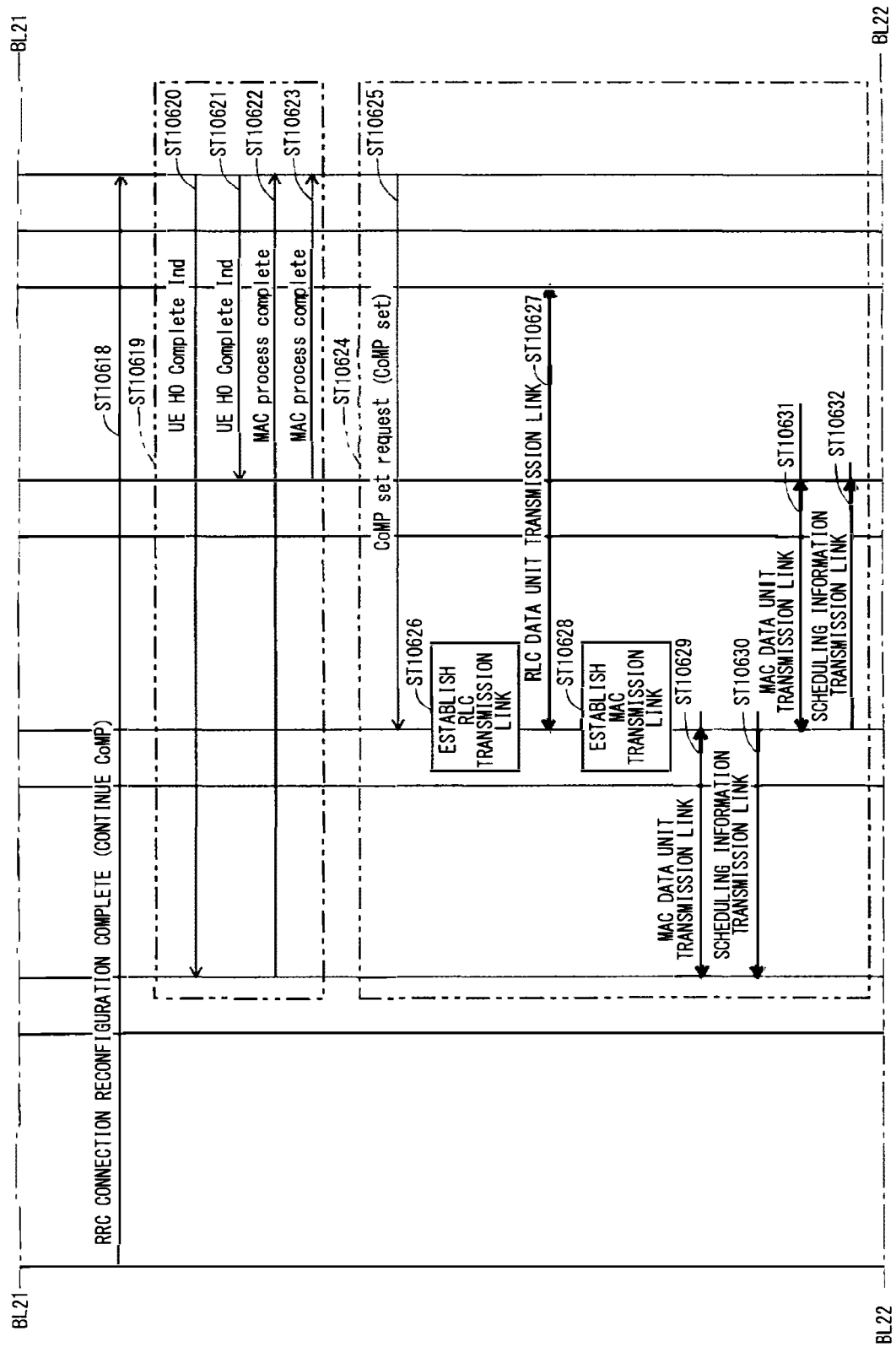
FIG. 72 is another diagram showing the exemplary sequence of the mobile communication system in the second modification of the tenth embodiment.
Figure 73:
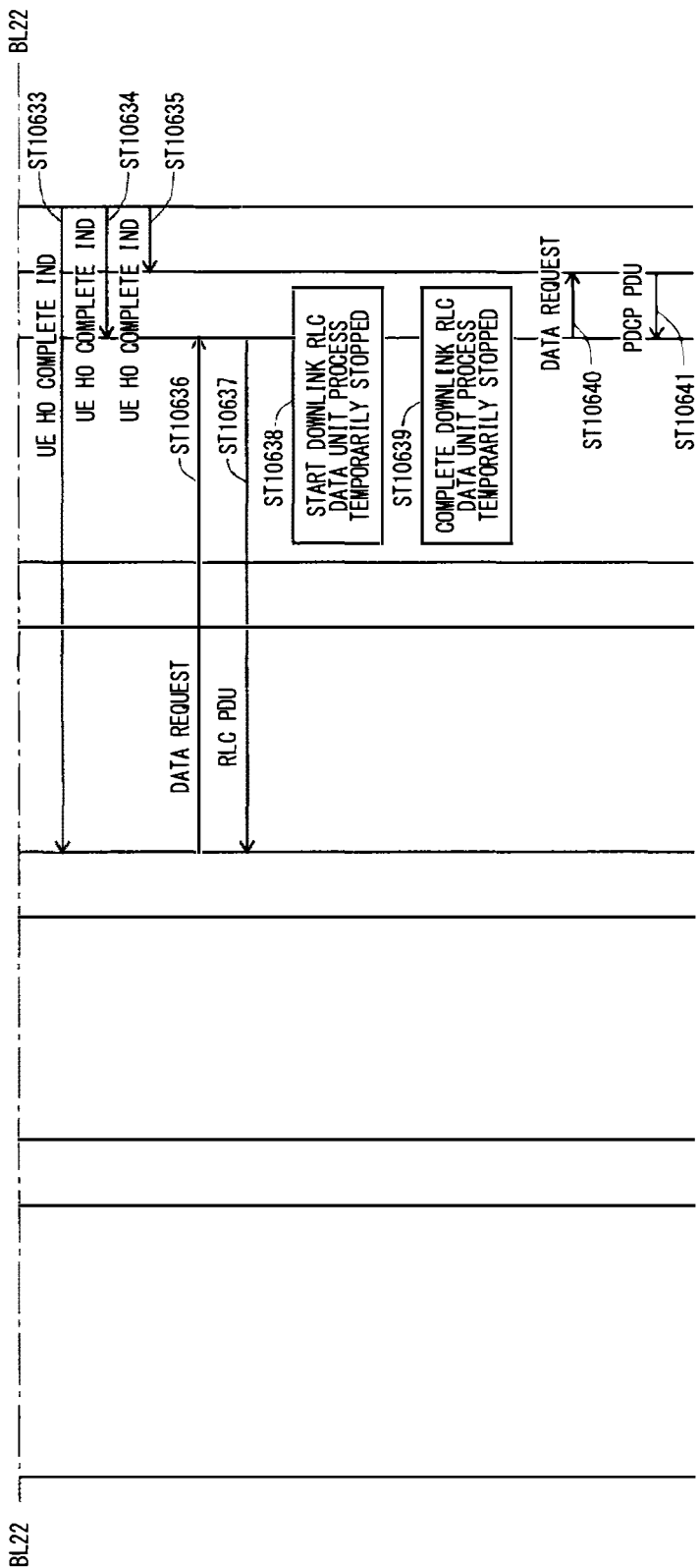
FIG. 73 is still another diagram showing the exemplary sequence of the mobile communication system in the second modification of the tenth embodiment.

FIGS. 71 to 73 are diagrams showing an exemplary sequence of a mobile communication system in the second modification of the tenth embodiment. FIGS. 71 and 72 are continuous with each other at a boundary BL21. FIGS. 72 and 73 are continuous with each other at a boundary BL22.

Similarly to the sequence shown in FIGS. 63 to 66, this sequence shows an example in which in communication between the UE and the E-UTRAN, the UE performs CoMP communication with three cells as a CoMP active set or CoMP measurement set, and changes the serving cell among those cells.

Described here is an example in which communication is performed among one cell unified entity composed of the RLC, PDCP, and RRC that manage three cells in common, one source sub cell composed of the PHY and MAC, one target sub cell, one non-serving sub cell, and one UE.

At the beginning of the sequence, first, the UE performs CoMP communication with three cells as a CoMP active set or CoMP measurement set. In this case, in Steps ST10601 to ST10605, the link for transmitting an RLC data unit exists between the cell unified entity and the source sub cell, the links for transmitting a MAC data unit and the links for notifying the scheduling information on the PDU scheduled by the MAC of the source sub cell exist between the source sub cell and the target sub cell and between the source sub cell and the non-serving sub cell. These links may be collectively referred to as a "MACPDU-related transmission link".

The link is described here as a logical one as in the tenth embodiment, an installation manner of which differing depending on actual installation. Also, not limited to the MACPDU-related transmission link, the communication paths for communication between sub cells and between the sub cell and the cell unified entity include a logical link, as described above.

In Step ST10606, it is judged that HO from the source cell to the target cell is performed. In Step ST10607, the RRC of the cell unified entity decides whether not to perform CoMP and decides a CoMP set at the target cell, based on, for example, the CoMP cell information currently operated in communication with the UE to become a target, the cell measurement information, the traffic situation of a CoMP candidate cell, and the CoMP cooperating set information.

In Step ST10608, the cell unified entity that has judged that HO is allowed and that CoMP is allowed transmits, to the UE, an RRC connection reconfiguration message indicative of a change of the serving cell continuing CoMP.

Herein, as in the tenth embodiment, "RRC connection Reconfiguration" differs from "RRC connection Reconfiguration" described in documents such as Non-Patent Document 1, and explicitly shows that it is does not mean "Re-establishment" of, for example, RLC.

In Steps ST10609 and ST10610, the RRC of the cell unified entity also instructs the PDCP and RLC to become targets to stop the process on the unprocessed data unit and stop downlink transmission to the MAC and RLC.

The PDCP and RLC of the cell unified entity that have been instructed stop the above-mentioned process. In Step ST10612, the RRC of the cell unified entity notifies the MAC that HO has been started. Also, the RLC of the cell unified entity performs the processes of Steps ST10613 and ST10614.

The MAC that has been notified that HO had been started continues the process until forwarding of the currently-held data unit is completed. To judge a stop of the process, a timer may be provided to set a maximum process completion time. In this case, the process is stopped when the process is completed or the timer expires. The HARQ process (see Reference 9) needs to be taken into account in this case. The HARQ process is an N process stop-and-wait system, which requires to set a timer value in consideration of the retransmission.

Also for uplink, the process of receiving data units from the UE is continued. To judge that the process is to be stopped, a timer different from the above-mentioned timer is provided to stop the process after the completion of the MAC process by the UE. Similarly to downlink, the HARQ process needs to be taken into account in the time until the timer expires. For simpler installation, the same timer may be used in uplink and downlink. If the HO completion by the UE described below is notified, an instruction thereof may be used in judging to stop forwarding.

The UE that has received the RRC connection reconfiguration message in Step ST10608 stops the UL RLC and PDCP processes in Step ST10611, similarly to the cell.

Also as to the MAC, for uplink, the MAC continues the process until forwarding of the currently-held data unit is completed, similarly to the cell. To judge that the process is to be stopped, a timer is provided, and in Step ST10615, the UE judges whether or not the MAC process has been completed or the processing timer has expired, as in the tenth embodiment.

Also for downlink, the process of receiving data units from the cell is continued. To judge that the process is to be stopped, a timer different from the above-mentioned timer is provided to stop the process after the completion of the MAC process by the cell. Similarly to uplink, the HARQ process needs to be taken into account in the time until the timer expires. For simpler installation, the same timer may be used in uplink and downlink.

If the MAC process has been completed or the processing timer has expired in Step ST10615, in Step ST10618, the UE transmits, to the target cell, an RRC connection reconfiguration complete message corresponding to the RRC connection reconfiguration. The UE performs procedures for synchronization of Step ST10616 and TA notification of Step ST10617 as required.

In Steps ST10620 and ST10621, the RRC of the cell unified entity that has received the RRC connection reconfiguration complete message notifies the source sub cell and the non-serving sub cell that the UE has completed a change of the serving cell.

The source sub cell, which has recognized in Step ST10620 that the serving cell had been changed from the notification that the UE had completed HO, completes the MAC process of the UE to become a target. After the completion of the process, in Step ST10622, the source sub cell notifies the cell unified entity of a MAC process complete message.

The non-serving cell, which has recognized in Step ST10621 that the serving cell had been changed from the notification that the UE had completed HO, completes the MAC process of the UE to become a target. After the completion of the process, in Step ST10623, the non-serving cell notifies the cell unified entity of the MAC process complete message A series of processes of Step ST10619 is the procedure for strictly preventing a process completion mismatch among the UE, the source sub cell, and the cell unified entity, and therefore, needs not to be performed for simplifying the processing procedure and speeding up a change of the serving cell.

In Step ST10625, the RRC of the cell unified entity that has transmitted an RRC connection reconfiguration message in Step ST10608 requests the target sub cell to establish an RLC transmission link with the cell unified entity and a MAC transmission link between cells included in the CoMP active set or CoMP measurement set.

In Steps ST10626 to ST10632, the target sub cell that has received the CoMP set request in Step ST10625 establishes the RLC transmission link and the MAC transmission link in accordance with the instruction.

A series of processes of Step ST10624 may be performed during an interval between the transmission of the RRC reconfiguration message in Step ST10608 and the transmission of the data request message in Step ST10636. If the links cannot be established with the data unit link and the scheduling information link between the MACs of the source sub cell side and the link of the target sub cell side in Steps ST10601 to ST10605, as shown in FIGS. 71 to 73, links may be established after the completion of HO.

In Steps ST10633, ST10634, and ST10635, the RRC of the cell unified entity that has received the RRC connection reconfiguration message notifies the MAC of the target sub cell and the RLC and PDCP of the cell unified entity that a change of the serving cell has been completed in the UE HO complete message.

The MAC of the target sub cell that has received the UE HO complete message in Step ST10633 checks whether the RLC transmission link and the MAC transmission link to become targets are established. If those links are established, for uplink, the MAC of the target sub cell performs the process in accordance with the request from the UE and, for downlink, requests data from the RLC and performs the MAC process on the data transmitted from the RLC. Communication with the cell in which the MAC transmission link is established is started together. If the RLC transmission link and MAC transmission link to become targets are not established, the above-mentioned process is performed after these links are established.

For uplink, the RLC of the cell unified entity that has received the UE HO complete message in Step ST10634 successively processes the uplink RLC PDU transmitted from the MAC.

For downlink, when data transmission is requested in the data request message of Step ST10636, in Step ST10637, the process and transmission to the MAC are restarted. After that, the processes of Steps ST10638 and ST10639 are performed.

For uplink, the PDCP of the cell unified entity that has received the UE HO complete message of Step ST10635 successively processes the uplink PDCP PDU transmitted from the RLC.

For downlink, when data transmission is requested in the data request message of Step ST10640, in Step ST10641, the PDCP PDU process and transmission to the RLC are restarted.

As described above, in this modification, the introduction of the cell unified entity reduces the transmission between layers of the cells, allowing the serving cell to be changed more efficiently while keeping CoMP communication. Although this modification has described the configuration in which the cell unified entity is composed of the RLC, PDCP, and RRC, the cell unified entity may also include part of the MAC or MAC. Alternatively, the RLC may be provided independently and the cell unified entity may be composed of only the RRC and PDCP. Although the transmission amount between entities decreases as the cells are unified in a larger scale, the cell unified entity increases in size and complexity. Meanwhile, if the cells are unified in a smaller scale, the transmission amount between entities increases but the cell unified entity decreases in size and complexity. This should be judged depending on how the cell unified entity is used and installed. The present invention is appropriately applied through proper allocation of inter-layer information transmission depending on the scale in which cells are unified.

Eleventh Embodiment

In the case of performing the HO process on the UE being subjected to CoMP, the source cell needs to appropriately judge whether or not to stop CoMP and perform the HO process or to perform the HO process while performing CoMP. This embodiment will disclose the judgment method.

The HO process method is judged based on whether or not the target cell selected by the serving cell (source cell) is a cell in the CoMP measurement set for the UE to become a HO target. If the cell unified entity decides HO, the cell unified entity may judge the method of the HO process based on whether or not the target cell is a cell in the CoMP measurement set for the UE to become a HO target.

If the target cell is a cell in the CoMP measurement set for the UE to become a HO target, the serving cell judges to perform the HO process while performing CoMP on the UE. The method of the tenth embodiment may be used as the method of performing the HO process while performing CoMP.

If the target cell is not the cell in the CoMP measurement set for the UE to become a HO target, the serving cell judges to stop performing CoMP on the UE and perform the HO process. The method of the eighth embodiment or the ninth embodiment may be used as the method of stopping the execution of CoMP and performing the HO process.

FIG. 74 is a diagram showing an exemplary sequence of a mobile communication system in an eleventh embodiment. FIG. 74 shows the sequence of judging to stop or continue CoMP in performing the HO process on the UE being subjected to CoMP.

The serving cell performs CoMP on the UE1 by the method disclosed in Steps ST1501 to ST1526 and ST1530 of FIGS. 15 and 16.

In Step ST1526, the serving cell and the UE1 perform at least any one of CoMP transmission/reception and CSI feedback.

In Step ST12101, the UE1 performs RRM measurement through CRS measurement. In Step ST12102, the UE1 reports, to the serving cell, the RRM measurement results in Step ST12101 as a measurement report message. The measurement in Step ST12101 includes CRS measurement of the serving cell itself. The measurement report in Step ST12102 may include the CRS measurement results of the serving cell itself.

In Step ST12103, the serving cell decides to perform the HO process on the UE1 using the measurement report from the UE1. At this time, the serving cell decides a target cell.

In Step ST12104, the serving cell judges whether or not the target cell is a cell in the CoMP measurement set. The serving cell moves to Step ST12105 if judging that the target cell is a cell in the CoMP measurement set in Step ST12104 or moves to Step ST12106 if judging that the target cell is not a cell in the CoMP measurement set in Step ST12104.

In Step ST12105, the serving cell decides to perform the HO process while performing CoMP on the UE1 being a HO target.

In Step ST12106, the serving cell decides to stop performing CoMP on the UE1 and perform the HO process being a HO target.

If judging in Step ST12105 to perform the HO process while performing CoMP on the UE1 being a HO target, for example, the serving cell may perform the HO process disclosed in the tenth embodiment. Meanwhile, if judging in Step ST12106 to stop performing CoMP on the UE1 and perform the HO process being a HO target, the serving cell may perform, for example, the HO process disclosed in the eighth embodiment or the ninth embodiment.

If the target cell is a cell in the CoMP measurement set, the target cell can also perform CoMP on the UE being a HO target, and thus, can perform the HO process while performing CoMP. This allows the target cell to obtain a good communication quality.

If the target cell is not a cell in the CoMP measurement set, it has not been decided whether the target cell can perform CoMP on the UE being a HO target. Therefore, when CoMP is stopped and the HO process is performed, a radio link can be connected more reliably at the target cell.

The HO process method is judged based on whether or not the target cell is an in-CoMP-measurement-set cell, as described above, so that the HO process suitable for the state of the UE to become a HO target can be performed. This improves a throughput as the mobile communication system.

First Modification of Eleventh Embodiment

This modification will disclose another method of judging to stop CoMP and perform the HO process or to perform the HO process while performing CoMP when the HO process is performed on the UE being subjected to CoMP.

In this modification, the HO process method is judged based on whether or not the target cell selected by the serving cell is a cell in the CoMP active set for the UE to become a HO target.

If the target cell is a cell in the CoMP active set for the UE to become a HO target, the serving cell judges to perform the HO process while performing CoMP on the UE. The method of the tenth embodiment may be used as the method of performing the HO process while performing CoMP.

If the target cell is not a cell in the CoMP active set for the UE to become a HO target, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the target cell is a cell in the CoMP active set.

If the target cell is a cell in the CoMP active set, the target cell can also perform CoMP on the UE being a HO target, and thus, can perform the HO process while performing CoMP. This also allows the target cell to obtain a good communication quality.

If the target cell is not a cell in the CoMP active set, it has yet to be decided whether the target cell can perform CoMP on the UE being a HO target. Therefore, when CoMP is stopped and the HO process is performed, a radio link can be connected more reliably at the target cell.

As described above, the HO process method is judged based on whether or not the target cell is an in-CoMP-active-set cell, so that the HO process suitable for the state of the UE to become a HO target can be performed. This improves a throughput as the mobile communication system.

Second Modification of Eleventh Embodiment

This modification will disclose another method of judging to stop CoMP and perform the HO process or to perform the HO process while performing CoMP when performing the HO process on the UE being subjected to CoMP.

In this modification, the HO process method is judged based on which RS measurement results by the UE to become a HO target are used when the serving cell selects a target cell.

If the target cell is selected using the CSI-RS measurement results by the UE to become a HO target, the serving cell judges to perform the HO process while performing CoMP on the UE. The method of the tenth embodiment may be used as the method of performing the HO process while performing CoMP.

If the target cell is selected using the CRS measurement results by the UE to become a HO target, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the target cell is selected using the CSI-RS measurement results by the UE to become a HO target or is selected using the CRS measurement results. The serving cell may move to Step ST12105 if using the CSI-RS measurement results or move to Step ST12106 if using the CRS measurement results.

If the target cell is selected using the CSI-RS measurement results, the target cell can obtain a good communication quality even when performing CoMP on the UE being a HO target, and thus, may perform the HO process while performing CoMP.

If the target cell is selected using the CRS measurement results, it is unclear whether or not the target cell can obtain a good communication quality when performing CoMP on the UE being a HO target. Therefore, a radio link can be more reliably connected at the target cell by stopping CoMP and performing the HO process.

As described above, the HO process method is judged based on whether the target cell is selected by measuring the CSI-RS or the target cell is selected by measuring the CRS, so that the HO process suitable for the state of the UE to become a HO target can be performed. This improves a throughput as the mobile communication system.

Third Modification of Eleventh Embodiment

This modification will disclose another method of judging, in performing the HO process on the UE being subjected to CoMP, to stop CoMP and perform the HO process or to perform the HO process while performing CoMP.

In this modification, the HO process method is judged using the number of CoMP transmission points for the UE to become a HO target. For this judgment, a threshold is provided for the number of CoMP transmission points.

If the number of CoMP transmission points for the UE to become a HO target is not larger than the threshold, the serving cell performs the HO process while performing CoMP on the UE. The method of the tenth embodiment may be used as the method of performing the HO process while performing CoMP.

If the number of CoMP transmission points for the UE to become a HO target is larger than the threshold, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the number of CoMP transmission points for the UE to become a HO target is not larger than the predetermined threshold.

If the number of CoMP transmission points is larger than the predetermined threshold, the control of the network becomes complicated if the HO process is performed while performing CoMP. This is because at least any one of the data unit and scheduling information for coordinated control needs to be transmitted between a large number of CoMP transmission points. Therefore, if the number of CoMP transmission points is larger than the predetermined threshold, when CoMP is stopped and the HO process is performed, the processing load of a network can be reduced more and a radio link can be connected more reliably at the target cell.

As described above, the HO process method is judged using the number of CoMP transmission points, so that the HO process suitable for the state of the UE to become a HO target can be performed. This improves a throughput as the mobile communication system.

Fourth Modification of Eleventh Embodiment

This modification will disclose another method of judging the HO process method using the number of CoMP transmission points for the UE to become a HO target. A threshold is provided for the number of CoMP transmission points to judge using the number of CoMP transmission points.

If the number of CoMP transmission points for the UE to become a HO target is not less than the threshold, the serving cell performs the HO process while performing CoMP on the UE. The method of the tenth embodiment may be used as the method of performing the HO process while performing CoMP.

If the number of CoMP transmission points for the UE to become a HO target is smaller than the threshold, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the number of CoMP transmission points for the UE to become a HO target is not less than the predetermined threshold.

If the number of CoMP transmission points is smaller than the predetermined threshold, the communication quality necessary for a communication link with one cell is likely to be obtained. Therefore, the control load of a network can be reduced by stopping CoMP and performing the HO process than by performing the HO process while performing CoMP.

If the number of CoMP transmission points is not less than the predetermined threshold, the required communication quality is unlikely to be obtained unless the data transmission/reception to/from a plurality of cells is used. Thus, a better communication quality can be obtained by performing the HO process while performing CoMP. The HO process method is judged using the number of CoMP transmission points, so that the HO process suitable for the state of the UE to become a HO target can be performed. This improves a throughput as the mobile communication system.

Fifth Modification of Eleventh Embodiment

This modification will disclose another method of judging, when the HO process is performed on the UE being subjected to CoMP, to stop CoMP and perform the HO process or to perform the HO process while performing CoMP.

In this modification, the HO process method is judged using the mobility speed of the UE to become a HO target. For this judgment, a threshold is provided for the mobility speed of the UE.

If the mobility speed of the UE to become a HO target is not larger than the threshold, the serving cell judges to perform the HO process while performing CoMP on the UE. The method of the tenth embodiment may be used as the method of performing the HO process while performing CoMP.

If the mobility speed of the UE to become a HO target is larger than the threshold, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the mobility speed of the UE to become a HO target is not larger than the predetermined threshold.

If the mobility speed of the UE being a HO target is larger than the predetermined threshold, control of the network for performing the HO process while performing CoMP is more affected by a transmission delay of at least any one of the data unit and the scheduling information for coordinated control. If the mobility speed of the UE being a HO target is larger than the predetermined threshold, the UE is likely to be outside the coverage of a new serving cell in a short time, increasing a possibility that the execution of CoMP will fail. Or, even if CoMP does not fail, a cell for optimum CoMP cannot be selected, reducing effects of CoMP. Therefore, if the mobility speed of the UE being a HO target is larger than the predetermined threshold, by stopping CoMP and performing the HO process, a radio link at the target cell can be more reliably connected.

As described above, the HO process method is judged using the mobility speed of the UE being a HO target, so that the HO process suitable for the state of the UE to become a HO target can be performed. This improves a throughput as the mobile communication system.

The following three (1) to (3) will be disclosed as indicators for the mobility speed of the UE.

(1) Actual speed. The UE may measure speed using GPS or the like. The measurement results may be notified the serving cell regularly or periodically from the UE. Or, the measurement results may be notified with a measurement report. This allows the serving cell to use the mobility speed information of the UE.

(2) Mobility speed information included in positioning information of UE. The method of obtaining the location information of the UE, disclosed in the third embodiment, may be used as the method in which the serving cell obtains the mobility speed information.

(3) Mobility speed information obtained from the number of cell reselections. Specifically, the mobility speed information is a speed scaling factor. In the LTE, the serving cell obtains the mobility speed information and thus can use that information.

Sixth Modification of Eleventh Embodiment

This modification will disclose another method of judging, in the case of performing the HO process on the UE being subjected to CoMP, to stop CoMP and perform the HO process or to perform the HO process while performing CoMP.

In this modification, the HO process method is judged using the communication quality with the serving cell. Specifically, the HO process method is judged using the communication quality with the source cell in HO. For this judgment, a threshold is provided for the communication quality.

If the communication quality between the UE to become a HO target and the serving cell is not larger than the threshold, the serving cell judges to perform the HO process while performing CoMP on the UE. The method of the tenth embodiment may be used as the method of performing the HO process while performing CoMP.

If the communication quality between the UE to become a HO target and the serving cell is larger than the threshold, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the communication quality between the UE to become a HO target and the serving cell is not larger than the predetermined threshold.

If the communication quality between the UE to become a HO target and the serving cell is larger than the predetermined threshold, the communication quality necessary for the communication link with one cell is likely to be obtained. Therefore, the control load of a network can be reduced by stopping CoMP and performing the HO process than by performing the HO process while performing CoMP.

Meanwhile, if the communication quality between the UE to become a HO target and the serving cell is not larger than the predetermined threshold, the required communication quality is unlikely be obtained unless the data transmission/reception to/from a plurality of cell is used. A better communication quality can be obtained by performing the HO process while performing CoMP.

As described above, the HO process method is judged using the communication quality with the serving cell, so that the HO process suitable for the state of the UE to become a HO target can be performed. This improves a throughput as the mobile communication system.

Seventh Modification of Eleventh Embodiment

This modification will disclose another method of judging, in the case of performing the HO process on the UE being subjected to CoMP, to stop CoMP and perform the HO process or to perform the HO process while performing CoMP.

In this modification, the HO process method is judged using the communication quality with a new serving cell. Specifically, the HO process method is judged using the communication quality with the target cell in HO. For this judgment, a threshold is provided for the communication quality.

If the communication quality between the UE to become a HO target and the target cell is not larger than the threshold, the serving cell judges to perform the HO process while performing CoMP on the UE. The method of the tenth embodiment may be used as the method of performing the HO process while performing CoMP.

If the communication quality between the UE to become a HO target and the target cell is larger than the threshold, the serving cell judges to stop performing CoMP on the UE and perform the HO process. The method of the eighth embodiment or the ninth embodiment may be used as the method of stopping the execution of CoMP and performing the HO process. The measurement report by the UE may be used for the communication quality between the UE to become a HO target and the target cell. The measurement report may be used for CoMP, for mobility, or for both of them. The communication quality between the UE to become a HO target and the target cell is notified the serving cell. The measurement by the UE may be the CRS measurement results or the CSI-RS measurement results.

The sequence in this modification may be obtained by partly changing the sequence shown in FIG. 74. In Step ST12104 of FIG. 74, the serving cell may judge whether or not the communication quality between the UE to become a HO target and the target cell is not larger than the predetermined threshold.

If the communication quality between the UE to become a HO target and the target cell is larger than the predetermined threshold, the communication quality necessary for a communication link with one cell is likely to be obtained. Therefore, the control load of a network can be reduced more by stopping CoMP and performing the HO process than by performing the HO process while performing CoMP.

Meanwhile, if the communication quality between the UE to become a HO target and the target cell is not larger than the predetermined threshold, the required communication quality cannot be obtained unless data transmission/reception to/from a plurality of cells is used. Therefore, a better communication quality can be obtained by performing the HO process while performing CoMP.

As described above, the HO process method is judged using the communication quality with the target cell, so that the HO process suitable for the state of the UE to become a HO target can be performed. This improves a throughput as the mobile communication system.

Eighth Modification of Eleventh Embodiment

This modification will disclose another method of judging, in the case of performing the HO process on the UE being subjected to CoMP, to stop CoMP and perform the HO process or to perform the HO process while performing CoMP.

In this modification, the HO process method is judged using the types of the service during communication. If the type of service during communication with the UE to become a HO target is a certain type, the serving cell judges to perform the HO process while performing CoMP on the UE. The method of the tenth embodiment may be used as the method of performing the HO process while performing CoMP.

If the type of service during communication with the UE to become a HO target is not a certain type, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the type of service during communication with the UE to become a HO target is a certain type.

As described above, the HO process method is judged using the type of service during communication, so that the HO process suitable for service during communication can be performed.

Ninth Modification of Eleventh Embodiment

This modification will disclose another method of judging, in the case of performing the HO process on the UE being subjected to CoMP, to stop CoMP and perform the HO process or to perform the HO process while performing CoMP.

In this modification, the HO process method is judged using a delay time required for service during communication. For this judgment, a threshold is provided for the delay time required for service.

If the delay time required for service during communication with the UE to become a HO target is not larger than the threshold, the serving cell judges to perform the HO process while performing CoMP on the UE. The method of the tenth embodiment may be used as the method of performing the HO process while performing CoMP.

If the delay time required for service during communication with the UE to become a HO target is larger than the threshold, the serving cell judges to stop performing CoMP on the UE and perform the HO process. The method of the eighth embodiment or the ninth embodiment may be used as the method of stopping the execution of CoMP and performing the HO process.

The sequence in this modification may be obtained by partly changing the sequence shown in FIG. 74. In Step ST12104 of FIG. 74, the serving cell may judge whether or not the delay time required for service during communication with the UE to become a HO target is not larger than the predetermined threshold.

If the delay time required for service during communication with the UE to become a HO target is not larger than the predetermined threshold, a good communication quality is required for reducing the delay time due to, for example, the retransmission process as much as possible. A better communication quality can be obtained by performing the HO process while keeping CoMP than by stopping CoMP and performing the HO process, further reducing a delay time. The HO process method is judged using the delay time required for service during communication, allowing for the HO process suitable for service during communication. This improves a throughput as the mobile communication system.

Although this modification has disclosed to judge the HO process method using a delay time required for service during communication, not the delay time but the judgment indicators disclosed in (1) to (5) below may be used.

(1) Error rate required for service during communication (packet error loss rate).

(2) Resource type required for service during communication. Examples of the resource types include a guaranteed bit rate (GBR) and Non-GBR.

(3) Priority for service during communication.

(4) Quality of service (QOS) of service during communication.

(5) QoS class identifier (QCI) of service during communication.

As described in (1) above, the HO process method is judged using an error rate required for service during communication. For this judgment, a threshold is provided for the error rate required for service.

If the error rate required for service during communication with the UE to become a HO target is not larger than the threshold, the serving cell judges to perform the HO process while performing CoMP on the UE. The method of the tenth embodiment may be applied as the method of performing the HO process while performing CoMP.

If the error rate required for service during communication with the UE to become a HO target is larger than the threshold, the serving cell judges to stop performing CoMP on the UE and perform the HO process. The method of the eighth embodiment or the ninth embodiment may be applied as the method of stopping the execution of CoMP and performing the HO process.

The sequence in the case of using the judgment indicator (1) above may be obtained by partly changing the sequence shown in FIG. 74. In Step ST12104 of FIG. 74, the serving cell may judge whether or not the error rate required for service during communication with the UE to become a HO target is not larger than the predetermined threshold. This allows for the HO process suitable for service during communication, improving a throughput as the mobile communication system.

The HO process method is judged using the resource type required for service during communication, as described in (2) above. If the resource type required for service during communication with the UE to become a HO target is the GBR, the serving cell judges to perform the HO process while performing CoMP on the UE. The method of the tenth embodiment may be applied as the method of performing the HO process while performing CoMP.

If the resource type required for service during communication with the UE to become a HO target is not the GBR, the serving cell judges to stop performing CoMP on the UE and perform the HO process. The method of the eighth embodiment or the ninth embodiment may be applied as the method of stopping the execution of CoMP and performing the HO process.

The sequence in the case of using the judgment indicator (2) above may be obtained by partly changing the sequence shown in FIG. 74. In Step ST12104 of FIG. 74, the serving cell may judge whether or not the resource type required for service during communication with the UE to become a HO target is the GBR. This allows for the HO process suitable for service during communication, improving a throughput as the mobile communication system.

The HO process method is judged using the service priority during communication, as described in (3) above. For this judgment, a threshold is provided for the service priority.

If the service priority during communication with the UE to become a HO target is not less than the threshold, the serving cell judges to perform the HO process while performing CoMP on the UE. The method of the tenth embodiment may be applied as the method of performing the HO process while performing CoMP.

If the service priority during communication with the UE to become a HO target is smaller than the threshold, the serving cell judges to stop performing CoMP on the UE and perform the HO process. The method of the eighth embodiment or the ninth embodiment may be applied as the method of stopping the execution of CoMP and performing the HO process.

The sequence in the case of using the judgment indicator (3) above may be obtained by partly changing the sequence shown in FIG. 74. In Step ST12104 of FIG. 74, the serving cell may judge whether or not the service priority during communication with the UE to become a HO target is not less than the threshold. This allows for the HO process suitable for service during communication, improving a throughput as the mobile communication system.

The HO process method is judged using the QoS of service during communication, as described in (4) above. For this judgment, the QoSs are categorized so that categories are numbered. For example, categories are numbered in ascending order from a category with a good QoS, and a threshold is provided for the numbers.

If the category number of the QoS of service during communication with the UE to become a HO target is not larger than the threshold, the serving cell judges to perform the HO process while performing CoMP on the UE. The method of the tenth embodiment may be applied as the method of performing the HO process while performing CoMP.

If the category number of the QoS of service during communication with the UE to become a HO target is larger than the threshold, the serving cell judges to stop performing CoMP on the UE and perform the HO process. The method of the eighth embodiment or the ninth embodiment may be applied as the method of stopping the execution of CoMP and performing the HO process.

The sequence in the case of using the judgment indicator (4) above may be obtained by party changing the sequence shown in FIG. 74. In Step ST12104 of FIG. 74, the serving cell may judge whether or not the category number of the QoS of service during communication with the UE to become a HO target is not larger than the threshold. This allows for the HO process suitable for service during communication, improving a throughput as the mobile communication system.

As described in (5), the HO process method is judged using the QCI of service during communication. As disclosed in TS23.203 V11.2.0 (hereinafter, referred to "Reference 10") by 3GPP, the QCI refers to an indicator when a plurality of demand indicators for service are classified. For judgment using the QCI, a threshold is provided for the QCI.

If the QCI of service during communication with the UE to become a HO target is not larger than the threshold, the serving cell judges to perform the HO process while performing CoMP on the UE. The method of the tenth embodiment may be applied as the method of performing the HO process while performing CoMP.

If the QCI of service during communication with the UE to become a HO target is larger than the threshold, the serving cell judges to stop performing CoMP on the UE and perform the HO process. The method of the eighth embodiment or the ninth embodiment may be applied as the method of stopping the execution of CoMP and performing the HO process.

The sequence in the case of using the judgment indicator (5) above may be obtained by partly changing the sequence shown in FIG. 74. In Step ST12104 of FIG. 74, the serving cell may judge whether or not the QCI of service during communication with the UE to become a HO target is not larger than the threshold. This allows for the HO process suitable for service during communication, improving a throughput as the mobile communication system.

Tenth Modification of Eleventh Embodiment

This modification will disclose another method of judging, when the HO process is performed on the UE being subjected to CoMP, to stop CoMP and perform the HO process or to perform the HO process while performing CoMP.

In this modification, the HO process method is judged based on whether or not the target cell selected by the serving cell is a cell in the CoMP cooperating set to which the serving cell belongs.

The serving cell judges to perform the HO process between the cells in the CoMP cooperating set while performing CoMP on the UE if the target cell is a cell in the CoMP cooperating set to which its own cell belongs. The method of the first modification of the tenth embodiment may be applied as the method of performing the HO process while performing CoMP between the cells in the CoMP cooperating set.

The serving cell judges to perform the HO process with the cell outside the CoMP cooperating set while performing CoMP on the UE if the target cell is not a cell in the CoMP cooperating set to which its own cell belongs. The method of the tenth embodiment may be applied as the method of performing the HO process while performing CoMP with the cell outside the CoMP cooperating set.

Figure 75:
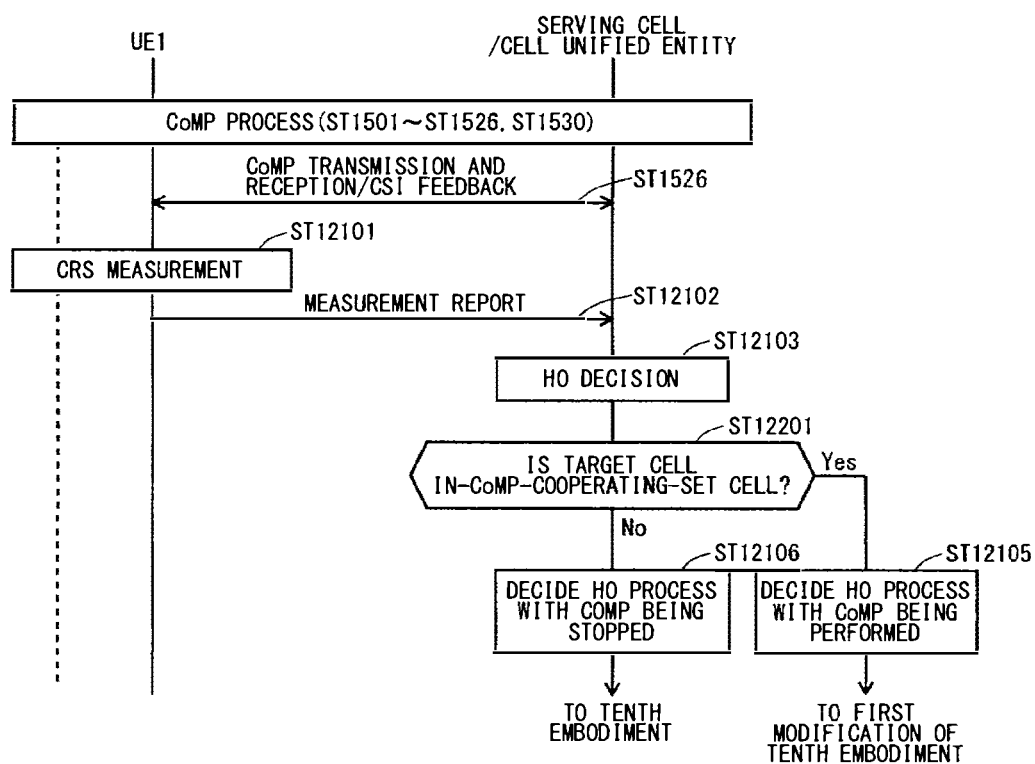
FIG. 75 is a diagram showing an exemplary sequence of a mobile communication system in a tenth modification of the eleventh embodiment.

FIG. 75 is a diagram showing an example of the sequence of a mobile communication system of the tenth modification of the eleventh embodiment. The sequence shown in FIG. 75 is similar to the sequence shown in FIG. 74, and thus, the same steps will be denoted by the same step numbers and common description will be omitted.

In this modification, in Step ST12201 of FIG. 75, the serving cell may judge whether or not the target cell is a cell in the CoMP cooperating set to which the serving cell belongs.

If the target cell is a cell in the CoMP cooperating set to which the serving cell belongs, in Step ST12105, the serving cell judges to perform the HO process between cells in the CoMP cooperating set while performing CoMP. In this case, the HO process disclosed in the first modification of the tenth embodiment may be performed.

If the target cell is not a cell in the CoMP cooperating set to which the serving cell belongs, in Step ST12106, the serving cell judges to perform the HO process with a cell outside the CoMP cooperating set while performing CoMP. In this case, the HO process disclosed in the tenth embodiment may be performed.

The HO process can be thus performed while performing CoMP on the UE being a HO target, depending on whether or not the target cell is a cell in the CoMP cooperating set to which its own cell belongs. Therefore, the target cell can obtain a good communication quality as well. This improves a throughput as the mobile communication system.

The following three (1) to (3) will be disclosed as the method in which the serving cell recognizes whether or not the target cell is a cell in the CoMP cooperating set.

(1) The serving cell inquires, from the central entity, whether or not the target cell belongs to the CoMP cooperating set of its own cell.

The central entity is an entity that intensively adjusts one or a plurality of points, and accordingly, is caused to recognize the cells in the CoMP cooperating set.

In Step ST12103, the serving cell selects a target cell and notifies the central entity of a message for inquiring whether or not the selected target cell is a cell in the CoMP cooperating set of its own cell. The message may include the cell identity of the target cell. This allows the central entity to specify the target cell. Or, the message may include the cell identity of the serving cell. This allows the central entity to specify the serving cell being a demand source.

The central entity notifies the serving cell being a demand source of whether or not the target cell is a cell in the CoMP cooperating set to which the serving cell being a demand source belongs. This allows the serving cell to recognize whether or not the target cell is a cell in the CoMP cooperating set of its own cell.

The serving cell may recognize whether or not the target cell is a cell in the CoMP cooperating set of its own cell, and then, reselect the target cell. This allows for the selection whether HO in the CoMP cooperating set is performed or HO between CoMP cooperating sets is performed. Therefore, the HO process suitable for the state of the UE to become a HO target can be performed, improving a throughput as the mobile communication system.

The method (1) above is not limited for the target cell alone but may be applied as the method of recognizing whether or not a desired cell is a cell in the CoMP cooperating set.

Although the entity that recognizes cells included in the CoMP cooperating set is the central entity herein, not limited thereto, an inquiry may be made to the entity, node, or device that recognizes the cells included in the CoMP cooperating set. For example, if the node that recognizes the cells included in the CoMP cooperating set is an operation administration and maintenance (OAM), an inquiry may be made to the OAM. Or, if the entity that recognizes the cells included in the CoMP cooperating set is the cell unified entity, an inquiry may be made to the cell unified entity. The same holds true for the cases in which the entity and node that recognize the cells included in the CoMP cooperating set are not the cell unified entity and OAM but are the MME, eNB, and HeNB-GW.

(2) The serving cell inquires the CoMP cooperating set of the target cell from the target cell.

After selecting the target cell in Step ST12103, the serving cell notifies the selected target cell of the message for inquiring about the CoMP cooperating set of the target cell. The serving cell may notify the target cell via the MME. At this time, the cell identity of the serving cell may be notified. This allows the target cell to recognize the serving cell being a demand source.

An identifier may be provided for the CoMP cooperating set. This identifier can be used as the method for identifying the CoMP cooperating set, not limited to this modification. Each cell may recognize to which CoMP cooperating set its own cell belongs. For example, the central entity may preliminarily notify each cell of to which CoMP cooperating set its own cell belongs.

The target cell that has received the notification of the message for inquiring the CoMP cooperating set of the target cell notifies the serving cell of the identifier of the CoMP cooperating set to which its own cell belongs. The target cell may notify the serving cell via the MME. This allows the serving cell to recognize whether or not the target cell is a cell in the CoMP cooperating set of its own cell. The serving cell may recognize whether or not the target cell is a cell in the CoMP cooperating set of its own cell, and then, reselect the target cell.

(3) The serving cell inquires, from the target cell, whether or not the target cell belongs to the CoMP cooperating set of its own cell.

After selecting a target cell in Step ST12103, the serving cell notifies the selected target cell of the CoMP cooperating set of its own cell. Specifically, the serving cell may notify the identifier of the CoMP cooperating set of its own cell. The serving cell may notify the target cell via the MME. At this time, the cell identify of the serving cell may also be notified. This allows the target cell to recognize the serving cell being an inquiry source.

The target cell that has received the notification of the CoMP cooperating set of its own cell judges whether or not it belongs to the set from the identifier of the CoMP cooperating set of the serving cell. The target cell notifies the serving cell being a demand source of the judgment results. This allows the serving cell to recognize whether or not the target cell is a cell in the CoMP cooperating set of its own cell. The serving cell may recognize whether or not the target cell is a cell in the CoMP cooperating set of its own cell and then reselect the target cell.

The methods (2) and (3) above may use a HO request message and a HO request response message to be notified from the source cell, here, the serving cell to the target cell when the HO process is performed.

The method described above allows the serving cell to recognize whether or not the target cell is a cell in the CoMP cooperating set.

This embodiment and the modifications thereof may be appropriately applied in combination. The embodiment and the modifications thereof are also applicable to the judgment whether or not to perform CoMP on the UE.

The methods disclosed in the present invention can be appropriately performed in combination. This allows for control corresponding to the system condition.

Although the embodiments have described CoMP in the LTE-A, the technique regarding the coordinated multiple point transmission and reception disclosed in the present invention can be appropriately used in other mobile communication system or a heterogeneous communication system.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1401 RRM measurement set, 1402 CoMP measurement set, 1403 CoMP transmission point, 1601 CoMP active set.

The invention claimed is:

1. A mobile communication system including:
a plurality of base stations; and
a user equipment, the plurality of base stations performing radio communication with the user equipment in a coordinated manner with each other, wherein
a base station among the plurality of base stations transmits measurement object information to the user equipment, the measurement object information indicating a signal to be measured for coordinated communication by the user equipment among signals transmitted from the plurality of base stations,
the user equipment transmits measurement result information to the base station, the measurement result information indicating a measurement result of a measurement object signal indicated by the measurement object information, and
when handover is performed, the base station transmits a signal notifying that the measurement object signal for coordinated communication is released from a measurement object to the user equipment.

2. The mobile communication system according to claim 1, wherein the measurement object signal is a reference signal to be measured by the user equipment for obtaining a state of a channel.

3. The mobile communication system according to claim 1, wherein the measurement object information is transmitted using a communication signal dedicatedly provided for the user equipment.

4. The mobile communication system according to claim 1, wherein the measurement object information is transmitted using a radio resource control (RRC) signal.

5. The mobile communication system according to claim 1, wherein the measurement result information is transmitted from the user equipment to the base station that transmits the measurement object information periodically.

6. The mobile communication system according to claim 1, wherein, when the base station decides to perform the handover, the base station transmits the signal notifying that the measurement object signal for the coordinated communication is released from the measurement object to the user equipment, and
wherein, by dedicated signaling, the base station transmits, the signal notifying that the measurement object signal for the coordinated communication is released, from a measurement object to the user equipment.

7. A base station including a processor of a computer, the base station performing radio communication with a user equipment in a coordinated manner with another base station,
wherein the processor performs control so that:
measurement object information is transmitted to the user equipment, the measurement object information indicating a signal to be measured for coordinated communication by the user equipment among signals transmitted from the base station and the another base station;
measurement result information is received from the user equipment, the measurement result information indicating a measurement result of a measurement object signal indicated by the measurement object information; and
when handover is performed, a signal notifying that the measurement object signal for coordinated communication is released from a measurement object is transmitted to the user equipment.

8. A user equipment including a processor of a computer, the user equipment performing radio communication with a plurality of base stations that operate in a coordinated manner with each other,
wherein the processor performs control so that:
measurement object information is received from a base station among the plurality of base stations, the measurement object information indicating a signal to be measured for coordinated communication by the user equipment among signals transmitted from the plurality of base stations;
measurement result information is transmitted to the base station, the measurement result information indicating a measurement result of a measurement object signal indicated by the measurement object information; and
when handover is performed, a signal notifying that the measurement object signal for coordinated communication is released from a measurement object is received from the base station.

\* \* \* \* \*